(12) United States Patent
Lim et al.

(10) Patent No.: US 12,213,419 B2
(45) Date of Patent: *Feb. 4, 2025

(54) APPARATUS FOR CULTIVATING PLANTS

(71) Applicant: LG ELECTRONICS INC., Seoul (KR)

(72) Inventors: Kiyoung Lim, Seoul (KR); Yongki Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/018,445

(22) PCT Filed: Jul. 29, 2021

(86) PCT No.: PCT/KR2021/009903
§ 371 (c)(1),
(2) Date: Jan. 27, 2023

(87) PCT Pub. No.: WO2022/025674
PCT Pub. Date: Feb. 3, 2022

(65) Prior Publication Data
US 2023/0292677 A1    Sep. 21, 2023

(30) Foreign Application Priority Data

Jul. 29, 2020  (KR) .................. 10-2020-0094822

(51) Int. Cl.
*A01G 27/00*    (2006.01)
*A01G 9/02*    (2018.01)
(Continued)

(52) U.S. Cl.
CPC ............. *A01G 9/247* (2013.01); *A01G 9/028* (2013.01); *A01G 9/249* (2019.05); *A01G 27/006* (2013.01)

(58) Field of Classification Search
CPC ........ A01G 31/02; A01G 31/00; A01G 31/06; A01G 27/008; A01G 9/247; A01G 27/003
See application file for complete search history.

(56) References Cited

U.S. PATENT DOCUMENTS 10,455,777 B1    10/2019 Dennison
2018/0359970 A1   12/2018 Millar et al.
(Continued)

FOREIGN PATENT DOCUMENTS

CN    207589648    7/2018
EP    3 649 848 A1    5/2020
(Continued)

OTHER PUBLICATIONS

International Search Report (with English Translation) dated Nov. 1, 2021 issued in Application No. PCT/KR2021/009903.

(Continued)

*Primary Examiner* — Kristen C Hayes
(74) *Attorney, Agent, or Firm* — KED & ASSOCIATES, LLP

(57) ABSTRACT

The present disclosure relates to an apparatus for cultivating plants, the apparatus includes a cabinet having a cultivation space; a door opening and closing the cultivation space; a cultivation shelf disposed inside the cultivation space and on which a seed package containing plants for cultivation is seated; a lighting device for radiating light to the cultivation shelf; a water tank provided inside the cultivation space and storing water; and a water supply pipe supplying water from the water tank to the cultivation shelf.

19 Claims, 96 Drawing Sheets

(51) Int. Cl.
*A01G 9/24* (2006.01)
*A01G 31/06* (2006.01)

(56) References Cited

U.S. PATENT DOCUMENTS

| | | | | |
|---|---|---|---|---|
| 2022/0007599 A1* | 1/2022 | Lim | ........................ | A01G 7/045 |
| 2022/0295714 A1* | 9/2022 | Choi | .................... | A01G 27/003 |
| 2022/0394937 A1* | 12/2022 | Jung | .................... | A01G 9/0293 |
| 2023/0095718 A1* | 3/2023 | Kuffner | ................. | A01G 9/247 |
| | | | | 47/65.9 |
| 2023/0109941 A1* | 4/2023 | Lim | ......................... | C02F 1/32 |
| | | | | 47/17 |

FOREIGN PATENT DOCUMENTS

| | | | | |
|---|---|---|---|---|
| EP | 3695709 A1 * | 8/2020 | ........... | A01G 27/003 |
| EP | 3 939 415 A1 | 1/2022 | | |
| KR | 10-1240375 | 3/2013 | | |
| KR | 10-2013-0098091 A | 9/2013 | | |
| KR | 10-1342141 | 12/2013 | | |
| KR | 10-1354706 | 1/2014 | | |
| KR | 10-1415842 | 7/2014 | | |
| KR | 10-1954251 | 3/2019 | | |
| KR | 10-2026448 | 9/2019 | | |
| WO | WO-2021080141 A1 * | 4/2021 | ............. | A01G 31/06 |
| WO | WO-2021085871 A1 * | 5/2021 | ............. | A01G 24/00 |

OTHER PUBLICATIONS

Partial supplementary European Search Report dated Jul. 26, 2024 issued in Application 21851243.2.

* cited by examiner

APPARATUS FOR CULTIVATING PLANTS

CROSS-REFERENCE TO RELATED PATENT APPLICATIONS

This application is a U.S. National Stage Application under 35 U.S.C. § 371 of PCT Application No. PCT/KR2021/009903, filed Jul. 29, 2021, which claims priority to Korean Patent Application No. 10-2020-0094822, filed Jul. 29, 2020, whose entire disclosures are hereby incorporated by reference.

TECHNICAL FIELD

The present disclosure relates to an apparatus for cultivating plants.

BACKGROUND ART

In general, an apparatus for cultivating plants, which provides a predetermined cultivation chamber having environments that are appropriate to grow the plants so that the plants are stored in the predetermined cultivation chamber. A configuration for supplying light energy required for the plant growth is provided in the apparatus for cultivating the plants, and the plats are grown by the supplied nutrients and light energy.

In recent years, an apparatus for cultivating plants, which is provided with a cultivation space capable of being controlled in light, temperature, and moisture and a door opening and closing the cultivation space so that the plants are capable of being grown in the home, is being developed.

A structure in which a multi-stage tray is disposed inside a cabinet, light is radiated from a light radiation portion to the tray, a nutrient solution is supplied to the tray through a nutrient solution collection box, and the inside of the cabinet is maintained to a set temperature by an air cooling device and an air circulation fan to cultivate the plants is disclosed in Korean Patent Registration No. 10-1240375.

However, according to the related art having the above-described structure, a structure in which the nutrient solution is supplied to the inside of the entire tray when the plants are cultivated may be provided, and In addition, the nutrient solution is also supplied to the entire tray even when the plants are partially cultivated in the tray. Thus, there is a limitation that mold or green algae are grown in an empty space.

In addition, there is a problem in that the nutrient solution supplied to the plants is exposed through the entire tray, and thus, when a lighting device operates, an environment under which generation of green algae or contaminants due to fur or mold is easy is provided to allow a user to feel discomfort.

A plant cultivator, in which a capsule containing seeds is seated in a case that defines a cultivation space opened and closed by a door, and light, moisture, and temperature are capable of being respectively controlled by a light source module, a culture solution module, and an air conditioning module, is disclosed in Korean Patent Registration No. 10-1954251.

However, according to the related art having the above-described structure, a structure in which the culture solution is supplied to the entire tray may be provided, and In addition, the culture solution may be injected to a portion, on which the capsule is not mounted, so that the culture solution is exposed to the outside and thus is contaminated.

Particularly, when a closed environment is provided in a temperature area in which the plants are grown, the culture solution may be very easily contaminated, and thus, there is a limitation that, when mold or green algae are generated due to the contamination of the culture solution, user's dissatisfaction is caused.

DISCLOSURE

Technical Problem

An object of the present disclosure is to provide an apparatus for cultivating plants with improved usability.

An object of the present disclosure is to provide an apparatus for cultivating plants that improves hygiene inside the cultivation space by preventing contamination of the inside of the cultivation space.

An object of the present disclosure is to provide an apparatus for cultivating plants capable of preventing leakage inside the cultivation space.

An object of the present disclosure is to provide an apparatus for cultivating plants capable of selectively supplying water so that water is supplied only to an area where a plurality of seed packages are mounted.

An object of the present disclosure is to provide an apparatus for cultivating plants capable capable of smoothly supplying and draining water in a structure in which a cultivation shelf on which a seed package is seated can be accessible.

An object of the present disclosure is to provide an apparatus for cultivating plants that can be operated according to a user's life pattern.

An object of the present disclosure is to provide an apparatus for cultivating plants capable of supplying a sufficient amount of water regardless of the type of crop.

An object of the present disclosure is to provide an apparatus for cultivating plants that allows an outer appearance of the inside of the cultivation space to look neat and hygienic.

An object of the present disclosure is to provide a seed package for an apparatus for cultivating plants capable of smoothly supplying water to seeds and maintaining a state where plants are seated.

An object of the present disclosure is to provide a refrigerator provided with a water tank installed inside a space where temperature is controlled and ensuring reliability of water supply.

An object of the present disclosure is to provide a water supply device capable of preventing contamination of water to be supplied.

Technical Solution

The apparatus for cultivating plants according to the present embodiment may include a cabinet in which a cultivation space is formed; a door opening and closing the cultivation space; a cultivation shelf disposed inside the cultivation space and on which a seed package containing plants for cultivation is seated; a lighting device for radiating light to the cultivation shelf; a water tank provided inside the cultivation space and storing water; and a water supply pipe supplying water from the water tank to the cultivation shelf.

The apparatus for cultivating plants according to the present embodiment may include a cabinet in which a cultivation space is formed; a cultivation shelf disposed inside the cultivation space and on which a seed package containing plants for cultivation is seated; a lighting device for radiating light to the cultivation shelf; and a water supply pipe for supplying water to the cultivation shelf, in which the cultivation shelf includes a shelf tray formed of stainless material and having a seat on which the seed package is seated; a shelf base provided under the shelf tray and accommodating water supplied from the water supply pipe; and a shutter provided to be openable and openable in the seat, and water accommodated in the shelf base may pass through the shutter and flow into the seat when the shutter is opened.

A plurality of the seats are independently recessed into the shelf tray, a plurality of seed packages may be selectively seated on each of the seats, and the shutters are disposed on the plurality of seats, so that the seed packages are It can be opened when seated on the seat.

The shelf base is mounted to be withdrawn out from the cultivation space by shelf rails, and a water supply portion may be formed at a lower portion of the outlet of the water supply pipe in the shelf base in a state where the shelf base is inserted into the cultivation space.

In the shelf base, a base passage through which water supplied from the water supply pipe flows and a drain hole formed at a rear end of the shelf base and through which water in the base passage is drained are formed, and an opening/closing member opening and closing the drain hole is provided on the shelf base so that water supplied from the water supply pipe can be drained through the drain hole via the base passage in a state where the shelf base is inserted into the cultivation space.

A driving device operated to open and close the opening/closing member is provided in the cultivation space, and the driving device is operated when a set time elapses after supplying water to allow water inside the shelf base to be drained.

A floating member accommodating a magnet may be disposed in the base passage, and a water level detection device for detecting the water level of the shelf base by the hall sensor may be provided below the shelf base.

When a set water level or higher is detected by the water level detection device, driving of a pump connected to the water supply pipe may be stopped.

A drain portion may be formed on the shelf base to pass through the shelf base at a position higher than the set water level and forcibly drain water above the set water level.

An apparatus for cultivating plants according to an embodiment of the present disclosure may include a cabinet in which a cultivation space is formed by an insulating wall; a door hinged to the cabinet and including a viewing window capable of checking the cultivation space from the outside; a shelf rail provided inside the cabinet; a cultivation shelf coupled to the shelf rail, withdrawn out from the cultivation space, and on which a seed package containing plants for cultivation is seated; a water supply pipe fixed to the inside of the cabinet and having an outlet positioned above the cultivation shelf to supply water to the cultivation shelf; a plate-shaped evaporator installed on a wall surface of the cultivation space at the rear of the cultivation shelf in a direction perpendicular to a direction of the cultivation shelf which is accessible and controlling the temperature of the cultivation space; and a blower disposed in front of the evaporator.

The cabinet may include a metal inner case forming the cultivation space; an outer case forming the outer appearance; and an insulator disposed in a space formed by the combination of the inner case and the outer case and insulating the cultivation space, in which the cabinet includes a blower fan cover forming the front surface of the blower and made of a metal material; and a lighting device installed on an top surface of the inner case, and light radiated from the lighting device may be reflected by the inner case and the blower fan cover to be irradiated.

The lighting device may include a light source module in which a plurality of light sources are disposed, and a light case in which the light source module is mounted, and the number of light sources disposed in the front half portion based on the center of the lighting device may be disposed to be more than the number of light sources in the rear half portion, and the space between both sides of adjacent light sources may be narrower than the space at the center.

The apparatus for cultivating plants may include a heater installed inside the cabinet; a temperature sensor for sensing the temperature of the cultivation space; a machine room disposed below the cabinet and having a compressor disposed therein; a water tank disposed inside the cultivation space; a pump connecting the water tank and the water supply pipe; and a control device configured to control operations of the pump, heater, and compressor.

The apparatus for cultivating plants may include a separation partition wall extending to be long from the bottom surface of the machine room in the front and rear direction and partitioning the inside of the machine room in the left and right direction; a heat dissipation fan provided at a rear end of the separation partition wall; a front cover forming the front surface of the machine room and having a plurality of openings, in which the compressor and the condenser are disposed with respect to the separation partition wall in the left and right direction, and the air suctioned from the front through the opening of the front cover may be discharged forward through the opening of the front cover after sequentially passing through the conderser, a heat dissipation fan, and the compressor.

The top surface of the machine room and the bottom surface of the cultivation space may be stepped so that the rear half portion where the compressor is disposed protrudes upward, and the water tank may be disposed on the front half portion of the bottom surface of the cultivation space in front of the compressor.

The apparatus for cultivating plants may further include a tank rail mounted on an inner surface of the cultivation space and coupled to the water tank to allow the water tank to be withdrawn out; in which the water tank may include: a tank body connected to the tank rail and storing water; and a tank cover that opens and closes the open top surface of the tank body by rotation, and the tank rail may be withdrawn out to a position where the tank cover is rotatable.

The machine room module coupled to the lower portion of the cabinet to form the machine room may include a machine room lower plate forming a lower surface of the machine room and a plurality of side frames forming a side surface of the machine room, in which each of the side frames is bent to form the side surface of the frame, the top surface of the frame, and the lower surface of the frame, the top surface of the frame and the lower surface of the frame, the lower surface of the frame protrudes forward than the front surface of the cabinet, and a height adjustment leg is coupled to the protruding lower surface of the frame, in a state where the cultivation shelf is withdrawn from the cultivation space, a cabinet may be supported by the height adjustment leg to prevent the cabinet from falling over.

A plurality of cultivation shelves are provided in the vertical direction to partition the cultivation space, in the cultivation space, a lighting device positioned above each space partitioned by the cultivation shelf and irradiating light into the cultivation space; and a blower located at the rear of each space partitioned by the cultivation shelf are provided, the outlet of the blower is located at a position corresponding to the lower surface of the lighting device, and the inlet of the blower may be located at a position corresponding to the top surface of the cultivation shelf.

The water supply pipe is disposed to extend along the water supply pipe guide portion in the vertical direction recessed on one of both surfaces of the inner case in the left and right directions, and the outlet of the water supply pipe protrudes from the top of the cultivation shelf toward the top surface of the cultivation shelf.

The apparatus for cultivating plants may include a drain pipe guide portion recessed into the other of both surfaces of the inner case in the left and right direction and extending in the upper and lower direction; a drain pipe extending along the drain pipe guide portion and guiding water drained from the cultivation shelf, and an inlet of the drain pipe may be located below the cultivation shelf.

The apparatus for cultivating plants may further include a shelf detection device for detecting the insertion of the cultivation shelf in a state where the cultivation shelf is completely inserted, and water can be supplied in a state where the insertion of the cultivation shelf is detected by the shelf detection device.

A magnet may be provided on a lower surface of the cultivation shelf, and the shelf detection device may include a hall sensor capable of detecting the magnet.

An apparatus for cultivating plants according to an embodiment of the present disclosure may include an outer case forming an outer appearance, an inner case forming a cultivation space, a cabinet composed of an insulator disposed in a space between the inner case and the outer case; an evaporator installed in the inner case to control the temperature of the cultivation space; a door opening and closing the cultivation space; a cultivation shelf disposed inside the cultivation space and on which a seed package containing plants for cultivation is seated; a water supply module supplying water to the cultivation shelf; a machine room forming a separate space under the cultivation space; a compressor disposed in the machine room and connected to the evaporator to compress the refrigerant; a heat dissipation fan disposed in the machine room and dissipating heat generated by the compressor to the outside; a suction passage formed at an upper portion of the cabinet to pass through the insulator and into which outside air is introduced; and a discharge passage formed on a lower surface of the cabinet to pass through the insulator and discharging air inside the cultivation space to the machine room.

An exhaust fan is further provided in the discharge passage, and when the exhaust fan operates, air in the cultivation space may be discharged to the outside of the cabinet via the machine room.

The suction passage may be formed to pass through a side surface of the inner case and a rear surface of the outer case, and a filter may be installed in the suction passage.

A plate-shaped evaporator for cooling the cultivation space may be provided at a rear surface of the cultivation space, and the suction passage may be disposed at a side of the evaporator.

A blower for circulating air inside the cultivation space is provided in front of the evaporator, and the outlet of the suction passage is located between the evaporator and the blower, so that outside air may be introduced through the suction passage by driving the blower.

The discharge passage may be disposed to communicate with a suction side of the heat dissipation fan.

A separation partition wall partitioning the machine room into a suction-side space into which a condenser is inserted and a discharge-side space into which a compressor is inserted is provided inside the machine room, the heat dissipation fan is mounted on the separation partition wall, and the outlet of the discharge passage may be opened in the suction-side space.

An apparatus for cultivating plants according to an embodiment of the present disclosure may include a cabinet forming a cultivation space; a door opening and closing the cultivation space; a cultivation shelf provided in the cultivation space, on which a plurality of seed packages accommodating seeds are seated, and on which a base passage for supplying water to the inside of the seed package is formed; a water supply pipe having an outlet formed above the cultivation shelf to supply water to the cultivation shelf; a pump for supplying water to the water supply pipe; a drain hole formed in the base passage; an opening/closing member opening and closing the drain hole; a driving device for operating the opening/closing member; a drain pipe provided below the cultivation shelf and guiding water drained by opening of the opening/closing member; and a control device configured to control the operation of the driving device and the pump, in which the control device may control to repeat maintenance of a state where water is stored in the cultivation shelf and a state where water is drained for a set time.

The amount of water supplied to the cultivation shelf is controlled by the driving time of the pump, and water can be supplied at a fixed rate regardless of the number of seed packages mounted on the cultivation shelf.

The driving device may be operated after 1 hour to 1 hour 30 minutes after water is supplied to the cultivation shelf to initiate drainage.

The pump may start supplying water at regular time intervals.

The cultivation shelf may include a shelf base in which the base passage is formed; and a shelf tray seated on an top surface of the shelf base and formed with a plurality of seats recessed to accommodate the plurality of seed packages, respectively, in which a communication hole through which water from the base passage is introduced is formed in the seat, and an opening through which water flows into the seat may be formed on a bottom surface of the seed package.

An apparatus for cultivating plants according to an embodiment of the present disclosure may include a cabinet forming a cultivation space; a door opening and closing the cultivation space; a cultivation shelf provided inside the cultivation space and on which a seed package containing plants for cultivation is seated; a lighting device provided above the cultivation shelf and irradiating light for plant cultivation; a display device having a manipulation portion for inputting time and a display portion for displaying time; a water supply pipe supplying water to the cultivation shelf; a pump connected to the water supply pipe; and a control portion that controls the pump, display, and lighting device, wherein the control portion can control the lighting device by determining daytime and nighttime based on the current time input through the manipulation portion.

An operating time of the lighting device may be adjusted through the manipulation portion.

The lighting device may be turned on for a set time based on an arbitrary time input from the manipulation portion and then turned off repeatedly.

The lighting device may be kept in an off state at night for a second set time smaller than the first set time for which the lighting device is kept in an on state during the daytime.

At least a portion of the door is formed to be see-through, and the display device is disposed at a position facing the door so that display information of the display portion can be seen through the door when the door is closed.

When the door is opened while the lighting device is turned on, the lighting device may be controlled to be lower than the illuminance of the lighting device before the door is opened.

An apparatus for cultivating plants according to an embodiment of the present disclosure may include a cabinet having a cultivation space; a cultivation shelf provided in the cabinet and on which a plurality of seed packages containing plants for cultivation are seated; a lighting device provided in the cabinet and irradiating light to the cultivation shelf; and a water supply pipe provided in the cabinet and supplying water to the cultivation shelf, in which the cultivation shelf may include a shelf tray formed with a plurality of seats on which the plurality of seed packages are seated; a shelf base provided under the shelf tray and accommodating water supplied from the water supply pipe; and shutters provided to be capable of opening and closing in each of the plurality of seats, and water accommodated in the shelf base may pass through the shutters and is introduced into the seats when the shutters are opened.

The shelf tray may be formed of a stainless material.

An opening through which water passing through the shutter flows into the seed package may be formed on a bottom surface of the seed package facing the shutter.

A water inlet recessed to accommodate the shutter may be formed on a bottom surface of the seed package when the seed package is seated, and the opening may be formed around the water inlet.

The shutter is movably mounted on the shelf tray in the vertical direction to be opened and closed, and when the seed package is mounted on the seat, the seed package may press the shutter to open the shutter.

In a state where the seed package is not mounted on the seat, the shutter may maintain a closed state.

Both sides of the cultivation shelf and both sides of the cultivation space are connected by shelf rails, and the cultivation shelf may be withdrawn out of the cultivation space.

In the shelf base, a plurality of base seats corresponding to the plurality of seats of the shelf tray are recessed, water to be supplied may be supplied to the plurality of seats and may be supplied to the seed package through an open shutter among the shutters.

An apparatus for cultivating plants according to an embodiment of the present disclosure may include a cabinet in which a cultivation space is formed; a door opening and closing the cultivation space; a cultivation shelf disposed inside the cultivation space and on which a seed package containing plants for cultivation is seated; a tank body in which a space for storing water supplied to the cultivation shelf is formed; a tank rail connected to both side surfaces of the tank body and an inner surface of the cultivation space, and inserting and withdrawing the tank body; a tank cover coupled to one side of the tank body with a rotating shaft and opening and closing the tank body by rotation; a first water outlet extending from the lower surface of the tank cover and having a first flow path for transporting water stored in the tank body; a second water outlet extending in an inlet direction of the tank body and having a second flow path communicating with the first flow path formed in the first water outlet; a fitting portion selectively engaged with the second water outlet when the tank body is inserted; and a water supply device connected to the fitting portion and including a pump that supplies water inside the tank body to the cultivation shelf via the first flow path and the second flow path.

The tank cover is made of a plastic material, and the first water outlet and the second water outlet are integrally formed with the tank cover so that the first flow path and the second flow path may be airtightly connected.

The second water outlet rotates together with the rotation of the tank cover, and a recessed water outlet groove may be formed on the top of the tank body to evacuate when the second water outlet rotates.

An apparatus for cultivating plants may include a tank level detection device in which a tank floater having a magnet is installed inside the tank body, and having a hall sensor for detecting the magnet installed inside the cultivation space to detect the level of water stored in the water tank.

A cover guide portion may be provided on a lower surface of the tank cover to extend toward the inside of the tank body and guide water flowing along the lower surface of the tank cover to the inside of the tank body when the tank cover is opened.

The cover guide portion extends to be in contact with the circumference of the open top surface of the tank body, and a water collection portion may be formed in the inner area of the cover guide portion to maintain a state where the water droplets form on the lower surface of the tank cover by continuously forming a plurality of grooves so that water droplets can form due to surface tension.

An evaporator for cooling the cultivation space may be provided inside the cultivation space, and a heater for heating the cultivation space may be provided inside a wall of the cultivation space.

The seed package of the apparatus for cultivating plants according to an embodiment of the present disclosure may include a seed accommodation member mounted interchangeably in the cultivation space of the apparatus for cultivating plants and formed of a material capable of absorbing moisture while accommodating cultivated seeds therein; a container for forming an accommodation space for accommodating the seed accommodation member; and a cover for shielding the open top surface of the container; in which the seed accommodation member forms a seed accommodation groove extending downward from the cover, forms a plurality of mutually open cell structures, and the roots of seeds disposed in the seed accommodation grooves can grow while passing through the open cells.

The size of the cell is 0.1 to 1.5 mm, and the cultivated seeds accommodated in the seed accommodation groove can be prevented from escaping through the cell.

The seed accommodation member is formed of a stretchable material so that the roots of the cultivated seeds grow while passing through the cells so that the cells can grow.

The container cover has a cover hole which communicates with the seed accommodation groove and which opens to allow the stem of a plant to be cultivated to pass through, and a seed accommodation member mounting portion which is formed around the cover hole and extends downward to insert and fix the top surface of the seed accommodation member.

A cover sheet shielding the cover hole and displaying information about a plant to be cultivated is attached to an top surface of the container cover and may be disposed in the cultivation space in a state where the cover sheet is removed.

A reflective sheet for reflecting irradiated light may be attached to an top surface of the container cover, and a sheet hole corresponding to the cover hole may be formed in the reflective sheet.

An opening through which water supplied from the outside of the container is introduced is formed at the center of the bottom surface of the container, and a plurality of the seed accommodation members may be disposed spaced apart from each other on both sides based on the opening.

The seed accommodation member may be formed to extend in contact with the bottom surface of the container.

A shielding member made of a material through which water can pass through and shielding an opening on the bottom surface of the container may be further provided inside the container.

A refrigerator according to an embodiment of the present disclosure may include a cabinet in which a storage space is formed; a door opening and closing a front opening of the cabinet; a tank body in which a space for storing water is formed; a tank rail connected to both side surfaces of the tank body and an inner surface of the cabinet and inserting and withdrawing the tank body; a tank cover coupled to one side of the tank body with a rotating shaft and opening and closing the tank body by rotation; a first water outlet extending from the lower surface of the tank cover and having a first flow path for transporting water stored in the tank body; a second water outlet extending in an insertion direction of the tank body and having a second flow path communicating with the first flow path formed in the first water outlet; a fitting portion selectively engaged with the second water outlet when the tank body is inserted; and a water supply device including a pump connected to the fitting portion and allowing water inside the tank body to flow through the first flow path and the second flow path.

The tank cover is made of a plastic material, and the first water outlet and the second water outlet are integrally formed with the tank cover so that the first flow path and the second flow path may be airtightly connected.

The second water outlet rotates together with the rotation of the tank cover, and a recessed water outlet groove may be formed on the upper portion of the tank body to evacuate when the second water outlet rotates.

The refrigerator may include a tank level detection device detecting the level of water stored in the water tank by installing a tank floater having a magnet inside the tank body and installing a hall sensor detecting the magnet inside the cabinet.

A water supply device according to an embodiment of the present disclosure may include a water tank having a first water storage space for storing water; a water supply pipe supplying the water stored in the water tank to the outside; a pump connected to the water supply pipe; and a sub-tank provided between the outlet of the water tank and the inlet of the pump, having a storage volume relatively smaller than that of the first water storage space, and having a transparent window; and a UV lamp installed to irradiate ultraviolet rays to the second water storage space through the transparent window of the sub-tank.

The water flowing by the operation of the pump may directly contact the inner surface of the transparent window and be sterilized by the UV lamp.

The UV lamp may be turned on while the pump is stopped to sterilize the water stored in the sub-tank.

The size of the second storage space may be smaller than that of the first storage space.

The sub-tank may maintain a state of being filled with water necessary for initial driving of the pump.

The water supply device may further include a tank level detection device for detecting the level of the water tank, and when the level of the water tank is less than or equal to a set level, the pump may maintain a state of being stopped.

The sub-tank may include a sub body forming the second storage space; and a sub cover shielding an open top surface of the sub body, the lamp cover may be mounted to shield an opening formed through the sub cover, and the UV lamp may be disposed on an outer surface of the sub cover.

The sub-tank may include a water outlet formed at the lower end of the sub-tank and connected to the pump to discharge water from the second storage space, and a water inlet formed on one side of the sub-tank above the water outlet and introducing water from the water tank.

Advantageous Effect

Apparatus for cultivating plants according to an embodiment of the present disclosure can expect the following effects.

In the apparatus for cultivating plants according to an embodiment of the present disclosure, the inside of the cultivation space is formed of stainless material, and the top surface of the cultivation shelf on which the seed package is seated is also formed of stainless material, and thus there is an advantage in that the inside of the cultivation space which is exposed looks very clean when the door is opened.

In addition, there is an advantage of maintaining a substantially clean state by preventing the growth of mold or the occurrence of contaminants in the cultivation space by the inner case made of stainless material and the structure of the top surface of the cultivation shelf.

In addition, the cultivation shelf inside the cultivation space may have a structure that can be accessible and may have a structure that does not interfere with the water supply pipe and the drain pipe even when being accessible. Therefore, the user can automatically supply and drain water, and at the same time, it is easy to attach and detach the seed package and manage the cultivated plants through the withdrawal and insertion of the cultivation shelf, thereby improving the convenience of use.

In addition, the cultivation shelf does not have an electric device for detecting the water level or the position of the shelf, and the water level and the position of the shelf can be detected from the outside of the cultivation shelf through the water level detection device and the shelf detection device and thus there is an advantage in that the structure of the cultivation shelf is simple because it is not necessary to arrange a electric wire and a power supply structure on the cultivation shelf having a structure which is accessible.

In addition, since the water tank disposed inside the cultivation space can be accessible, water supply and addition of nutrients can be easily performed. In addition, there is an advantage in that it is possible to prevent water leakage into the cultivation space and thus contamination by detecting the withdrawal and insertion of the water tank and preventing drainage and supply of water while the water tank is withdrawn.

In addition, the water stored in the water tank is circulated between the cultivation shelves, and therefore, there is an advantage in that frequent water supply is not required and thus it is convenient to use. In addition, there is an advantage in that stable cultivation of plants can be guaranteed by allowing a user to be notified when the water tank is short of water.

Meanwhile, since the cultivation space is sealed by a door and the temperature of the cultivation space can be controlled by a temperature control device, it is possible to create an environment that facilitates plant cultivation. However, at the same time, the environment of the cultivation space is an environment where mold and green algae are likely to occur, and water is selectively supplied only to the area where the seed package is placed, and the cultivation shelf is emptied after a set time elapses after water supply to cause internal contamination of the cultivation space to be minimized, and there is an advantage of improving the hygiene inside the cultivation space.

In particular, the cultivation shelf may include a shelf tray on which seed packages are seated, and a shelf base for receiving water below the shelf tray. In addition, the shelf tray has a structure for shielding the shelf base from above so that water supplied to the cultivation shelf is not directly exposed to the outside.

Therefore, it is possible to prevent the inside of the cultivation space from being contaminated by the water supplied, and to prevent green algae from occurring by supplying light to the water of the cultivation shelf so that the cultivation shelf and the cultivation space can maintain a sanitary condition.

In addition, a plurality of seats on which the seed packages are seated are formed on the cultivation shelf, and shutters that are opened when the seed packages are seated may be provided on the seats. The shutter enables selective water supply only to the seat where the seed package is seated among the entire seats of the cultivation shelf, so that water is not supplied to the seat where the seed package is not mounted and thus since the supplied water is exposed to the outside, the occurrence of contamination can be prevented.

In addition, the cultivation shelf is configured to be supplied with a fixed amount of water by a pump, so that problems such as overflow due to excessive water supply can be prevented. In addition, the water level detection device is configured to detect the water level of the cultivation shelf, and when the water level of the cultivation shelf rises to or exceeds the set water level due to a malfunction of the pump or a problem during drainage work, by detecting this, water supply can be stopped to prevent water overflow problems. In addition, even if the water level detection device malfunctions and water is supplied in a situation where the water level cannot be detected, a drain portion is formed on the cultivation shelf so that when water is supplied at or above the limit water level, water at or above the limit water level can be drained to prevent contamination of the cultivation space due to overflow of water in the cultivation shelf.

In addition, the water supplied to the cultivation shelf maintains a water supply state for a set time, and after supplying water, all the water in the cultivation shelf is drained when a set time has elapsed so that the plant can sufficiently absorb water. Therefore, there is an advantage in that a sufficient amount of water can be supplied regardless of the type and quantity of crops to be cultivated.

In addition, after supplying water, all the water inside the cultivation shelf is drained so that there is no water inside the cultivation shelf for a set period of time to prevent mold or green algae from occurring, thereby there are advantages of preventing odor in the cultivation space and improving sanitation.

In addition, in the lighting device according to the embodiment of the present disclosure, a plurality of light sources are arranged in a certain shape. As for the light sources, the number of light sources disposed in the front half portion is greater than the number of light sources disposed in the rear half portion, and the distance between both sides of adjacent light sources is narrower than that in the center. That is, an inner case made of metal is provided on both sides and rear of the lighting device, and a door made of glass is provided on the front side of the lighting device. Therefore, the degree of reflection and scattering is different depending on the direction of the irradiated light, and this arrangement has the advantage of providing a uniform amount of light to the cultivated plants regardless of the position in the cultivation shelf.

In addition, a proximity detection device is disposed in front of the cabinet. Therefore, before the user opens the door, it is possible to detect in advance that the user is close to the apparatus for cultivating plants, and thus there is an advantage of preventing water from leaking into the cultivation space due to the cultivation shelf or water tank being withdrawn out during the water supply or drainage process.

In addition, if the user does not open the door for a set time while the proximity detection device is in an on state, the control portion may turn on the stopped pump operation to proceed with the interrupted water supply or open the drain port to proceed with the drainage. Therefore, there is an advantage in that the set water supply or drainage can be smoothly completed by continuously proceeding with the interrupted water supply or drainage without the need for a user to separately operate.

In addition, time can be set through the manipulation portion to adjust the operation of the lighting device, and operation of the lighting device can be set based on the set time.

Accordingly, the user may set the current time in the apparatus for cultivating plants and set the on/off time of the lighting device to provide the same cultivation environment as the current environment. Therefore, the apparatus for cultivating plants can be operated according to the user's living environment.

In particular, even when the user's life pattern is different from the general case or when the plant cultivation device cannot be used for a long time, the on-off time of the lighting device can be adjusted through the manipulation portion, thereby there is an advantage of improving the convenience of use.

In addition, the blower disposed at the rear of the cultivation space has an advantage in that the outlet is located at a position corresponding to the lower surface of the lighting device to prevent overheating of the lighting device by discharged air.

In addition, the inlet of the blower is located at a position corresponding to the top surface of the cultivation shelf so that air can be actively flowed in a area between the cultivation shelf and the lighting device where plants grow. In particular, there is an advantage in that the suctioned air can promote the growth of plants by providing an appropriate stress due to the air current to the plants being cultivated while flowing along the top surface of the cultivation shelf.

In addition, the tank cover that opens and closes the water tank may have a passage structure through which water inside the water tank is discharged by a first water outlet extending downward from a lower surface and a second water outlet extending rearward.

At this time, the second water outlet may be connected to a fitting portion at the rear, and thus water may be supplied even when the water tank is disconnected through a selective connection according to the insertion and withdrawal of the water tank.

In addition, since the first water outlet and the second water outlet are integrally molded with the tank cover so that outside air does not fundamentally flow into the flow path between the first water outlet and the second water outlet, there is an advantage in that air is prevented from being mixed when the pump is driven.

In addition, a sub-tank may be provided between the water tank and the pump. In addition, a predetermined amount of water may be always filled in the sub-tank. Therefore, the input side of the pump can be maintained a state of being filled with water necessary for the initial start-up of the pump, and an accurate amount of water can be supplied without air being mixed during operation of the pump.

That is, by preventing air from being mixed when the pump is driven, it is possible to supply an accurate amount of water to the cultivation shelf when the pump is driven. Therefore, it is possible to repeatedly supply a set amount of water to the cultivation shelf only by controlling the driving time of the pump without using a separate flow sensor or the like.

In addition, by fundamentally preventing air from entering the pump, there is an advantage in ensuring operation reliability of the pump, preventing abnormal operation of the pump, and maintaining durability of the pump even during long-term use.

In addition, a sterilizing device such as a UV lamp is provided in the sub-tank to sterilize the water stored in the sub-tank. In particular, since the sub-tank needs to be capable of accommodating a necessary amount of water when the pump is initially driven, the sub-tank can be configured in a compact size, and an amount capable of effectively sterilizing can be stored through the UV lamp.

Accordingly, the water inside the sub-tank can be sterilized by the UV lamp, and the sterilized water can be supplied to the cultivation shelf when the pump is driven. Therefore, there is an advantage in preventing mold or green algae from occurring in the water supplied to the inside of the cultivation shelf.

In particular, in a structure in which water is circulated between the cultivation shelf and the water tank, and in which nutrients are added to the water tank and water in a culture solution is circulated, since water contamination may be more serious, but the water can be sterilized by the UV lamp, there is an advantage in preventing mold or green algae from occurring in circulating water and preventing odors from occurring inside the cultivation space.

Of course, since the water tank has a structure in which the water containing the nutrient solution is accommodated and circulated, a UV lamp may be installed in the water tank, but when the user inserts and withdraws and opens the water tank, there is a possibility of harm to the human body by the UV radiation, and it may be difficult to irradiate the entire inside of the water tank with UV-ray for sterilization, which has a relatively larger water storage area compared to the sub-tank. Accordingly, by arranging the UV lamp in a sub-tank that maintains a closed state and has a relatively small water storage area compared to the water tank, there is an advantage in that potential harm to the user's body is fundamentally prevented and efficient sterilization is possible.

In addition, since the seed package seated on the cultivation shelf is provided with a seed accommodation member for accommodating seeds, and the seed accommodation member is made of a porous material so that water and oxygen are smoothly supplied and the roots of plants pass through the seed accommodation member to grow, there is an advantage in that it is possible to effectively cultivate plants by allowing plants to maintain a settled state.

BEST MODE

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

A direction will be defined prior to the explanation. In an embodiment that will be described below, a direction facing a front surface of a door illustrated in FIG. 1 may be defined as a front direction unless the direction is separately defined, a direction facing the inside of a cabinet with respect to the front surface of the door will be defined as a rear direction, a direction facing a bottom surface on which an apparatus for cultivating plants is installed will be defined as a downward direction, and a direction that is away from the bottom surface will be defined as an upward direction.

Figure 1:
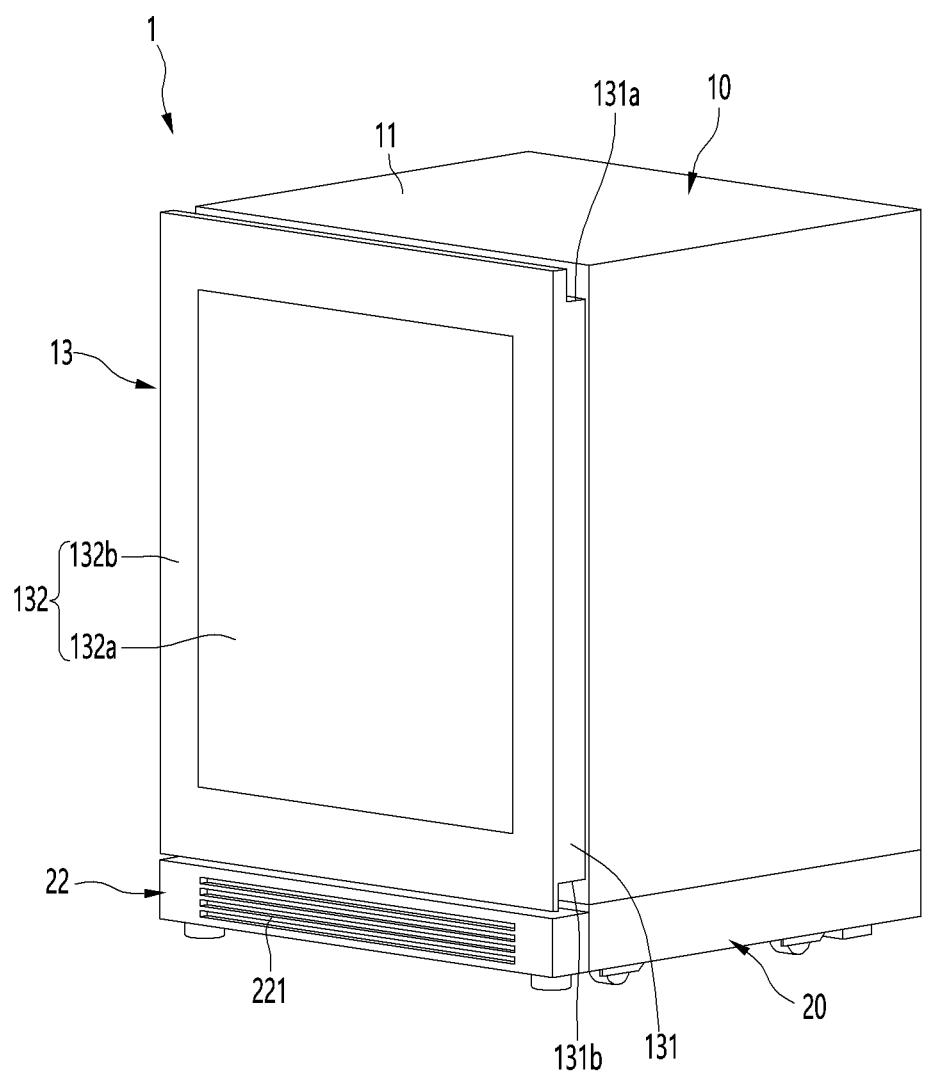
FIG. 1 is a perspective view of an apparatus for cultivating plants according to an embodiment.
Figure 2:
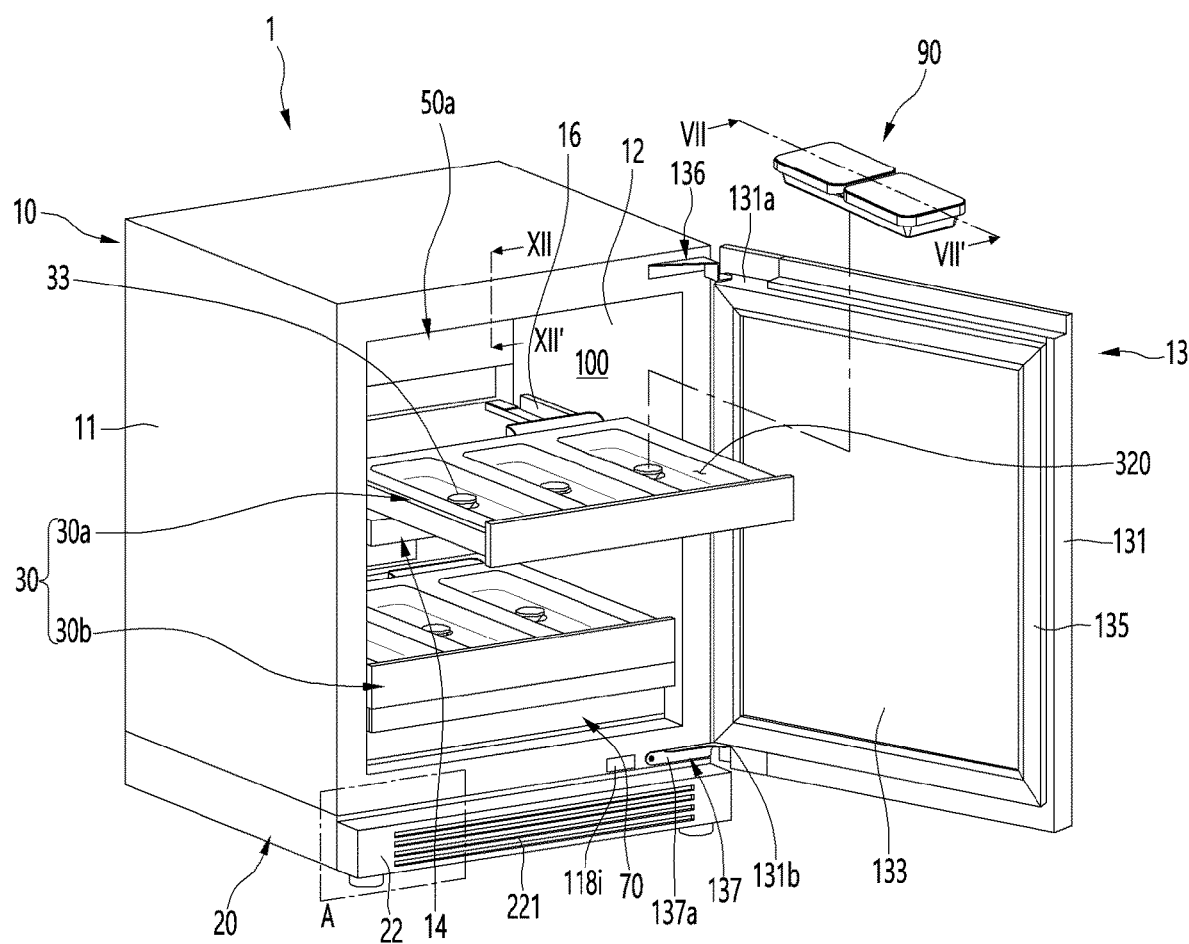
FIG. 2 is a perspective view illustrating a state where a door of the apparatus for cultivating plants is opened.
Figure 3:
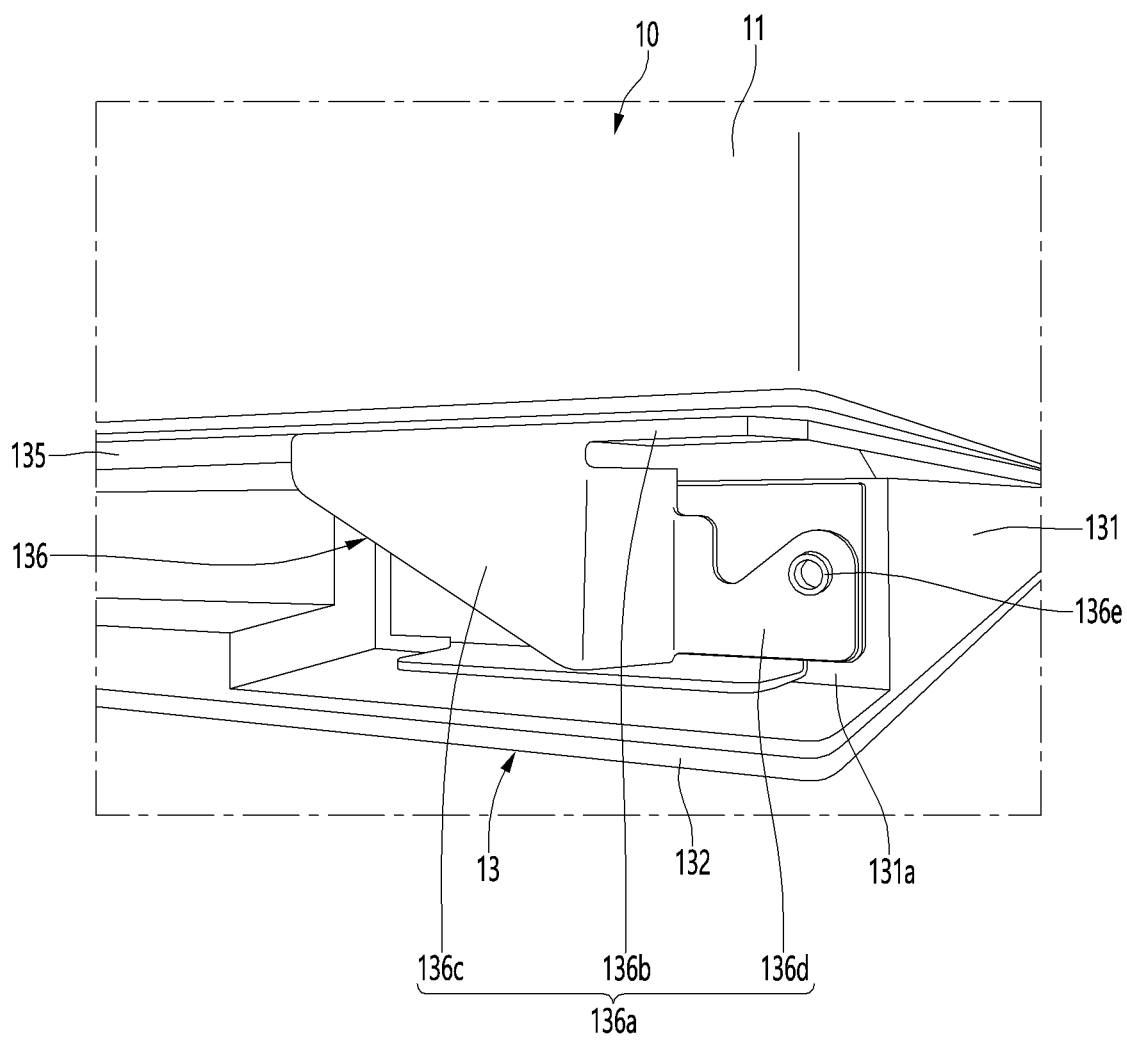
FIG. 3 is a view illustrating an upper hinge in a closed state of the door.
Figure 4:
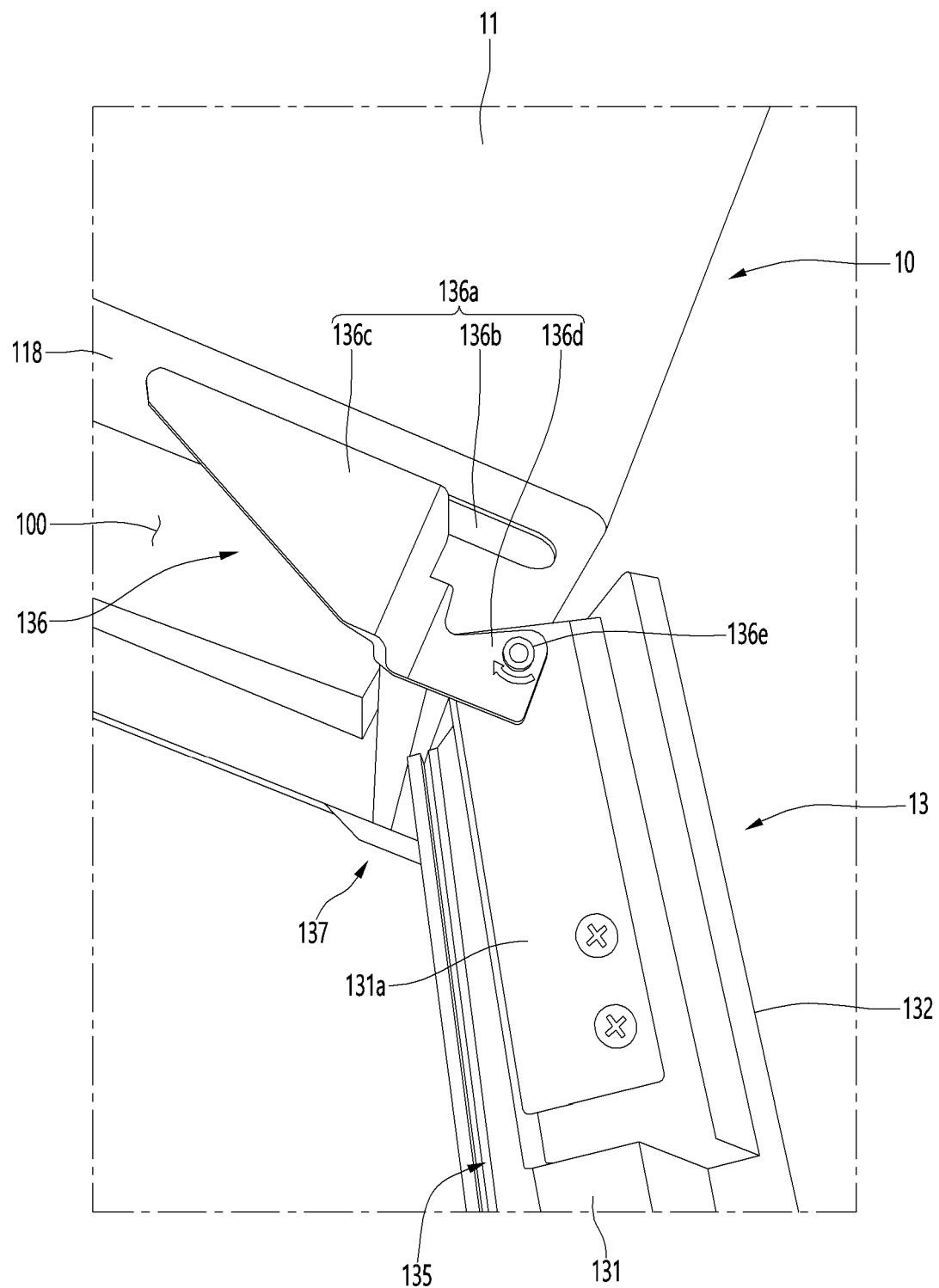
FIG. 4 is a view illustrating an upper hinge in an open state of the door.

FIG. 1 is a perspective view of an apparatus for cultivating plants according to an embodiment, FIG. 2 is a perspective view illustrating a state where a door of the apparatus for cultivating plants is opened, FIG. 3 is a view illustrating an upper hinge in a closed state of the door, and FIG. 4 is a view illustrating an upper hinge in an open state of the door.

Referring to the accompanying drawings, an apparatus 1 for cultivating plants according to an embodiment may be provided in a hexahedral shape. In addition, the apparatus 1 for cultivating plants may be installed alone in an indoor space or may have a size and structure that is capable of being mounted in a built-in manner in furniture together with other electronic products if necessary. For example, the apparatus 1 for cultivating plants may have a relatively low height and may be installed to define a portion of an island table or a storage cabinet installed on a wall. Of course, unlike this embodiment, the apparatus 1 for cultivating plants may have a higher height in a vertical direction, and may have various sizes that can be installed for home use, such as three or more cultivation shelves 30 disposed vertically inside.

In addition, the apparatus for cultivating plants 1 may be referred to as a plant cultivation device and has a closed space capable of adjusting the internal temperature to have a temperature lower than room temperature as needed, so the apparatus for cultivating plants 1 may also be referred to as a plant cultivation refrigerator, a refrigerator-type apparatus for cultivating plants, or a plant refrigerator.

The apparatus 1 for cultivating plants may have an outer appearance that is defined by a cabinet 10 defining a cultivation space 100, in which plants are cultivated, and a door 13 that opens and close the cabinet 10. Here, the plants to be cultivated, such as leaves, herbs, etc. that are capable of being used for wraps or salads, may be easily eat and cultivated by the user, and In addition, plants that does not occupy a large space may be cultivated.

The cabinet 10 may define a cultivation space 100 with an opened front surface, and the door 13 that opens and closes the cultivation space 100 may be provided in the front surface of the cabinet 10. The door 13 may have upper and lower ends, which are respectively connected to the cabinet 10 by an upper hinge 136 and a lower hinge 137, and the cultivation space 100 may be opened and closed by rotation of the door 13.

In addition, the door 13 may define an outer appearance of a front surface of the apparatus 1 for cultivating plants when the front surface is closed. The door 13 may include a front panel 132 and a rear panel 133 forming front and rear surfaces of the door 13, and a door frame 131 forming a circumferential surface of the door 13.

Each of the front panel 132 and the rear panel 133 may be made of a material capable of visibly recognizing the cultivation space 100. For example, each of the front panel 132 and the rear panel 133 may be made of a tempered glass or insulating glass material. In addition, an insulating panel 134 (see FIG. 9) may be further provided between the front panel 132 and the rear panel 133, and a gas for thermal insulation may be injected between the front panel 132 and the rear panel 133 by the insulating panel 134, or a space between the front panel 132 and the rear panel 133 by the insulating panel 134 may be vacuumized to improve insulation performance of the door 13.

Meanwhile, a see-through window 132a capable of visibly recongizing the inside of the cultivation space 100 may be provided on the front surface of the door 13. In addition, a bezel 132b that is not visible inside may be formed around the see-through window 132a, and the bezel 132b may prevent the door frame 3131 and some components coupled to the door frame 131 from being exposed to the outside and may be formed in a dark color such as black.

The door frame 131 may connect the front panel 132 to the rear panel 133 and may define the circumferential surface of the door 13. In addition, the front surface of the door frame 131 may be completely covered by the front panel 132, and the entire outer appearance of the front surface of the door 13 may be defined by the front panel 132 when viewed from a front side.

In addition, the upper hinge 136 and the lower hinge 137 may be coupled to upper and lower ends of the door frame 131, respectively.

The upper hinge 136 may be mounted on an upper end of the front surface of the cabinet 10 and may be connected to an upper hinge mounting portion 131a recessed into an upper end of the door frame 131. In addition, in a state where the door 13 is closed, the upper hinge 136 may be accommodated inside the upper hinge mounting portion 131a, does not protrude upward and sideways, and may be configured not to be exposed to the outside when viewed from the front.

In detail, the upper hinge 136 may include an upper hinge plate 136a and an upper hinge shaft 136e. The upper hinge plate 136a may be formed of a plate-shaped metal material and may be bent multiple times.

The upper hinge plate 136a may include an upper cabinet mounting portion 136b fixed to and mounted on the front surface of the cabinet 10, that is, the front surface of the deco frame 118. The upper cabinet mounting portion 136b may be in surface contact with the front surface of the deco frame 118 and may be firmly coupled to the decor frame 118 by screws. In addition, one end of the upper cabinet mounting portion 136b extends more laterally than the upper bent portion 136c so that the upper hinge plate 136a may be maintained in a state of being more stably coupled to the cabinet 10 when the door 13 is opened and closed.

In addition, an upper bent portion 136c bent forward may be provided at an upper end of the upper cabinet mounting portion 136b. The upper bent portion 136c may extend upward from the upper cabinet mounting portion 136b. In addition, the upper bent portion 136c may be formed to protrude more forward as it gets closer to the upper hinge shaft 136e. Thus, with the extended end of the upper bent portion 136c, as illustrated in FIG. 3, it can be prevented that a space is formed between the door frame 131 and the upper bent portion 136c and thus the hand of the user gets stuck in the space even when the door 13 is closed.

In addition, one end of the upper bent portion 136c, that is, one end close to the upper hinge shaft 136e among both ends in the left and right direction may include a shaft mounting portion 136d that is continuously bent downward and sideways. The shaft mounting portion 136d may further extend laterally, and the upper hinge shaft 136e may be mounted thereto.

Strength of the shaft mounting portion 136d can be reinforced by being formed in a shape that is bent multiple times, and the upper hinge plate 136a can have sufficient strength for stably supporting the door 13 while having a thin thickness.

In addition, the position of the upper hinge shaft 136e may be located at a position close to the side end of the upper hinge mounting portion 131a. To this end, the shaft mounting portion 136d may extend to an end of the upper hinge mounting portion 131a. In addition, according to the position of the upper hinge shaft 136e, the friction between the front surface of the cabinet 10 and the gasket 135 is minimized when the door 13 rotates for opening and closing, and at the same time, in a state where the door 13 is opened, a gap can be maintained between the end of the door 13 and the front surface of the cabinet 10 so that the fingers of the user does not get stuck.

The lower hinge shaft extending downward may be mounted on the shaft mounting portion 136d. The upper hinge shaft 136e is inserted into the door frame 131 through the upper hinge mounting portion 131a and may serve as a rotation shaft of the door.

Meanwhile, the lower hinge 137 may be mounted on a lower portion of the front surface of the cabinet 10 and may be shaft-coupled to the lower hinge mounting portion 131b recessed at the lower end of the door frame 131. In addition, in a state where the door 13 is closed, the lower hinge 137 may be accommodated inside the lower hinge mounting portion 131b and may be configured not to protrude downward and sideways and not to be exposed to the outside when viewed from the front.

In detail, the lower hinge 137 may include a lower hinge plate 137a and a lower hinge shaft. The lower hinge plate 137a may be formed of a plate-shaped metal material and may be bent.

The lower hinge plate 137a is bent, one side thereof is fastened to the front surface of the cabinet 10 by screws, and the other side thereof is bent forward so that the lower hinge shaft can be mounted thereto. In addition, the lower hinge shaft is shaft-coupled with the lower end of the door 13 to support the door 13 from below. Although not illustrated in detail, the lower hinge 137 may be formed in a shape corresponding to the upper hinge 136.

In addition, a door open detection device 118i may be provided at a side of the lower hinge 137. The door open detection device 118i may be provided at a lower front surface of the cabinet 10 and may be mounted on the deco frame 118.

The door open detection device 118i may have a structure such as a Hall sensor and may detect a magnet disposed inside the corresponding door 13 to determine whether the door 13 is opened or closed. Of course, the door opening detection device 118i may be formed in a switch structure and selectively contacted according to the opening and closing of the door 13 to determine whether the door 13 is opened or closed.

A gasket 135 may be provided around the rear surface of the door frame 131. The gasket 135 may be in close contact with the front surface of the cabinet 10 in a closed state of the door 13. At this time, since a magnet is embedded inside the gasket 135, when the door 13 is closed, the gasket 135 can be brought into closer contact with the front surface of the cabinet 10.

Meanwhile, a machine room module 20 may be provided below the cabinet 10. Components for controlling a temperature inside the cultivation space 100 may be disposed in the machine room module 20, and thus it is possible to provide a machine room 200 provided with a number of electrical components including a compressor and a condenser constituting a refrigeration cycle to be described below. The machine room module 20 may be coupled to a bottom surface of the cabinet 10 in an assembled state to define the integrated outer appearance of the cabinet 10 as a whole.

Since the apparatus 1 for cultivating plants is installed in a built-in manner, the machine room module 20 may have a structure in which air for cooling and heat dissipation inside the machine room 200 is introduced and discharged forward.

That is, a front cover 22 may be disposed on the front surface of the machine room 200. The front cover 22 may be exposed forward below the door 13 to define the front surface of the machine room 200. The front cover 22 may have a shape of which a front surface protrudes and may have the same plane as the front surface of the door 13 when the door 13 is closed.

A grill portion 221 in which a plurality of openings is defined may be provided on the front cover 22. The grill portion 221 may be disposed over the entire front surface of the front cover 22. Also, air may be introduced into the machine room 200, and the air inside the machine room 200 may be discharged.

Meanwhile, the cabinet 10 may be constituted by an outer case 11 defining an outer appearance thereof and an inner case 12 defining the cultivation space 100, and an insulator 101 may be disposed between the outer case 11 and the inner case 12 to thermally insulate the cultivation space 100. Thus, the cultivation space 100 may be maintained at a set temperature. That is, the remaining surfaces of the cultivation space 100 except for the front surface opened and closed by the door 13 may be configured as an insulating wall so that the cultivation space 100 is insulated.

Each of the outer case 11 and the inner case 12 may be made of a metal material and may be provided by coupling a plurality of plate-shaped materials to each other. Particularly, the inner case 12 may have both side surfaces, a rear surface, and a top surface, each of which is provided in a metal plate shape, and may be coupled to each other to define the cultivation space 100.

A plurality of cultivation shelves 30 may be arranged vertically in the cabinet 10. In this embodiment, two upper and lower cultivation shelves 30 may be provided and may have the same structure. The cultivation shelves 30 may be respectively referred to as an upper cultivation shelf 30a and a lower cultivation shelf 30b for convenience of explanation and understanding. Alternatively, two or more cultivation shelves 30 may be further provided according to a size of the cabinet 10. Also, the cultivation shelf 30 may be configured to be inserted into and withdrawn from the inside of the cabinet 10 in a front and rear direction, and mounting of the seed package 90 including seeds of plants for cultivation and management and harvest of the plants may be easy.

The cultivation shelf 30 may have a structure in which a plurality of seed packages 90 are mounted. Also, the cultivation shelf 30 may have a structure in which a plurality of the seed packages 90 are disposed in independent areas, respectively, so that the cultivation and harvest of the plants are possible.

For example, a plurality of seats 320 recessed in a shape corresponding to the seed package 90 may be disposed on the top surface of the cultivation shelf 30, and the seed package 90 desired by the user may be seated on the seat 320 to cultivate the plants.

Also, water may be supplied to the cultivation shelf 30 from the water tank 70, and water supplied to the cultivation shelf 30 may be selectively supplied to the seat 320 of the plurality of seat 320 where the seed package 90 is disposed.

Also, the water supplied to the cultivation shelf 30 may be completely drained after being sufficiently supplied to the seed package 90. Thus, the cultivation shelf 30 may be emptied for the rest of a time excluding a water supply time so as to be maintained in a clean state.

The water tank 70 may be disposed further below the cultivation shelf 30 and may be disposed at the lowermost side of the cultivation space 100. The water tank 70 may store water supplied to the cultivation shelf 30, and the water discharged from the cultivation shelf 30 may be collected. That is, a water supply module and a drain module may be provided between the water tank 70 and the cultivation shelf 30 so that water is circulated.

The water tank 70 may be exposed when the door 13 is opened so that a water level of the water tank 70 is checked from the outside. Also, the water tank 70 may be exposed to the front surface of the cultivation space 100 and be withdrawn out to supplement water. If necessary, nutrients required for growing plants may be put into the water tank 70. For example, the nutrients may be provided in a solidified form and thus may be gradually dissolved in water for a predetermined time and then supplied to the seed package 90 while maintaining an appropriate concentration of water in the water tank. Therefore, the water supplied from the water tank 70 may be a culture solution containing nutrients.

Also, a lighting device 40 for radiating light toward the top surface of the cultivation shelf 30 may be provided above the cultivation shelf 30. Also, a blower 50 for circulating internal air in the cultivation space 100 may be provided on the rear wall of the cultivation space 100.

The cultivation space 30 may be partitioned vertically by the cultivation shelf 30 and the lighting device 40, and the blower 50 may be independently disposed in each partitioned space. In addition, the upper and lower blower devices 50 may operate independently to form independent air currents inside the partitioned cultivation space 100.

A display 14 may be provided in the cultivation space 100. The display 14 may be configured to display an operation state of the apparatus 1 for cultivating plants and be provided at the front end of the lighting device 40, which is disposed at a lower side, of the plurality of lighting devices 40. Thus, the display 14 may be disposed at a position facing the rear surface of the door 13. Also, information output from the display 14 may be recognized through the door 13 and be identified at the outside even when the door 13 is closed.

The seed package 90 may be selected by a user, and the user may select and purchase a desired type of crop through aftermarkets. Also, the seed package 90 may be supplied in the form of delivery according to a user's order or may be supplied regularly by a manager. If necessary, the user may directly place and use seeds for cultivation in the seed package 90 provided.

The seed package 90 may be supplied not only in a shape accommodated in the seed, but also in a state where the seed is germinated and sprouted, or a state where a plant after a certain time elapses after the germination is disposed.

The user may cultivate the seed package 90, in which the desired crop is contained, by seating the seed package 90 on the cultivation shelf 30, and also may cultivate a different type of plant by placing different types of seed packages 90 on one cultivation shelf 30. Also, when the cultivation is completed or when replacement with another crop is desired, the seed package 90 may be removed or replaced from the seat 320.

Hereinafter, the structure of the seed package 90 will be described in more detail with reference to the drawings.

Figure 5:
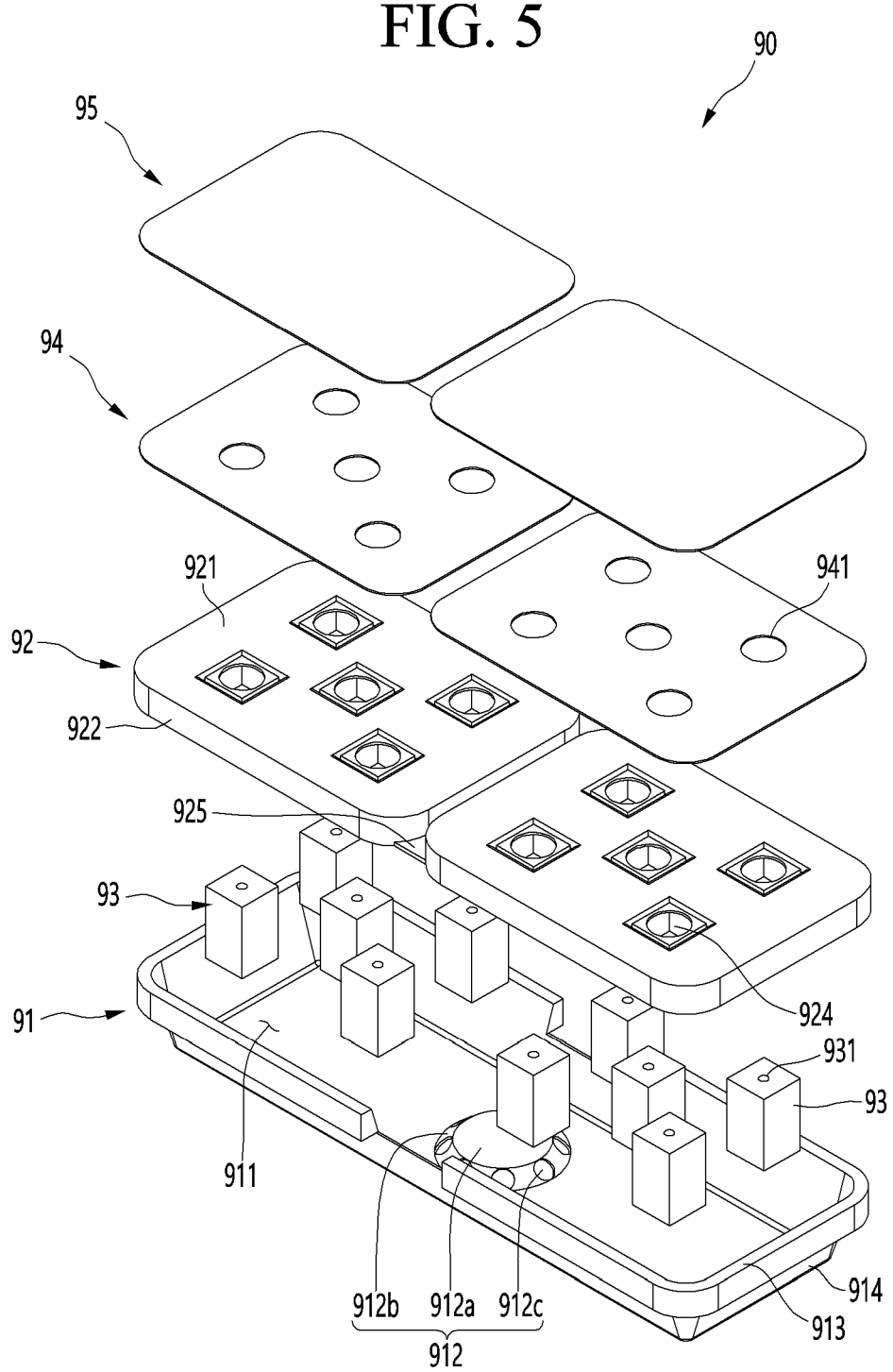
FIG. 5 is an exploded perspective view of a seed package inserted into the apparatus for cultivating plants as viewed from above.
Figure 6:
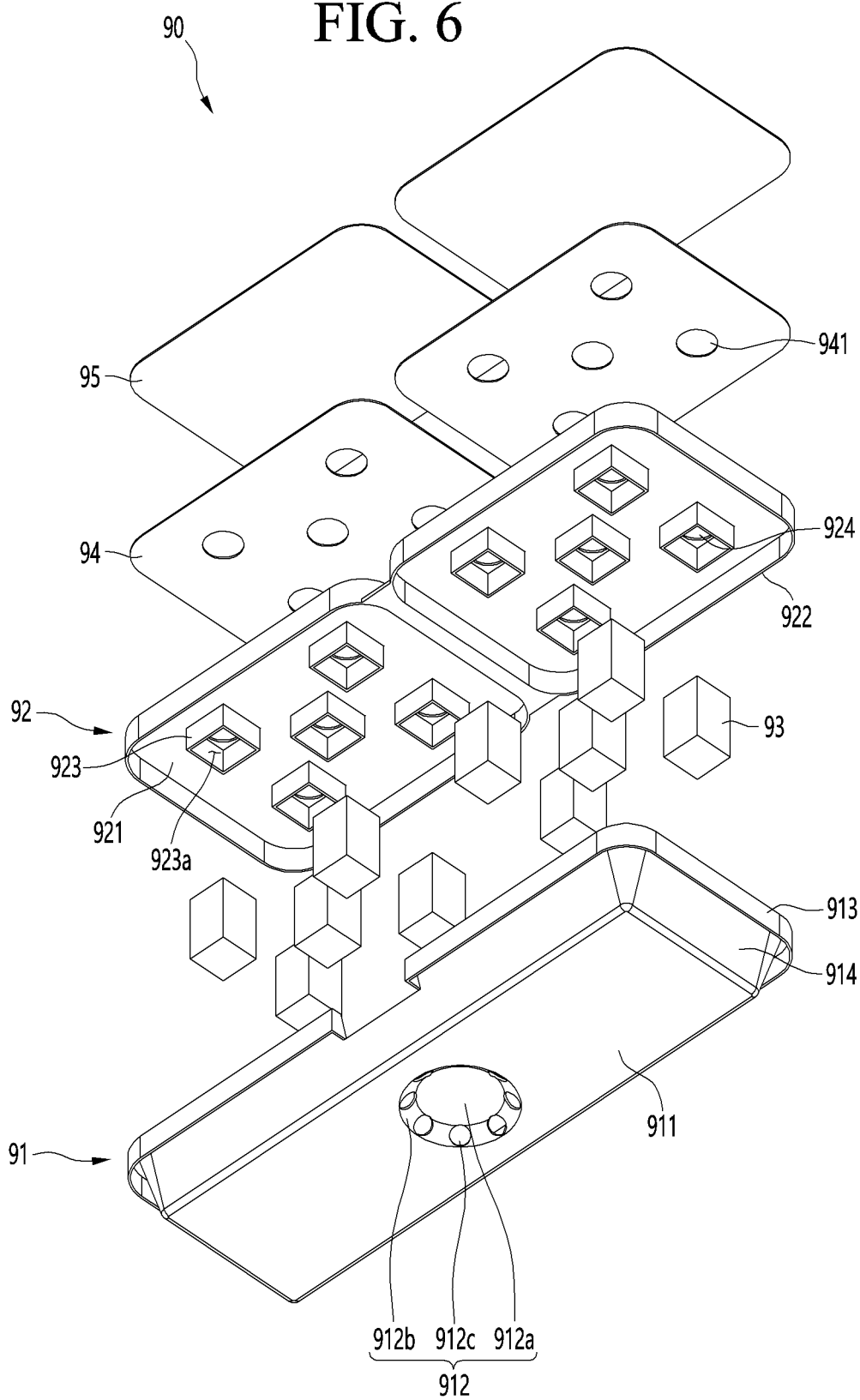
FIG. 6 is an exploded perspective view of a seed package inserted into the apparatus for cultivating plants as viewed from below.
Figure 7:
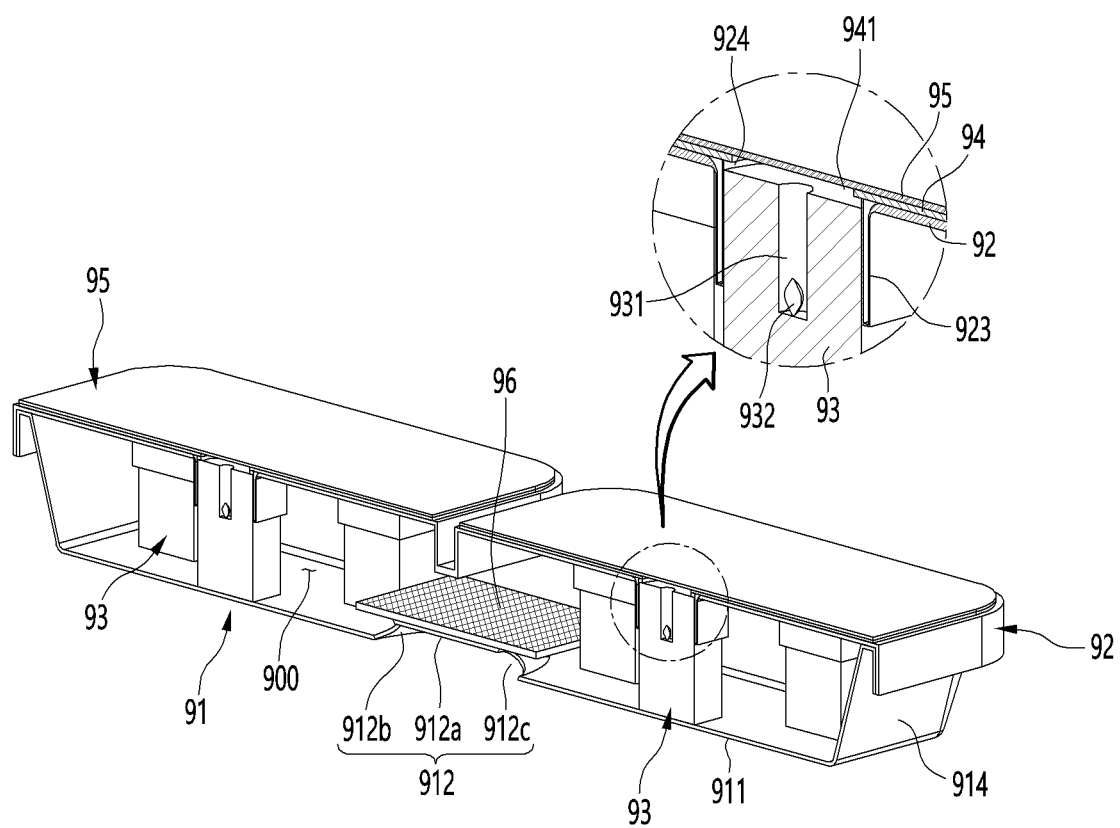
FIG. 7 is a cutaway perspective view taken along line VII-VII' of FIG. 2.

FIG. 5 is an exploded perspective view of a seed package inserted into the apparatus for cultivating plants as viewed from above, FIG. 6 is an exploded perspective view of a seed package inserted into the apparatus for cultivating plants as viewed from below, and FIG. 7 is a cutaway perspective view taken along line VII-VII' of FIG. 2.

As illustrated in the figure, the seed package 90 may include a container 91 that defines a recessed accommodation space 900, a container cover 92 that shields an opened top surface of the container 91, and a plurality of seed accommodation members 93 provided in the accommodation space 900 to accommodate seeds.

In detail, the container 91 has a circumferential surface 914 extending upward along a circumference of a flat container bottom surface 911 and a container edge 913 bent outward from an upper end of the container circumferential surface 914.

The container bottom surface 911 may have a size corresponding to that of the seat 320, and thus, the container bottom surface 911 may be supported by a seat bottom surface 322. Also, the container circumferential surface 914 has a height greater than a depth of the seat 320 so that the container cover 92 shielding the container 91 is disposed above the top surface of the cultivation shelf 30.

A water inlet 912 may be provided on the bottom surface 911 of the container. The water inlet 912 may be recessed from the bottom surface of the container 91 to protrude from the container bottom surface 911 when viewed from the inner surface. The water inlet 912 may be provided at a center of the container 91 and be disposed at a position corresponding to the shutter 33. Therefore, when the seed package 90 is seated on the seat 320, the shutter 33 may be accommodated inside the seat 320, and water may be supplied into the seed package 90.

In detail, the water inlet 912 may include an inlet top surface 912*a* disposed above the container bottom surface 911 and an inlet circumferential surface 912*b* extending along a circumference of the inlet top surface 912*a* to extend up to the container bottom surface 911. A plurality of container openings 912*c* may be defined along the inlet circumferential surface 912*b*.

The inlet circumferential surface 912*b* may be inclined toward the outside as it extends downward. Also, the inlet circumferential surface 912*b* may have a height at which the inlet top surface 912*a* is capable of pressing the shutter 33 to open the shutter 33 when the seed package 90 is seated on the seat 320.

The container cover 92 may include a plate-shaped cover plate 921 that shields the opened top surface of the container 91. Also, an accommodation member mounting portion 923 to which the seed accommodation member 93 is fixedly mounted may be disposed on a bottom surface of the cover plate 921. The accommodation member mounting portion 923 may protrude downward from the bottom surface of the container cover 92, and an opened insertion port 923*a* may be defined in a lower end of the accommodation member mounting portion 923 so that an upper end of the seed accommodation member 93 is inserted. That is, the cross-sectional shape of the insertion port 923*a* may correspond to a shape of a top surface of the seed accommodation member 93.

The seed accommodation member 93 may be provided in plurality, and the plurality of the seed accommodation members 93 may be disposed to be spaced apart from each other in the accommodation space 900 of the container 91. The seed accommodation member 93 may accommodate seeds 932 of plants to be cultivated and may absorb water supplied into the seed package 90 to supply the water to the seeds.

The seed accommodation member 93 may have a porous material or a reticulated structure to facilitate the water absorption, and the water absorbed from the bottom by a capillary phenomenon may be transferred to the seeds. For example, the seed accommodation member 93 is formed in a block shape and may be formed in a fine cell structure open to each other in the entire area of the seed accommodation member 93.

At this time, the fine cells distributed throughout the seed accommodation member 93 are formed in a size between 0.1 mm and 1.5 mm in diameter, so that it is possible to easily absorb water inside the container 91 and to easily supply oxygen to roots growing inside the seed accommodation member. In addition, while preventing the seeds 932 inside the seed accommodation grooves 931 from escaping through the cells, the roots of the cultivated plants may pass through the cells and grow out of the seed accommodation member 93. In particular, the seed accommodation member 93 may be formed of a stretchable material, and thus the cell may be enlarged so that roots growing after the seed 932 germinates pass through the cell.

In addition, the seed accommodation member 93 may be made of various materials capable of absorbing moisture and maintaining a shape. For example, the seed accommodation member 93 may be made of a sponge material such as an oasis. In addition, the seed accommodation member 93 may be formed of an elastically deformable material or structure.

The cross-sectional shape of the seed accommodation member 93 may have a shape corresponding to the shape of the accommodation member mounting portion 923. The seed accommodation member 93 may be provided in a hexahedral shape and have an upper end inserted into the accommodation member mounting portion 923 and a lower end configured to be supported by the bottom surface 911 of the container.

Also, a seed accommodation groove 931 recessed downward may be defined in the top surface of the seed accommodation member 93. The seeds 932 may be accommodated inside the seed accommodation groove 931, and a recessed lower end of the accommodation groove may be defined at one side that is away from the container bottom surface 911. The seed accommodation groove 931 may be recessed downward, but may be defined higher than a maximum level of the water accommodated in the container 91. Thus, the seeds inside the seed accommodation groove 931 may be prevented from being immersed in water. Also, when the seeds 932 are germinated, the plants may be grown along the seed accommodation groove 931, and roots may be grown to pass through the seed accommodation member 93.

That is, soil or medium containing nutrients may not be accommodated in the container 91, and only water containing nutrients may be supplied into the seed package 90 after the seed package 90 is mounted on the cultivation shelf 30. Thus, the inside of the seed package 90 may be prevented from being contaminated by mold or green algae.

Also, the inside of the seed package 90 may be maintained in a state where water does not exist in the seed package 90 by draining the water through the cultivation shelf 30. Thus, contamination does not occur in the seed package 90 and the cultivation shelf 30.

As described above, components such as medium or soil for supplying the nutrients may not be filled inside the seed package 90. Also, the seed accommodation members 93 may be spaced apart from each other in the container 91 so that a corresponding portion of the accommodation space 900 in the container 91 is empty. Thus, both a flow of water supplied into the inside of the container 91 and a flow of the water discharged from the inside of the container 91 may be smoothly performed.

Also, a shielding member 96 may be provided on the water inlet 912. The shielding member 96 may be made of a material such as fabric or paper or may be made of a net material such as mesh to allow the water to pass therethrough. The shielding member 96 may be provided to cover the water inlet 912, thereby preventing the root of the plant growing through the seed accommodation member 93 from blocking the water container opening 912*c*.

A cover hole 924 may be defined in the container cover 92 corresponding to the seed accommodation groove 931. The cover hole 924 may be disposed inside the accommodation member mounting portion 923, and the seed accommodation groove 931 and the cover hole 924 may communicate with each other. Thus, a stem germinated from the seed may pass through the cover hole 924 via the seed accommodation groove 931 and then be exposed to the outside of the container cover 92.

The container 91 may be divided into both sides based on the water inlet 912, and different crops may be cultivated at both sides. Both the sides of the water inlet 912 may have a symmetrical shape, and the seed accommodation member 93 may also have a symmetrical arrangement.

In particular, the container cover 92 may be divided into both sides based on the central cover connection portion 925, and both sides may be formed in a symmetrical shape based on the cover connection portion 925. Therefore, when viewed from above, the seed package 90 can be divided into two areas, and in each area, the cover plate 921, the cover edge 922, the cover hole 924, and the accommodation member mounting portion 923 may be formed, and the accommodation member may be mounted.

A cover edge 922 may be disposed along a circumference of the cover plate 921 of the container cover 92, and the cover edge 922 may be in contact with the container edge 913 to couple the container cover 92 to the container 91.

A reflective sheet 94 may be attached to the top surface of the container cover 92. The reflective sheet 94 may be provided in the form of a sheet capable of reflecting light radiated from the lighting device 40, and the seed package 90 may be prevented from increasing in temperature through the reflection of the light. For example, the reflective sheet 94 may be formed as white. Also, a sheet hole 941 which is cut or penetrated at a position corresponding to the cover hole 924 may be defined in the reflective sheet 94. Thus, the stem from which the seed is germinated may be exposed to the outside through the container cover 92 and the sheet hole 941.

Also, the cover sheet 95 may be attached to the top surface of the container cover 92. The cover sheet 95 may be disposed above the reflective sheet 94 and be attached to the cover edge 922 or adhere to the reflective sheet 94.

The cover sheet 95 may seal the top surface of the container cover 92 when packaging and transporting the container 91 to prevent the seed package 90 from being damaged, prevent the seeds accommodated in the seed package 90 from being discharged to the outside, prevent the inside of the seed package 90 from being contaminated due to the introduction of the external contaminants.

Also, the type of crops to be cultivated and related cultivation information may be printed on the cover sheet 95. Thus, the user may acquire information necessary for cultivation of the plant by using the information displayed on the cover sheet 95. For example, the information may be displayed in a manner such as a barcode or QR-code, and the information may be obtained through a mobile phone or a reader of the apparatus 1 for cultivating plants itself.

The reflective sheet 94 and the cover sheet 95 may be respectively attached to the cover plate 921 divided into two portions. Therefore, when two types of crops are cultivated in the seed package 90, different cover sheets 95 are attached to both sides of the container cover 92 to provide information about the cultivated plants to the user.

To cultivate the plants using the apparatus 1 for cultivating plants, the cover sheet 95 of the seed package 90 may be removed, and the seed package 90 may be seated on the seat 320 of the cultivation shelf 30. Also, an operation of the apparatus 1 for cultivating plants may be set using the information on the cover sheet 95, and the operation of the apparatus 1 for cultivating plants may be controlled according to the setting.

The seed package 90 may be disposed so that both sides thereof are symmetrical with respect to the center thereof. Thus, it is possible to cultivate different types of crops at both the sides of the seed package 90 based on the water inlet 912. That is, it is possible to cultivate different types of crops within one seed package 90.

Also, in the state where the seed package 90 is seated on the cultivation shelf 30, the shutter 33 may be disposed at the center of the seed package 90. That is, the accommodation space 900 may be disposed on both the sides of the seed package 90 with respect to the shutter 33. Accordingly, areas where plants are cultivated on the seed package 90 may be disposed on both sides of the shutter 33. Due to this structure, water introduced through one water inlet 912 can be evenly supplied to both sides of the seed package 90.

In addition, since the shutter 33 is located at a position corresponding to the center of the seed package 90, the seed package 90 may be seated in a desired direction regardless of the mounting direction of the seed package 90 and when the seed package is seated, uniform water can be supplied to the cultivation areas on both sides.

Hereinafter, the internal structure of the apparatus 1 for cultivating plants will be described in more detail with reference to the drawings.

Figure 8:
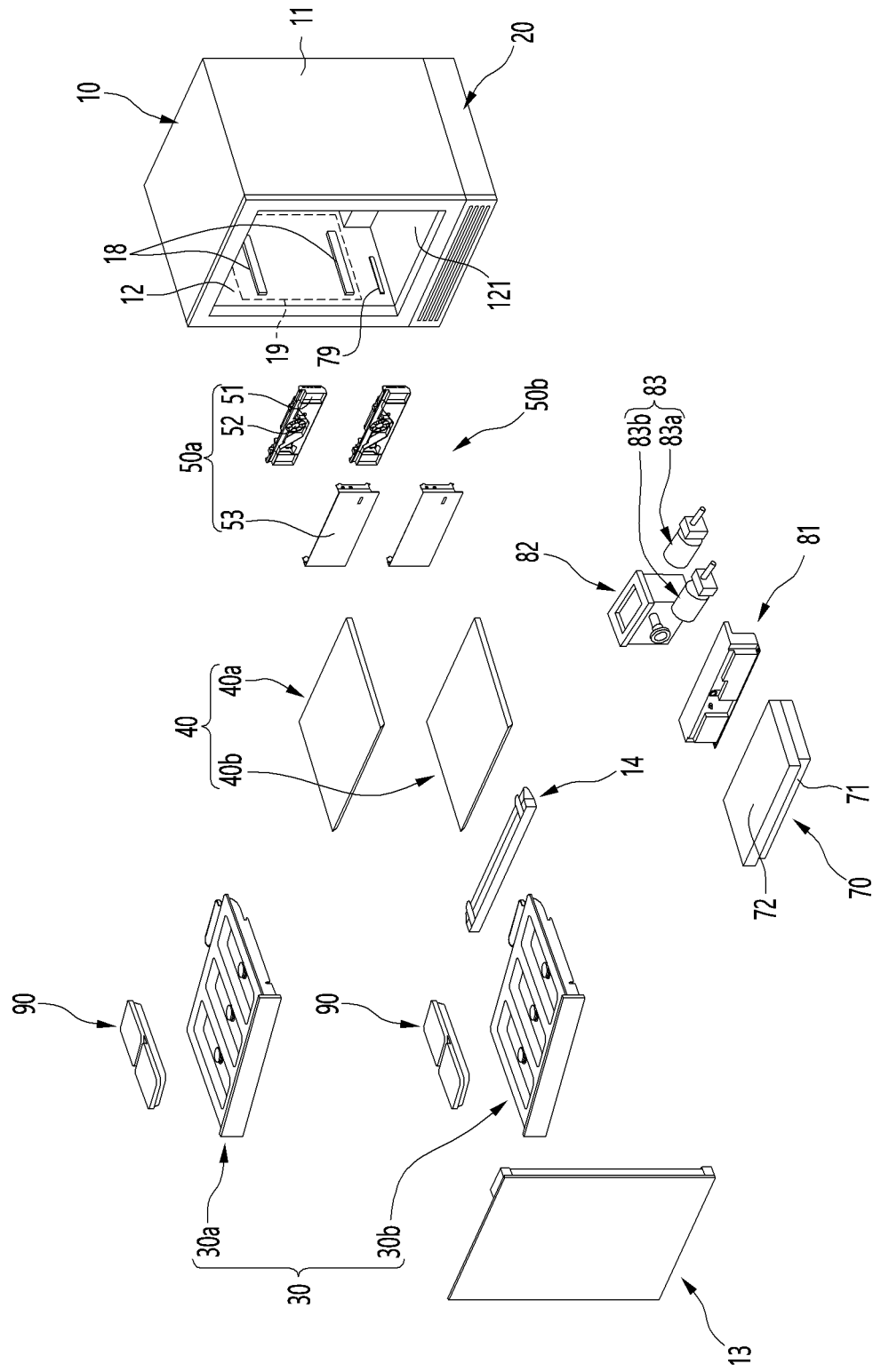
FIG. 8 is an exploded perspective view of the apparatus for cultivating plants.
Figure 9:
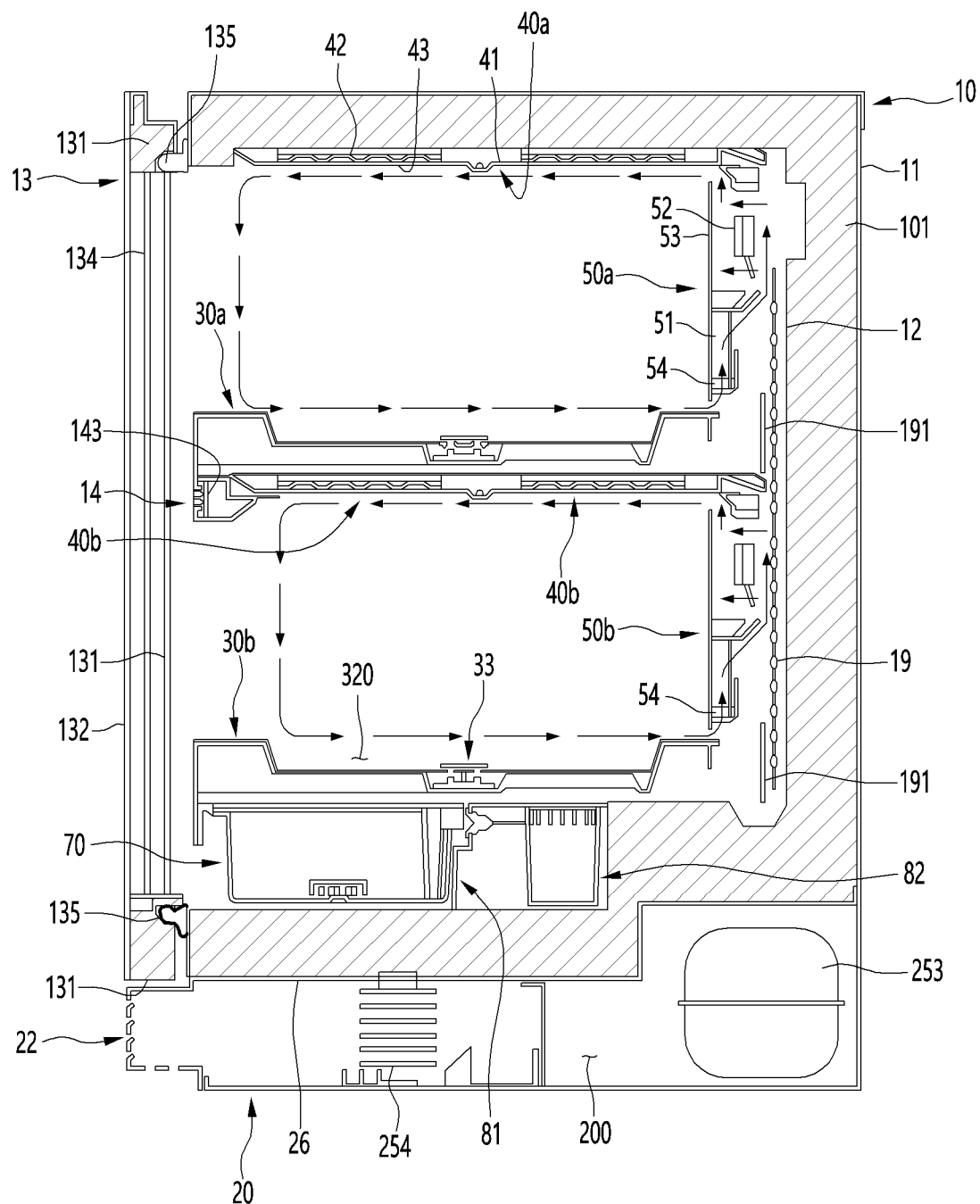
FIG. 9 is a cross-sectional view illustrating the internal structure of the apparatus for cultivating plants.

FIG. 8 is an exploded perspective view of the apparatus for cultivating plants, and FIG. 9 is a cross-sectional view illustrating the internal structure of the apparatus for cultivating plants.

As illustrated in the figure, an evaporator 243 that generates cool air may be provided on a rear wall of the cultivation space 100, and a blower 50 may be provided in front of the evaporator 243. Thus, air within the cultivation space 100 may be circulated by an operation of the blower 50, and thus, the inside of the cultivation space 100 can be cooled to be maintained at a set temperature. Accordingly, the cultivation space 100 may be referred to as a cooling space or a storage space.

In detail, the internal temperature of the cultivation space 100 may be controlled by a refrigeration cycle. Here, the evaporator 19 may be disposed on an inner rear wall of the cultivation space 100. The evaporator 243 may be provided with a roll bond-type heat exchanger and may be referred to as a heat exchanger.

The evaporator 19 may have a plate-shaped structure that is easily attached to the rear wall of the cultivation space 100. Also, the evaporator 19 may minimize a loss of the cultivation space 100 due to the plate-like structure and also may be close to the cultivation space 100 to effectively control a temperature of the cultivation space 100.

A heater 19 may be provided on one wall surface of the cultivation space 100. The heater 18 may be configured as a cord type heater such as a heating electric wire and may be provided on either left and right sides or rear surface of the cultivation space 100. The heater 18 may be disposed between the insulator 101 and the inner case 12 and may be disposed to contact the inner case 12. The heater 18 may be disposed across the upper and lower portions of the cultivation space 100 and may evenly heat the cultivation space 100. Of course, if necessary, a plurality of heaters 18 corresponding to the number of the cultivation shelves 30 may be provided and may be configured to independently heat each space partitioned by the cultivation shelves 30.

In particular, the heater 18 may be operated when the temperature of the indoor space is lower than that of the cultivation space 100, such as in winter when the temperature of the space where the apparatus for cultivating plants 1 is installed may be lower than that of the cultivation space 100.

That is, when the temperature of the space in which the apparatus for cultivating plants 1 is installed becomes lower than that of the cultivation space 100, the temperature of the inside of the cultivation space 100 may be lowered by radiation and/or conduction, and as a result, the compressor 253 may be in a non-driving state. Therefore, in order to prevent the temperature of the cultivation space 100 from becoming too low in a state where the operation of the compressor 253 is stopped due to the influence of the outside temperature, the heater 18 is driven to maintain the set temperature range and the operation of the compressor 253 may be induced. Accordingly, the heater 18 may also be referred to as a low temperature compensation heater.

Accordingly, the cultivation space 100 can be heated and cooled by the evaporator 19 and the heater 18. In addition, when the evaporator 19 or the heater 18 is driven, the blower 50 is operated so that the entire cultivation space 100 can be evenly cooled or heated. Therefore, by the evaporator 19 and the heater 18, the inside of the cultivation space 100 can maintain a temperature suitable for plant growth (for example, 18° C. to 28° C.). Of course, if necessary, a configuration for heating other than the heater 18 may be provided, and various heating methods such as the heating structure using a hot gas through a direction change of the refrigeration cycle may be performed. The temperature inside the cultivation space 100 may be sensed by an internal temperature sensor and may be maintained to a temperature that is suitable for crops to be cultivated.

As described above, components including the evaporator 19, the compressor 253, and the condenser 242, which are configured to control the temperature of the cultivation space 100, may be referred to as a temperature control device. The temperature control device may further include the heater 18.

The inside of the cultivation space 100 may be divided into an upper space, in which an upper blower 50a is disposed, and a lower space, in which a lower blower 50b is disposed. The blowers 50 that are vertically disposed have the same structure and shape, but only different from each other in their mounted positions. That is, the blower 50 may be provided as many as the number corresponding to the number of the cultivation shelves 30 and may blow air forward from a rear side of the cultivation shelf 30. Thus, the air may be independently circulated in the spaces inside the cultivation space 100 by being partitioned by the cultivation shelf 30.

As illustrated in FIG. 9, the air inside the cultivation space 100 may be circulated by the blower 50, and in particular, the circulated air may pass through the rear wall surface of the evaporator 19, and thus, the entire inside of the cultivation space 100 may have a uniform temperature and be quickly controlled in temperature. Also, the air circulated by the blower 50 may flow while passing through the top surface of the cultivation shelf 30 and the bottom surface of the lighting device 40.

The air flowing by the blower 50 may pass through the top surface of the cultivation shelf 30 to allow respiration of the plants grown on the cultivation shelf 30 to be smoother and also allows the plants to be properly shaken, thereby controlling stress so that an optimum airflow required for growth is provided. Also, the air flowing by the blower 50 may pass through the bottom surface of the lighting device 40 to prevent the lighting device 40 from being overheated.

The blower 50 as a whole may include a fan guide 51 mounted in front of the evaporator 19, a blowing fan 52 mounted on the fan guide 51, and a blowing fan cover 53 covering the fan guide 51.

The blowing fan 52 may be mounted at a center of the fan guide 51, and when the blowing fan 52 is driven, air may flow smoothly from the bottom to the top. Also, a lower end of the fan guide 51 may be spaced apart from the top surface of the cultivation shelf 30, and an upper end of the fan guide 51 may be spaced apart from a bottom surface of the lighting device 40. Thus, when the blowing fan 52 is driven, the fan guide 51 may guide air so that the air is suctioned along the top surface of the cultivation shelf 30 and discharged along the bottom surface of the lighting device 40.

Also, a deodorizing member 54 may be provided on a lower end of the fan guide 51. The deodorizing member 54 may be provided as a filter made of a deodorant material or may be made of a porous material through which air passes. In addition, the deodorizing member 54 may be provided on a path through which air is suctioned to remove and collect odor generating factors in the air of the cultivation space 100. An odor may not be generated in the cultivation space 100 by the deodorizing member 54, and a continuous deodorizing action may be achieved when the blower 50 is driven.

The blowing fan 52 may be provided in a box fan shape and may be configured to blow the cooled or heated rear air forward through the evaporator 19.

Also, the blowing fan cover 53 may be disposed in front of the fan guide 51 to shield the fan guide 51, thereby preventing the fan guide 51 from being exposed to the outside. The blowing fan cover 53 may be coupled to the fan guide 51, and the upper and lower ends of the blowing fan cover 53 may be spaced apart from the lighting device 40 and the cultivation shelf 30, respectively, to provide an air inlet and an air outlet. The blowing fan cover 53 may form a portion of the rear wall surface of the cultivation space 100 that is exposed when the door 13 is opened. In addition, an additional sub-plate 191 may be further provided at the rear of the cultivation shelf 30 to prevent exposure of the evaporator 19 when the cultivation shelf 30 is withdrawn.

The lighting device 40 may be provided above the cultivation shelf 30. The lighting device 40 may radiate light toward the cultivation shelf 30 to provide light that is necessary for plants. Here, an amount of light radiated by the lighting device 40 may be set similar to sunlight, and an amount of light and a radiation time optimized for the plant to be grown may be set.

The lighting device 40 may be provided in number corresponding to the number of cultivation shelves 30 and may be provided above each cultivation shelf 30. For example, the lighting device 40 may include an upper lighting device 40a provided in an upper space partitioned by the cultivation shelf 30 and a lower lighting device 40b provided in a lower space partitioned by the cultivation shelf 30. The upper lighting device 40a may be mounted on the top surface of the cultivation space 100, and the lower lighting device 40b may be mounted on the bottom surface of the upper cultivation shelf 30a.

That is, the upper lighting device 40a and the lower lighting device 40b may be disposed vertically above the cultivation shelf 30, which are disposed therebelow, to radiate light from the upper surface of the partitioned cultivation space 100 toward the cultivation shelf 30, thereby controlling the growth of the cultivated plants.

The lighting device 40 may include an LED module 42 including a plurality of LEDs 422 (see FIG. 34), a light case 41 on which the LED module 42 is mounted, and a light cover 43 which shields the LED module 42 and through which light is transmitted. The plurality of LEDs 422 may be provided so as to provide a sufficient amount of light to the cultivation shelf 30 and may be widely distributed above the cultivation shelf 30. The LED module 42 may be configured in a state where the plurality of LEDs 422 are mounted on a substrate, and the plurality of LED modules 42 including the plurality of LEDs 422 may be disposed.

Also, the plurality of LEDs 422 may be disposed to provide a uniform amount of light to the entire top surface of the cultivation space 100 in consideration of the reflection from the inside of the cultivation space 100. Therefore, distances between the LEDs 422 may not be all the same.

Also, the plurality of LEDs 422 may be shielded by the light cover 43, and the light radiated from the LEDs 422 may be diffused in a process of passing through the light cover 43. As a result, the lighting device 40 may emit light in the form of surface plate, and bright spots such as light condensation at a portion corresponding to the LEDs 422 may be prevented from occurring.

The water tank 70 may be provided on a bottom surface inside the cabinet 10. The water tank 70 may store water supplied to the cultivation shelf 30 and water collected from the cultivation shelf 30. The water tank 70 may be disposed below the cultivation shelf 30, which is disposed at the lowermost side, among the plurality of the cultivation shelves 30 and may be disposed in front of a position corresponding to the front end of the cultivation shelf 30.

A length of the water tank 70 in a horizontal direction may correspond to a width of the inner space of the cabinet 10. Also, a length of the water tank 70 in a vertical direction may correspond to a distance between the cultivation shelf 30, which is disposed at the lowermost side, and the bottom surface of the cultivation space 100. That is, the water tank 70 may be provided to fill an entire space below the lower cultivation shelf 40b disposed at the lowermost side, and a space behind the water tank 70 may be covered by the water tank 70.

A pump cover 81 may be provided in the rear space covered by the water tank 70. A pump 83 supplying water of the water tank 70 to the cultivation shelf and a sub-tank 82 provided between the water tank 70 and the pump 83 may be further provided in the pump cover 81. The pump 70 and the pipes connected to the pump 70 can be referred서 as a water supply device because water in the water tank 70 can be supplied to the cultivation shelf 30. The water supply device may include a pipe connected to a fitting portion 811 to be described below, and may further include the sub-tank 82.

The pump 83 may be configured to supply water to the cultivation shelf 30 and be connected to an outlet of the sub-tank 82. Also, the pump 83 may be provided as many as the number corresponding to the cultivation shelf 30. That is, the pump 83 may include an upper pump 83a supplying water to the upper cultivation shelf 30a and a lower pump 83b supplying water to the lower cultivation shelf 30b. Also, the upper pump 83a and the lower pump 83b may be connected to water supply pipes 84 that are directed to the upper cultivation shelf 30a and the lower cultivation shelf 30b to independently supply water to the upper cultivation shelf 30a and the lower cultivation shelf 30b, respectively.

Alternatively, only one pump 83 may be provided. In this case, the pump 83 may be connected to a switching valve so that the water discharged from the pump 83 is selectively supplied to the upper cultivation shelf 30a and the lower cultivation shelf 30b.

The sub-tank 82 may be disposed at a side of the pump 83 to connect the water tank 70 to the pump 83. The sub-tank 82 may be disposed on a path through which water of the water tank 70 is supplied to the pump 83 and may be always maintained at a constant water level. Thus, an accurate operation of the pump 83 may be ensured, and a quantity of water may be supplied to the cultivation shelf 30.

The water tank 70 may be disposed to be able to be withdrawn and inserted, and thus, the water tank 70 and the sub-tank 82 may be separated from each other when the water tank 70 is withdrawn. In a state where the water tank 70 is completely mounted, the water tank 70 and the sub-tank 82 may be connected to each other to supply water.

Also, although not shown, a water supply module supplying water to the cultivation shelf 30 and a drain module draining the water of the cultivation shelf 30 to the water tank 70 may be disposed at both left and right surfaces of the cabinet 10. The water circulation between the water tank 70 and the cultivation shelf 30 may be possible by the water supply module and the drain module.

The water tank 70 may be provided inside the cultivation space 100 so as to be accessible in the front and rear direction. Also, the water tank 70 may include a tank body 71 defining a space in which water is stored and a tank cover 72 that opens and closes a top surface of the tank body 71. Thus, the water tank 70 may have a structure in which the water tank 70 is opened in the withdrawn state to allow additional water supply.

Also, nutrients required for the plant cultivation may be supplied to the water tank 70 by opening the tank cover 72, and thus, the nutrients together with water may be supplied to the cultivation shelf 30. Therefore, even if the seed package 90 itself does not contain the nutrients, the nutrients may be effectively supplied to the seeds. Thus, the water circulated between the water tank 70 and the cultivation shelf 30 may be water that is in a state containing the nutrients and thus may be referred to as a nutrient solution or a culture solution.

The display 14 may be provided on the front surface of the cultivation space 100. The displays 14 may be disposed below the upper cultivation shelf 30a and at a front end of the lower lighting device 40b. In addition, the front surface of the display 14 in a mounted state may be positioned on the same plane as the front surface of the upper cultivation shelf 30a.

In addition, the display 14 is located at a position close to the rear surface of the door 13 in a closed state, and therefore, when the display 14 is turned on even in a closed state, a user may see-through the display 14 through the door 13.

A machine room module 20 may be provided below the cabinet 10. The machine room module 20 may be coupled to the cabinet 10 in a state where the compressor 253 and the condenser 242 are mounted therein. Also, in a state where the machine room module 20 and the cabinet 10 are coupled to each other, a pipe connecting the evaporator 19 to the compressor 253, which are provided inside the cabinet 10, may be connected to each other to allow the refrigeration cycle to operate.

Hereinafter, the internal structure of the cabinet 10 will be described in more detail with reference to the drawings.

Figure 10:
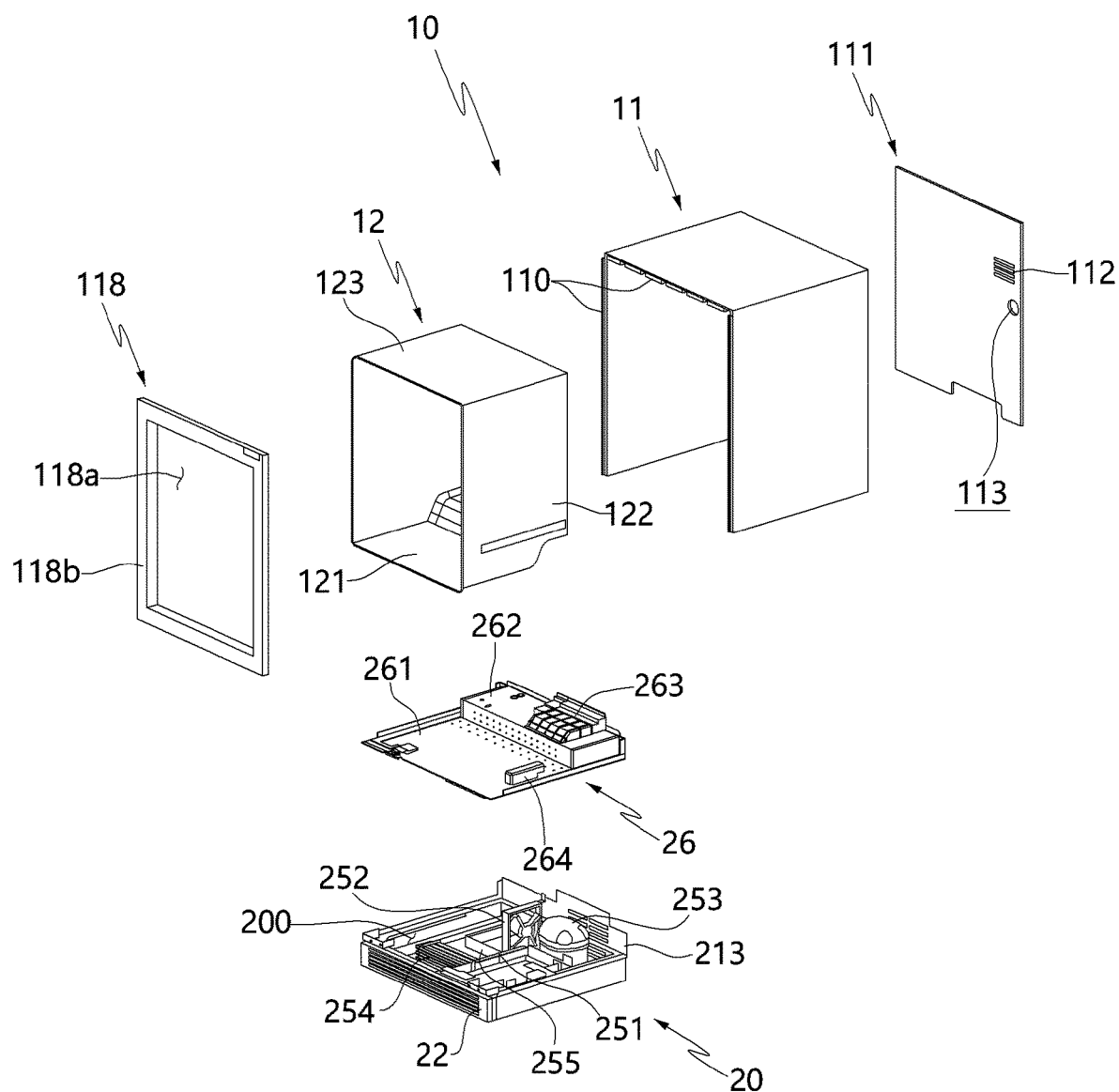
FIG. 10 is an exploded perspective view of the main body of the apparatus for cultivating plants.
Figure 11:
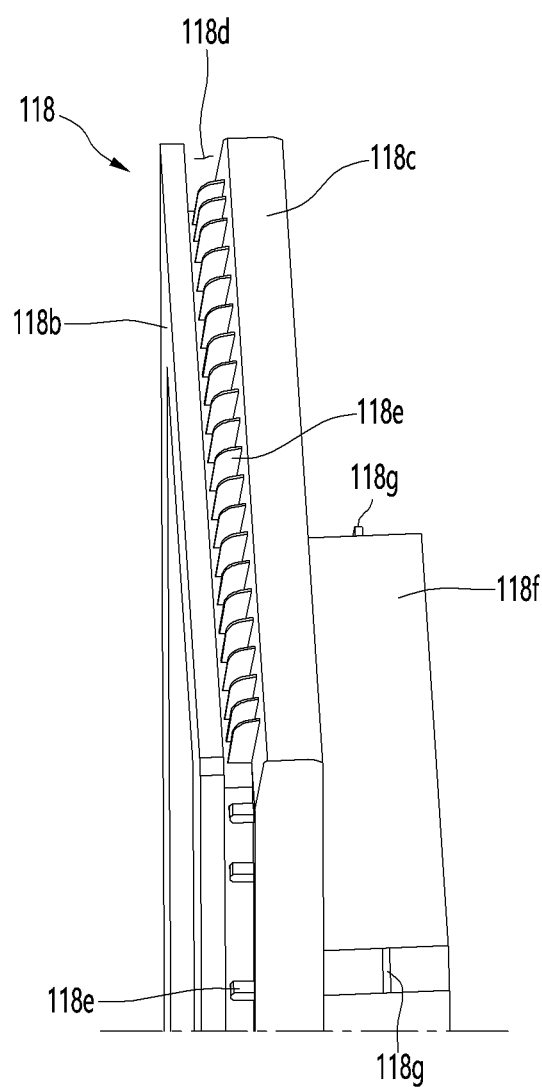
FIG. 11 is a partial perspective view of a deco frame according to an embodiment of the present disclosure.
Figure 12:
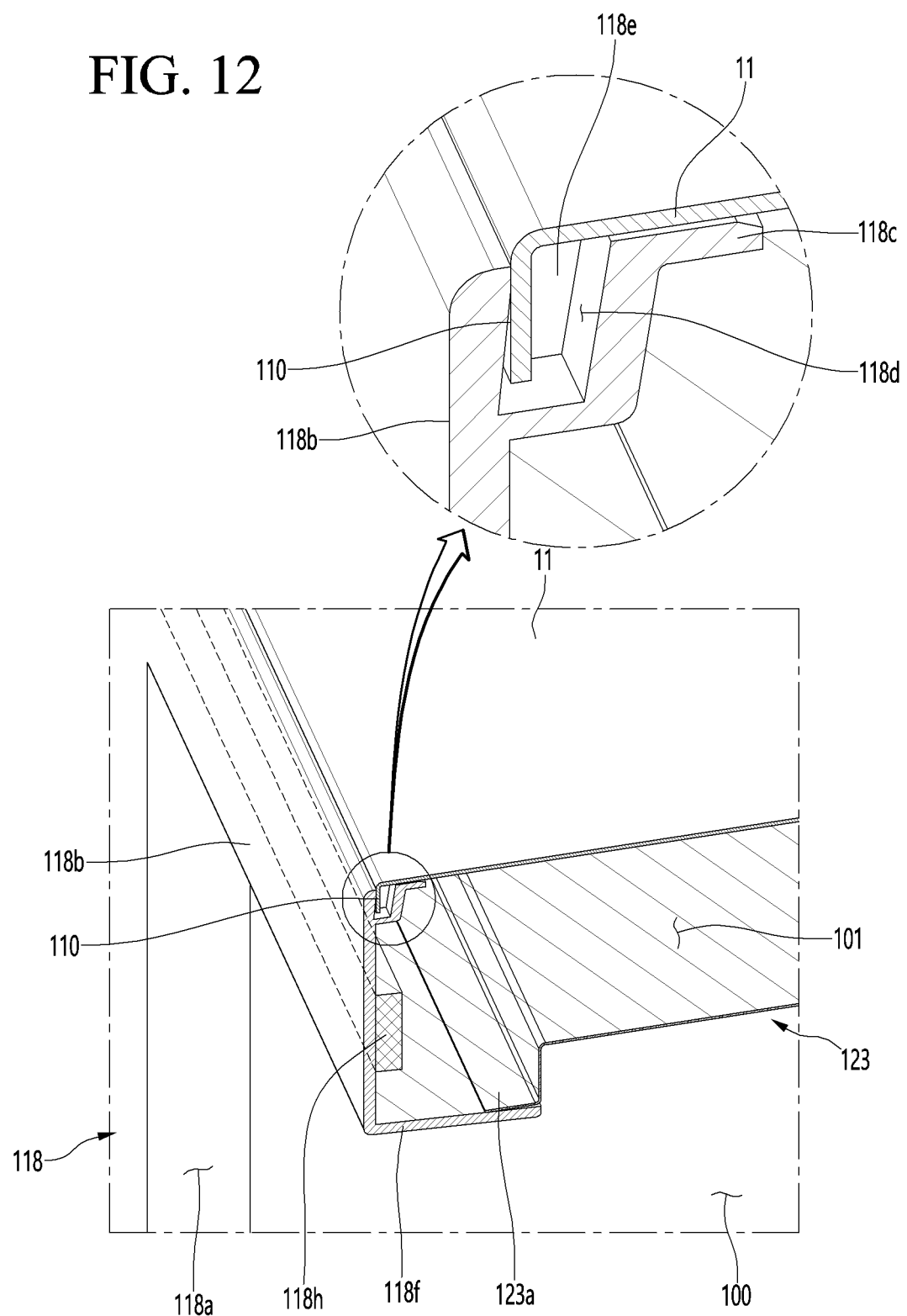
FIG. 12 is a cutaway perspective view taken along line XII-XII' of FIG. 2.

FIG. 10 is an exploded perspective view of the main body of the apparatus for cultivating plants, FIG. 11 is a partial perspective view of a deco frame according to an embodiment of the present disclosure, and FIG. 12 is a cutaway perspective view taken along line XII-XII' of FIG. 2.

As illustrated, the cabinet 10 may include an outer case 11 forming an outer appearance and an inner case 12 forming the cultivation space 100. The cabinet 10 may further include a decorative frame 118 forming a front surface and a back plate 111 forming a rear surface.

The outer case 11 has a substantially hexahedral shape that is open in the front, rear and downward directions, and the inner case 12 is installed inside the outer case 11 to be spaced apart from the outer case 11. In addition, the back plate 111 is assembled on the rear side of the outer case 11, the deco frame 118 is assembled on the front side, and the machine room top cover 26 is assembled on the bottom surface.

In a state where the inner case 12 is positioned inside the outer case 11, and the back plate 111, the decor frame 118, and the machine room top cover 26 are assembled to the outer case 11, respectively, the foam liquid is injected into the space between the inner case 12 and the outer case 11 through the inlet 1134 of the back plate 111 to form the insulator 101.

In this way, when the foam insulator is filled between the outer case 11 and the inner case 12, the electric wire harness connected to the electrical components inside the cabinet 10 and the machine room 200 is embedded in the foamed insulator.

As illustrated in FIGS. 11 and 12, the deco frame 118 forms the front surface of the cabinet 10, the outer circumference is coupled to the outer case 11, and the opened inner circumference is coupled to the inner case 12 and thus may be formed to communicate with the front surface of the cabinet 10 and the front end of the cultivation space 100.

In addition, the deco frame 118 may be injection-formed of a plastic material and may be in contact with the rear surface of the door 13. The decor frame may include a front portion 118b having an opening 118a in the center, an outer extension portion 118c extending rearward along an outer circumference of the front portion 118b, and an inner extension portion 118f extending rearward along a circumference of the opening 118a.

In addition, the front portion 118b of the deco frame 118 may be formed in a flat shape, and a magnet 118h may be attached to an inner surface of the front portion 118b. When the door 13 is closed, the magnet 118h and the magnet 118h of the door gasket 135 exert an attractive force to each other so that the gasket 135 adheres further to the front surface of the deco frame 118. At this time, the magnet 118h may be disposed along the inner circumference of the decor frame 118.

Meanwhile, the outer extension portion 118c may support the front end of the outer case 11 from the inside and may have a rigid coupling structure with the outer case 11. In detail, a case bending portion 110 bent inward may be formed at the front end of the outer case 11. In addition, a frame groove 118d into which the case bending portion 110 is inserted may be formed around the deco frame 118, that is, in the outer extension portion 118c.

The frame groove 118d may be formed along the circumference of the deco frame 118 and may be disposed closer to the front end than the rear end of the outer extension portion 118c. In addition, the outer extension portion 118c in front of the frame groove 118d is formed in a round shape, so that the front end of the outer case 11 and the upper end of the deco frame 118 are naturally engaged so that a step in the area where the deco frame 118 and the outer case 11 come into contact with each other does not occur or be conspicuously visible.

In addition, the outer extension portion 118c behind the frame groove 118d can support the inner surface of the outer case 11 and stably supports the front end of the outer case 11.

Meanwhile, a guide rib 118e may be formed inside the frame groove 118d. The guide rib 118e protrudes forward from the rear surface of the inner surface of the frame groove 118d and may extend upward from the bottom of the frame groove 118d. In addition, the guide rib 118e may be slightly spaced apart from the inner front surface of the frame groove 118d to provide a space into which the case bending portion 110 is inserted. Further, to plurality of he guide ribs 118e may be formed at regular distances along the frame groove 118d, guide the insertion of the case bending portion 110, and support the case bending portion 110 from the rear.

The guide rib 118e may be formed to be inclined or rounded so that the height thereof decreases as the guide rib protrudes from the rear to the front. In addition, the guide rib 118e may be formed such that the protruding width thereof becomes narrower as guide rib extends from the bottom to the top.

In another aspect, the upper end of the guide rib 118e is formed to have a lower slope toward the front, so that the guide rib can guide the insertion of the case bending portion 110 while making contact with the lower end of the case bending portion 110. In addition, the front end of the guide rib 118e is formed to have an inclination toward the rear as it goes upward to facilitate insertion of the case bending portion 110, while the case bending portion 110 can be made to adhere to the inner front surface of the frame groove 118d.

That is, in a state where the outer case 11 is coupled to the deco frame 118, the case bending portion 110 can come into close contact with the front surface of the frame groove 118d. Therefore, it is possible to minimize the sense of difference between the rounded portion of the bent portion of the outer case 11 and the rounded portion of the front end of the outer extension portion 118c connected to each other. In this case, the bent portion of the outer case 11 and the front end of the outer extension portion 118c may be formed to have a curvature corresponding to each other and to be rounded.

The inner extension portion 118f may extend further rearward than the outer extension portion 118c, and the inner case 12 may be connected along the circumference of the inner extension portion 118f. At this time, an extension portion protrusion 118g protruding outward may be formed at a corner of the outer extension portion 118c, and the extension portion protrusion 118g may be in contact with the front end of the inner case 12 to guide the coupling position of the inner case 12.

Meanwhile, the inner case 12 may include a bottom plate 121 forming the bottom of the cultivation space 100, a pair of side plates 122 forming left and right sides of the cultivation space 100, a top plate 123 forming an top surface of the cultivation space 100, and a rear plate 124 forming a rear surface of the cultivation space 100.

The inner case 12 may be formed of at least one metal plate material, and for example, the inner case 12 may be formed of an aluminum material. The inner case 12 may be formed by coupling the bottom plate 121, the side plate 122, the top plate 123, and the rear plate 124.

The bottom plate 121 forms the bottom surface of the cultivation space 100, and the rear half portion may be formed in a higher stepped shape. The rear half portion of the bottom plate 121 having a relatively high height corresponds to the disposition position of the compressor 253 and can secure an installation space for the compressor 253 inside the machine room 200.

In addition, the sub-tank 82 and the pumps 83 may be disposed in the front half portion of the bottom plate 121 having a relatively low height, and the front half portion of the bottom plate 121 may be shielded by the pump cover 81.

Meanwhile, the lower surface of the cabinet 10 may be formed by the machine room top cover 26. The machine room top cover 26 may form an top surface of the machine room 200 and may shield an open top surface of the machine room module 20.

The machine room top cover 26 may be formed by bending a metal plate-like material. The machine room top cover 26 may include a lower part 261 forming the front half portion and an upper part 262 forming the rear half portion. The lower part 261 may be formed at a height in contact with the top surfaces of the condenser 254 and the separation partition wall 251 inside the machine room 200 and may be formed at a relatively low height. In addition, the upper part 262 may be formed to come into contact with an upper end of the heat dissipation fan 252 inside the machine room 200 and may be formed higher than the lower part 261. That is, the rear half portion of the machine room top cover 26 may be formed higher than the front half portion and may be formed stepwise.

In addition, when the machine room back plate 213 forming the back side of the machine room 200 is opened, the back side of the machine room 200 can be opened, and at this time, a wide rear surface inside the machine room 200 may be opened by the upper part 262 having a high height. Accordingly, the operator can easily perform installation of the compressor 253 and welding of pipes connected to the compressor 253 through the relatively wide rear surface of the machine room.

Meanwhile, the height of the upper part 262 is lower than the upper end of the compressor 253, and a cutout portion corresponding to the compressor 253 may be formed. Accordingly, the upper end of the compressor 253 protrudes through the upper part 262, and the upper part of the compressor 253 can be accommodated by the compressor cover 263 mounted on the upper part 262.

The compressor cover 263 has a three-dimensional shape to accommodate the top of the compressor 253 and may be injection-molded of a plastic material. The compressor cover 263 forms the machine room top cover 26 by shielding the cutout of the upper part 262.

Meanwhile, a electric wire guide portion 264 through which electric wires connected to electric components inside the machine room 200 may be formed in the machine room top cover 26, and through the electric wire guide portion 264, the electric wires in the machine room 200 may be connected to electric wires inside a area where the insulator 101 is accommodated.

The cabinet 10 may be provided with an inlet duct 15 and an outlet duct 172, and outside air is introduced into the cultivation space 100 by the inlet duct 15 and the outlet duct 172, so that the carbon dioxide needed for plant growth may be suppled.

Hereinafter, the arrangement structure of the inlet duct 15 and the discharge duct 172 will be described in more detail with reference to drawings.

Figure 13:
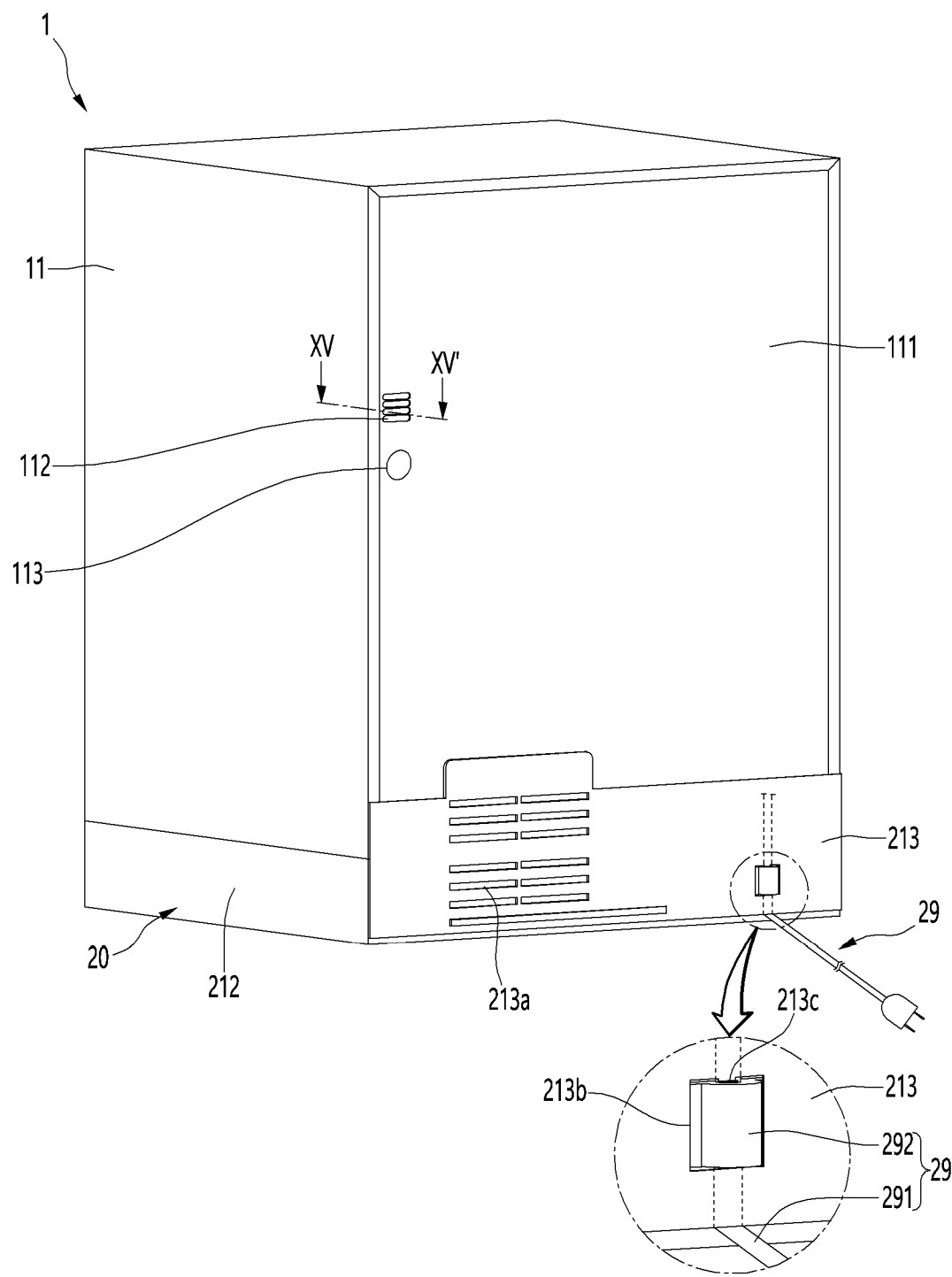
FIG. 13 is a perspective view of the apparatus for cultivating plants as viewed from the rear.
Figure 14:
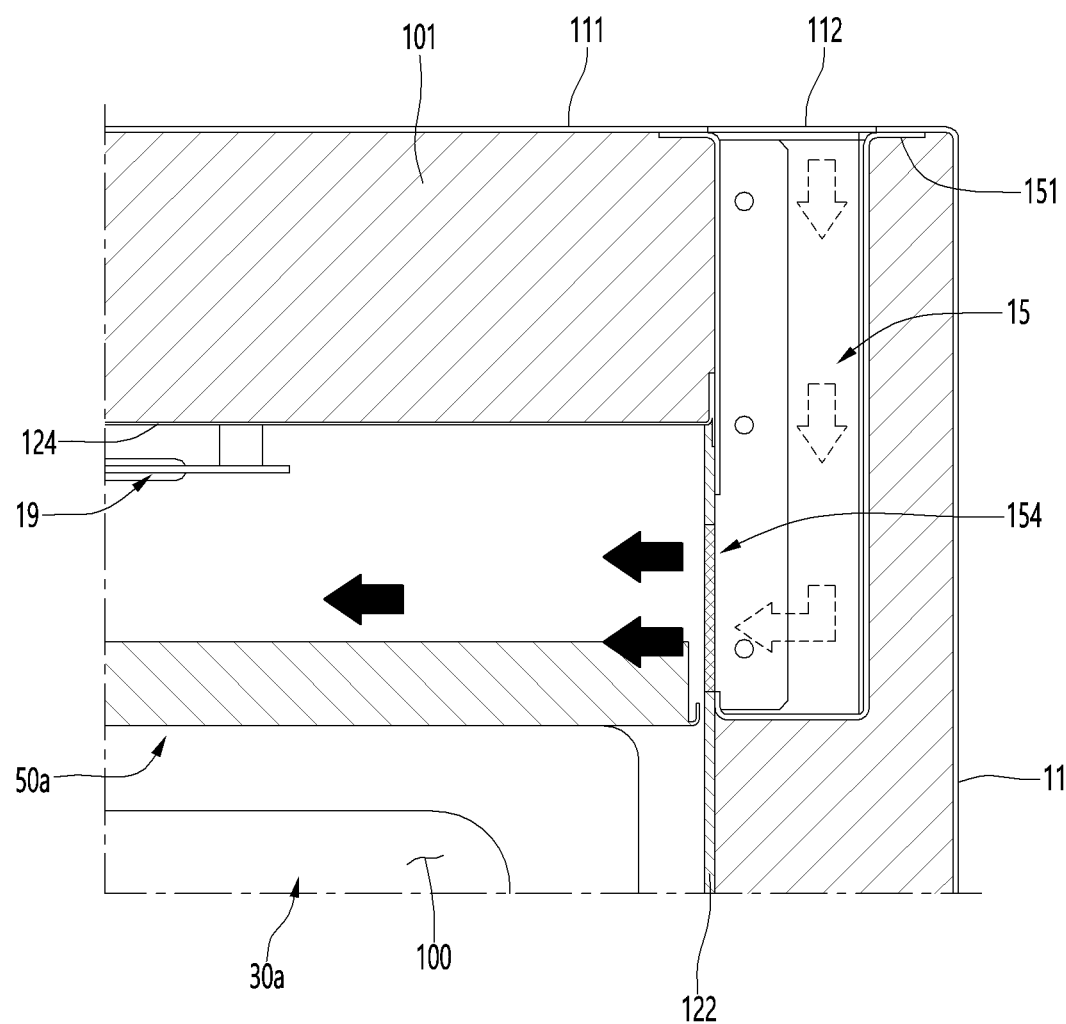
FIG. 14 is a cross-sectional view illustrating the structure of the inlet duct of the apparatus for cultivating plants.
Figure 15:
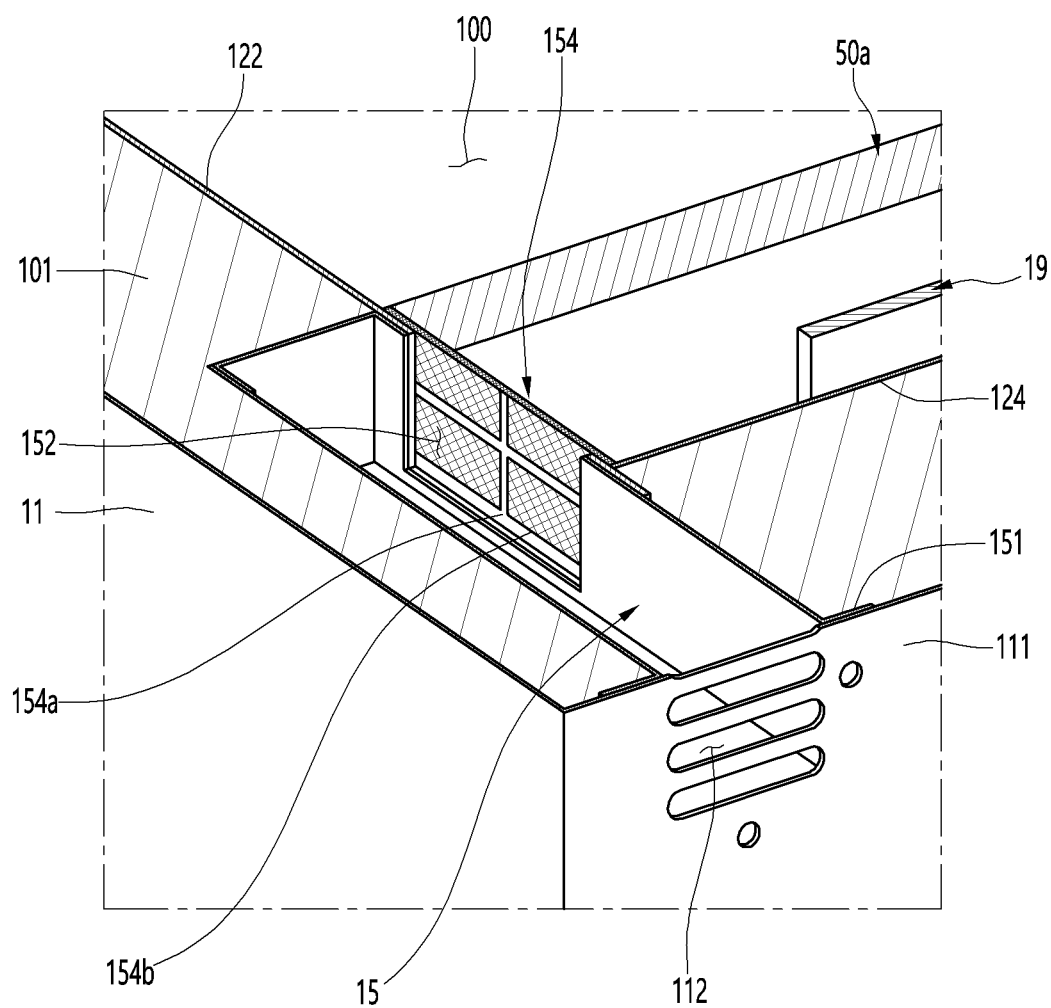
FIG. 15 is a cutaway perspective view taken along line XV-XV' of FIG. 13 as viewed from the rear.
Figure 16:
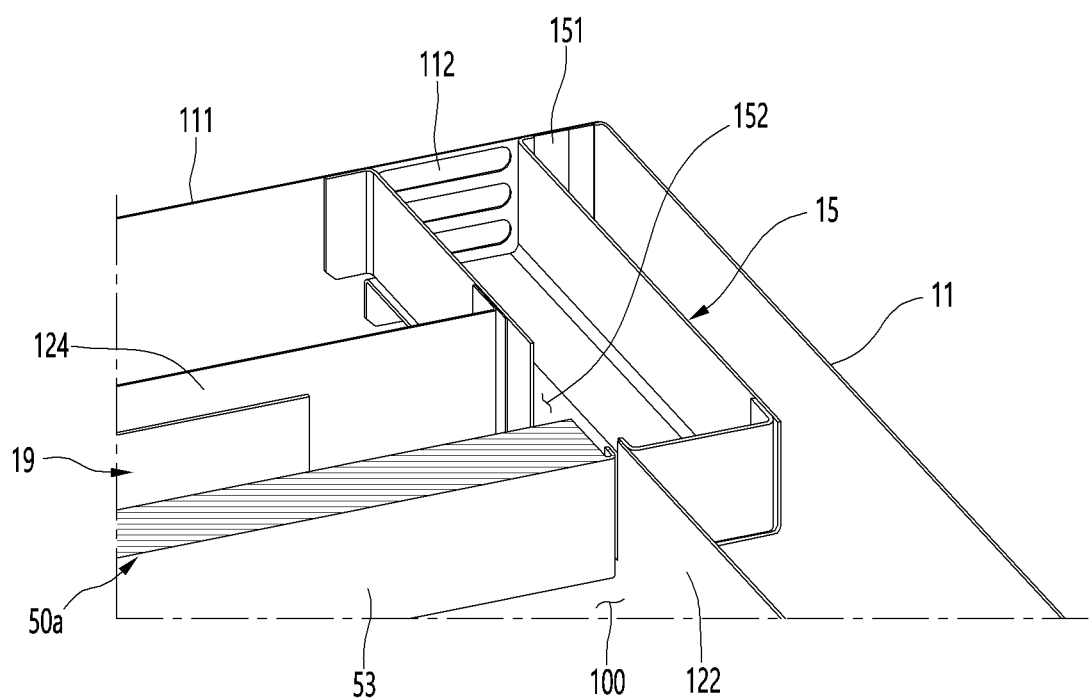
FIG. 16 is a cutaway perspective view taken along line XV-XV' of FIG. 13 as viewed from the front.
Figure 17:
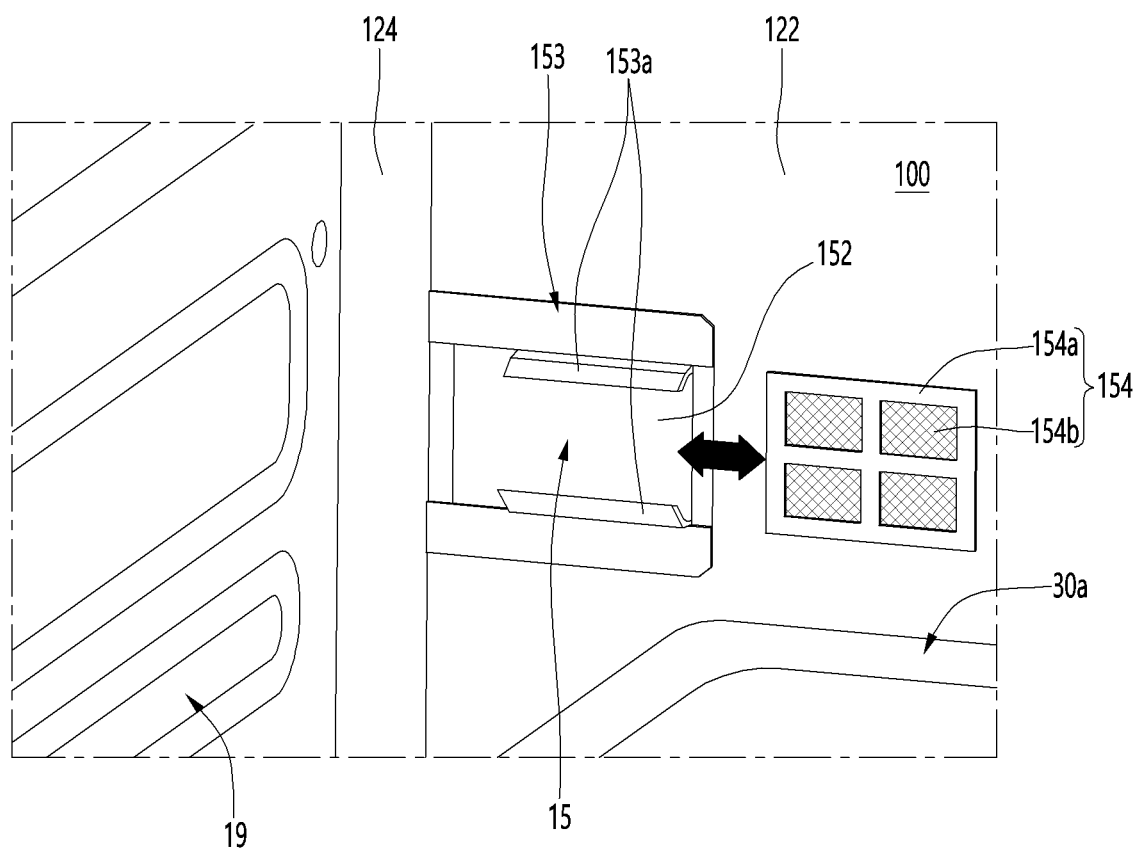
FIG. 17 is a view looking at the cultivation space inlet from the inside of the cultivation space of the apparatus for cultivating plants.
Figure 18:
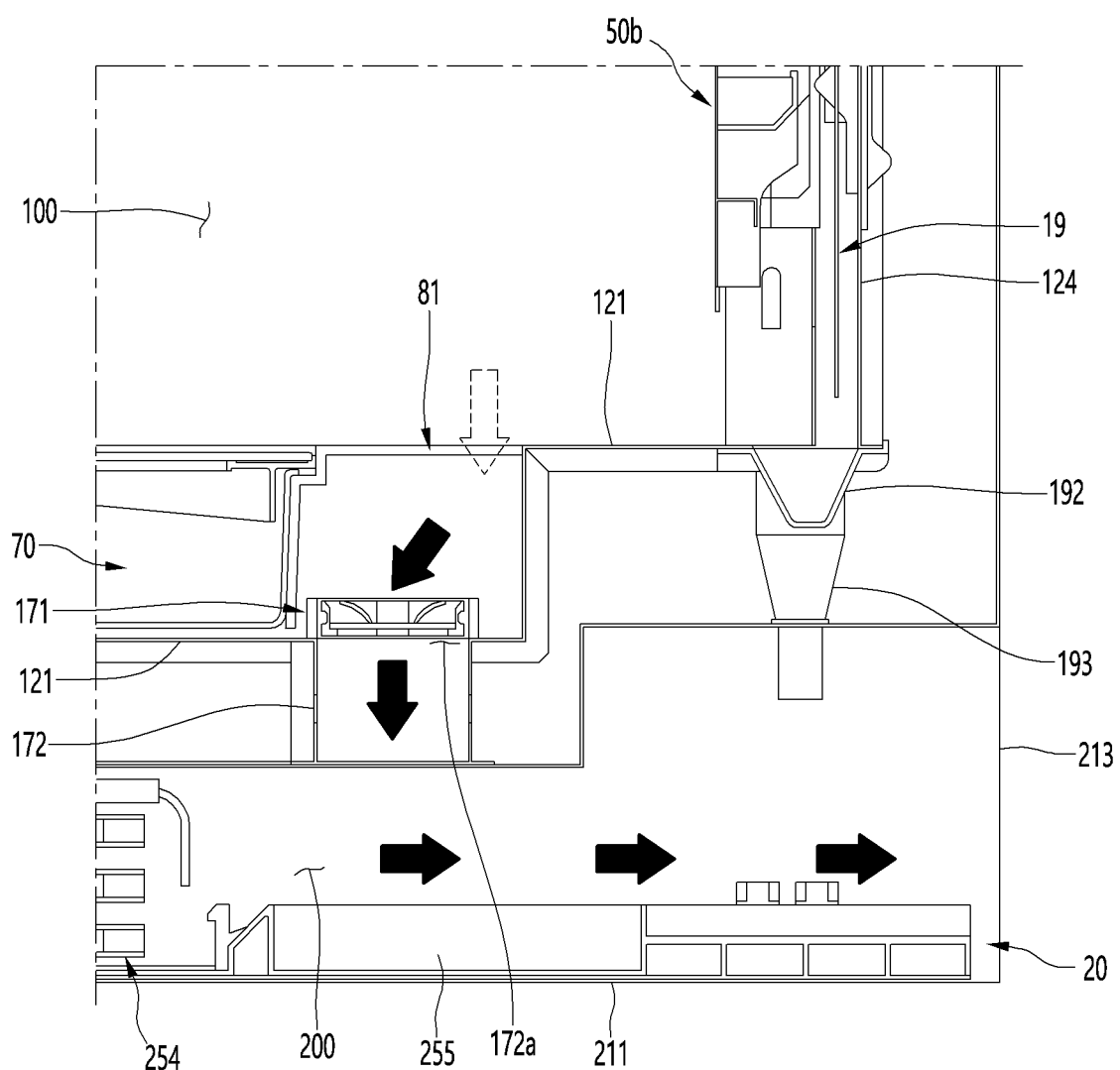
FIG. 18 is a cross-sectional view illustrating the structure of the discharge duct of the apparatus for cultivating plants.

FIG. 13 is a perspective view of the apparatus for cultivating plants as viewed from the rear, FIG. 14 is a cross-sectional view illustrating the structure of the inlet duct of the apparatus for cultivating plants, FIG. 15 is a cutaway perspective view taken along line XV-XV' of FIG. 13 as viewed from the rear, FIG. 16 is a cutaway perspective view taken along line XV-XV' of FIG. 13 as viewed from the front, FIG. 17 is a view looking at the cultivation space inlet from the inside of the cultivation space of the apparatus for cultivating plants, and FIG. 18 is a cross-sectional view illustrating the structure of the discharge duct of the apparatus for cultivating plants.

As illustrated in the drawing, on the other hand, an inlet duct 15 may be provided at the top of the cabinet 10. The inlet duct 15 communicates the inside of the cultivation space 100 with the outside space to form a flow path or passage through which external air flows into the inside of the cultivation space 100, and the inlet duct may be arranged to penetrate the insulator 101 in the cabinet 10. In addition, the inlet duct 15 may supply carbon dioxide by introducing outside air into the cultivation space 100. Accordingly, the inlet duct 15 may be referred to as an inflow flow path or an inflow passage.

The inlet duct 15 may connect the back plate 111 provided on the rear surface of the cabinet 10 and the side plate 122 forming the side surface of the cultivation space 100. The inlet duct 15 may be formed in a cylindrical shape of a hexahedron, and the open rear surface of the inlet duct 15, that is, the inlet of the inlet duct 15 may be communicated with an outside air inlet 112 formed on the back plate 111. Therefore, outside air may flow into the inlet duct 15 through the outside air inlet 112. In addition, the outlet of the inlet duct 15 may be formed on a circumferential surface of the inlet duct 15, that is, on one side facing the side plate 122. An outlet of the inlet duct 15 may be formed at one end of the inlet duct 15 and communicate with the cultivation space inlet 152.

As such, the inlet duct 15 may be formed in the shape of a hexahedral cylinder, and extends backward in a state of being in contact with one side of the cultivation space 100, that is, the side plate 122 and thus is in contact with the back plate 111. Accordingly, the intake duct 15 can pass through the cabinet 10 through the shortest path.

In addition, the inlet duct 15 may extend from the side of the cultivation space 100, that is, the side of the side plate 122, and thus, prevent with the components provided in the rear plate 214 forming the rear surface of the cultivation space 100, in particular, the components such as the evaporator 19.

The inlet duct 15 may be formed by bending a metal plate-shaped material multiple times, or may be formed of a plastic material if necessary. In addition, the inlet duct 15 may be disposed between the outer case 11 and the inner case 12 and filled with the insulator 102.

Meanwhile, the inlet duct 15 may extend to a front end of the blower 50. That is, at least a part of the outlet of the inlet duct 15 may be located further rear than the front end of the blower 50a. Therefore, at least a portion of the cultivation space inlet 152 corresponding to the outlet of the inlet duct 15 may also be covered by the blower 50, and the cultivation space inlet 152 may enter the cultivation space 100 can be prevented from being directly exposed.

In addition, the cultivation space inlet 152 may overlap a area between the rear wall surface of the cultivation space 100 and the blower 50. Accordingly, the air introduced into the cultivation space 100 through the cultivation space inlet 152 may flow to the rear of the blowing fan 52 and be discharged forward by the blowing fan 52.

That is, the air introduced to the rear of the blowing fan 52 can be discharged forward after being cooled via the evaporator 19 or an area adjacent to the evaporator 19. Therefore, even if air from the external space is introduced into the cultivation space 100, the temperature of the cultivation space 100 does not change rapidly.

Meanwhile, a pre-filter 154 may be provided at the cultivation space inlet 152. The pre-filter 154 can prevent foreign substances such as dust or pests from entering from the outside. The pre-filter 154 may be formed in a size capable of shielding the cultivation space inlet 152. The pre-filter 154 may include a filter frame 154a forming an overall outer frame and a filter portion 154b having a reticulated structure or a mesh structure covering the filter frame 154a.

Filter guides 153 may be formed at upper and lower ends of the cultivation space inlet 152. The filter guide 153 may extend along upper and lower ends of the cultivation space inlet 152, and a filter restricting portion 153a capable of accommodating the upper and lower ends of the pre-filter 154 may be bent. Accordingly, the pre-filter 154 can be moved forward and backward along the filter guide 153 and can be detached from the inside of the cultivation space 100 as needed.

That is, the pre-filter 154 may be inserted into and mounted inside the filter guide 153, and may be disposed in a distance between the side wall surface of the cultivation space 100 and the side surface of the blower 50. In addition, when replacement or management of the pre-filter 154 is required, the pre-filter 154 may be introduced in and withdrawn out through a distance between the side wall surface of the cultivation space 100 and the side surface of the blower 50.

Meanwhile, the inlet duct 15 may be disposed at a position corresponding to the height of the blower assembly 500b located at the top of the blower 50. That is, the inlet duct 15 may be located in an upper area of the cultivation space 100, and thus the air suctioned into the cultivation space 100 from the outside is introduced through the upper portion of the cultivation space 100 and, since the air on the bottom surface of the cultivation space 100 is discharged to the outside via the machine room 200 through the discharge duct 172, the inside of the cultivation space 100 can be effectively ventilated.

As illustrated in FIG. 18, an exhaust fan 171 may be provided below the pump cover 81. The exhaust fan 171 can ventilate the cultivation space 100 by discharging air from the cultivation space 100 to the outside via the machine room 200. The exhaust fan 171 can be shielded by the pump cover 81 to prevent external exposure, and is provided on the lower surface of the cultivation space 100 adjacent to the machine room 200 so that exhaust can be made more smoothly.

In addition, a bottom surface of the cultivation space 100 and an top surface of the machine room 200 may be connected by a discharge duct 172. The discharge duct 172 may form a flow path or passage through which air inside the cultivation space 100 is discharged. The discharge duct 172 is formed to pass through the lower surface of the cabinet 10 and may pass through the insulator 101 on the lower surface of the cabinet 10. Accordingly, the discharge duct 172 may be referred to as a discharge flow path or a discharge passage. The cultivation space 100 and the machine room 200 may communicate with each other through the discharge duct 172. In addition, the exhaust fan 171 may be connected to an inlet of the discharge duct 172.

The open top surface of the discharge duct 172, that is, the inlet of the discharge duct 172 may communicate with the cultivation space outlet 172a formed on the bottom plate 121 forming the lower surface of the cultivation space 100. In addition, the exhaust fan 171 may be provided at the cultivation space outlet 172a. Therefore, when the exhaust fan 171 is driven, the air in the cultivation space 100 can be effectively discharged to the machine room 200 through the discharge duct 172.

At this time, the opened lower surface of the discharge duct 172, that is, the outlet of the discharge duct 172 communicates with the top surface of the machine room 200, wherein the opened lower surface of the discharge duct 172 can communicate with the space in which to be the condenser 254 is disposed in the inner space of the machine room 200.

In detail, the discharge duct 172 may communicate with the suction side of the heat dissipation fan 252, and when the heat dissipation fan 252 is driven, air in the discharge duct 172 can be introduced into the machine room 200 more effectively by the suction force of the heat dissipation fan 252.

In addition, the air introduced into the machine room 200 through the heat dissipation fan 252 may be exhausted to the outside through the grill outlet 222 of the grill cover 200 via the compressor 253. That is, the air inside the cultivation space 100 whose humidity has increased due to the transpiration of plants is introduced into the space between the pump covers 81 and moved downward, and is discharged to the machine room 200 through the discharge duct 172, and then may be discharged to the outdoors via the machine room 200. In addition, the low-temperature air inside the cultivation space 100 is introduced into the machine room 200 through the discharge duct 172 and passes through the compressor 253 by the driving of the heat dissipation fan 252 and thus the compressor 253 can be cooled more effectively.

Meanwhile, the discharge duct 172 is formed in a cylinderical shape, and upper and lower surfaces may be opened. The open top surface of the discharge duct 172 may communicate with the bottom surface of the cultivation space 100, and the open lower surface of the discharge duct 172 may communicate with the top surface of the machine room 200. Accordingly, the discharge duct 172 connects the cultivation space 100 and the machine room 200 through the shortest path.

In addition, the discharge duct 172 may be buried on the insulator. Since the discharge duct 172 connects the cultivation space 100 and the machine room 200 through the shortest path, the non-insulation area not filled with the insulator 102 is minimized and thus it can be prevented that the heat insulation performance of the cultivation space 100 is minimized.

In addition, the discharge duct 172 may be formed in a cylinderical shape having a rectangular cross section by bending a plate-shaped metal material multiple times. In addition, flanges are formed around the upper and lower ends of the opening of the discharge duct 172 to be fixedly mounted on the bottom surface of the cultivation space 100 and the top surface of the machine room 200. Of course, the discharge duct 172 may be formed in the same shape by being injected with a plastic material.

Hereinafter, the structure of the machine room 200 will be described in more detail with reference to drawings.

Figure 19:
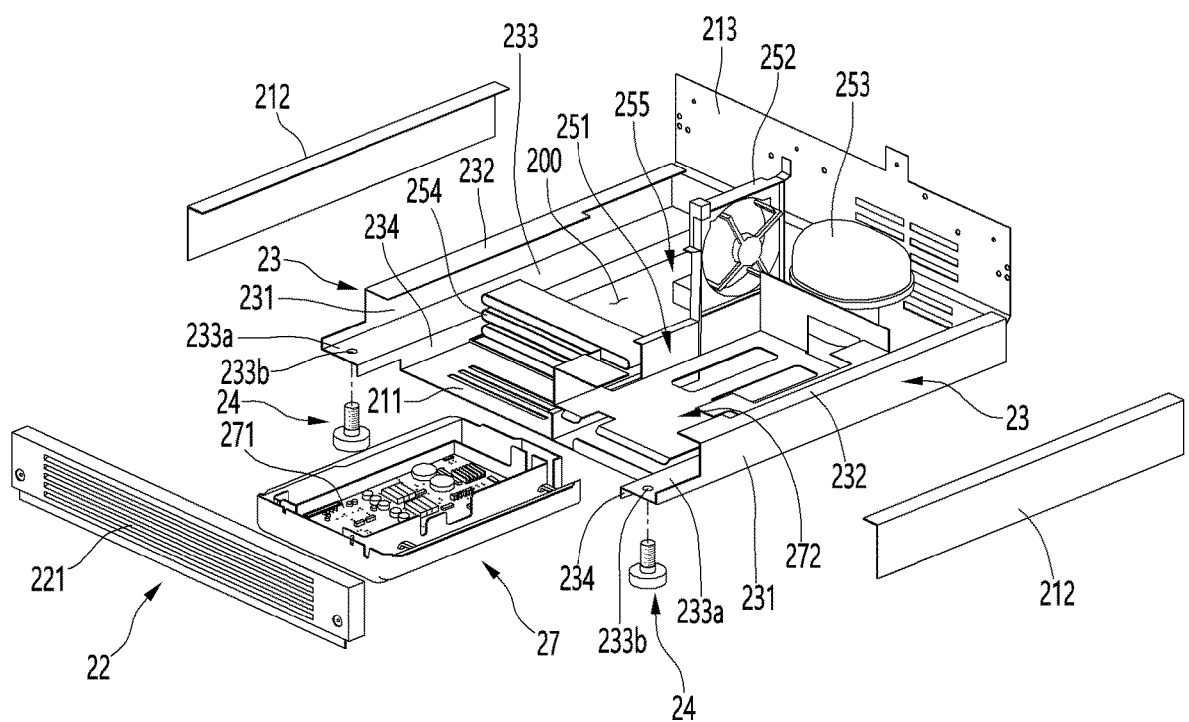
FIG. 19 is an exploded perspective view of a state where the front cover, control portion, and legs of the machine room module are separated.
Figure 20:
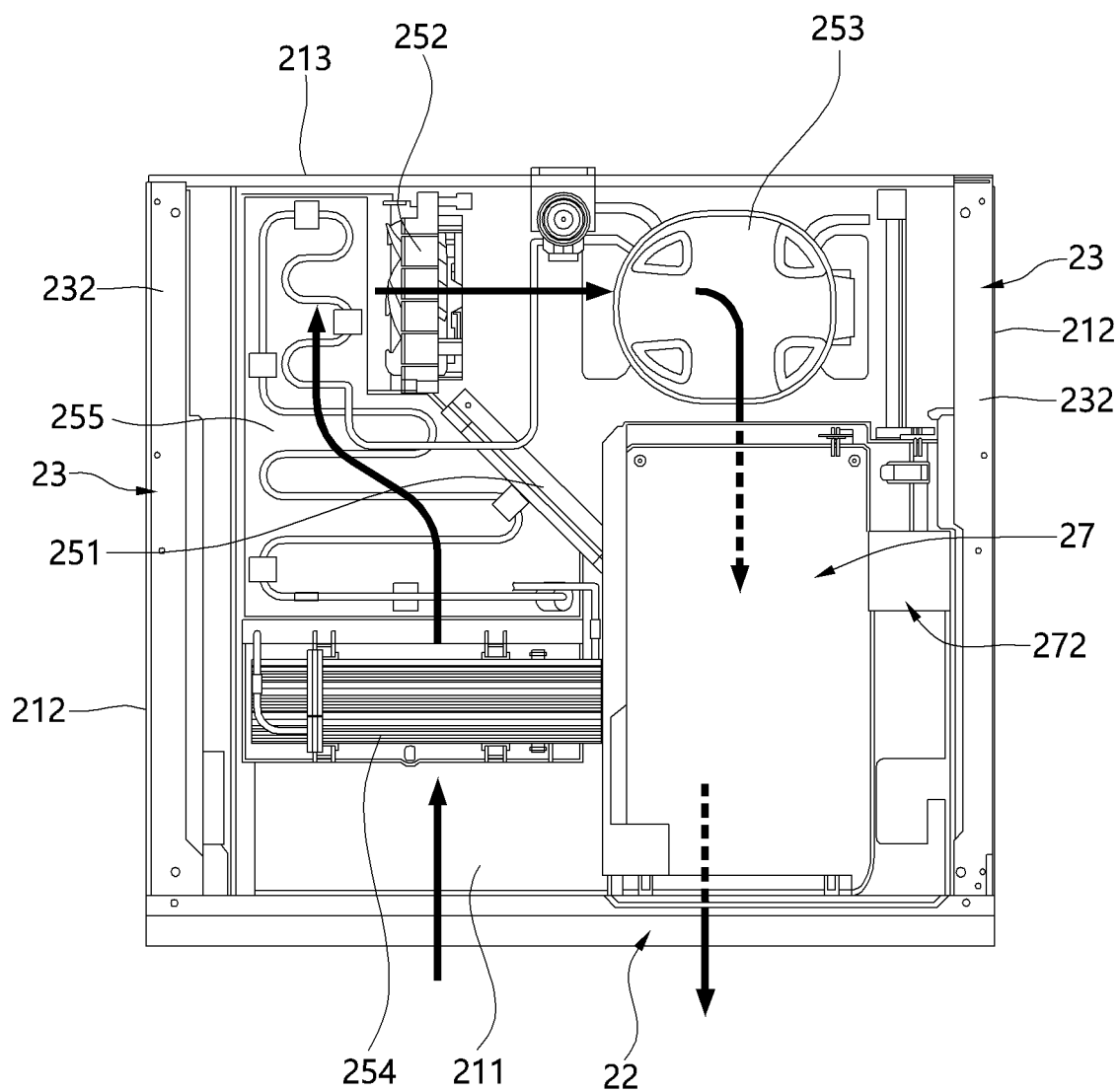
FIG. 20 is a plan view illustrating the inside of the machine room.
Figure 21:
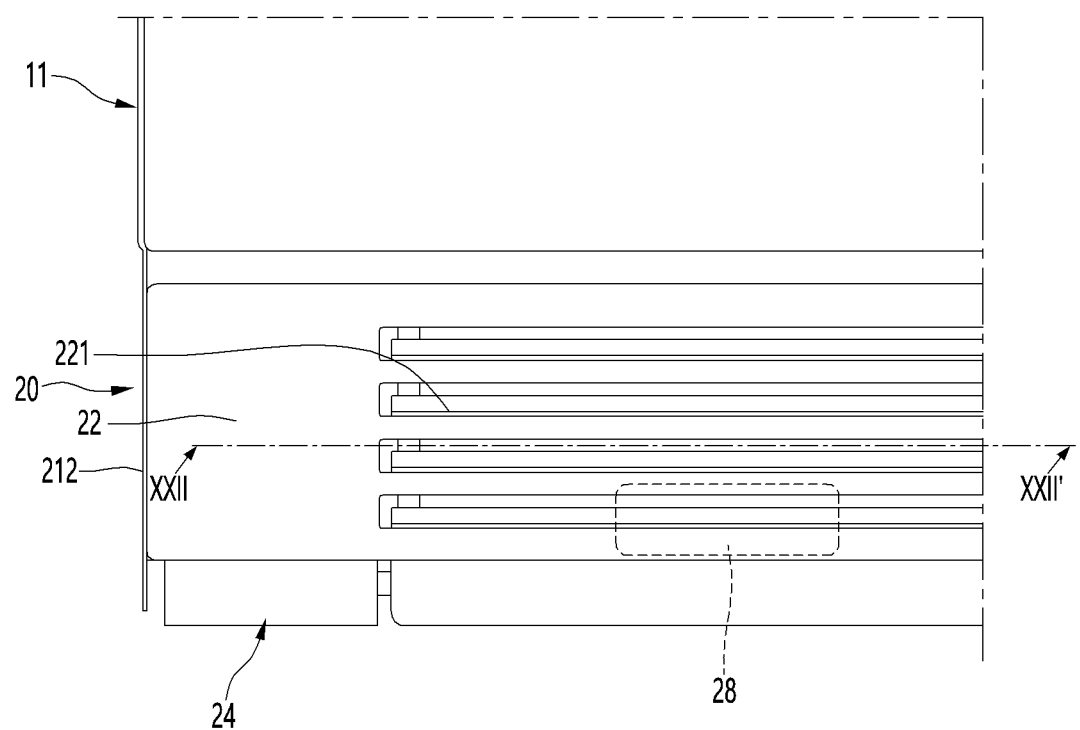
FIG. 21 is an enlarged view of portion A of FIG. 2.
Figure 22:
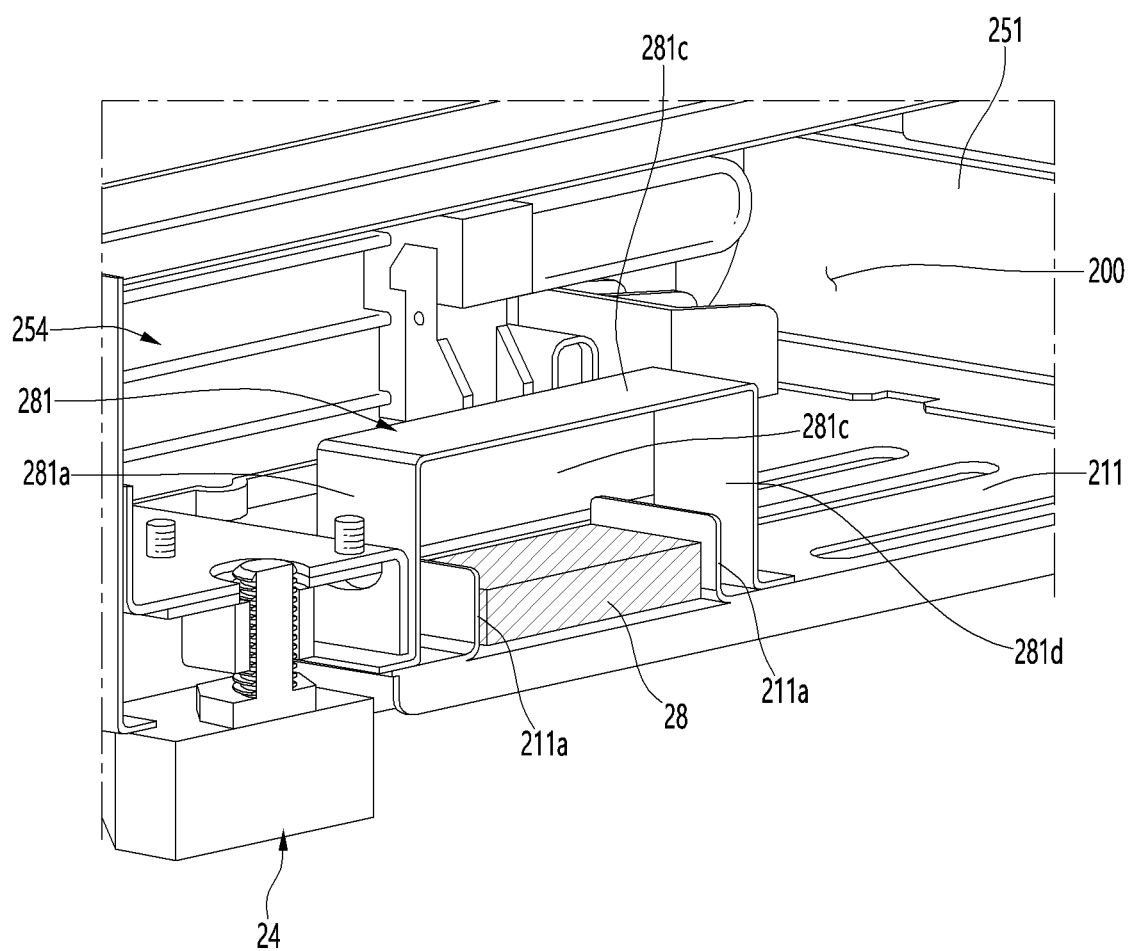
FIG. 22 is a cutaway perspective view taken along line XXII-XXII' of FIG. 21.
Figure 23:
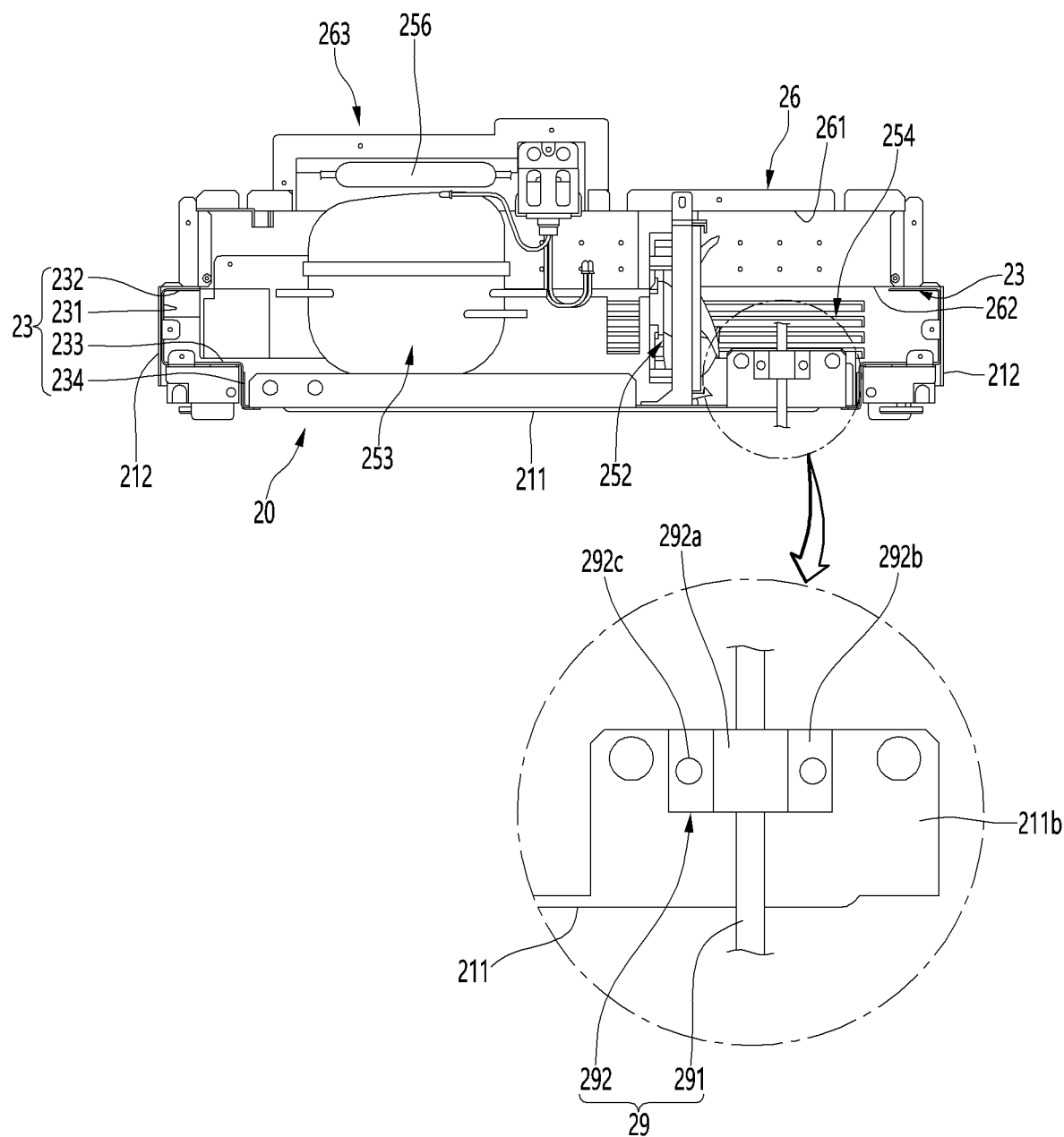
FIG. 23 is a rear view illustrating the inside of the machine room.
Figure 24:
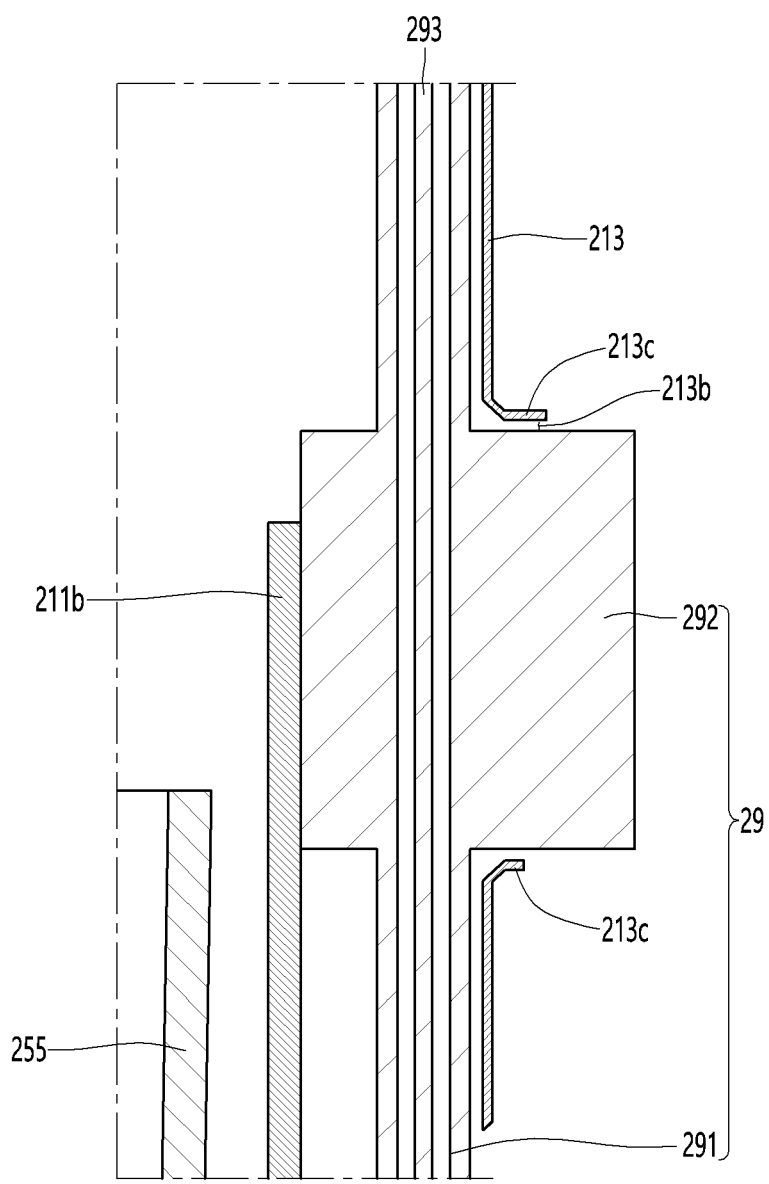
FIG. 24 is a cross-sectional view illustrating a fixed state of the power cable of the apparatus for cultivating plants.

FIG. 19 is an exploded perspective view of a state where the front cover, control portion, and legs of the machine room module are separated, FIG. 20 is a plan view illustrating the inside of the machine room, FIG. 21 is an enlarged view of portion A of FIG. 2, FIG. 22 is a cutaway perspective view taken along line XXII-XXII' of FIG. 21, FIG. 23 is a rear view illustrating the inside of the machine room, FIG. 24 is a cross-sectional view illustrating a fixed state of the power cable of the apparatus for cultivating plants.

As illustrated, the machine room module 20 is mounted on the lower surface of the cabinet 10 and forms a machine room 200 space independent of the cultivation space 100 below the cabinet 10.

The cabinet 10 may be filled with the insulator 101 to insulate the cultivation space 100, and the area above the machine room module 20 may be referred to as an insulated area. In addition, the machine room module 20 is a space where heat dissipation and cooling is performed, and the insulator 101 is not disposed, and can be referred to as a non-insulation area. Accordingly, the cabinet 10 may have a structure in which heat is effectively dissipated inside the machine room 200 while maintaining insulation of the cultivation space 100.

In addition, the cabinet 10 may be stacked so that the assembled outer case 11 shields the upper surface of the machine room module 20 so that the insulator 101 is filled in a state where the assembly of the machine room module 20 is completed. Therefore, the cabinet may be composed of a lower module of the machine room module 20 and an upper module of the outer case 11 area disposed above the machine room module 20.

The machine room module 20 may include a machine room lower plate 211 forming a lower surface, and side frames 23 may be coupled to both side surfaces of the machine room lower plate 211. The side frame 23 may form a side surface of the machine room module 20, and the upper module of the cabinet 10, that is, the lower end of the assembly combined with the outer case 11 is seated and can support the outer case 11 in a state where the insulator 101 is filled.

In detail, the side frame 23 may extend along both ends of the machine room lower plate 211 and may have a predetermined height to form a side surface of the machine room 200. In addition, the side frame 23 is formed to have a shape bent multiple times, so that the upper module of the cabinet 10 can be seated thereon.

The side frame 23 may include a frame side surface 231, a frame top surface 232 and a frame lower surface 233. The frame side surface 231 forms a side surface of the machine room 200 and may have a set height. In this case, an upper end of the frame side surface 231 may correspond to an upper end of a separation partition partitioning a space inside the machine room 200.

A frame top surface 232 may be formed at an upper end of the frame side surface 231. The frame top surface 232 may be vertically bent inward from an upper end of the frame side surface 231, and an upper module filled with the insulator 101 may be seated. That is, the bottom of both sides of the outer case 11 and both ends of the machine room top cover 26 can come into contact with each other, and the bottom of both sides of the upper module can be supported by the top surface 232 of the frame. Accordingly, the width of the frame top surface 232 may correspond to the width of both protruding ends of the upper module. In addition, the front and rear lengths of the frame side surface 231 and the frame top surface 232 may correspond to the front and rear lengths of the machine room lower plate 211 and the front and rear lengths of the upper module of the cabinet 10.

A frame lower surface 233 bent inwardly parallel to the frame top surface 232 may be formed at a lower end of the frame side surface 231. The lower surface 233 of the frame is bent inward and provides a surface on which legs 24 supporting the cabinet 10 from below and wheels 243 for moving the cabinet 10 can be provided.

The frame lower surface 233 may extend more forward than the frame side surface 231 and may protrude forward of the cabinet 10. That is, the frame lower surface 233 may protrude more forward than the deco frame 118 forming the front surface of the cabinet 10. Of course, the frame lower surface 233 does not protrude more than the front surface of the door 13 when the door 13 is closed and may extend forward so as to be inserted into the front cover 22.

That is, a frame protrusion 233a protruding more forward than the cultivation space 100 may be formed at the front end of the frame lower surface 233, and the leg 24 may be mounted on the frame protrusion 233a.

A screw hole 233b to which the leg 24 is mounted may be formed in the frame protrusion 233a. In addition, the leg 24 may have a support portion 241 in contact with the ground and a leg shaft 242 extending from the center of the support portion 241 and fastened to the screw hole 233b. The leg shaft 242 may be formed in a screw shape and may be fastened to the screw hole 233b, and the height of the leg 24 may be adjusted according to rotation of the leg shaft 242. Accordingly, the height of the cabinet 10 can be adjusted, and the cabinet 10 can be disposed horizontally by adjusting the step difference of the cabinet 10 in the left and right or front and rear direction. Accordingly, the leg 24 may be referred to as a height adjustment leg 24.

Meanwhile, as the legs 24 are mounted on the frame protrusions 233a, the cabinet 10 can have a stable installation structure. In particular, even when the center of gravity moves forward due to the withdrawal of the cultivation shelf 30 and the water tank 70 and the opening of the door 13, the apparatus for cultivating plants 1 can be prevented from falling forward.

A lower surface bent portion 234 bent downward again may be formed at an extended inner end of the lower surface 233 of the frame. The bottom bent portion 234 extends downward and may be coupled to both left and right ends of the machine room lower plate 211. That is, a pair of side frames 23 may be coupled to both left and right ends of the lower plate 211 of the machine room. The bottom bent portion 234 may have a structure in which an extended lower end is bent inward again for coupling with the machine room lower plate 211, and is coupled to the machine room lower plate 211 by screws or rivets.

In addition, the deco plate 212 may be further mounted on an outer surface of the side frame 23. The deco plate 212 may be formed of the same material as the outer case 11, and may cover the entire frame side surface 231 to form a side appearance of the machine room module 20. Therefore, the outer appearance of the side of the cabinet 10 can have a sense of unity, and the outer appearance of the cabinet 10 having a structure stacked on the top surface of the machine room module 20 can be seen neatly.

An upper end of the deco plate 212 may be bent inward, and the bent upper end may be inserted between the top surface 232 of the frame and the lower end of the outer case 11. In addition, as illustrated in FIG. 23, the lower end of the deco plate 212 may extend downward more than the frame side surface 231 to cover at least a portion of the leg 24 and the wheel 243.

The machine room lower plate 211, the side frame 23, the machine room back plate 213, and the front cover 22 are coupled to each other, and the open top surface may be shielded by the machine room top cover 26.

An internal space of the machine room module 20 may be partitioned by the separation partition wall 251. The separation partition wall 251 may extend backward from the opened front end of the machine room module 20. The condenser 242 may be provided in a left space partitioned by the separation partition wall 251, and a compressor 253 may be provided in a right space partitioned by the separation partition wall 251. Also, a heat dissipation fan 233 for forcibly flowing air from the left side to the right side may be provided on a rear end of the separation partition wall 251.

A front cover 22 may be provided on the opened front surface of the machine room module 20. The front cover 22 may shield the opened front surface of the machine room module 20, and a grill portion 221 may be disposed on the front surface of the front cover 22. The grill portion 221 may define an opening, through which air is injected and discharged, such as a grill.

Thus, when the heat dissipation fan 252 is driven, external air may be suctioned to flow to the left space of the machine room module 20 through a left side of the grill portion 221, and the suctioned air may pass through the condenser 242 and then be heat-exchanged with a refrigerant in the condenser 242 to dissipate heat of the condenser 242. Also, the air passing through the heat dissipation fan 252 may cool the compressor 253 while passing through the compressor 253. Also, the air passing through the compressor 253 may be discharged forward through the right side of the grill portion 221.

That is, while the apparatus 1 for cultivating plants is installed, external air may be suctioned, and the air inside the machine room module 20 may be discharged at the front side while passing through the front cover 22. Thus, the apparatus 1 for cultivating plants may be installed in a space in which both the left and right sides and the rear surface are blocked. Particularly, even if the apparatus 1 for cultivating plants is installed in a furniture such as a sink, the cooling and heat exchange of the compressor 253 and the condenser 242 in the machine room module 20 may be effectively performed.

The evaporator 19 constituting the refrigeration cycle may be provided inside the cabinet 10 and also be disposed vertically on the rear surface of the cultivation space 100 so as to be easily connected to the components inside the machine room module 20 by a refrigerant pipe.

A condensed water receiver 255 from which condensed water generated in the evaporator 19 or defrosting water generated during defrosting is discharged may be provided in the machine room module 20. Also, at least a portion of the condenser may be disposed inside the condensed water receiver 255, or the refrigerant pipe connected to the condenser 242 may be disposed inside the condensed water receiver 255 to evaporate water inside the condensed water receiver 255.

Meanwhile, a control box 27 may be provided inside the machine room 200. The control box 27 may be disposed in a space on the right side partitioned by the partition wall 251, that is, in front of the compressor 253. In addition, when the front cover 22 is separated, the control box 27 may be configured to be exposed forward.

In addition, a box guide member 272 may be provided inside the machine room 200 to guide the introduction and the withdrawal of the control box 27. The box guide member 272 is formed in a plate shape, and may be configured to be bent multiple times to support both side surfaces, a lower surface, and a rear surface of the control box 27. The box guide member 272 may be opened forward, and thus the control box 27 may be introduced in and withdrawn out in the front and rear direction.

The top surface of the box guide member 272 is open, and the upper end of the box guide member 272 may be mounted on the lower surface of the machine room top cover 26. Therefore, the box guide member 272 is disposed in a hanging shape on the top surface of the machine room 200, and the lower surface of the box guide member 272 can be separated from the lower surface of the machine room 200, that is, the machine room lower surface plate 211. Therefore, air flow inside the machine room 200 can be smooth. The box guide member 272 is disposed at a position corresponding to the electric wire guide portion 264 so that electric wires connected to the PCB 271 inside the control box 27 can be introduced and withdrawn.

At least a portion of a rear surface and a lower surface of the box guide member 272 may be opened, so that cold air discharged forward past the compressor 253 passes through or contacts the box guide member and thus the control box 27 and the PCB 271 in the control box 27 can be effectively cooled.

In addition, the control box 27 can be exposed in a state where the front cover 22 is opened, and in this state, the control box 27 can be withdrawn to be capable of facilitating maintenance of the internal PCB 271.

Meanwhile, at least a portion of the PCB 271 or the control box 27 including the PCB 271 can control the overall operation of the apparatus for cultivating plants 1, and thus may be referred to as the control portion 27.

As disclosed in FIGS. 21 and 22, a proximity detection device 28 may be provided inside the machine room 200.

The proximity detection device 28 is configured to detect when a user stands in front of the apparatus for cultivating plants 1 for use of the apparatus for cultivating plants 1.

This proximity detection device 28 may be a capacitive sensor or a non-capacitive sensor for detecting the presence of a person. For example, the proximity detection device 28 may be a position sensing device (PSD). That is, the proximity detection device 28 may be configured to recognize the user's location by radiating infrared rays and measuring an angle of reflected light in a light receiving portion. In addition, the proximity detectable distance can be set by the proximity detection device 28, and the proximity detection device 28 sets the detectable distance within 1 m, for example, between 15 cm and 100 cm, and when the user is located within 1 m from the front surface of the apparatus for cultivating plants 1, it can recognize that the user is located in front of the apparatus for cultivating plants 1 for manipulation. This proximity detection device 28 may also be referred to as a proximity detection sensor.

In addition, a sensor fixing portion 211a for fixing the proximity detection device 28 may be formed in the machine room 200. The sensor fixing portion 211a may be formed on the bottom surface of the machine room 200, that is, the machine room lower plate 211. In detail, the sensor fixing portion 211a may be bent upward after a portion of the machine room lower plate 211 is cut, and a pair of sensor fixing portions may be disposed on both left and right sides to support both sides of the proximity detection device 28.

The sensor fixing portion 211a may be formed at the rear of the front cover 22 forming the front surface of the machine room 200. In addition, since the sensor fixing portion 211a is located in front of the condenser 254, the user's location can be recognized without being disturbed by other components.

In addition, the front end of the sensor fixing portion 211a may be located on the same line as the front end of the bottom surface 201 of the machine room 200 in a vertical direction. That is, the sensor fixing portion 211a may be located at the front end of the machine room 200. Therefore, the proximity detection device 28 is located at the forefront of the machine room 200, so that the user's location recognition may not be disturbed by other components in the machine room 200.

Accordingly, the proximity detection device 28 may be covered by the front cover 22. At this time, the proximity detection device 28 may be disposed adjacent to the front cover 22, and thus may emit a light beam to detect user proximity through the grill portion 221 of the front cover 22.

The sensor fixing portion 211a is formed on both sides of the proximity detection device 28 and serves to fix the proximity detection device 28. Accordingly, the height of the sensor fixing portion 211a may correspond to or be greater than the height of the proximity detection device 28. In addition, the width of the sensor fixing portion 211a may correspond to or be larger than the width of the proximity detection device 28 so that both side surfaces of the proximity detection device 28 may come into contact with each other. It is possible to prevent the proximity detection device 28 from being separated from the machine room 200 by the sensor fixing portion 211a.

In addition, a sensor case 281 capable of accommodating the proximity detection device 28 may be further provided above the sensor fixing portion 211a. The sensor case 281 may be formed with an open front surface and spaced apart from the sensor fixing portion 211a at a set distance.

The sensor case 281 includes both side surfaces 281a and 281b formed horizontally spaced apart from each other in parallel with the sensor fixing portion 211a, an top surface 281c connecting the two side surfaces, and a rear surface 281d extending from the rear end of the top surface 281c to the bottom surface 201 of the machine room 200.

The sensor case 281 can be prevented from being damaged by an external shock or the like. In addition, since the front surface of the sensor case 281 is opened, there is an advantage in that the proximity detection device 28 can be repaired or replaced while only the front cover 22 is opened or closed during assembly work or repair work.

Meanwhile, when the user approaches the vicinity of the apparatus for cultivating plants 1 to open the door 13 during the operation of the apparatus for cultivating plants 1, the proximity detection device 28 detects this, and thus the water supply to the cultivation shelf 30 or the drainage of the water of the cultivation shelf 30 is stopped.

That is, when the user opens the door 13 and withdraws the cultivation shelf 30 or the water tank 70 is withdrawn, water supplied or drained to the cultivation shelf 30 may leak, and the proximity detection device 28 completely prevents this problem.

In addition, when a user of the proximity detection device 28 is detected, the brightness of the lighting device 40 may be slightly lowered. This is to prevent glare when the user opens the door 13 or when the user approaches.

The proximity detection device 28 may be operated in conjunction with the door opening detection device 118i that detects the opening of the door 13. That is, when a user is detected through the proximity detection device 28, water supply and drainage are immediately stopped, and when the opening of the door 13 is not detected even after a certain period of time has elapsed after the stop, the water supply and drainage can be resumed. Of course, if it is detected that the door 13 is opened within a certain period of time, a state where water supply and drainage are stopped is maintained, until the door 13 is closed again, and after the door 13 is closed, the water supply and drainage can be resumed.

Meanwhile, referring to FIG. 23, looking at the back of the machine room 200, the machine room top cover 26 is combined with the machine room module 20 to shield the open top surface of the machine room 200 and can form the top surface of the machine room 200. The machine room top cover 26 forms the lower surface of the cabinet 100, and therefore, the machine room 200 can be completed by coupling the cabinet 100 to the top of the machine room module 20.

In a state where the machine room top cover 26 is mounted on the machine room module 20, the rear surface of the machine room 200 may be opened. In addition, the rear surface of the machine room 200 may be shielded by the machine room rear plate 213. The machine room back plate opening 213a may be further formed at a position corresponding to the compressor 253 in the machine room rear plate 213, and a portion of the air inside the machine room 200 may be discharged.

The machine room back plate 213 may be coupled to the rear end of the machine room lower plate 211 and the back plate 111. At this time, while the rear portion of the machine room top cover 26 forming the top surface of the machine room module 20 protrudes upward from other portions, the rear portion inside the machine room 200 is formed higher than other portions. That is, the rear portion is formed higher than other portions in consideration of the protruding heights of the heat dissipating fan 252 and the compressor 253 installed in the machine room 200. In particular, since the compressor 253 has the highest height among components inside the machine room 200, one side of the corresponding machine room top cover 26 may be formed to correspond to the height of the compressor 253.

In detail, the machine room top cover 26 is formed in a plate shape of a metal material, the lower part 261 and the upper part 262 are bent, and the compressor cover 263 can be mounted.

The lower part 261 may be formed on the front half portion of the machine room top cover 26. In addition, the lower part 261 forms the lowest portion of the machine room top cover 26 and may be formed at a set height. The height of the lower part 261 may correspond to the height of the condenser 254 and the separation partition 230 and may correspond to the height of the side frame 23. That is, the lower surface of the lower part 261 may be in contact with the top surface of the condenser 254, the upper end of the separation partition wall, and the upper end of the side frame 23 to form the front half portion of the top surface of the machine room 200. As illustrated in FIG. 9, the lower part 261 includes the front half portion of the top surface of the machine room 200 and may further include a portion of the rear half portion of the top surface of the machine room 200. That is, the lower part 261 may extend from the front end of the machine room 200 to the front end of the heat dissipation fan 252.

The upper part 262 may be formed to have a height corresponding to the upper end of the heat dissipation fan 252, protrude upward compared to the lower part 261, and may be formed to have a stepped shape.

Meanwhile, the compressor 253 protrudes upward from the inside of the machine room 200 and may have a set height. At this time, the height of the compressor 253 may be formed higher than the height of the upper part 262, and thus may protrude upward more than the surface of the upper part 262.

At this time, an opening may be formed on one side of the machine room top cover 26 where the compressor 253 is disposed, and a compressor cover 263 for shielding the protruding top surface of the compressor 253 may be mounted in the opening.

The compressor cover 263 may be formed to effectively accommodate the upper end of the compressor 253 having a three-dimensional shape. That is, the compressor cover 263 may be recessed to form a compressor accommodation space 281 for accommodating the upper end of the compressor 253 therein, and the inner top surface of the compressor 253 accommodation space may have a set height. The compressor cover 263 may be injection-molded with a plastic material to form a three-dimensional shape.

The compressor cover 263 may be provided at a position corresponding to the top surface of the compressor 253 in the upper part 262. In addition, the compressor cover 263 may further protrude upward from the upper part 262.

Meanwhile, a dryer 256 may be disposed inside the space formed by the compressor cover 263. The dryer 256 may be located on the open rear side of the machine room 200 and may be disposed in a space between the compressor 253 and the compressor cover 263 formed after the compressor 253 is disposed. The dryer 256 may be exposed to the rear when the machine room rear plate 213 is opened, and it may be easily connected to a refrigerant pipe adjacent to the opened rear surface of the machine room 200.

In addition, the dryer 256 is disposed in a space formed by the compressor 253, the compressor cover 263, and the machine room back plate 213, so that even when the compressor 253 is driven, the dryer can be disposed so as not to be in contact with other components or so as not to generate shaking or vibration noise due to the contact.

Meanwhile, as illustrated in FIG. 24, a power cable 29 for supplying power to the apparatus for cultivating plants may be fixedly mounted at the rear end of the lower plate 211 of the machine room.

To this end, the rear end of the lower plate 211 of the machine room may be formed by bending upward, and a mounting portion 211b to which the electric wire fixing portion 292 constituting the power cable 29 is fixedly mounted may be formed. The mounting portion 211b may be slightly spaced apart from the machine room back plate 213 at a position facing the machine room back plate 213.

In more detail regarding the arrangement of the power cable 29, the control box 27 should not be exposed to the outside when the apparatus for cultivating plants 1 is installed in a free standing type, and it would be preferable to be provided inside the cabinet to facilitate installation without protruding to the outside when installed in a built-in type.

In addition, in order to facilitate access for maintenance without affecting the space of the cultivation room, it would be preferable to arrange the power cable on one side of the machine room 200. For example, the control box 27 may be provided on the top plate of the machine room.

Therefore, the power cable 29 is connected to the control box 27 and can be withdrawn out through the machine room 200. In addition, the power cable 29 may be partially covered by the back plate 213 of the machine room, and may be withdrawn out through a space between the open rear surface of the machine room 200 and the back plate 213 of the machine room.

In addition, the power cable 29 can be fixed between the open back surface of the machine room 200 and the machine room 200 and is fixed at the lower end of the machine room back plate 213 to minimize movement at the bottom of the machine room back plate 213 even when the power cable 29 is manipulated.

In detail, the power cable 29 may include an electric wire portion 291 which extend along the electric wire 293 and in which the electric wire 293 is buried, and an electric wire fixing portion 292 which protrudes from the electric wire portion 291 and which is configured to fix and mount the power cable 29.

The electric wire fixing portion 292 may be inserted into and fixed to the fixing hole 213b penetrating the back plate 213 of the machine room. Therefore, the power cable 29 can be fixed to the back plate 213 of the machine room, and the electric wire portion 291 passes through the lower end of the back plate 213 of the machine room and is withdrawn out to the outside of the apparatus for cultivating plants, and thus damage of the power cable caused by the back plate 213 of the machine room is minimized and the movement of the power cable 29 is restricted.

In addition, the electric wire fixing portion 292 may be integrally formed with the electric wire portion 291. In detail, in the power cable 29, the electric wire portion 291 and the electric wire fixing portion 292 may be integrally formed in a mold through an insert injection molding method. In this case, the assembling process of the power cable 29 according to an embodiment of the present disclosure can be significantly simplified, which is advantageous in terms of time and economy.

The electric wire fixing portion 292 may include a protrusion 292a protruding to be inserted into the fixing hole 213b and side extension portions 292b extending outward from both ends of the protrusion 292a.

The protrusion 292a may have a convex shape by being connected to the side extension portions 292b disposed on both left and right sides. The protrusion 292a may pass through the fixing hole 213b of the back plate 213 of the machine room and protrude outward from the back plate 213 of the machine room.

That is, the protrusion 292a penetrates the fixing hole 213b and protrudes more than the outer surface of the machine room rear plate 213, and is firmly fixed to the machine room cover to limit the movement of the power cable 29.

The length L2 between both side ends of the protrusion 292a may be equal to or smaller than the length L1 of the width of the fixing hole 213b, so that the entire shape of the protrusion 292a or a portion of the protrusion 292a may protrude outward from the back plate 213 of the machine room.

The vertical length of the protrusion 292a may be shorter than the vertical length of the fixing hole 213b. That is, the upper end or lower end of the protrusion 292a is formed to correspond to a position adjacent to or in contact with the bent part 213c formed at the upper end or lower end of the fixing hole 213b, so that the protrusion 292a can be prevented from being separated from the fixing hole 213b.

The distance between both side ends of the side extension portion 292b is longer than the distance between both side ends of the fixing hole 213b, so that the power cable 29 can be prevented from being separated from the fixing hole 213b. In addition, a screw 292c is fastened to each of the pair of side extension portions 292b so that the electric wire fixing portion can be fixedly mounted to the mounting portion.

The bent portion 213c may be formed by bending the back plate 213 of the machine room, and protrudes backward from the upper end and lower end of the fixing hole 213b so that the protrusion 292a of a electric wire fixing portion 292 of the power cable 29 may protrude in the same direction as the protruding direction. By forming the bent portion 213c, the protrusion 292a of the electric wire fixing portion 292 may be seated in the fixing hole 213b.

Therefore, the power cable 29 can be fixed to the fixing hole 213b, and the movement of the power cable 29 is prevented by restricting flow by the bent portion 213c to prevent movement of the power cable 29 and to prevent the power cable 29 from being damaged.

In addition, the fixing hole 213b may be disposed at a position where the power cable 29 passes along the machine room back plate 213, and, specifically, the fixing hole 213b can effectively limit the movement of the power cable 29 by disposing the fixing hole 213b to the lower portion of the machine room back plate 213.

In addition, the power cable 29 is fixed to the fixing hole 213*b* by the electric wire fixing portion 292, and is withdrawn out of the apparatus for cultivating plants 1 at the lower end of the machine room back plate 213. Accordingly, even if force is applied to the power cable from the outside, the movement of the power cable 29 is restricted so that the power cable 29 cannot be removed.

In addition, the power cable 29 equipped with the electric wire fixing portion 292 according to an embodiment of the present disclosure may be manufactured by manufacturing the electric wire fixing portion 292 separately, and then being coupled with the electric wire portion 291 using a fixing means such as an adhesive or the like. Hereinafter, components provided inside the cabinet 10 will be described in more detail with reference to drawings.

Figure 25:
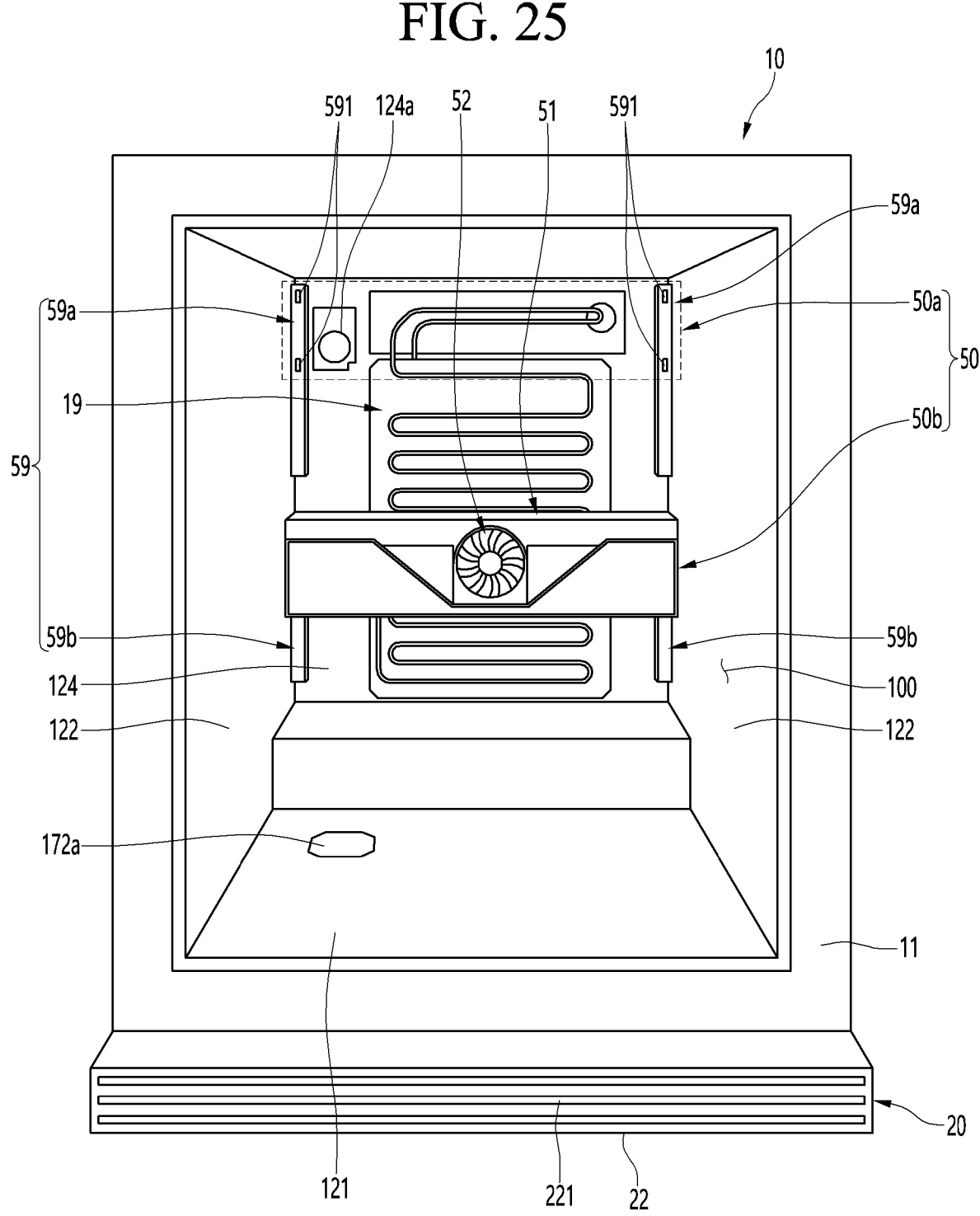
FIG. 25 is a front view illustrating the arrangement of a blower according to an embodiment of the present disclosure.

FIG. 25 is a front view illustrating the arrangement of a blower according to an embodiment of the present disclosure.

As illustrated in the drawing, the evaporator 19 may be vertically disposed long on the inner rear wall of the cabinet 10. The evaporator 19 is a plate-shaped roll bond type evaporator that substantially minimizes a portion protruding to the inside of the cultivation space 100 to prevent loss of the cultivation space 100, and the entire area of the cultivation space 100 can be evenly cooled.

In addition, the evaporator 19 may be disposed at the center in the horizontal direction, and may extend long from the upper end to the lower end of the rear plate 124. At this time, both left and right ends of the evaporator 19 may be slightly spaced apart from both left and right ends of the rear plate 124.

In addition, a connector 124*a* may protrude from one side of the evaporator 19, that is, from the left end of the rear plate 124. The connector 124*a* is a portion connected to the electric wire of the blower 50 and may be formed at a position corresponding to a position where the blower 50 is mounted. In detail, the connector 124*a* may be formed at a position corresponding to the connector hole 514 to be described below.

Side rails 59 may be provided on both left and right sides of the rear wall of the cultivation space 100. The side rail 59 is for fixing the blower 50 and is configured to be extended in multiple stages so that the cultivation shelf 30 is sufficiently withdrawn out of the cultivation space 100 so that the user can easily detach the seed package 90, and the plants under cultivation can be easily managed and harvested.

The side rails 59 may be provided at both left and right ends of the rear plate 124. In addition, the side rails 59 may be disposed at corner areas of the rear plate 124 and the pair of side plates 122.

The side rail 59 may include an upper side rail 59*a* on which the upper blower 50*a* is mounted and a lower side rail 59*b* on which the lower blower 50*b* is mounted. The upper side rails 59*a* may be formed at positions corresponding to both ends of the upper blower 50*a* and may extend downward from an upper end of the rear plate 124. In addition, the lower side rails 59*b* may be formed at positions corresponding to both ends of the lower blower 50*b* and may extend upward from the lower end of the rear plate 124. That is, it can be seen that the upper side rails 59*a* and the lower side rails 59*b* are disposed above and below the cultivation space 100.

In addition, the lower end of the upper side rail 59*a* and the lower end of the lower side rail 59*b* may be slightly spaced apart, and a space is formed so as not to interfere with the rear end of the upper cultivation shelf 30*a*.

The upper blower 50*a* may be disposed at the upper end of the rear surface of the cultivation space 100 while being mounted on the upper side rail 59*a*. In addition, the lower blower 50*b* may be disposed at a middle height of the rear surface of the cultivation space 100 while being mounted on the lower side rail 59*b*. That is, the upper blower 50*a* and the lower blower 50*b* may be positioned at the upper and lower portions of the cultivation space 100 vertically partitioned by the cultivation shelf 30.

In addition, both ends of the blower 50 may be coupled to the side rails 59 disposed on both sides. That is, the horizontal length of the blower 50 may correspond to the horizontal length of the cultivation space 100.

Meanwhile, the upper side rail 59*a* and the lower side rail 59*b* may have the same size and shape, and may differ only in their upper and lower positions. The side rails 59 may be formed in a rod shape elongated in the vertical direction, and both ends of the blower 50 may be fixedly mounted. To this end, a rail opening 591 may be formed on the front surface of the side rail 59. The rail openings may be spaced apart in a vertical direction, and may be opened so that the plate coupling portion 533 protruding from the rear end of both side surfaces of the blowing fan cover 53 is inserted.

Hereinafter, the structure of the blower 50 will be described in more detail. In addition, in the blower 50, since the structure of the upper blower 50*a* and the lower blower 50*b* are completely identical to each other, only one blower 50 will be described.

Figure 26:
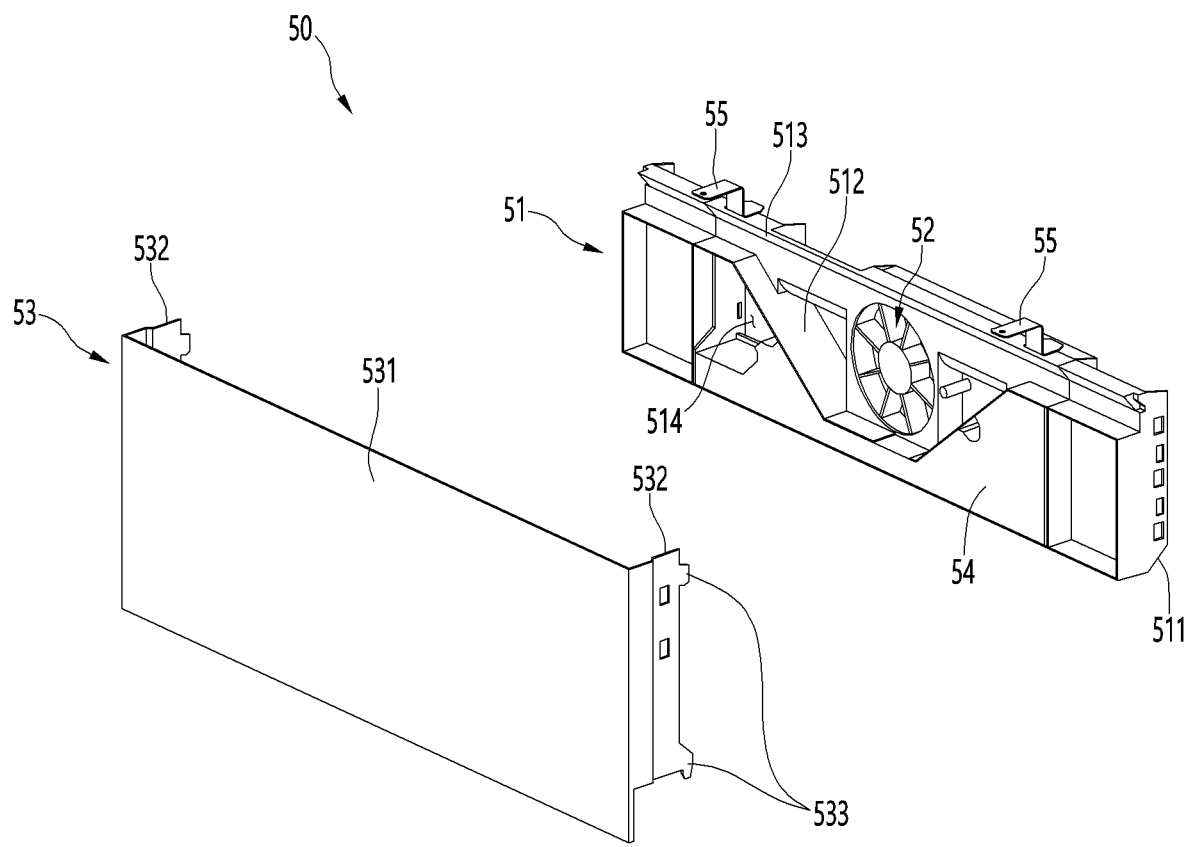
FIG. 26 is an exploded perspective view of the blower as viewed from the front.
Figure 27:
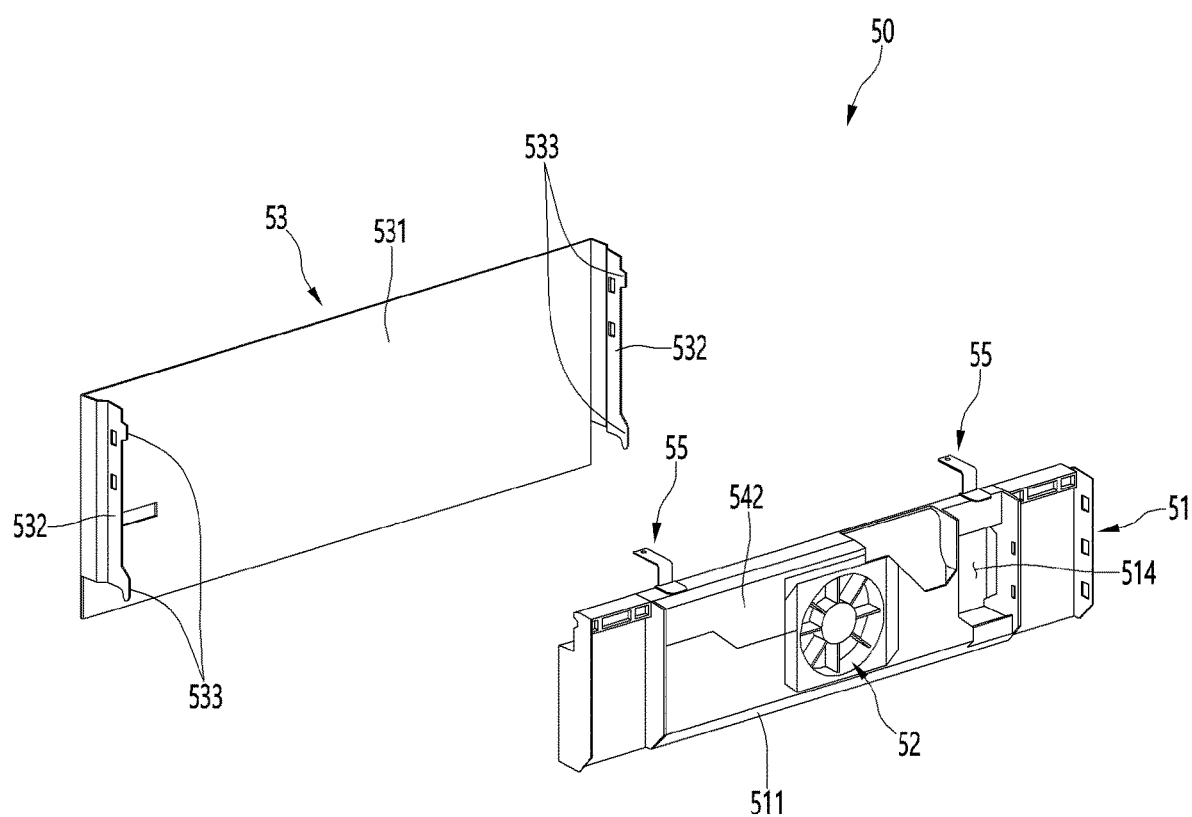
FIG. 27 is an exploded perspective view of the blower as viewed from the rear.
Figure 28:
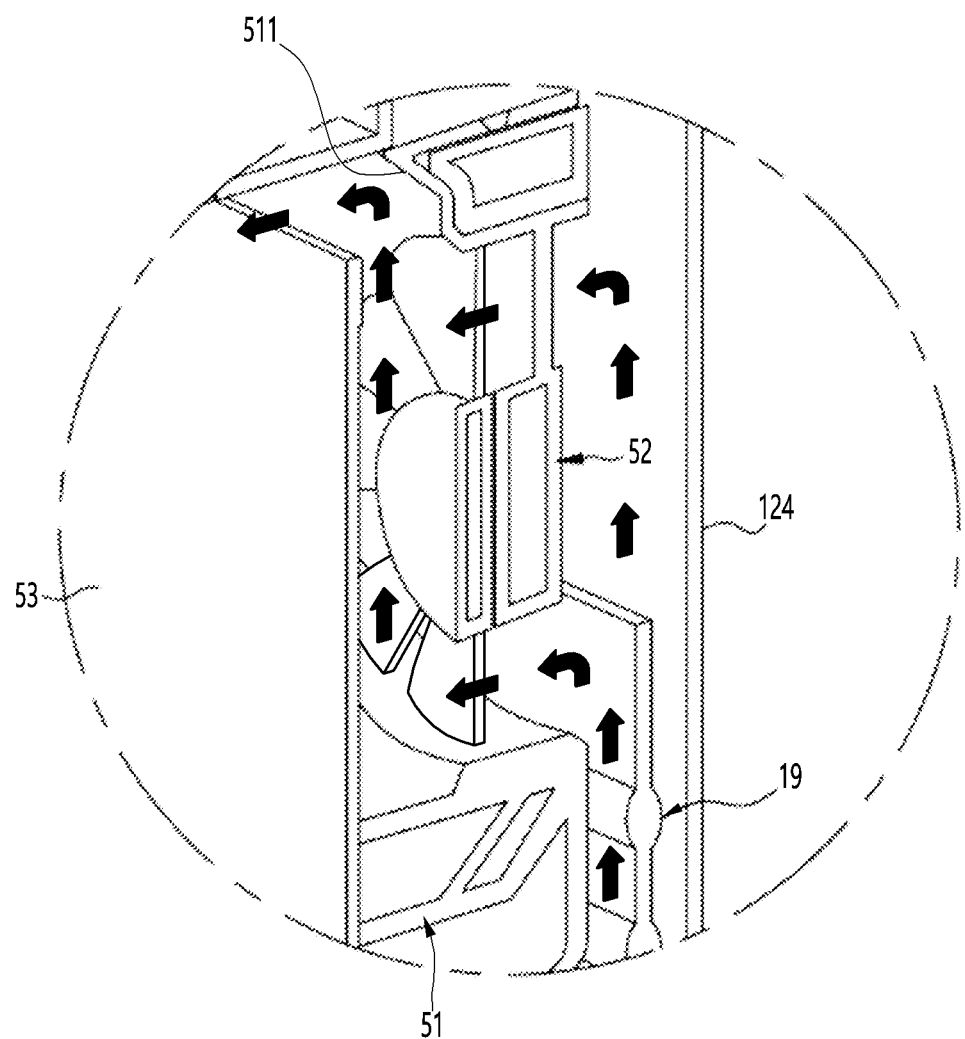
FIG. 28 is a cut-away perspective view illustrating an air flow path passing through the blower.

FIG. 26 is an exploded perspective view of the blower as viewed from the front, FIG. 27 is an exploded perspective view of the blower as viewed from the rear, and FIG. 28 is a cut-away perspective view illustrating an air flow path passing through the blower.

As illustrated in the drawing, the evaporator 19 is provided on the rear wall of the cultivation space 100, and a blower 50 may be provided in front of the evaporator 19.

The blower 50 is configured to circulate air above the cultivation space 100 partitioned by the cultivation shelf 30. Therefore, the number of blower devices 50 corresponding to the number of the cultivation shelves 30 is provided and is provided at the lower end of the lighting device 40 and at the upper side adjacent to the cultivation shelf 30.

As illustrated in the drawing, the blowing device 50 may be configured to include a blowing fan cover 53 which shields a blowing fan 52, a fan guide 51 to which the blowing fan 52 is mounted, and the fan guide 51, and the evaporator 19.

In detail, the blowing fan 52 is formed in a box fan shape and may be provided at the center of the fan guide 51. In addition, the blowing fan 52 may discharge the air introduced from the rear of the blowing device 50 forward.

The fan guide 51 provides a space in which the blowing fan 52 is mounted and is configured to guide the discharge of air discharged by the blowing fan 52. The fan guide 51 is injection-molded of a plastic material, and the blowing fan 52 may be mounted at the center of the rear surface of the fan guide 51.

Meanwhile, an air guide portion 512 is formed on the front surface of the fan guide 51 to guide the air discharged from the blowing fan 52 upward. The air guide portions 512 are provided on both left and right sides of the blowing fan 52, respectively, and may be configured to widen upward. Accordingly, the air discharged by the blowing fan 52 flows along the inclined surface and may come closer to the outlet formed at the upper end of the fan guide 51 toward the outside.

A discharge guide portion 513 may be formed at an upper front surface of the fan guide 51. The discharge guide portion 513 forms a surface protruding forward from the bottom to the top. That is, the discharge guide portion 513 forms an inclined surface or a round surface, and guides the air flowing from the bottom to the top toward the front. At this time, since the end of the discharge guide portion 513 is adjacent to the lower surface of the lighting device 40, the air discharged from the blower device 50 flows from the rear end of the lower surface of the lighting device 40 to the front by the discharge guide portion 513. When the lighting device 40 generates heat, the lighting device 40 can be cooled by such an air flow.

A connector hole 514 may be formed on one side of the fan guide 51. The connector hole 514 is formed to open at a position corresponding to the connector 124a mounted on the rear wall of the inner cultivation space. Therefore, when the blower 50 is mounted, the connector 124a is inserted into the connector hole 514 so as not to interfere with each other. In addition, an electric wire connected to the blowing fan 52 may be connected to the connector exposed through the connector hole 514.

Blower brackets 55 for fixing and mounting the blower 50 may be provided on both left and right sides of the top surface of the fan guide 51. One end of the Blower bracket 55 may be coupled to the top surface of the fan guide 51, and the other end may be mounted on the lower surface of the lighting device 40. Therefore, the lighting device 40 and the blowing device 50 may be coupled to each other in a form of perpendicularly crossing each other. In addition, the blower 50 may discharge air toward the front from the rear end of the lighting device 40.

In addition, an inlet guide 511 may be formed on a lower surface of the fan guide 51. The inlet guide 511 is formed to be inclined upward toward the rear, and can guide air suctioned from the lower side of the fan guide 51 to smoothly flow to the rear of the fan guide 51.

In addition, recessed spaces are formed on the front and rear surfaces of the fan guide 51, and a front insulator 541 and a rear insulator 542 may be disposed inside the recessed space, respectively. The front insulator 541 and the rear insulator 542 may be formed of, for example, a foamed styrofoam material, and the cool air flowing through the fan guide 51 is transferred to the surface of the blowing fan cover 53 and condensation may be prevented from occurring on the surface of the blowing fan cover 53.

Meanwhile, the blowing fan cover 53 may shield both the fan guide 51 and components mounted on the fan guide 51 in front of the fan guide 51. In addition, the blower fan cover 53 extends to a position adjacent to the upper end of the cultivation shelf 30, and the evaporator 19 and the rear plate 124 or the evaporator 19 in the mounted state of the blower 50 can be prevented from being exposed.

In addition, there may be some distance between the blowing fan cover 53 and the cultivation shelf 30, and air flowing backward along the cultivation shelf 30 may be suctioned in and directed toward the blowing fan 52.

At this time, in order to prevent the evaporator 19 from being exposed through the distance between the blowing fan cover 53 and the cultivation shelf 30, a shielding plate 560 is further provided in a corresponding area of the evaporator 19.

The blower fan cover 53 may form the outer appearance of the rear wall of the cultivation space 100.

The blowing fan cover 53 may be formed of the same metal material as the inner case 12 or may be formed by bending a plate-shaped material. The blowing fan cover 53 may include a front portion 531 and a side portion 532.

The front portion 531 is exposed through the cultivation space 100 and may be formed to correspond to the horizontal length of the cultivation space 100. In addition, the upper end of the front portion 531 may be located adjacent to the upper end of the fan guide 51 and the upper end of the lighting device 40, and substantially air discharged by the blowing fan 52 serves as an outlet discharged to the cultivation space 100. The lower end of the front portion 531 may extend downward more than the lower end of the fan guide 51, may be located adjacent to the top surface of the cultivation shelf 30, and serves as a inlet through which the air sucked toward the blowing fan 52 is substantially introduced.

That is, the blowing fan cover 53 may shield rear components and form a rear outer appearance of the cultivation space 100. In addition, the blowing fan cover 53 has an inlet for air flowing along the cultivation shelf 30 formed at the lower end and an outlet port for air discharged along the lighting device 40 formed at the upper end, so that the air circulation in the cultivation space 100 may be achieved. In particular, the air flow can be made along the cultivation shelf 30 and the lighting device 40 by the structure of the blower 50, In addition, the air cooled or heated by the evaporator 19 or the heater 18 while flowing along the rear of the fan guide 51 continuously circulates inside the cultivation space 100 so that the temperature control of the cultivation space 100 is possible. Through this continuous circulation of air, the interior of the cultivation space 100 maintains a uniform temperature as a whole, and the inside of the cultivation space 100, such as providing an airflow for the growth of plants inside the cultivation shelf 30, etc. can be made optimal.

The side portion 532 may be bent backward at both ends of the front portion 531 and may be combined with both side surfaces of the fan guide 51. The side portion 532 may have a coupling structure corresponding to the side surface of the fan guide 51 and may be coupled to each other by the elasticity of the side portion 532 itself without fastening a separate coupling member.

Meanwhile, a plate coupling portion 533 coupled with a side rail 59 mounted on a rear wall of the cultivation space 100 may protrude from the rear end of the side portion 532. The plate coupling portion 533 may have a size corresponding to the rail opening 591 of the side rail 59. The plate coupling portions 533 may be formed at upper and lower portions, and at least one of the plate coupling portions 533 may be formed in a hook shape to be caught and restrained in the rail opening 591 of the side rail 59.

Hereinafter, the structure of the lighting device 40 provided inside the cultivation space 100 will be described in more detail with reference to drawings.

Figure 29:
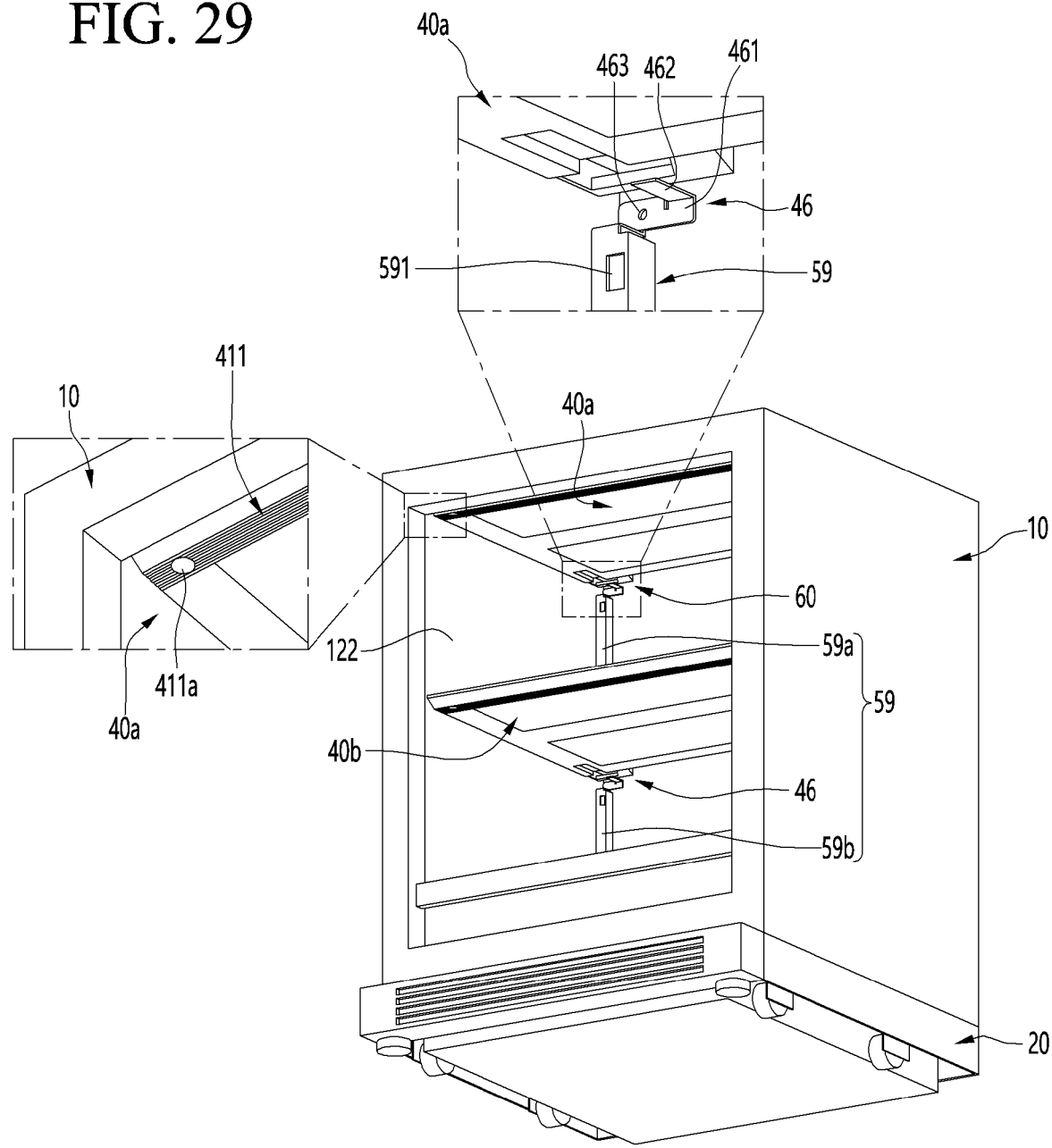
FIG. 29 is a perspective view illustrating a mounting state of a lighting device according to an embodiment of the present disclosure.

FIG. 29 is a perspective view illustrating a mounting state of a lighting device according to an embodiment of the present disclosure.

As illustrated in the drawing, the lighting device 40 may be disposed inside the cultivation space 100. The lighting device 40 is for irradiating light on the top surface of the cultivation shelf 30, and when the cultivation space 100 is divided up and down by the cultivation shelf 30, a lighting devices 40 are provided in the partitioned space of the cultivation space 100 in the vertical direction respectively.

That is, the lighting device 40 may include an upper lighting device 40 for irradiating light to the upper cultivation shelf 30a and a lower lighting device 40 for irradiating light to the lower cultivation shelf 30b. The upper lighting device 40 may be disposed on the top surface of the cultivation space 100, and the lower lighting device 40 may be disposed on the lower surface of the upper cultivation shelf 30a. In addition, the lighting device 40 may be disposed to face the cultivation shelf 30.

The lighting device 40 may be seated on the lighting brackets 46 formed on the side plates 122 on both sides and mounted inside the cabinet 10. The lighting bracket 46 may protrude from both sides of the rear surface of the cultivation space 100. That is, the lighting bracket 46 may protrude from the rear plate 124 and support the rear end of the lighting device 40 from below. In addition, the lighting device 40 may be formed by bending an upper end of the side rail 59 or may be integrally formed with the side rail 59.

The lighting bracket 46 may be formed at a position corresponding to a position where the lighting device 40 is mounted. That is, the upper lighting bracket 46 may be provided at a position spaced downward from the top plate 123 by a space into which the upper lighting device 40 can be inserted. In addition, a lower lighting bracket 46 may be provided at a position spaced downward by a space in which the lower lighting device 40 can be inserted below the upper cultivation shelf 30a.

In addition, the lighting bracket 46 may include a bracket mounting portion 461 extending along the rear surface of the cultivation space 100 and a bracket support portion 462 protruding forward from an upper end of the bracket mounting portion 461.

The bracket mounting portion 461 may extend along the rear plate 124 and may include a through hole 463 through which a screw passes to fix the rear plate 124 and the lighting bracket 46.

In addition, the bracket support portion 462 may be formed to extend forward from one side of the upper end of the bracket mounting portion 461. The bracket support portion 462 may be formed to be spaced downward from the top plate 123 or the upper cultivation shelf 30a. In addition, the rear end of the lighting device 40 may be inserted into a space spaced downward from the top plate 123 or the upper cultivation shelf 30a. That is, the rear end of the lighting device 40 is seated in the bracket support portion 462 so that the rear end of the lighting device 40 can be fixed inside the cultivation space 100.

In addition, screw holes 411a into which screws are fastened upward may be formed on both left and right sides of the front end of the lighting device 40. The screw hole 411a penetrates the lighting device 40 so that it can be fastened to the top plate 123 or the upper cultivation shelf 30a.

With this structure, when the operator mounts the lighting device 40 to the cabinet 10, the operator inserts the lighting device 40 into the upper side of the bracket support portion 462 to support the rear end of the lighting device 40. and by fastening a screw to the screw hole at the front end of the lighting device 40, the lighting device can be easily fixed.

Therefore, since only the front end of the lighting device 40 is fastened using a screw or the like, there is an advantage in that mounting and dismounting of the lighting device 40 is much easier. In particular, the rear end of the lighting device 40 located deep inside the cultivation space 100 can be fixed only with a support structure without a separate fastening structure, thereby workability for assembling and disassembling the lighting device 40 can be remarkably improved.

Hereinafter, a detailed structure of the lighting device 40 will be described in more detail with reference to drawings.

Meanwhile, since the structure and shape of the upper lighting devices 40 and the lower lighting devices 40 are the same, only one lighting device 40 will be described.

Figure 30:
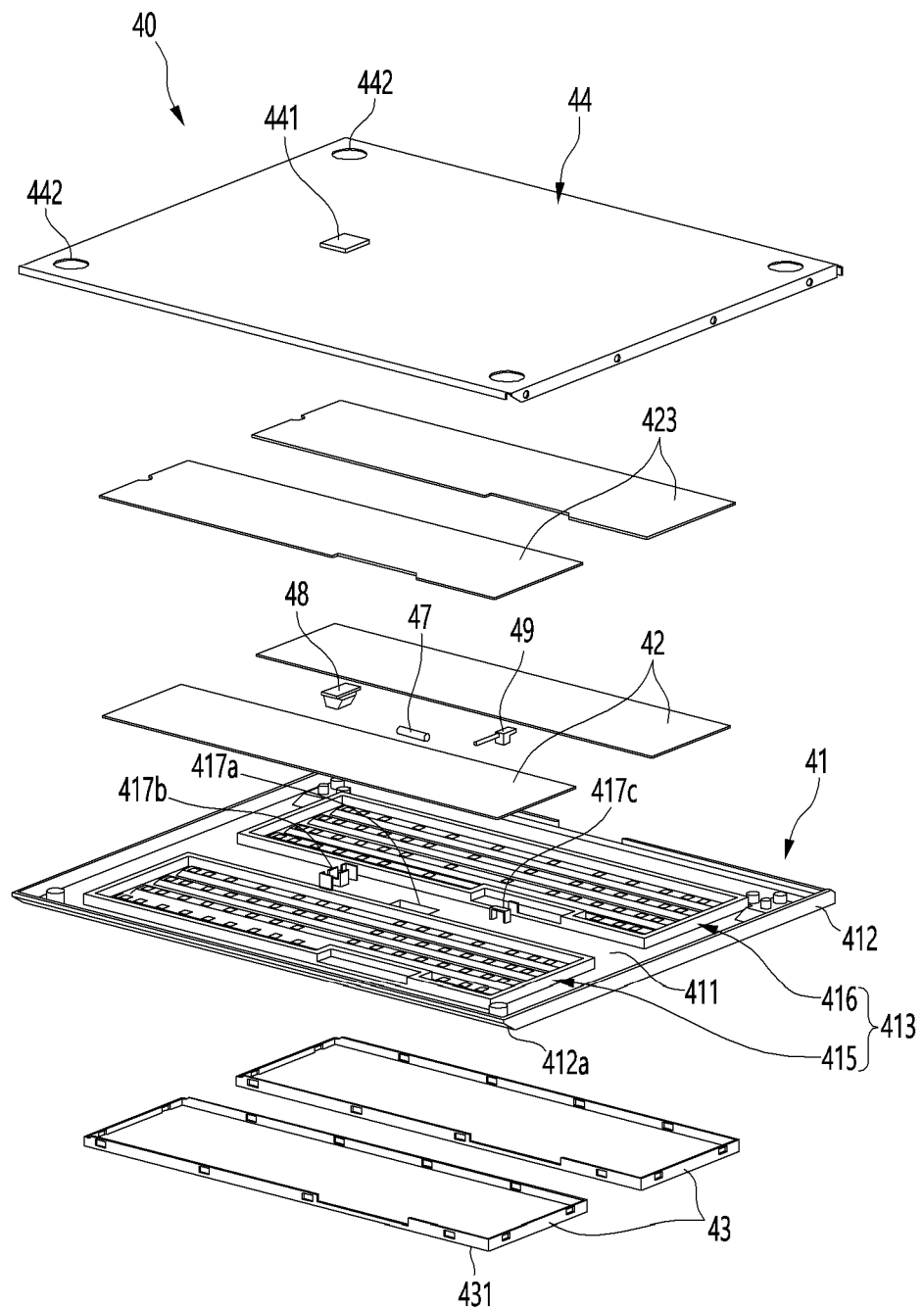
FIG. 30 is an exploded perspective view of the lighting device.
Figure 31:
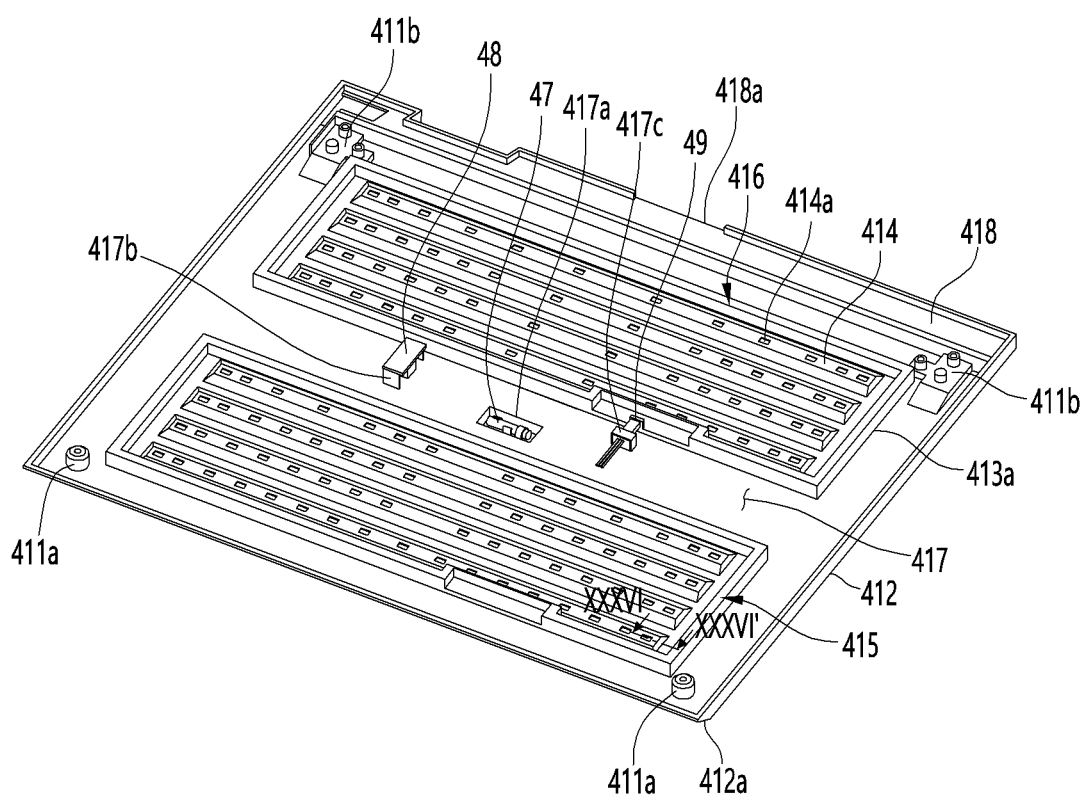
FIG. 31 is a perspective view of a light case, which is one component of the lighting device.
Figure 32:
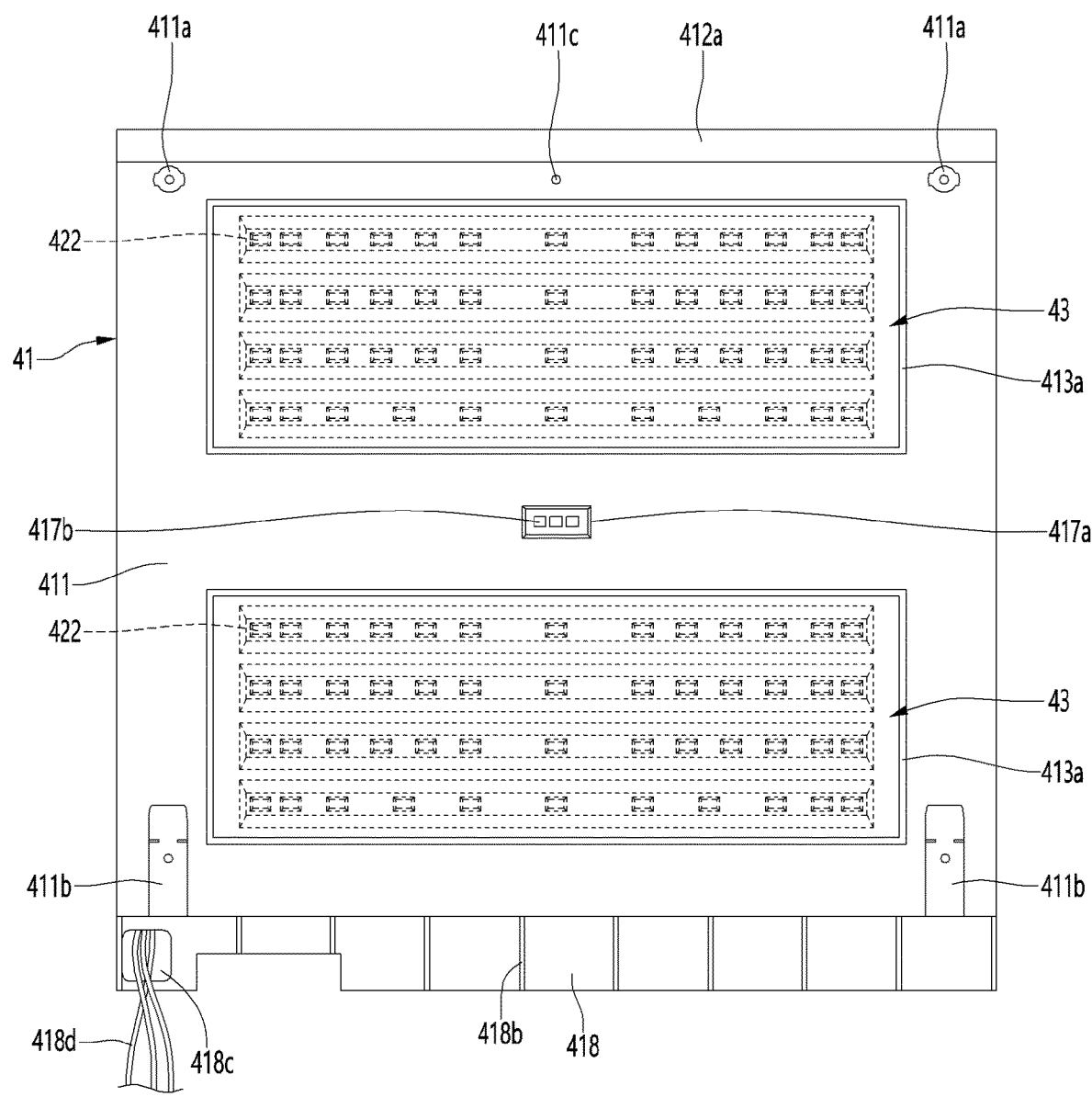
FIG. 32 is a bottom view of the light case.

FIG. 30 is an exploded perspective view of the lighting device, FIG. 31 is a perspective view of a light case, which is one component of the lighting device, and FIG. 32 is a bottom view of the light case.

As illustrated in the figure, the lighting device 40 may include a light case 41 in which an LED module 42 is mounted, a light cover 43 shielding the LED module 42 and transmitting light, and the light case. and a case cover 44 for shielding the top surface of the light case 41.

The light case 41 may include a bottom surface 411 which forms a surface exposed downward and formed in a rectangular plate shape, and a case edge 412 which is bent upward along the circumference of the bottom surface 411 and forms a space in which LED module 42 is accommodated.

In addition, the front surface 412a of the case edge 412 may be formed to be inclined to minimize exposure of the lighting device 40 when the user opens the door 130.

Screw holes 411a may be formed at both sides of the front end of the bottom surface 411 to couple the light case 41 and the case cover 44 and to fix the lighting device 40 thereto. In addition, a screw penetrating the lighting device 40 may be fastened to the screw hole 411a.

In addition, a display mounting hole 411c to which the display device 14 is fixedly mounted may be formed at the center of the front end of the bottom surface 411, and a screw 411d penetrating the display fixing portion 145 of the display device 14 may be fastened to the display mounting hole 411c.

In addition, a blower mounting portion 411b to which the blower 50 can be mounted may be formed at both sides of the rear end of the light case 41. The blower mounting portion 411b may be formed by recessing the lower surface of the light case 41 so that blower brackets provided on both sides of the upper end of the blower 50 may be inserted.

Meanwhile, a drainage surface 418 inclined downward may be formed at the rear end of the bottom surface 411 of the light case 41. The drainage surface 418 may guide the water to be discharged to the rear without flowing into the light case 41 when water falls to the rear end of the lighting device 40 due to condensation or water leakage.

To this end, the drainage surface 418 may extend to the rear end of the light case 41, and the drain pan 192 is positioned vertically below the extended rear end of the light case 41 to drain falling water.

The drainage surface 418 may be formed to be lower toward the rear, and a drainage cutout 418a in which a portion of the case edge 412 is cut may be formed at the center of the rear end of the drainage surface 418. In addition, a plurality of reinforcing ribs 418b are continuously disposed on the lower surface of the drainage surface 418 at regular distances to prevent the drainage surface 418 from being deformed or damaged.

On the other hand, an electric wire hole 418c through which the electric wire 418d connected to the LED module 42, the temperature sensor 47, the shelf detection device 48, and the water level detection device 49 is introduced in and withdrawn may be formed in the corners of the side and rear ends of the light case 41. Accordingly, the electric wires 418d connected to electric components inside the lighting device 40 may be guided to the outside through the rear end of the lighting device 40 without being exposed to the outside.

The light case 41 may include module mounting portions 413 in the front half portion and the rear half portion based on the center of the bottom surface 411. The module mounting portion 413 is a portion to which the LED module 42 is mounted, and may be configured such that a plurality of LED modules 42 are mounted. If the LED module 42 is composed of one, there is a problem in that the entire LED module 42 must be replaced when an error occurs in the LED module 42, and if the number of the LED module 42 is too large, there is a problem that the mounting and the assembly work is difficult and the arrangement of electric wires connected to the LED module 42 is not easy.

Accordingly, the light case 41 may include a front module mounting portion 415 provided in the front half portion of the bottom surface 411 and a rear module mounting portion 416 provided in the rear half portion of the bottom surface 411.

The front module mounting portion 415 and the rear module mounting portion 416 may be formed to accommodate the LED module 42 therein. That is, a mounting portion edge 413a protruding upward may be formed on the bottom surface 411 of the light case 41, and the front module mounting portion 415 and the rear module mounting portion 416 may be defined by the mounting portion edge 413a.

The mounting portion edge 413a may be formed in a shape corresponding to the circumference of the LED module 42, and protrudes upward from the bottom surface 411 to form a space in which the LED module 42 is accommodated.

In addition, the lower surface of the mounting portion edge 413a may be opened, and the lower surface of the light case 41 may be opened. That is, the mounting portion edge 413a may form a recessed shape on the lower surface of the light case 41, and the light cover 43 may be mounted in the recessed groove of the mounting portion edge 413a.

In addition, the light case 41 can secure a space between the front module mounting portion 415 and the rear module mounting portion 416, in which a temperature sensor mounting portion 417a on which a temperature sensor 47 is mounted, a water level detection device mounting portion 417c in which a water level detection device 49 are mounted, and a shelf detection device mount portion 417b on which the shelf detection device 48 is mounted may be disposed.

The temperature sensor mounting portion 417a, the water level detection device mounting portion 417c, and the shelf detection mounting portion 417b may be disposed on a separation portion 417 formed in the center of the bottom surface 411 of the light case 41 and may be located between the front module mounting portion 415 and the rear module mounting portion 416.

In addition, the temperature sensor mounting portion 417a may be formed at the center of the separation portion 417, and may be recessed at the center of the light case 41 so as to slightly protrude downward when viewed from below. In addition, the temperature sensor 47 may be mounted inside the temperature sensor mounting portion 417a and may be positioned at a position protruding toward the inside of the cultivation space 100. Therefore, the temperature of the cultivation space 100 can be more accurately measured. In addition, a plurality of openings 417b may be formed downward on the lower surface of the temperature sensor mounting portion 417a to minimize the effect of the air flow by the blower 50 from the rear to the front.

The shelf detecting mounting portion 417b may be formed at a position corresponding to the position of the shelf detection member 35, and the water level detection device mounting portion 417c may be formed at a position corresponding to the position of the water level detection member 34. The shelf detecting mounting portion 417b and the water level detection device mounting portion 417c protrude upward from the bottom surface 411 of the light case 41 so that the shelf detecting device 48 and the water level detecting device 49 may be adjacent to the case cover 44 to make the distance from the cultivation shelf 30 as close as possible, and through this, it is possible to ensure the detection of the cultivation shelf 30 and water level detection performance of the cultivation shelf 30.

The LED module 42 may be configured such that a plurality of LEDs 422 are mounted on a substrate 421. In addition, a plurality of the LEDs 422 may be continuously disposed on the substrate 421 at regular distances.

In addition, a cover sheet 423 may be provided above the LED module 42. The cover sheet 423 is to prevent moisture permeation or contamination damage to the substrate 421 and may be formed to a size capable of completely shielding the substrate 421 from above. The cover sheet 423 may be formed of an insulating material and may be formed of an adiabatic material to prevent heat from penetrating upward during operation of the LED 422.

In addition, a case cover 44 may be provided above the light case 41. The case cover 44 may be formed in a size corresponding to that of the light case 41 and is formed in a plate shape to shield the open top surface of the light case 41. Cover holes 442 corresponding to screw holes 411a formed at four corners of the light case 41 may be formed in the case cover 44. In addition, a screw fastened below the screw hole 411a passes through the cover hole 442 and can be fastened to a configuration for mounting the lighting device 40.

In addition, a detection portion 441 protruding upward may be formed on the case cover 44. The detection portion 441 protrudes upward from a position corresponding to the shelf detection device 48, and allows the shelf detection device 48 to be located inside. Therefore, it can be arranged more closely with the cultivation shelf 30 disposed above.

Meanwhile, a light cover 43 may be provided on a lower surface of the light case 41. The light cover 43 is mounted on the light case 41 to form a portion of the lower surface of the light case 41, shields the module mounting portion 413 from below, and is configured to protect the LED 422 disposed inside.

The light cover 43 may be formed of a transparent material to allow light transmission, and a coating or surface treatment for light diffusion may be added to the light cover 43.

A cover edge 431 bent upward may be formed around the circumference of the light cover 43, and the cover edge 431 is inserted into the recessed inside of the mounting portion edge 413a formed in the light case 41 and thus can be fixedly mounted therein.

Figure 33:
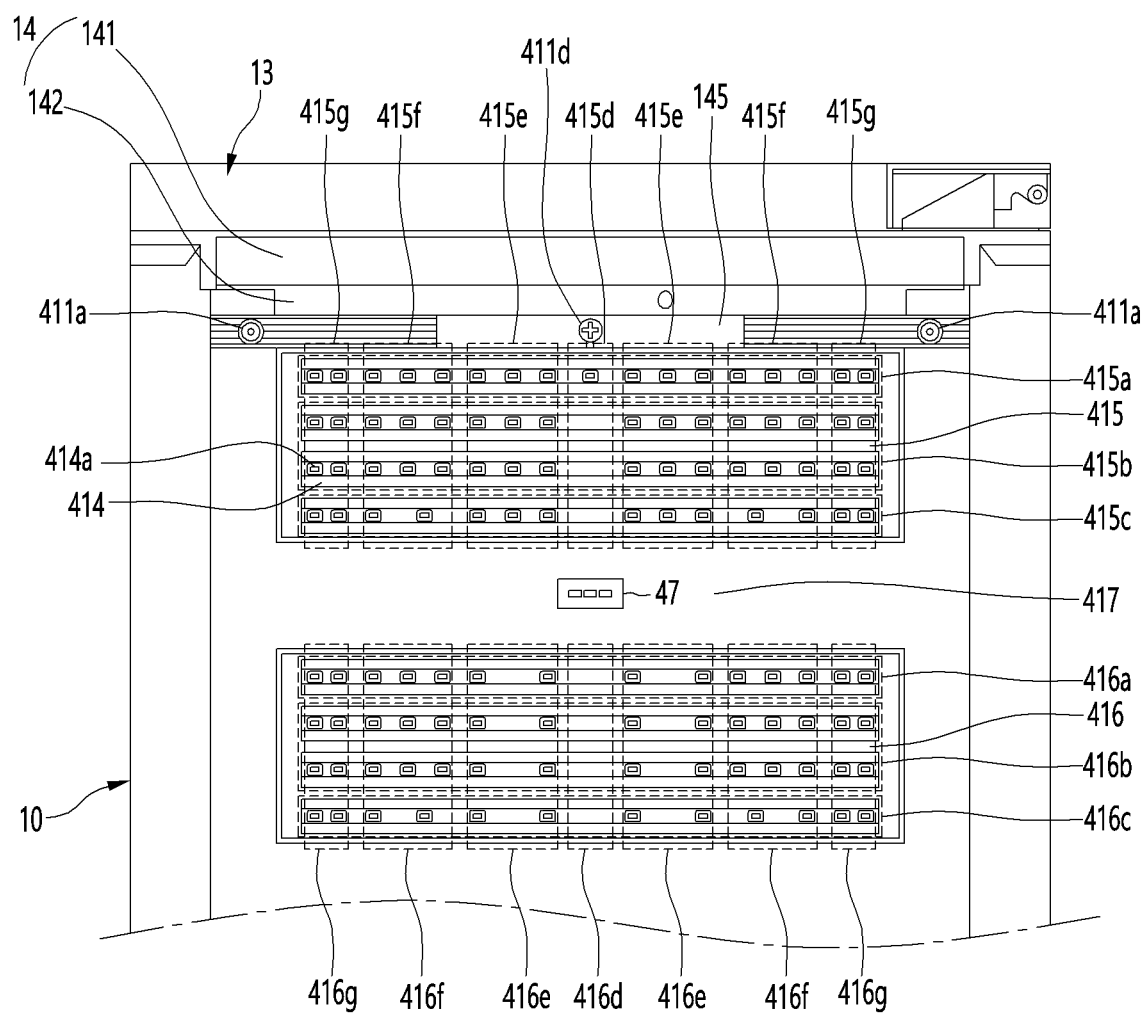
FIG. 33 is a view of a state where the lighting device is mounted as viewed from below.
Figure 34:
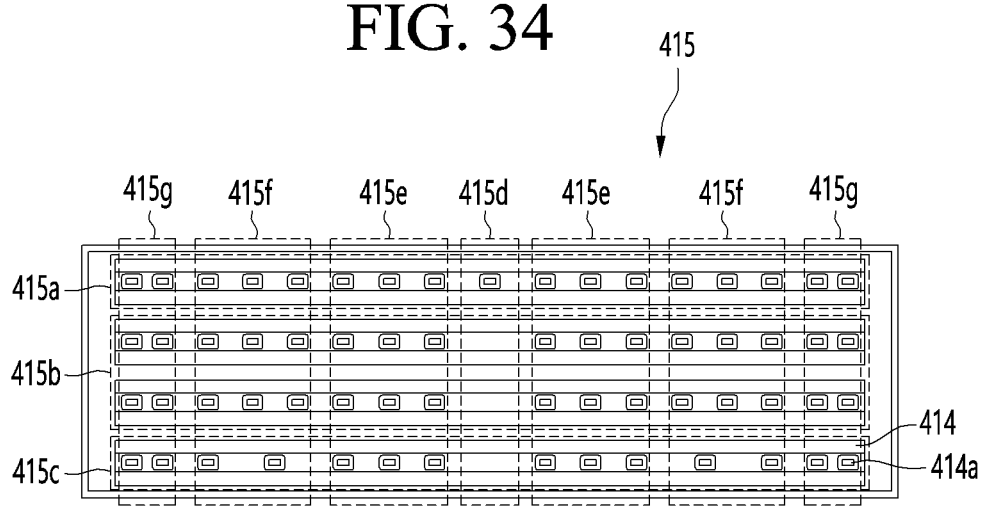
FIG. 34 is a view illustrating a front module mounting portion, which is one component of the light case.
Figure 35:
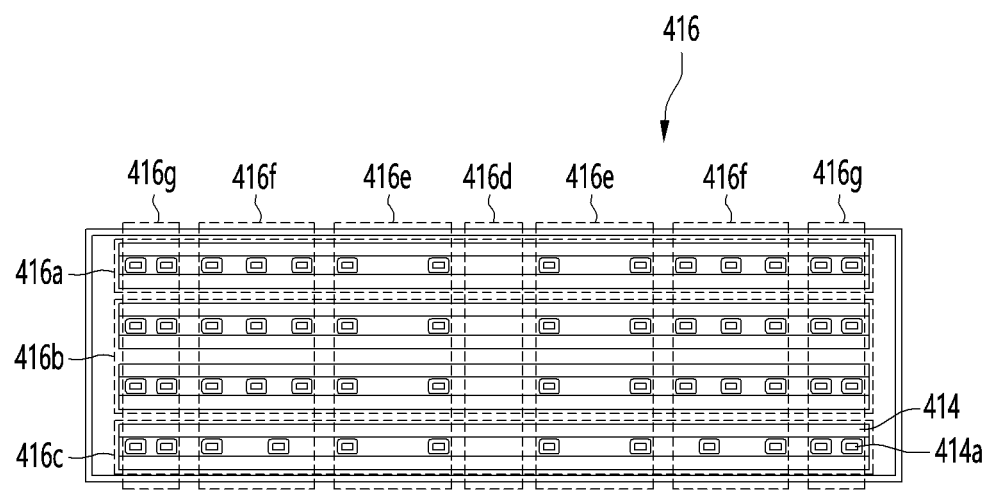
FIG. 35 is a view illustrating a rear module mounting portion, which is one component of the light case.

FIG. 33 is a view of a state where the lighting device is mounted as viewed from below, FIG. 34 is a view illustrating a front module mounting portion, which is one component of the light case, and FIG. 35 is a view illustrating a rear module mounting portion, which is one component of the light case.

As illustrated in the figure, the light case 41 may have a module mounting portion 413 to which the LED module 42 is mounted in the front half portion and the rear half portion based on the center of the bottom surface 411.

In detail, the light case 41 includes a separation portion 417 in which the LEDs 422 are not disposed based on the center of the bottom surface 411, and a front module mounting portion 415 provided in the front based on the separation portion 417, and a rear module mounting portion 416 provided in the rear based on the separation portion 417. That is, in the lighting device 40 of the present disclosure, the LED module 422 is not provided at the middle portion, and a front module mounting portion 415 and a rear module mounting portion 416 may be provided on the front and rear sides of the separation portion 417, respectively. With this structure, light is not irradiated from the middle portion of the lighting device 40 so that light is not concentrated in the middle portion of the cultivation shelf 30.

A light groove 414 may be formed inside the module mounting portion 413. The light groove 414 is formed along the arrangement of the LEDs 422 provided in the LED module 42, and extends from the left end to the right end of the inside of the module mounting portion 413, and may be disposed continuously in the front and rear direction.

The light groove 414 protrudes when viewed from above and may have a recessed shape when viewed from below. In addition, a plurality of LED holes 414a may be formed along the protruding center of the light groove 413. The LED holes 414a may be formed at positions corresponding to each of the LEDs 422. In addition, both sides of the light groove 414 are inclined or rounded around the LED hole 414a so that the light emitted from the LED 422 may be reflected through the light groove 414 and irradiated downward. In addition, the inner surface of the light groove 414 may be surface treated or coated so that light can be reflected more effectively.

In addition, the substrate 421 constituting the LED module 42 may be formed in a size corresponding to that of the module mounting portion 413, and thus may be fixed inside the mounting portion edge 413a.

In addition, a plurality of the LEDs 422 may be continuously disposed on the substrate 421 at regular distances. In this case, the LED 422 may be disposed at a position corresponding to the LED hole 414a. The LED 422 may be configured to have a light quantity (wavelength) similar to that of sunlight, and may be configured to emit light of a color capable of promoting photosynthesis of plants.

Meanwhile, according to an embodiment of the present disclosure, the LED holes 414a disposed in the module mounting portion 413 may be arranged in a certain shape as illustrated in FIGS. 33 to 35.

The LED holes 414a provided in the front module mounting portion 415 may be formed so that as the whole LED hole extends to both left and right sides with respect to the center of the front module mounting portion 415, a distance between adjacent LED holes 414a on both sides becomes narrower. In addition, the number of LED holes 414a provided in the front module mounting portion 415 may decrease from the front half portion to the rear half portion.

That is, the number of LED holes 414a in the front half portion area of the front module mounting portion 415 is greater than the number of LED holes 414a in the rear half portion area, and the distance between the LED holes 414a may be narrower.

Describing in detail with reference to the drawings, the front module mounting portion 415 is partitioned in the front-back direction and can be divided into a front half portion 415a, a middle portion 415b, and a rear half portion 415c areas. In addition, the front module mounting portion 415 may have the LED holes 414a disposed symmetrically on both left and right sides in a horizontal direction about the center, and the front module mounting portion 415 may be divided into a second area 415e, a third area 415f, and a fourth area 415g symmetrically in the horizontal direction with respect to a first area 415d located at the center.

That is, the center of the front module mounting portion 415 may be partitioned as the first area 415, the side end of the front module mounting portion 415 may be partitioned as the fourth area 415g, and the second area 415e and the third area 415f may be partitioned to be positioned between the first area 415d and the second area 415f.

In addition, the first area 415d and the fourth area 415g may have sizes corresponding to each other, and the sizes of the second area 415e and the third area 415f may be partitioned larger than the size of the first area 415d and the fourth area 415g. For example, the size of the second area 415e and the third area 415f may be 1.5 to 2 times the size of the first area 415d and the fourth area 415g.

One light groove 414 may be formed in the front half portion 415a, and a plurality of LED holes 414a may be spaced apart from each other along the light groove 413b.

In detail, one or more LED holes 414a may be provided in the first area 415d forming the center of the front half portion 415a. Further, in the second area 415e and the third area 415f formed symmetrically on both left and right sides of the first area 415d, a plurality of the LED holes 414a may be formed spaced apart at regular distances. Further, the LED holes 414a disposed in the second area 415e and the third area 415f may have the same distance between adjacent LED holes 414a. In addition, the number of LED holes 414a disposed in the second area 415e and the third area 415f may be greater than the number of LED holes 414a disposed in the first area 415d. For example, one LED hole 414a may be provided in the first area 415d, and three LED holes 414a may be disposed in each of the second area 415e and the third area 415f.

The distance (shortest distance) between the LED holes 414a on the first area 415d and the LED holes 414a on the second area 415e may be larger than the distance between the LED holes 414a disposed on the second area 415e or may be formed at corresponding distances.

In addition, in the LED holes 414a from the second area 415e to the third area 415f, the gaps on both sides of adjacent LED holes 414a may be the same.

The front half portion fourth area 415g may be formed at a side end of the front module mounting portion 415, and a plurality of LED holes 414a disposed in the fourth area 415g may be formed at regular distances. The number of LED holes 414a disposed in the fourth area 415g may be smaller than the number of LED holes 414a disposed in the second area 415e or the third area 415f. For example, two LED holes 414a may be disposed in the fourth area 415g.

In addition, the distance between both sides of the LED holes 414a on the fourth area 415g may be narrower than the distance between both sides of the LED holes 414a on the second area 415e or the third area 415f. Accordingly, while the number of LED holes 414a on the fourth area 415g may be smaller than the number of LED holes 414a on the second and third areas 415e and 415f, the distance between both sides may be narrower.

With this structure, the front half portion 415a of the front module mounting portion 415 may be formed with a narrower distance between the LED holes 414a on both sides from the center toward both sides.

In addition, the LED holes 414a may be arranged in a plurality of rows at the middle portion 415b of the front module mounting portion 415 while being spaced apart in the front and rear direction. For example, in the middle portion 415b of the front module mounting portion 415, the light grooves 414 are formed in two or more rows, and a plurality of LED holes 414a may be spaced apart from each other along the light grooves 414.

The LED hole 414a may not be disposed in the first area 415d of the middle portion 415b of the front module mounting portion 415. That is, unlike the LED hole 414a disposed in the first area 415d of the front half portion 415a, the LED hole 414a is not disposed in the first area 415d of the middle portion 415b.

In addition, the LED holes 414a disposed on the second area 415e, the third area 415f, and the fourth area 415g of the middle portion 415b may be disposed in the same manner as the arrangement of the LED holes 414a disposed in the second area 415e, the third area 415f, and the fourth area 415g of the front half portion 415a. For example, a plurality of LED holes 414a may be spaced at regular distances on the second area 415e and the third area 415f, and the distance between the LED holes 414a disposed in the fourth area 415g may be narrower than the distance between the LED holes 414a disposed in the second area 415e and the third area 415f.

The LED hole 414a may not be disposed in the first area 415d of the rear half portion 415c of the front module mounting portion 415 in the same way as in the middle portion 415b. In addition, the second area 415e of the rear half portion 415c may be disposed corresponding to the arrangement of the LED holes 414a disposed on the front half portion 415a or the second area 415e of the middle portion 415b.

Meanwhile, the LED holes may be disposed in the third area 415f of the rear half portion 415c of the front module mounting portion 415 unlike the arrangement form of the LED holes 414a disposed on the third area 415f of the front half portion 415a or the middle portion 415b. For example, the distance between both sides of the LED holes 414a disposed in the third area 415f of the rear half portion 415c may be disposed wider than the distance between the LED holes 414a on the third area 415f of the front half portion 415a or the middle portion 415b. Therefore, the total number of LED holes 414a on the third area 415f of the rear half portion 415c is smaller than the number of LED holes 414a on the third area 415f of the front half portion 415a or the middle portion 415b.

In detail, two LED holes 414a may be disposed on the third area 415f of the rear half portion 415c, and one LED hole 414a is disposed in a position corresponding to the distance between the LED holes 414a disposed in the third area 415f of the middle portion, and another LED hole 414a may be disposed a positing corresponding to the LED hole 414a disposed at a side end adjacent to the fourth area 415g among both side ends of the third area 415f of the middle portion.

In addition, the LED hole 414a disposed on the fourth area 415g of the rear half portion 415c may be disposed corresponding to the arrangement of the LED hole 414a disposed on the fourth area 415g of the front half portion 415a or the middle portion 415b.

As such, the number of LED holes 414a provided in the front module mounting portion 415 may be disposed so that the number of LED holes 414a disposed in the front half portion 415a is greater than the number of LED holes 414a disposed in the rear half portion 415c.

In addition, the distance between both sides of the LED holes 414a may be narrower from the center to both sides (from the first area to the fourth area). In addition, the LED hole 414a may not be disposed at the center of the front module mounting portion 415, and the LED hole 414a may be disposed only at the center of the front half portion 415a.

In addition, the distance between the LED holes 414a may be narrowed as a whole as the center of the front module mounting portion 415 approaches the corner.

Meanwhile, the arrangement form of the LED holes 414a disposed in the rear module mounting portion 416 may be formed differently from the arrangement form of the LED holes 414a disposed in the front module mounting portion 415.

The rear module mounting portion 416 is partitioned in the front and rear direction and can be divided into a front half portion 416a, a middle portion 416b, and a rear half portion 416c. In addition, the rear module mounting portion 416 may have the LED holes 414a disposed symmetrically on both left and right sides in a horizontal direction about the center, and the rear module mounting portion 416 may be divided into a sixth area 416e, a seventh area 416f, and an eighth area 416g symmetrically in the horizontal direction with respect to the fifth area 416d located in the center.

The front half portion 416a, the middle portion 416b, and the rear half portion 416c of the rear module mounting portion 416 may be partitioned so that the positions and sizes of the front half portion 415a, the middle portion 415b, and the rear half portion 415c of the front module mounting portion 415 correspond to each other, respectively. In addition, the fifth area 416d may be partitioned so that the position and size of the first area 415d correspond to each other, the sixth area 416e may be portioned so that the position and size of the second area 415e correspond to each other, the seventh area 416f may be partitioned so that the position and size of the third area 415f correspond to each other, and the eighth area 416g may be partitioned so that the position and size of the fourth area 415g correspond to each other.

The rear module mounting portion 416 may be disposed so that the number of LED holes 414a disposed in the front half portion 416a may be greater than the number of LED holes 414a disposed in the rear half portion 416c. Further, the rear module mounting portion 416 may be formed so that a distance between both sides of the adjacent LED holes 414a may be narrower toward both sides from the center.

Looking in more detail with reference to the drawings, the LED hole 414a may not be disposed in the fifth area 416d of the front half portion of the rear module mounting portion 416.

In addition, a plurality of LED holes 414a may be disposed in the sixth area 416e of the front half portion at regular distances, wherein the number of the LED holes 414a in the sixth area 416e of the front half portion may be less than the number of the LED holes 414a disposed in the second area 415e of the front module mounting portion 415. For example, two LED holes 414a may be disposed on the sixth area 416e of the front half portion, and the distance between the LED holes 414a may be wider than the distance between the LED holes 414a disposed in the second area 415e on the front module mounting portion 415.

In addition, the LED holes 414a disposed in the seventh area 416f of the front half portion may be disposed corresponding to the arrangement of the LED holes 414a on the third area 415f. Accordingly, the distance between the LED holes 414a on the seventh area 416f may be narrower than the distance between the LED holes 414a on the sixth area 416e.

In addition, the LED holes 414a disposed in the seventh area 416f of the front half portion may be spaced apart in plurality corresponding to the arrangement of the LED holes 414a on the fourth area 415g of the front module mounting portion 415.

In this way, the LED holes 414a disposed in the front half portion 416a of the rear module mounting portion 416 may be formed such that a distance between the LED holes 414a becomes narrower toward both sides with respect to the center. In other words, the distance between the LED holes 414a disposed in the front half portion 416a of the rear module mounting portion 416 may be narrower in the order of the sixth area 416e, the seventh area 416f, and the eighth area 416g.

In addition, the number of LED holes 414a disposed on the seventh area 416f may be greater than the number of LED holes 414a disposed on the sixth area 416e.

In addition, the LED holes 414a disposed in the middle portion 416b of the rear module mounting portion 416 may correspond to or have the same arrangement as the arrangement of the LED holes 414a disposed in the front half portion 416a of the rear module mounting portion 416. can Accordingly, the middle portion of the rear module mounting portion 416 may be formed so that the distance between the LED holes 414a becomes narrower from the center toward both sides. In other words, the distance between the adjacent LED holes 414a may be narrower from the fifth area 416d to the eighth area 416g. The total number of LED holes 414a disposed in the seventh area 416f is greater than the total number of LED holes 414a disposed in the fifth area 416d and the sixth area 416e.

The total number of LED holes 414a disposed in the front half portion 416a and the middle portion 416b of the rear module mounting portion 416 may be disposed to fewer than the total number of the LED holes 414a disposed in the front half portion 415a and the middle portion 415b of the front module mounting portion 415. Therefore, the distance between the LED holes 414a may be formed wider than that. In particular, the distance between the LED holes 414a disposed on the sixth area 416e of the rear module mounting portion 416 is larger than the distance between the LED holes 414a disposed on the second area 415e and the total number of LED holes 414a on the sixth area 416e may be less than the total number of LED holes 414a on the second area 415e.

In addition, the LED hole 414a disposed in the rear half portion 416c of the rear module mounting portion 416 is not provided on the fifth area 416d, and the LED hole 414a on the sixth area 416e may correspond to or be the same as the disposition of the LED holes 414a of the front half portion 416a or the middle portion 416b of the rear module mounting portion 416.

In addition, the arrangement of the LED holes 414a disposed on the seventh area 416f of the second half 416c of the rear module mounting portion 416 may be formed to correspond to or identical to the arrangement of the LED holes 414a disposed on the third area 415f of the rear half portion 415c of the front module mounting portion 415. In other words, the LED holes 414a on the seventh area 416f are wider than the distance between the LED holes 414a disposed on the seventh area 416f of the middle portion 416b of the rear module mounting portion 416 and may be arranged narrower than the distance between the LED holes 414a disposed on the sixth area 416e of the rear half portion. In this structure, the total number of LED holes 414a disposed on the rear half portion 416c of the rear module mounting portion 416 is smaller than that of the front half portion 416a or the middle portion 416b. In addition, in the rear half portion 416c, the difference between the distance between the LED holes 414a on the sixth area 416e and the distance between the LED holes 414a on the seventh area 416f can be smaller than in the front half portion 416a or the middle 416b.

In addition, the LED hole 414a disposed on the eighth area 416g of the rear half portion 416c of the rear module mounting portion 416 may be disposed to correspond to the arrangement of the LED hole 414a disposed on the eighth area 416g of the front half portion or the middle portion.

As such, the total number of LED holes 414a disposed on the rear module mounting portion 416 may be less than the total number of LED holes 414a disposed on the front module mounting portion 415.

In addition, the distance between the LED holes 414a disposed on the rear module mounting portion 416 may be wider than the distance between the LED holes 414a disposed on the front module mounting portion 415 as a whole.

The LED 422 may be disposed at a position corresponding to the LED hole 414a to emit light capable of promoting photosynthesis of plants. In addition, the LEDs 422 may be disposed to correspond to the arrangement of the LED holes 414a. Accordingly, the LEDs 422 may be arranged such that the total number of the LEDs 422 decreases from the front to the rear, and the distance between the LEDs 422 widens from both sides to the center. With this disposition, there is an advantage in that light irradiated from the LED 422 can be uniformly provided within the cultivation space 100.

According to an embodiment of the present disclosure, when the LED holes 414a are arranged on the module mounting portion 413, there is an effect of evenly irradiating the entire area of the cultivation shelf 30 with light.

In detail, when the same number of LEDs 422 are arranged in the front and rear direction and the distance between the LEDs 422 is uniformly arranged as a whole, there is a problem in that the amount of light provided to the upper and lower cultivation shelves 30 is more concentrated in the rear half portion, and the light is not uniformly irradiated.

A door 13 made of a glass material is provided in front of the lighting device 40, and an inner case 12 made of a metal material is provided at the side and rear of the lighting device 40. That is, the light reflectance may be different depending on the position where the light is irradiated from the lighting device 40.

In detail, a door 13 made of a glass material is provided in front of the cabinet 10, and a portion of the light passes through the door 13 and is emitted to the outside of the cabinet 10, and a portion of the light may be reflected by the door 13 and irradiated to the cultivation shelf 30. That is, the light irradiated from the lighting device 40 can be transmitted through the door, so that the amount of light reaching the front half portion of the cultivation shelf 30 is relatively smaller than the amount of light reaching the rear half portion of the cultivation shelf 30.

In addition, the inner case 12 forming the side surface and rear surface of the cabinet 10 is made of a metal material so that the degree of reflection or scattering of light is higher than that of the door 13. That is, the amount of light reaching both sides and the rear half portion of the cultivation shelf 30 is relatively greater than the amount of light reaching the front half portion of the cultivation shelf 30.

That is, the inner case 12 made of a material having high light reflectivity is located behind the lighting device 40, so that the amount of light irradiated to the rear of the cultivation shelf 30 is relatively more than the amount of light irradiated to the front of the cultivation shelf 30.

Therefore, the degree of reflection or scattering of light is different from the front, side, and rear surfaces of the cabinet 10, making it difficult to provide uniform light to the cultivation shelf 30.

In the lighting device 40 according to an embodiment of the present disclosure, the number of LEDs disposed in the rear half portion is smaller than the number of LEDs disposed in the front half portion of the arrangement of the LEDs 422, so that the amount of light reflected from the inner case 12 positioned at the rear and the amount of light reflected from the door 13 positioned at the front may be uniform. That is, more LEDs 422 are disposed in the front half portion than in the rear half portion of the lighting device 40, so that a uniform amount of light can be provided to the entire cultivation shelf 30.

In addition, when the arrangement of the LEDs 422 is arranged with a constant distance between the center and both sides, the light irradiated from each of the LEDs 422 overlaps and is concentrated in the center. Therefore, considering the overlapping range where the light is irradiated, the distance between the LEDs is arranged on both sides of the light case 41 to be narrower than the middle portion, so that it is possible to prevent the light from being concentrated in the center and being irradiated.

Therefore, regardless of where the seed package 90 is seated on the cultivation shelf 30, it is possible to provide uniform light. If the amount of light reached is different depending on the location of the cultivation shelf 30, there is a problem in that the growth rate of cultivated plants varies according to the location of the cultivation shelf 30 in which they are seated, so that they do not grow uniformly. As a result, the harvesting time of the plants is different from each other, causing inconvenience to the user.

According to the lighting device 40 according to an embodiment of the present disclosure, the amount of light irradiated is uniform throughout the cultivation shelf 30, so there is an advantage in that the growth rate of cultivated plants can be equally matched.

Meanwhile, in the light groove 414 formed in the module mounting portion 413, both sides of the light groove 414 are inclined around the LED hole 414a, so that the light emitted from the LED 422 is reflected through the light groove 414 so that the light can be irradiated downward.

Figure 36:
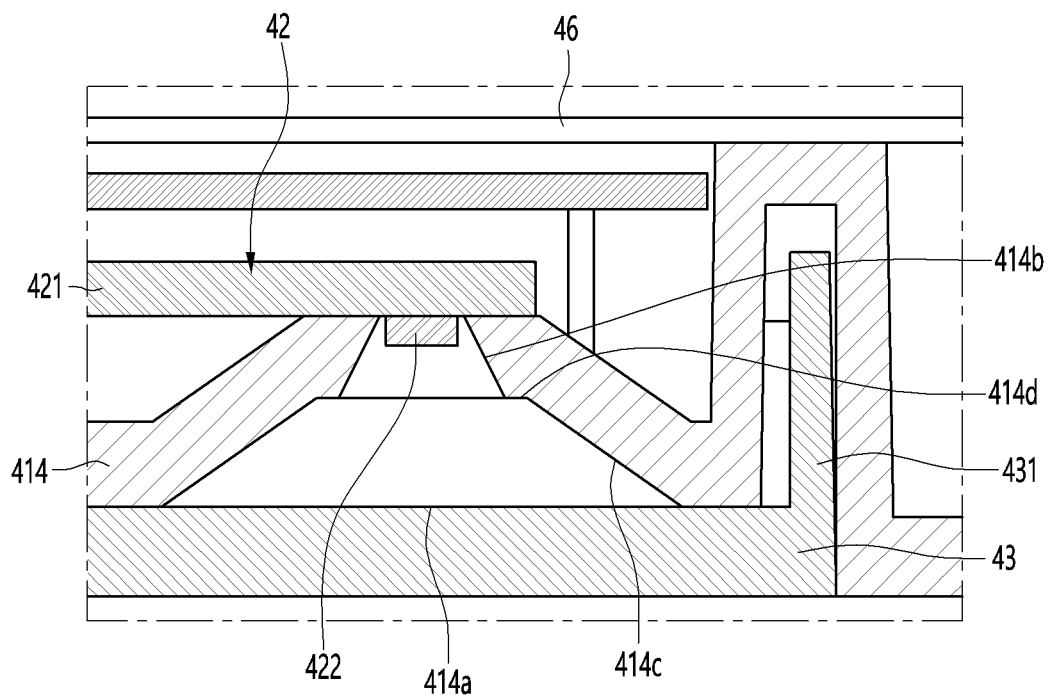
FIG. 36 is a cross-sectional view taken along line XXXVI-XXXVI' of FIG. 31.

FIG. 36 is a cross-sectional view taken along line XXXVI-XXXVI' of FIG. 31.

Referring to the drawings, when the light groove 414 is described in detail, the upper end of the light groove 414 is opened to form an LED hole 414a, and the LED 422 can be inserted into the LED hole 414a. Further, the light groove 414 is formed with both sides inclined around the LED hole 414a, and the opened lower end of the light groove 414 may be shielded by the light cover 43.

As a whole, an inner surface of the light groove 414 may be inclined in a direction away from the center of the LED hole 414a from top to bottom. In addition, the inner surface of the light groove 414 may include two stages of inclination by varying the inclination angle.

In detail, a first inclined portion 414b extending downward from the LED hole 414a into which the LED 422 is inserted, and a second inclined portion 414c extending from the first inclined portion 414b to a lower end of the light groove 414 may be formed on an inner surface of the light groove 414. In addition, the first inclined portion 414b and the second inclined portion 414c may be formed with different degrees of inclination, respectively.

For example, the second inclined portion 414c may be formed to have a relatively gentler slope than the slope of the first inclined portion 414b.

In other words, the light groove 414 has an inclination in a direction away from the center of the LED hole 414a as it goes downward with respect to the LED hole 414a, and this inclination may include a first inclined portion 414b and a second inclined portion 414c with a step difference. That is, the first inclined portion 414b and the second inclined portion 414c may be connected by a stepped portion 414d. The stepped portion 414d connects the lower end of the first inclined portion 414b and the upper end of the second inclined portion 414c in a horizontal direction.

As such, the light groove 414 according to an embodiment of the present disclosure is characterized in that the inner surface has two or more inclined surfaces. Accordingly, the light emitted from the LED 422 is provided to the cultivation space 100 via the first inclined portion 414b and the second inclined portion 414c.

If the inner surface of the light groove 414 is formed as a single inclined surface, when the lighting device 40 is viewed from the outside, the LED 422 appears relatively prominent in the light case 41. In addition, when the light groove 414 is formed as a single inclined surface, a line in the form of a dot (spot) is illuminated in the cultivation space 100 by the degree of spread of the light irradiated from the LED 422.

The light groove 414 of one embodiment of the present disclosure forms a first inclined portion 414b and a second inclined portion 414c having different inclinations, thereby while minimizing exposure of the LED 422 when viewed from the outside, the light was allowed to be irradiated to the surface of the cultivation shelf 30. Accordingly, there is an advantage in preventing a spot-shaped line from being generated due to concentration of light irradiated within the cultivation space 100.

Hereinafter, the display device 14 will be described with reference to drawings.

Figure 37:
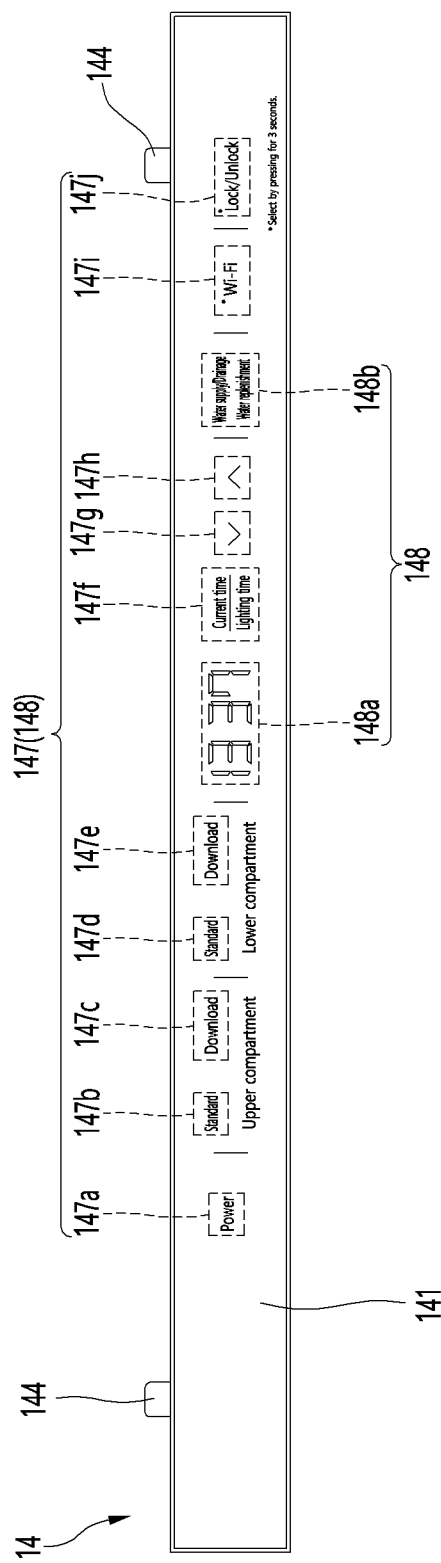
FIG. 37 is a front view of a display device according to an embodiment of the present disclosure.
Figure 38:
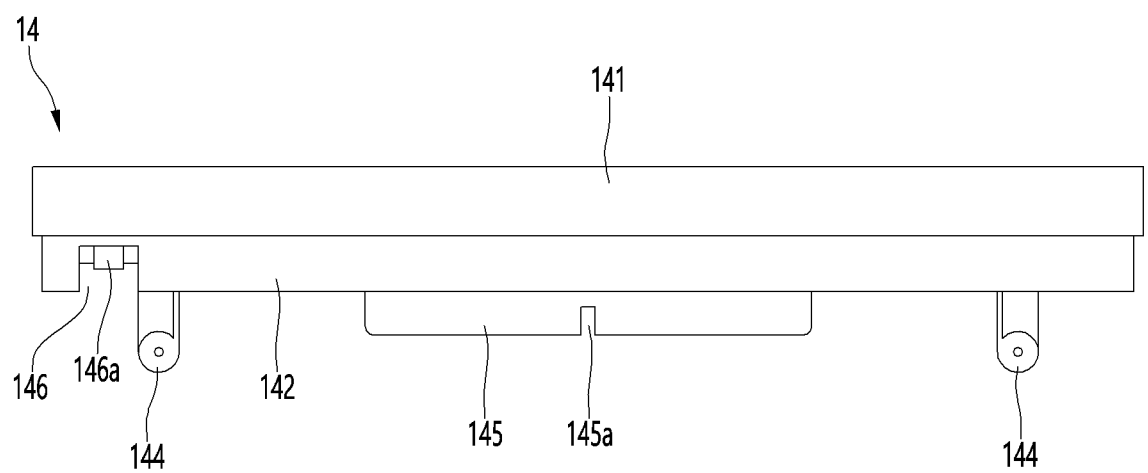
FIG. 38 is a bottom view of the display device.

FIG. 37 is a front view of a display device according to an embodiment of the present disclosure, and FIG. 38 is a bottom view of the display device.

As illustrated in the figure, the display device 14 may be provided on the lower surface of the upper cultivation shelf 30 and the front end of the lower lighting device 40 (See FIGS. 2 and 9). The display device 14 may be configured to display the operation state of the apparatus for cultivating plants 1 and to manipulate the operation of the apparatus for cultivating plants 1.

In detail, the lighting device 40 may have an external shape for the combination of the front case 141 and the rear case 142, and a PCB (143 in FIG. 9) on which a touch sensor and an LED are mounted may be disposed inside the front case 141 and the rear case 142.

The front case 141 may be formed in a hexahedron shape with an open rear surface and may be formed long in a horizontal direction. In addition, the opened rear surface of the front case 141 may be shielded by the rear case 142.

The front surface of the front case 141 may be formed with a narrow vertical width and a horizontally long width. In a state where the display device 14 is mounted, the front surface of the front case 141 may be positioned on the same plane as the front surface of the upper cultivation shelf 30a, and is formed to have a top and bottom width and a left and right length corresponding to the front surface of the upper cultivation shelf 30a, thereby providing a uniform outer appearance as a whole.

In addition, a plurality of manipulation portions 147 may be formed on the front surface of the front case 141, and a function of the manipulation portion 147 is printed at a position corresponding to the manipulation portion 147 so that the user can identify the function.

In addition, the PCB 143 may be provided on the rear surface of the front case 141, and the PCB 143 has a touch sensor or button at the corresponding position so as to detect the touch manipulation at the time of the touch manipulation of the manipulation portion 147.

Looking in detail at the manipulation portion 147 disposed on the front case 141, the manipulation portion 147 may include a power manipulation portion 147a for turning on and off power. In addition, the manipulation portion 147 includes an upper compartment standard operation manipulation portion 147b and an upper compartment download operation manipulation portion 147c for adjusting the operation mode of the area where the upper cultivation shelf 30a is disposed, and the lower cultivation shelf 30b. A lower compartment standard operation manipulation portion 147d and a lower compartment download operation manipulation portion 147e for adjusting the operation mode of the area where the lower cultivation shelf 30b is disposed may be further included. Further, the manipulation portion 147 may include a time manipulation portion 147f capable of setting an on/off time of the lighting device 40, and up and down manipulation portions 147g and 147h are provided on the sides of the time manipulation portion 147f, and thus can set the time manipulated by the time manipulation portion 147f. In this case, the time set by the time manipulation portion 147f may be the current time or the time when the lighting device 40 is turned on or off. In addition, the manipulation portion 147 may further include a communication connection manipulation portion 147i for setting a connection state with the external device such as the cloud server 2 or the user device 3 such as a mobile phone. In addition, the manipulation portion 147 may further include a lock manipulation portion 147j capable of locking or unlocking the state of the display device 14.

Meanwhile, a display portion 148 may be formed on the front surface of the front case 141. The display portion 148 is for displaying the operation of the apparatus for cultivating plants 1, and a display means such as an LED is disposed at a position corresponding to each manipulation portion 147 and thus may display to the user the operation state of each manipulation portion 147 or the activation state of the function as an on/off state.

In addition, the display portion 148 may include a time display portion 148a displaying the time set by the time manipulation portion 147f. The current time or the time set for the operation of the lighting device 40 may be displayed through the time display portion 148a, and the user may check the operation state of the apparatus for cultivating plants 1 through this. The time display portion 148a may display information in numbers or letters, and thus may display information such as the temperature of the cultivation space 100 in addition to displaying the time. Temperature setting of the cultivation space 100 may also be possible.

In addition, the display portion 148 may further include a water supply display portion 148b for displaying a water supply or drainage state of the cultivation shelf 30. In addition, the water supply display portion 148b may display water replenishment of the water tank 70 when the water level of the water tank 70 is lowered.

In addition, the display portion 148 may further include a display portion for displaying the operation state of any one of the power manipulation portion 147a, the upper compartment standard operation manipulation portion 147b, the upper compartment download operation manipulation portion 147c, the lower compartment standard operation manipulation portion 147d, the lower compartment download operation manipulation portion 147e, and the communication connection manipulation portion 147i and the lock manipulation portion 147j.

In addition, the display portion 148 may be formed at the same position as the manipulation portion 147, and may be configured to be lit on the inner surface of the front case 141 so that light is transmitted to the outside. In addition, the display portion 148 may be configured such that an LED is disposed in a hole penetrating the front case 141 to be turned on and off according to a user's manipulation and setting state to be displayed externally.

Meanwhile, display mounting portions 144 may be formed on both left and right sides of the top surface of the front case 141. The display fixing portion 145 may extend rearward and may be coupled to an top surface of the lighting device 40.

The rear case 142 shields the open rear surface of the front case 141 and forms the rear outer appearance of the display device 14. In addition, the rear case 142 may protrude backward, and a rear end of the rear case 142 may be located on a lower surface of the lighting device 40.

In particular, a display fixing portion 145 extending rearward may protrude from the center of the rear case 142. The upper display fixing portion 145 may be formed in a plate shape and may come into contact with the front lower surface of the lighting device 40.

In addition, a fixing portion opening 145a through which a screw 411d can pass may be formed at the center of the display fixing portion 145. The fixing portion opening 145a may be formed at a position corresponding to the display mounting hole 411c. Therefore, in a state where the display device 14 is disposed, the display device 14 can be fixedly mounted by fastening the screw 411d to sequentially pass through the fixing portion opening 145a and the display mounting hole 411c.

Meanwhile, a connector hole 146 exposing a connector 146a to which a electric wire extending from the PCB 143 is connected may be formed at one side of the rear case 142. The connector hole 146 is formed at one end of the rear case 142 and is not exposed to the outside when the display device 14 is mounted. In addition, the electric wire connected to the connector 146a inside the connector hole 146 may be guided into the lighting device 40, and may be extended through the rear end of the lighting device 40 to the rear plate 124. Of course, even at this time, electric wires connected to the display device 14 and the lighting device 40 are not exposed to the outside.

Hereinafter, a disposition structure of a water supply module and a drain module constituting a path through which water flows inside the cultivation space 100 will be described in more detail with reference to drawings.

Figure 39:
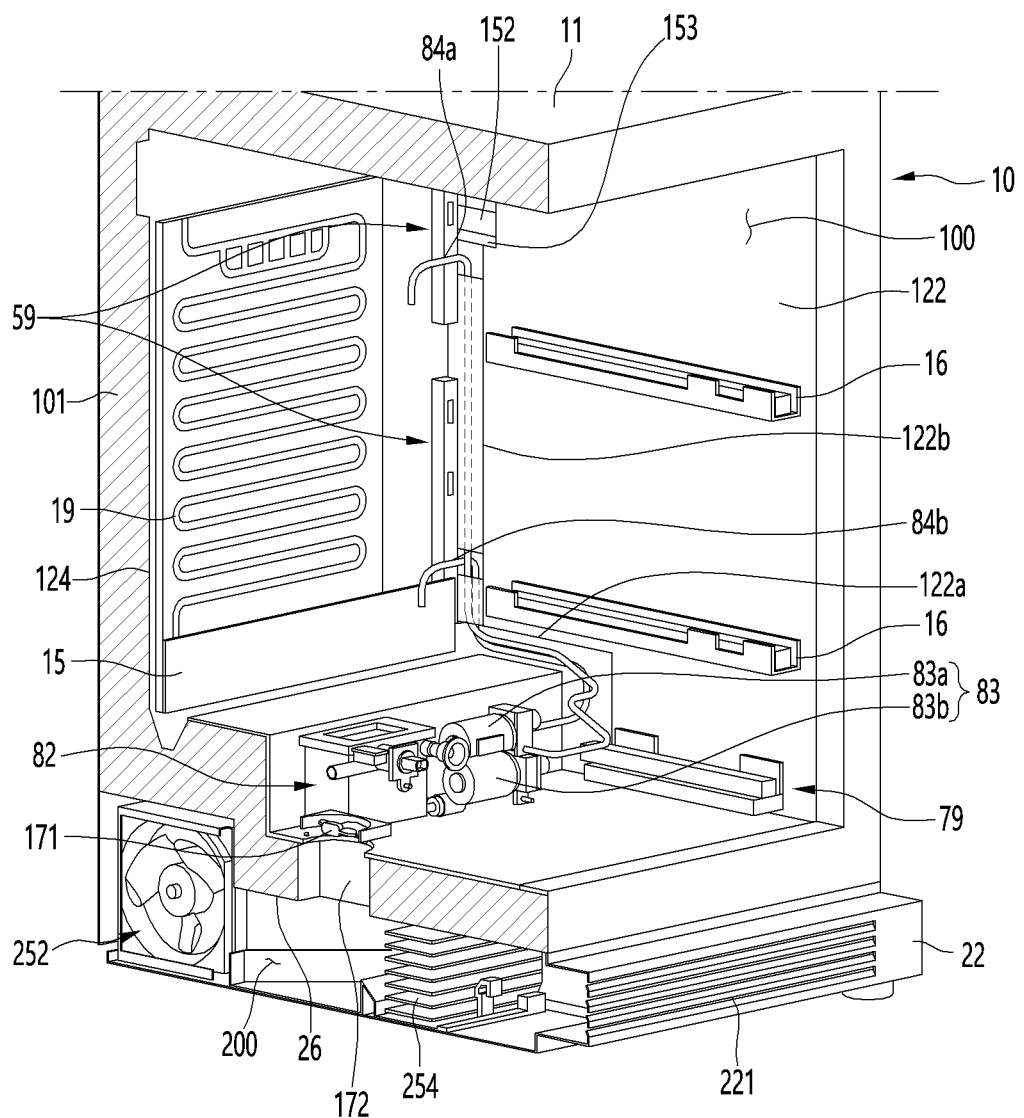
FIG. 39 is a cutaway perspective view illustrating the arrangement of a water supply module inside a cabinet according to an embodiment of the present disclosure.
Figure 40:
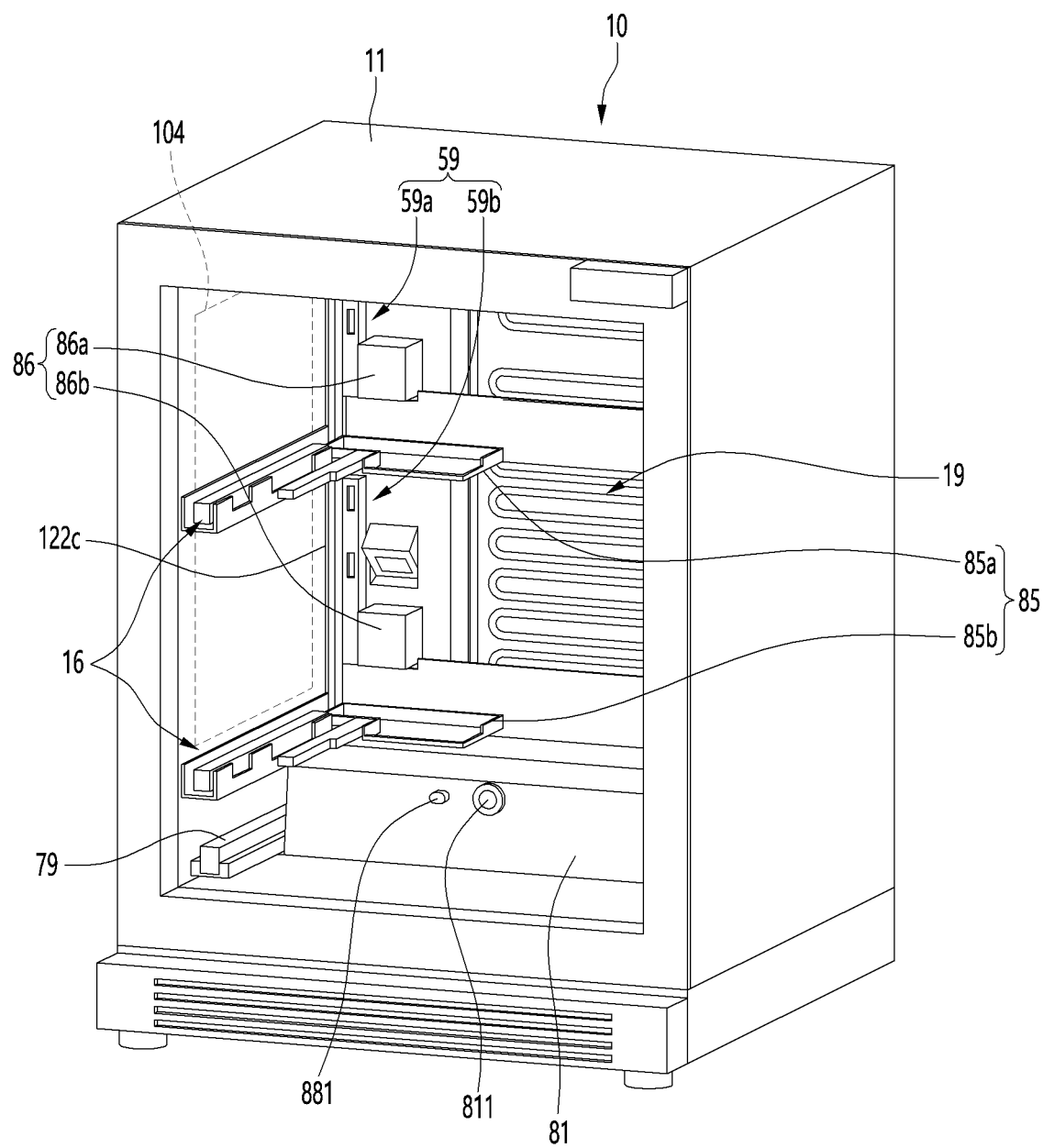
FIG. 40 is a perspective view illustrating the arrangement of a drain module inside a cabinet according to an embodiment of the present disclosure.
Figure 41:
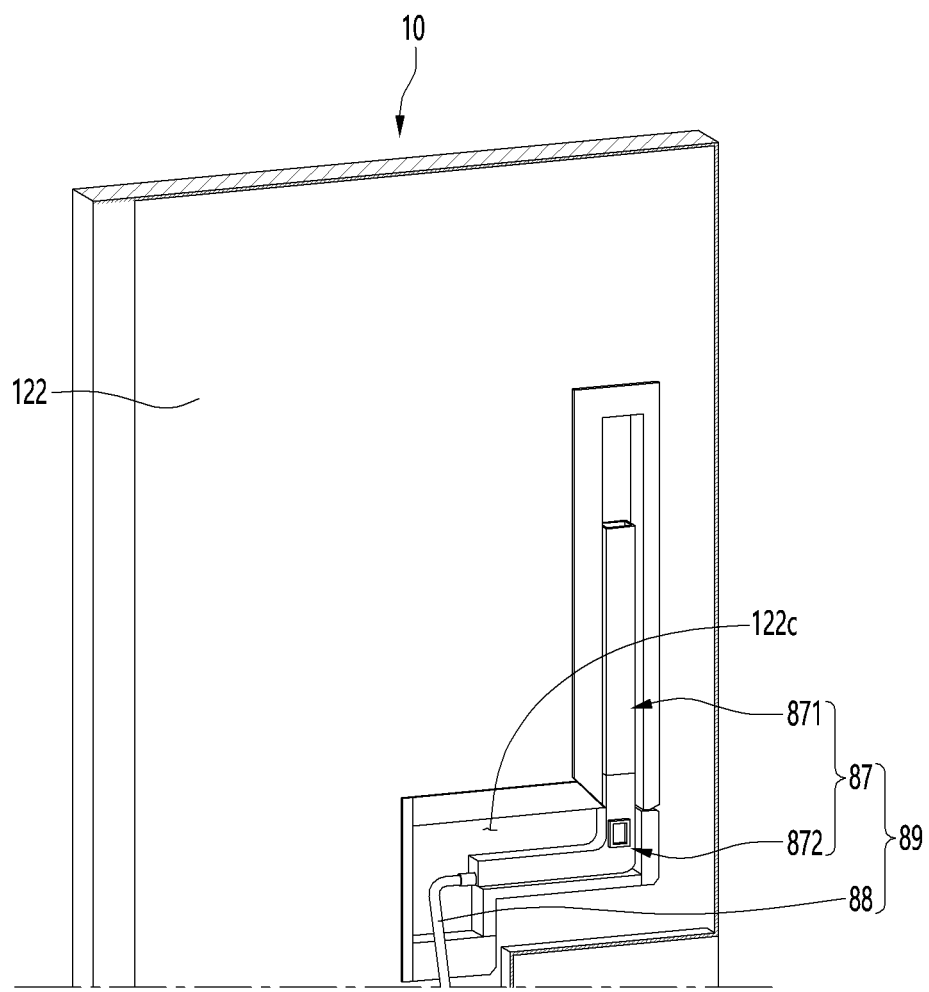
FIG. 41 is a partial perspective view illustrating the arrangement of one side of the inside of the cabinet and the drain pipe.

FIG. 39 is a cutaway perspective view illustrating the arrangement of a water supply module inside a cabinet according to an embodiment of the present disclosure, FIG. 40 is a perspective view illustrating the arrangement of a drain module inside a cabinet according to an embodiment of the present disclosure, and FIG. 41 is a partial perspective view illustrating the arrangement of one side of the inside of the cabinet and the drain pipe.

As illustrated in the drawing, the inner surface of the cultivation space 100 may be formed by the inner case 12.

The bottom plate 121 may define the bottom surface of the cultivation space 100 and have a shape of which a rear portion is stepped with a higher height. The rear portion of the bottom plate 121, which has a relatively high height, may be a portion corresponding to an arrangement position of the compressor 241 to secure an installation space of the compressor 241 inside the machine room 200.

Also, the sub-tank 82 and the pump 83 may be disposed in the first half of the bottom plate 121 having the relatively low height and may be shielded by the pump cover 81. A ventilation fan 171 may be provided in a space inside the pump cover 81, and an exhaust duct 172 through which a bottom surface of the cultivation space 100 and the machine room 200 communicate with each other may be provided under the ventilation fan 171. Thus, air inside the cultivation space 100 may be exhausted to the machine room 200, and external air may be introduced into an inlet provided in the other wall of the cabinet 10 to supply carbon dioxide required for the plant growth.

The water tank 70 may be disposed in front of the pump cover 81. The water tank 70 may be disposed to be accessible inside the cultivation space 100. For this, a tank rail 79 for the accessible water tank 70 may be provided on each of both sides of the side plate 122. The tank rail 79 may have a structure extending in multiple stages, and when the water tank 70 is completely withdrawn, the tank cover 72 may be withdrawn by a distance at which the tank cover 72 is capable of being opened and closed. Also, when the water tank 70 is completely inserted, the water tank 70 may be connected to the sub-tank 82 and the drain module.

The evaporator 243 may be mounted on the rear plate 124. The evaporator 243 may be formed in a plate shape and may be disposed to occupy most of the rear wall area of the cultivation space 100. In addition, the blower 50 may be provided in front of the evaporator 243.

In addition, the lighting device 40 may be provided on the lower surface of the top plate 123. An upper lighting device 40a located at the uppermost portion of the lighting devices 40 may be fixedly mounted on the lower surface of the top plate 123. In addition, the lower lighting device 40b may be disposed below the upper cultivation shelf 30a.

The cultivation shelf 30 may be disposed to be introduced in and withdrawn from the side plates 122 on both sides. The side plate 122 may be provided with shelf rails 16 extendable in multiple stages, and both side surfaces of the cultivation shelf 30 may be combined with the shelf rails 16. Therefore, the cultivation shelf 30 can be introduced and withdrawn in the front and rear direction, and it is easy to harvest and manage the plants cultivated on the cultivation shelf 30 and to mount and remove the seed package 90.

A water supply pipe guide portion 122a may be disposed on the side plate 122 at the right side of the side plate 122. The water supply pipe guide portion 122a may be configured to guide the water supply pipe 84 that is directed to the cultivation shelf 30 and may be provided to be recessed so that the water supply pipe 84 is accommodated.

The water supply pipe guide portion 122a may extend backward along a lower end of the side plate 122 and may extend upward from a rear end of the side plate 122. Also, a guide portion cover 122b may be disposed on the water supply pipe guide portion 122a to shield a portion of an opened front surface of the water supply pipe guide portion 122a. The guide portion cover 122b may be configured to shield the water supply pipe guide portion 122a extending in the vertical direction along the rear end of the side plate 122, and the water supply pipe 84 accommodated therein may not be exposed to the outside.

Also, a water supply pipe fixing portion may be further disposed on the guide portion cover 122b. The water supply pipe fixing portion may fix an end of the water supply pipe 84 through which water is discharged so as to be disposed on the water supply portion 316 of each of the upper and lower cultivation shelves 30a and 30b. Thus, the position of the outlet of the water supply pipe 84 may be fixed, and water may be supplied to the cultivation shelf 30 at an accurate position.

The water supply pipe 84 may have a metal tubular shape and include an upper water supply pipe 84a, which is connected to the upper pump 83a to supply water to the upper cultivation shelf 30a, and a lower water supply pipe 84b, which is the lower pump 83b to supply water to the lower cultivation shelf 30b.

The sub-tank 82, the pump 83, and the water supply pipe 84, which are disposed to supply water to the cultivation shelf 30, may be referred to as a water supply module, and the water supply module may be provided in the inner space of the pump cover 81 and the sidewall of the cultivation space 100 so as not to be exposed to the outside in a normally used state.

Particularly, the water supply pipe 84 may be in a state of being accommodated in the water supply pipe guide portion 122a disposed on the side surface of the cultivation space 100 and may not be exposed to the outside by the guide portion cover 122b. Also, an end of the water supply pipe 84 adjacent to the cultivation shelf 30 may be covered by the cover plate 53 of the blower 50.

Also, a drain module may be disposed at the other side facing one side of the cultivation space 100 in which the water supply module is disposed. That is, the water supply module and the drain module may be disposed on both left and right sides based on the cultivation shelf 30, respectively.

In detail, among the left and right sides forming the cultivation space 100, a drain pipe 89 may be disposed on one side (left side in FIG. 40) facing the one side where the water supply pipe 84 is disposed. In addition, a drain tray 85 may be provided at a corner area adjacent to the rear surface of the cultivation space 100 adjacent to the drain pipe 89.

A drain pipe guide portion 122c recessed inward may be formed on the side plate 122 forming the left side of the cultivation space 100. The drain pipe guide portion 122c may be recessed outward from the side of the cultivation space 100. In addition, the drain pipe guide portion 122c may extend rearward from the space formed by the pump cover 81 and extend upward from a corner portion in contact with the rear surface of the cultivation space 100. The drain pipe 89 extends in the vertical direction, and all of the water drained from the upper cultivation shelf 30a and the lower cultivation shelf 30b arranged up and down can be drained through one drain pipe 89. When a plurality of cultivation shelves 30 are provided, the drain pipe 89 may be arranged to pass through the plurality of cultivation shelves 30.

Meanwhile, when the drain pipe 89 is mounted on the drain pipe guide portion 122c, the drain pipe 89 does not protrude into the cultivation space. Therefore, it is possible to prevent interference between the drain pipe 89 and the cultivation shelf 30 even when the cultivation shelf 30 is introduced and withdrawn. In addition, the drain pipe 89 is connected to the drain tray 85 in a state of being disposed inside the drain pipe guide portion 122c to guide the water drained from the cultivation shelf 30 to the inside of the pump cover 81.

To this end, the drain pipe 89 may include the drain guide pipe 87 extending in the vertical direction and a drain tube 88 connected to the drain guide pipe 87.

The drain guide pipe 87 may include an upper drain guide pipe 871 extending in a vertical direction and a lower drain guide pipe 872 extending from a lower end of the upper drain guide pipe 871 and bent forward. In addition, the lower drain guide pipe 872 may be connected to the drain tube 88. In addition, the upper drain guide pipe 871 is disposed at the rear end of the side of the cultivation space 100 and is mostly covered by the blower 50 so that the upper drain guide pipe is not exposed to the outside. In addition, since the lower drain guide pipe 872 and the drain tube 88 are disposed below the lower cultivation shelf 30*b*, the lower drain guide pipe 872 and the drain tube 88 are covered by the lower cultivation shelf 30*b* and are not exposed to the outside.

In addition, the drain tray 85 is also disposed below the cultivation shelf 30 and disposed adjacent to the rear wall surface of the cultivation space 100, so that the drain tray is not exposed to the outside. Therefore, even if the door 13 is opened, external exposure of the drain pipe 89 and the drain tray 85 for drainage inside the cultivation space 100 can be prevented.

Meanwhile, the drain valve 881 connected to the end of the drain pipe 89 may be exposed to the front surface of the pump cover 81 and may be connected to the drain tube 88 disposed inside the pump cover 81. The drain valve 881 is exposed forward and is connected to and opened when the water tank 70 is introduced and is separated from the water tank 70 and closed when the water tank 70 is withdrawn.

Hereinafter, the structure of the water tank 70 will be described in more detail with reference to drawings.

Figure 42:
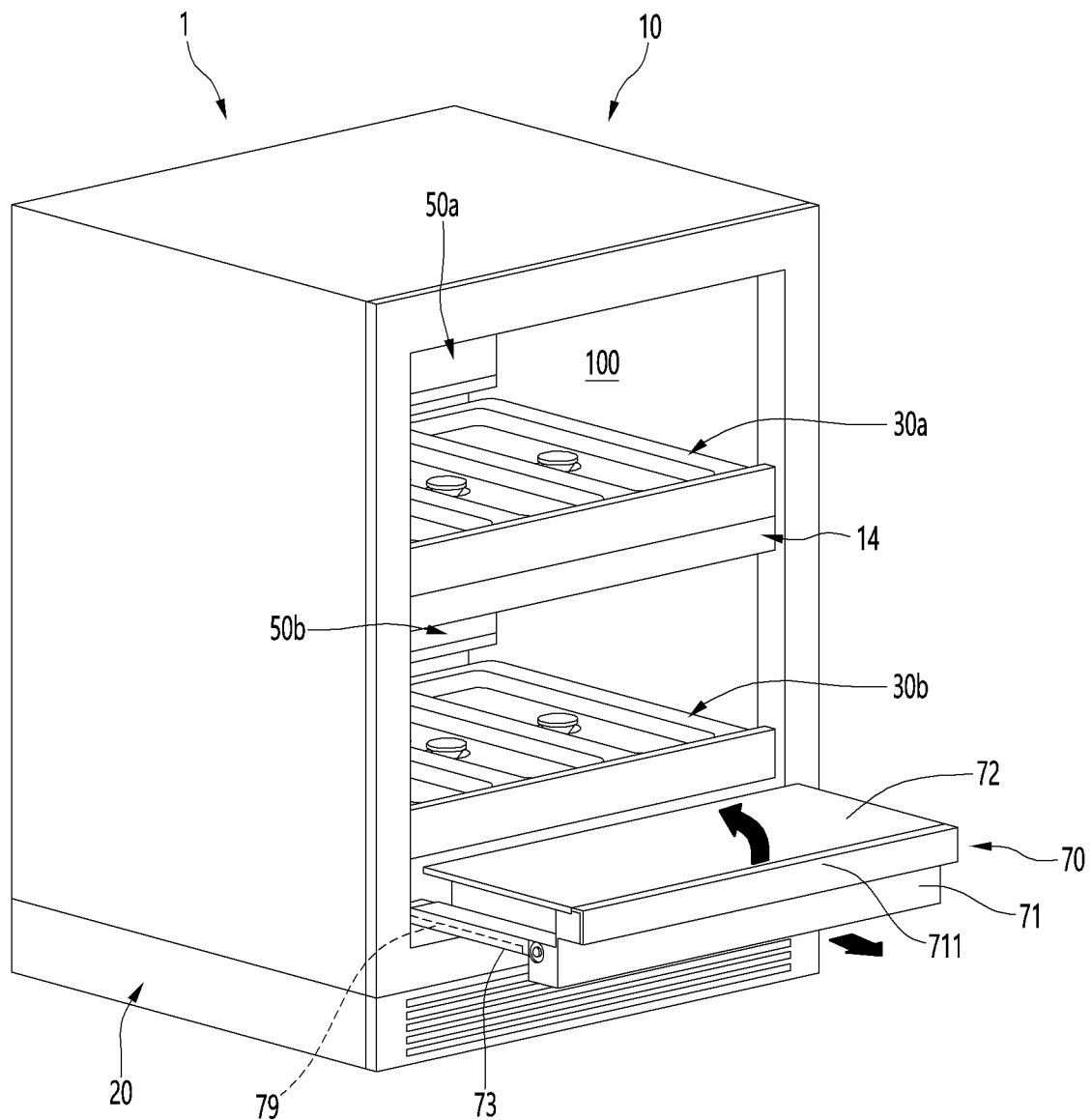
FIG. 42 is a perspective view illustrating a state where a water tank is inserted and withdrawn and used according to an embodiment of the present disclosure.
Figure 43:
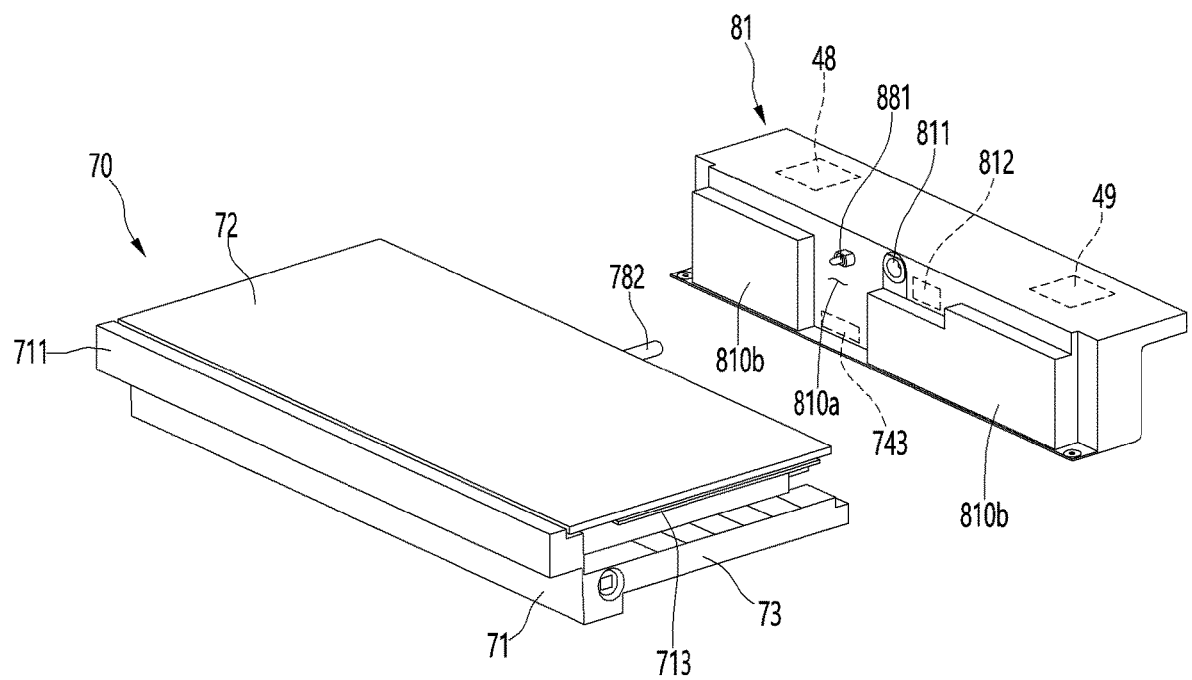
FIG. 43 is a perspective view illustrating a state where the water tank and pump cover are separated.

FIG. 42 is a perspective view illustrating a state where a water tank is inserted and withdrawn and used according to an embodiment of the present disclosure, and FIG. 43 is a perspective view illustrating a state where the water tank and pump cover are separated.

As illustrated in the drawing, the water tank 70 may be provided at the lowest portion of the cultivation space 100 and may be introduced and withdrawn in the front and rear direction. The water tank 70 may be formed in a size capable of filling the space between the bottom surface of the cultivation space 100 and the lower surface of the lower cultivation shelf 30*b* in an introduced state. In addition, when the water tank 70 is introduced, it may be positioned on the same plane as the front surface of the lower cultivation shelf 30*b* to have a sense of unity.

In addition, tank rails 79 may be coupled to rail mounting portions 73 on both left and right sides of the water tank 70. The tank rail 79 may be fixed to the side plate 122 and has a structure capable of being extended in multiple stages so that the water tank 70 can be introduced and withdrawn in the front and rear direction.

The entire water tank 70 can be withdrawn completely forward, and at least the tank cover 72 can be withdrawn to the extent that the tank body 71 storing water can be opened by rotating the tank cover 72 upward. The user may open the tank body 71 in a state where the water tank 70 is withdrawn, and fill the water tank 70 with water or supply nutrients necessary for plant cultivation and thus it is possible to circulate water in a culture medium state through the water supply module and the drain module.

Meanwhile, the pump cover 81 may be provided behind the water tank 70. The pump cover 81 may be fixedly mounted on the bottom plate 211, and when the pump cover 81 is mounted, a number of configurations including the pump 83 and the sub-tank 82 may be accommodated in the inner space of the pump cover 81.

In addition, a pump cover protrusion 810*b* protruding forward and a pump cover recessed portion 810*a* recessed backward between the pump cover protrusion 810*b* may be formed on the front surface of the pump cover 81. The pump cover protrusion 810*b* may be adjacent to the rear surface of the water tank 70 when the water tank 70 is introduced.

In addition, the protruding rear surface 744 of the water tank 70 may be accommodated in the pump cover recessed portion 810*a*. In addition, a drain valve 881 for selective connection with the water tank 70 and a fitting portion 811 may be disposed inside the pump cover recessed portion 810*a*.

Therefore, when the water tank 70 is completely introduced, the drain valve 881 is inserted into the valve insertion port 744*a* of the rear surface 744 of the water tank 70 to drain water into the water tank 70, and the tank water outlet 78 of the water tank 70 may be inserted into the fitting portion 811 to supply water to the cultivation shelf 30.

Of course, when the water tank 70 is withdrawn, the contact with the drain valve 881 is released, the drain valve 881 is closed, the tank outlet 78 is separated from the fitting portion 811, and thus water supply to the cultivation shelf 30 may be stopped. That is, when the water tank 70 is introduced, both water supply and drainage are possible, and as soon as the water tank is withdrawn, water supply and drainage are stopped to prevent leakage.

Meanwhile, a tank detection device 743 may be provided on one side of the recessed portion of the pump cover 81. The tank detection device 743 may detect whether the water tank 70 is completely introduced so that the driving of the pump 83 and the driving of the driving device are started.

In addition, a shelf detection device 48 for detecting complete introduction of the lower cultivation shelf 30*b* may be provided on the inner top surface of the pump cover 81. The shelf detection device 48 may ensure that the lower cultivation shelf 30*b* is completely introduced and water supply and drainage are performed at an accurate position. In addition, a water level detection device 49 for detecting the water level of the lower cultivation shelf 30*b* may be provided on the inner top surface of the pump cover 81.

The shelf detection device 48 and the water level detection device 49 provided inside the pump cover 81 may be the same as the shelf detection device 48 and the water level detection device 49 provided inside the lower lighting device 40*b*.

Hereinafter, the structure of the water tank 70 will be described in more detail with reference to drawings.

Figure 44:
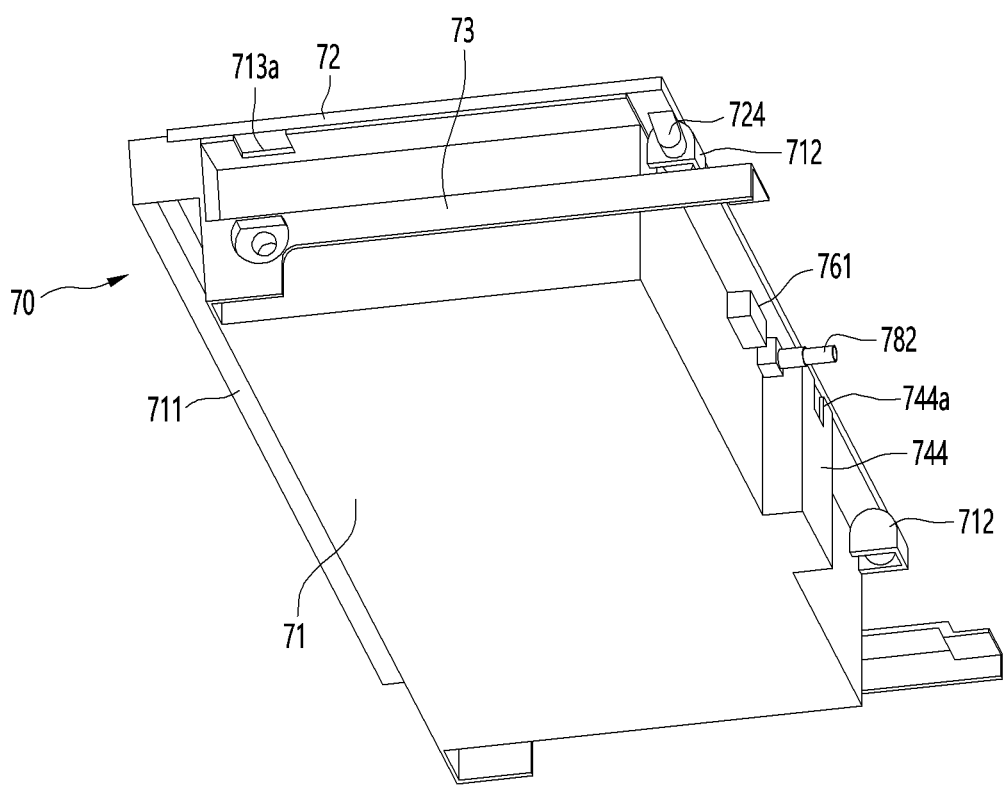
FIG. 44 is a perspective view of the water tank as viewed from below.
Figure 45:
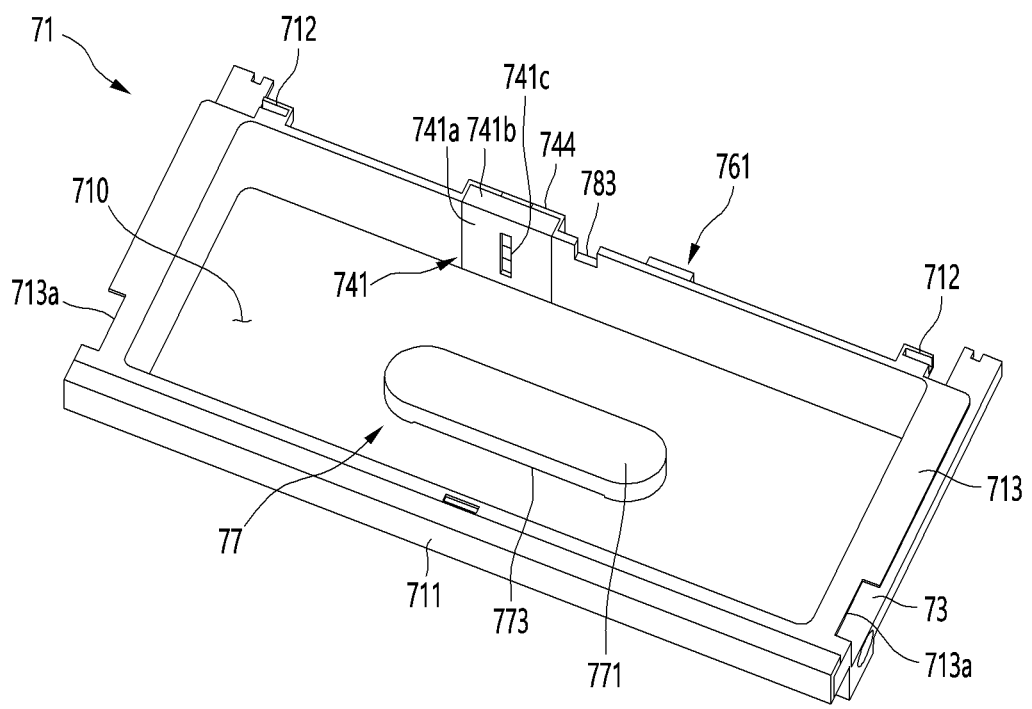
FIG. 45 is a perspective view illustrating the inside of the tank body of the water tank.
Figure 46:
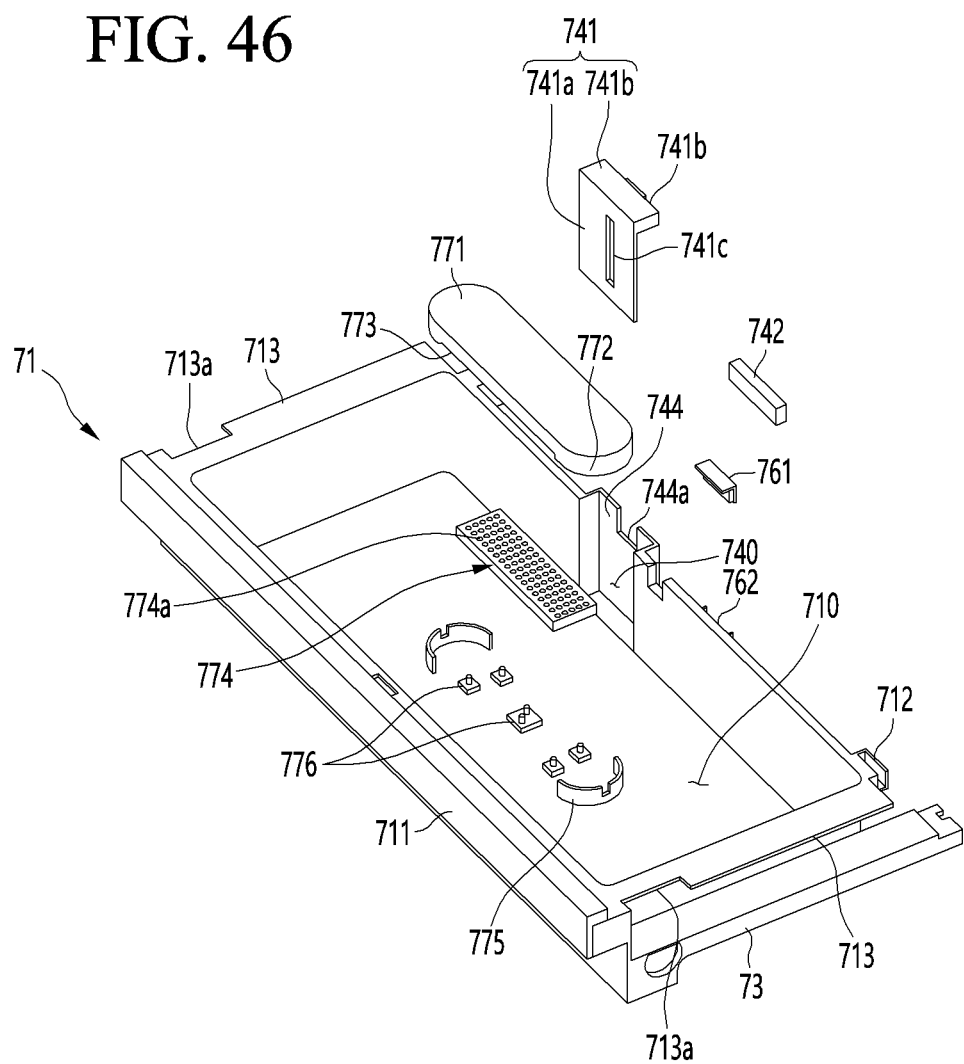
FIG. 46 is an exploded perspective view of the tank body.
Figure 47:
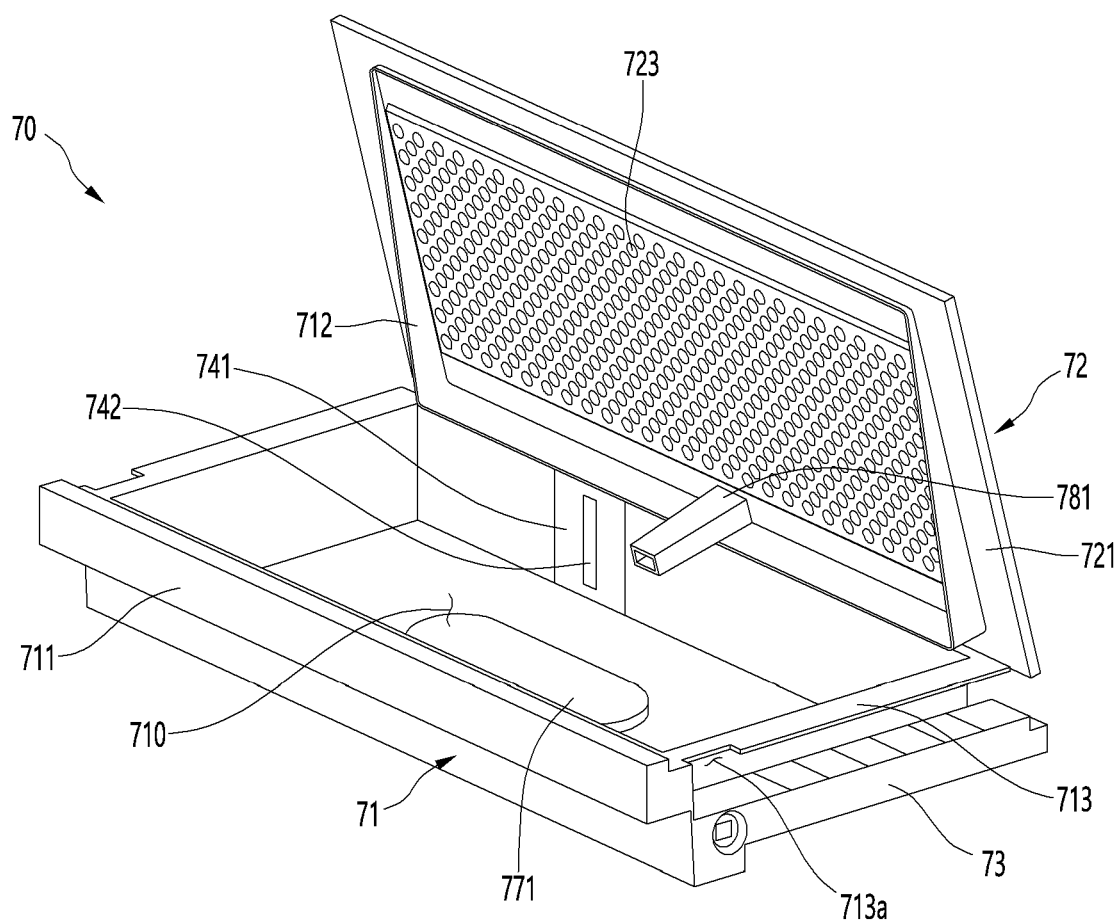
FIG. 47 is a perspective view of the water tank in which the tank cover is opened.
Figure 48:
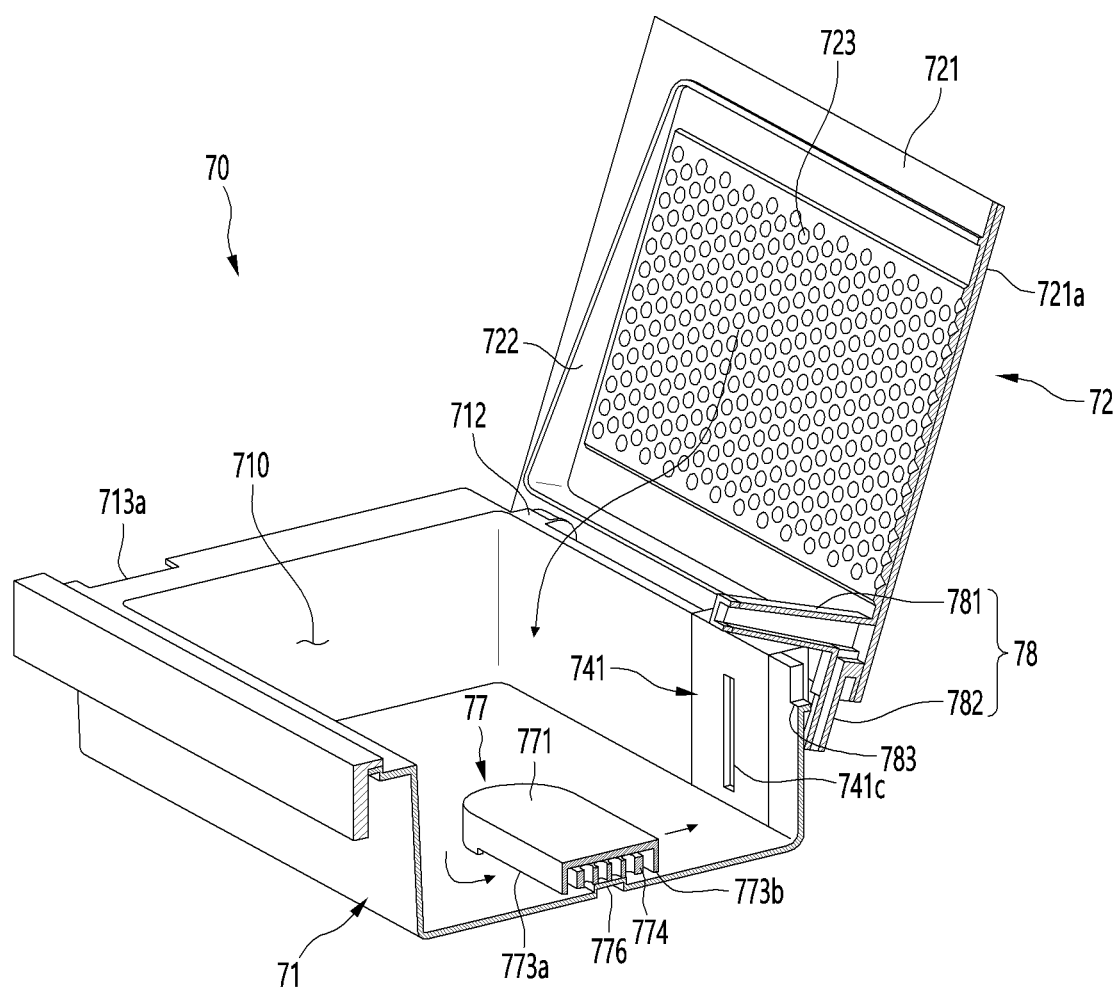
FIG. 48 is a cut-away perspective view illustrating a state where the tank cover of the water tank is fully opened.

FIG. 44 is a perspective view of the water tank as viewed from below, FIG. 45 is a perspective view illustrating the inside of the tank body of the water tank, FIG. 46 is an exploded perspective view of the tank body, FIG. 47 is a perspective view of the water tank in which the tank cover is opened, and FIG. 48 is a cut-away perspective view illustrating a state where the tank cover of the water tank is fully opened.

As illustrated in the drawing, the water tank 70 includes a tank body 71 in which water supplied to the cultivation shelf 30 and water drained from the cultivation shelf 30 are stored, and the tank body 71 may include a tank cover 72 that opens and closes the open top surface.

A tank handle 711 that a user can hold may be formed on the front surface of the tank body 71 to introduce and withdraw the water tank 70, and on both left and right sides of the tank body 71, a rail mounting portion 73 coupled with the tank rail 79 may be formed. The rail mounting portion 73 may be mounted in a form to be seated on the tank rail. Accordingly, the water tank 70 may be mounted inside the cultivation space 100 to be introduced and with drawn.

Further, side edges 713 protruding outward may be formed at upper ends of both sides of the tank body 71, and cover grooves 713a recessed inward may be formed in the side edges 713. When the tank cover 72 is opened, the user can lift and open the tank cover 72 through the cover groove 713a.

Cover connection portions 712 to which cover rotation shafts 724 protruding from both rear ends of the tank cover 72 are mounted may be formed at both left and right ends of the rear surface of the tank body 71. Therefore, the tank cover 72 can be rotated based on the cover rotation shafts 724, and the open top surface of the tank body 71 can be approached by the rotation of the tank cover 72. Accordingly, water may be replenished by opening the tank cover 72 in a state where the water tank 70 is introduced and withdrawn. In addition, it may be possible to adjust the concentration of water in the water tank 70, that is, the culture medium, by opening the tank cover 72 and introducing nutrients necessary for plant growth.

Meanwhile, a water level display portion 744 may be formed on the rear surface of the tank body 71. In addition, a valve insertion port 744a may be formed at an upper end of the rear surface of the water level display portion 744. The valve insertion port 744a may be located at a position corresponding to the drain valve 881 and may be formed to a size into which the drain valve 881 can be inserted. Since the drain valve 881 is inserted into the valve insertion port 744a, it may be referred to as a valve inlet.

When the water tank 70 is introduced, the drain valve 881 may be inserted into the valve insertion port 744a and may be configured to be opened in contact with the display portion cover 741 inside the tank body 71. Accordingly, water drained through the drain pipe 89 may flow into the water tank 70 through the drain valve 881.

In detail, the water level display portion 744 protrudes rearward from the rear surface of the tank body 71 and may form a space recessed backward on the inside. In addition, the water level display portion 744 may be located at a position corresponding to the drain valve 881, and the valve insertion port 744a may be formed in the water level display portion 744. The valve insertion port 744a may be formed at a corresponding position so that the front case 881b of the drain valve 881 can be inserted when the water tank 70 is inserted.

In addition, a display portion cover 741 may be formed on an inner surface of the tank body 71 corresponding to the water level display portion 744. The display portion cover 741 is coupled to the water level display portion 744, and a space in which the tank floater 742 is accommodated may be formed between the water level display portion 744 and the display portion cover 741. In addition, the front end of the drain valve 881 inserted through the valve insertion port 744a may come into contact with the display portion cover 741 to be opened.

The display portion cover 741 indicates the water level of the water tank 70 and may be spaced apart from the rear surface of the water level display portion 744. In addition, the display portion cover 741 may form the same plane as the inner surface of the tank body 71 in a state of being mounted on the water level display portion 744.

The display portion cover 741 as a whole may include a cover front surface 741a spaced apart from the water level display portion 744 and a cover top surface 741b extending rearward from an upper end of the cover front surface 741a.

In a state where the display portion cover 741 is mounted, the front surface 741a of the cover may form an inner surface of the tank body 71. In addition, the cover front surface 741a may shield the top surface of the inner space 740 of the water level display portion 744.

In addition, the front cover 741a may extend from the bottom surface of the tank body 71 to the top of the tank body 71. In addition, a display portion opening 741c cut in a vertical direction may be formed in the front surface 741a of the cover. Water inside the tank body 71 may flow into a space spaced apart between the display portion cover 741 and the tank body 71 through the display portion opening 741c.

A tank floater 742 may be formed in the space 740 between the display portion cover 741 and the tank body 71. The tank floater 742 may be formed of a foam material that floats on water and may be formed to have an identifiable color. Therefore, the tank floater 742 can move up and down according to the water level of the tank body 71, and the water level of the tank body 71 can be intuitively displayed through the display portion opening 741c.

In addition, the tank floater 742 may include a magnet, and a tank level detection device 743 may be provided on a front surface of the pump cover 81 corresponding to the display portion cover 741. The tank level detection device 743 may detect the water level of the water tank 70 by detecting a change in the magnetic field of the magnet of the tank floater 742.

For example, the tank level detection device 743 may be disposed at the lower end of the pump cover 81, and thus, when the magnet is located at a position corresponding to the tank level detection device 743, the water tank 70 can detect that the water level is low. When it is detected that the water level of the water tank 70 is low, the control portion 27 of the apparatus for cultivating plants 1 may inform the user of water replenishment, and supply water to the cultivation shelf 30 as needed may be discontinued.

Meanwhile, in a state where the water tank 70 is completely introduced, the drain valve 881 may be inserted through the valve insertion port 744a. In addition, the drain valve 881 may be opened in contact with the display portion cover 741 in the space of the water level display portion 744, and water supply to the inside of the water tank 70 becomes possible.

In addition, a water outlet groove 783 through which a tank outlet 78 to be described below may pass may be formed on a rear surface of the tank body 71. The water outlet groove 783 may be recessed downward from an upper end of the tank body 71, and the tank water outlet 78 may be introduced and withdrawn during a rotation operation for opening and closing the tank cover 72.

In detail, the tank outlet 78 fixed to the tank cover 72 may pass through the water outlet groove 783 when the tank cover 72 is closed. In addition, when the tank cover 72 is opened, the tank outlet 78 rotates together with the tank cover 72, and at this time, the water outlet groove 783 recessed in the upper portion of the tank body 71 is formed so that it can evacuate without interfering with the rotating tank outlet 78.

Meanwhile, the tank outlet 78 is a portion through which water supplied to the cultivation shelf 30 is discharged from the inside of the water tank 70 and may protrude backward from the rear surface of the tank body 71.

In addition, an end of the tank outlet 78 may be inserted into a fitting portion 811 exposed on the front surface of the pump cover 81 when the water tank 70 is introduced. The fitting portion 811 may communicate with the sub-tank 82, and the sub-tank 82 may be connected with the pump 83. Accordingly, water discharged through the tank outlet 751 can be supplied to the cultivation shelf 30 through the sub-tank 82, the pump 83, and the water supply pipe 84.

In addition, the tank detection member 761 may be provided on the rear surface of the tank body 71. The tank detection member 761 may be located at a position facing the tank detection device 812 provided inside the pump cover 81, and may be configured to detect whether the water tank 70 is introduced.

In a state where the water tank 70 is not completely introduced, drainage and water supply operations are not smooth, and in particular, the drained water leaks and is discharged into the cultivation space 100 instead of the water tank 70, so that the cultivation space 100 may be contaminated. Accordingly, it is possible to detect whether the water tank 70 is completely introduced and control the driving of the driving device 86 and the pump 83 according to the detected state. In addition, when the water tank 70 is not introduced, this may be notified through the display 14.

Meanwhile, the tank body 71 may form a water storage space 710 opened upward. Water for supplying water to the cultivation space 100 and water recovered from the cultivation space 100 may be stored inside the water storage space 710. Of course, the water in the water storage space 710 may be mixed with nutrients and stored as a culture medium. Meanwhile, the water storage space 710 of the water tank 70 may be referred to as a first water storage space to be distinguished from the water storage space of the sub-tank 82 to be described below.

A purifying member 740 may be provided on the bottom surface of the water storage space 710. The purifying member 740 is to purify the water inside the water tank 70 and may be formed of a porous material containing a component capable of purifying water. For example, the purifying member 740 may be formed of a material such as activated carbon or zeolite.

The purifying member 740 may have the plurality of perforations, and as the water inside the water tank 70 passes through the purifying member, substances that may cause green algae or mold may be adsorbed. Accordingly, water circulating between the water tank 70 and the cultivation shelf 30 can be purified while passing through the purifying member 740.

The purifying member 740 may be formed in a flat plate shape so as to be disposed on the bottom surface of the water storage space 710, and may be configured to be accommodated inside the purifying member case 77. Further, a purifying member support portion 776 protruding upward may be formed on an inner lower surface of the tank body 71, that is, a bottom surface of the water storage space 710. The purifying member 740 may be slightly spaced from the bottom surface of the water storage space 710 by the purifying member support portion 776, and the water inside the water tank 70 passes both the upper and lower surfaces of the purifying member, and thus the contact area can be increased.

A case fixing portion 775 for fixing the purifying member case 77 may be further formed on the bottom surface of the water storage space 710. The case fixing portion 775 may be formed in a round shape corresponding to the shape of both left and right sides of the purifying member case 77. Accordingly, both left and right sides of the inner surface of the purifying member case 77 may be constrained by the case fixing portion 775.

The lower surface of the purifying member case 77 is opened and may be formed to accommodate the purifying member 740 therein. In detail, the purifying member case 77 may include a plate-shaped top surface 771 forming the top surface and a case circumferential portion 772 extending downward along the circumference of the top surface 771 of the case.

Both ends of the case circumferential portion 772 may have a shape corresponding to those of the case fixing portion 775. In addition, when the purifying member case 77 is mounted, the case fixing portion 775 may be inserted into the inner surface of the case circumferential portion 772 so as to come into close contact with it.

Meanwhile, a front groove 773a and a rear groove 773b may be respectively formed on the front and rear surfaces of the case circumferential portion 772. The front groove 773a and the rear groove 773b are recessed at the bottom of the case circumference 772, and when the purifying member case 77 is mounted on the bottom surface of the water storage space 710, the purifying member case 77 is spaced apart from the bottom surface of the water storage space 710 so that water inside the water storage space 710 can flow in and out. Accordingly, the water accommodated in the tank body 71 is purified by the purifying member 740 while flowing in and out the purifying member case 77, thereby preventing green algae and mold from occurring.

The tank cover 72 may be provided above the tank body 71, and the water storage space 710 may be opened and closed by the tank cover 72. The tank cover 72 may include a cover plate 721 formed in a plate shape to shield the open top surface of the tank body 71 and a cover guide portion 722 protruding from the lower surface of the cover plate 721.

The cover plate 721 may form a top surface of the water tank 70 in a closed state. A separate deco plate 721a for outer appearance may be further provided on the top surface of the cover plate 721. For example, the deco plate 721a may form the entire top surface of the cover plate 721 and may be formed of a glass material.

The cover rotation shaft 724 serving as a rotation shaft of the tank cover 72 may be formed at both left and right sides of the rear end of the cover plate 721 and may be rotatably coupled to the cover connection portion 712 of the tank body 71. can be combined Accordingly, the tank cover 72 is rotatably mounted on the tank body 71, and the water storage space 710 can be opened and closed by rotation.

The cover guide portion 722 protrudes downward from the lower surface of the cover plate 721 and may be formed in a shape corresponding to the open top surface of the water storage space 710. Accordingly, when the tank cover 72 is closed, the cover guide portion 722 may come into contact with the inner surface of the water storage space 710.

Further, the cover guide portion 722 may have a rear surface extending downward more than a front surface, and both sides of the cover guide portion 722 may have an inclination that decreases toward the front. In particular, the rear surface of the cover guide portion 722 may extend to be located in an inner area of the water storage space 710 in an open state. Therefore, when the water droplets formed on the rear surface of the tank cover 72 flow down due to the opening of the tank cover 72, they can flow into the water storage space 710 through the cover guide portion 722. Accordingly, when the tank cover 72 is opened, water may be prevented from leaking out of the water tank 70.

Meanwhile, a water collection portion 723 may be formed in an inner area of the cover guide portion 722. The water collection portion 723 may be formed of grooves small enough to allow water droplets to form and may occupy most of the inner area of the cover guide portion 722.

Therefore, even if condensation occurs on the rear surface of the tank cover 72, water droplets can be maintained on the water collector 723 due to the surface tension of water, and when the tank cover 72 is opened, a large amount of water may be prevented from flowing along the tank cover 72.

In addition, a tank outlet 78 may be formed at the middle portion of the rear end of the tank cover 72. The tank outlet 78 may form a flow path for supplying water from the water tank 70 to the outside of the water tank 70, extends from an inner lower end of the tank cover 72, and thus may be formed to protrude from the rear surface of the water tank 70.

Meanwhile, the tank water outlet 78 may include a first water outlet 781 and a second water outlet 782. The first water outlet 781 may extend from the lower surface of the tank cover 72 to the lower surface of the tank body 71 to form a first flow path. At this time, at least a portion of the lower end of the first water outlet 781 may be spaced apart from the lower surface of the tank body 71 to form an inlet through which water inside the tank body 71 is introduced.

In addition, the second water outlet 782 may form a second flow path by extending from an upper end of the first water outlet 781 to a rear direction in which the water tank 70 is introduced, pass through the tank body 71, and thus may be extended to the rear direction. At this time, the second flow path may communicate with the first flow path.

In addition, the second water outlet 782 may be inserted into the fitting portion 811 in a state where the water tank 70 is introduced so that the water tank 70 and the sub-tank 82 communicate with each other.

The second water outlet 782 may protrude through the water outlet groove 783. In addition, the second water outlet 782 can be rotated together with the rotation of the tank cover 72, and even when the tank cover 72 is rotated, the second water outlet 782 does not interfere with the tank body 71, by the recessed water outlet groove 783.

Meanwhile, the tank outlet 78 may be integrally formed with the tank cover 72. At least a portion of the tank cover 72 may be injection-molded from a plastic material, and the tank outlet 78 may be molded together during molding of the tank cover 72. For example, the tank outlet may be formed together with the cover plate 721.

Therefore, the tank outlet 78 is not formed with a coupling portion through which the water may leak, and when the water inside the water tank 70 is suctioned in, a negative pressure is maintained so that a set amount of water can be supplied via the first and second flow paths when the pump 83 is driven.

If the tank water outlet 78 is separately molded into a first water outlet 781 and a second water outlet 782 and has a structure coupled to the tank cover 72, short-circuits may occur between the first flow path and the second water outlet 782 and external air may be introduced when the pump 83 is driven due to assembly distribution.

When water and air are mixed into the tank outlet 78 during the suction process by driving the pump 83, normal operation of the pump 83 may be hindered by the air introduced into the pump 83. However, since the tank outlet 78 in the present embodiment is integrally molded with the tank cover 72 and there is no assembly portion between the first flow path and the second flow path, the occurring possibility of such a problem may be completely prevented. In addition, the cover plate 721 constituting the tank cover 72, the cover guide portion 722, the water collection portion 723, and the tank outlet 78 may be integrally injection-molded.

The water of the water tank 70 discharged through the tank outlet 78 may be supplied to the cultivation shelf 30 through the water supply pipe 84 through the sub-tank 82 and the pump 83.

Hereinafter, the structure of the sub-tank 82 will be described in more detail with reference to drawings.

Figure 49:
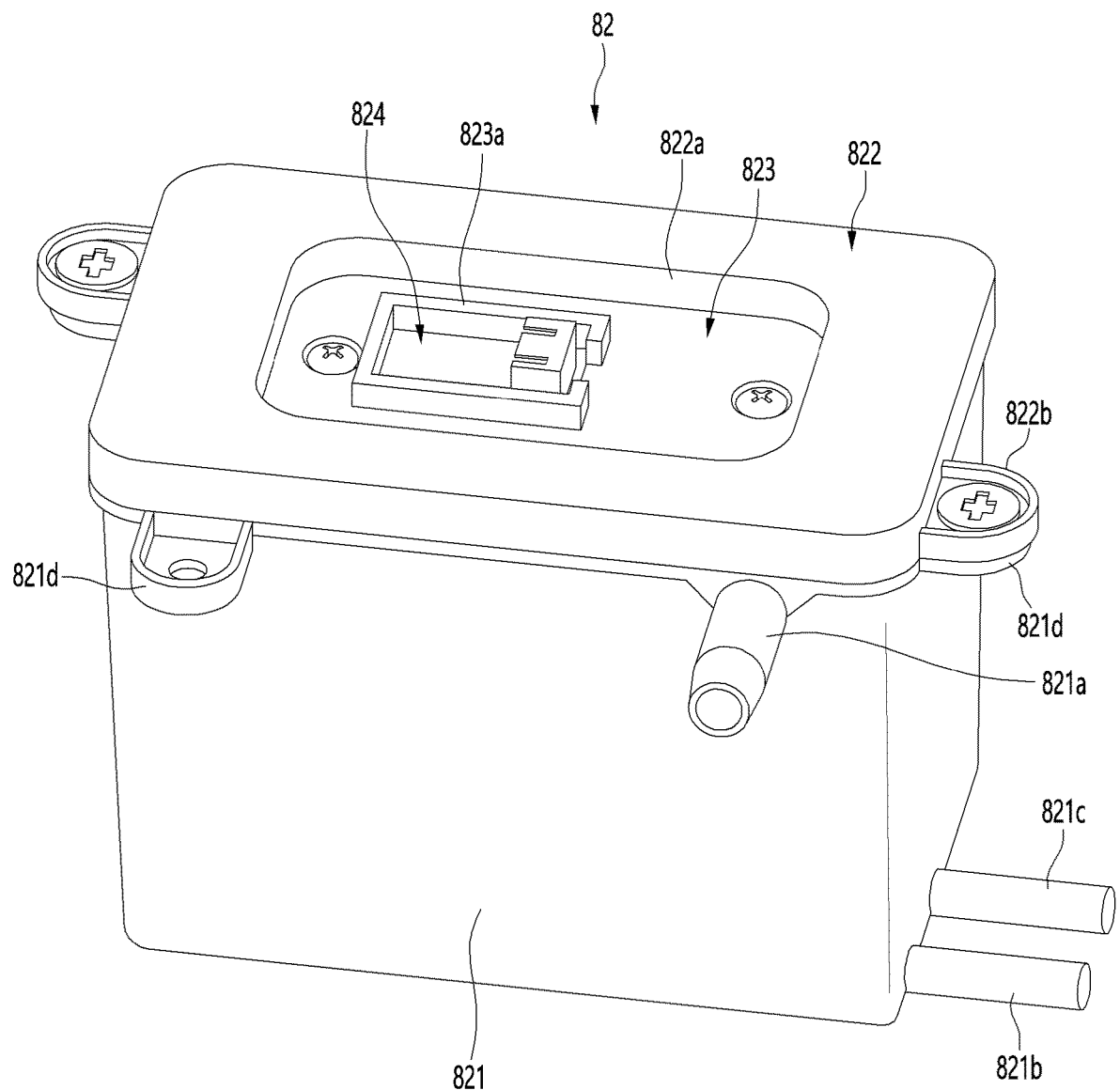
FIG. 49 is a perspective view of a sub-tank according to an embodiment of the present disclosure.
Figure 50:
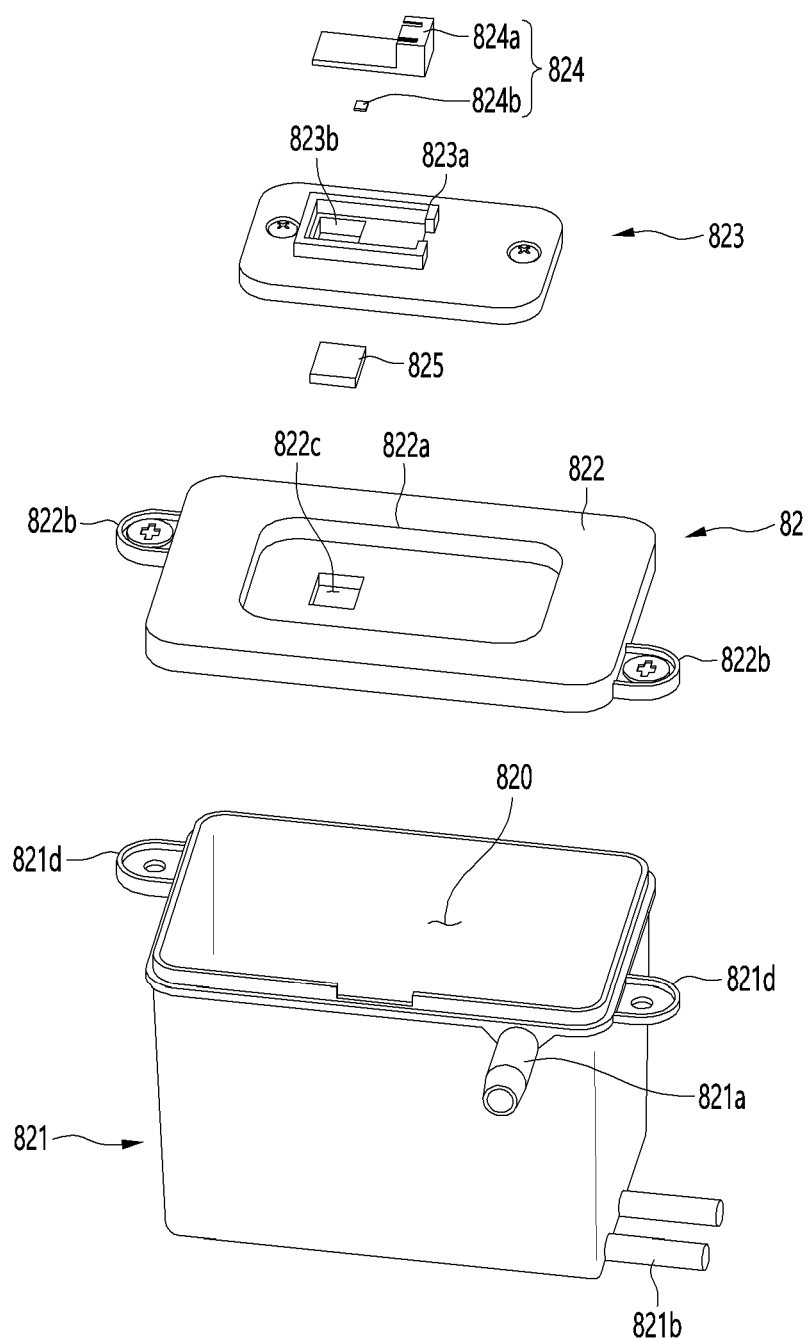
FIG. 50 is an exploded perspective view of the sub-tank.

FIG. 49 is a perspective view of a sub-tank according to an embodiment of the present disclosure, and FIG. 50 is an exploded perspective view of the sub-tank.

The sub-tank 82 is for ensuring operation reliability of the pump 83, and the inlet side of the pump 83 is always filled with water, and thus it is possible to prevent a problem that the pump 83 cannot discharge a fixed amount of water due to a problem in that air is mixed when the pump 83 is driven.

Accordingly, the water contained in the sub-tank 82 maintains a constant water level and must pass through the sub-tank 82 before being supplied to the pump 83. At this time, the capacity of the sub-tank 82 is required for the initial maneuver of the pump 83, and the quantity which is capable of guaranteeing sterilization effect can be accommodated by the UV-lamp (UV-LED: 824) provided in the sub-tank 82. For example, the amount of water accommodated in the sub-tank 82 enables the initial driving of the plurality of pumps 83, and the capacity capable of effective sterilization by the UV lamp 824 may be 300 cc. The sub-tank 82 may be formed to provide a space in which 300 cc of water can be accommodated.

That is, the storage capacity of the sub-tank 82 may be designed in consideration of the initial driving of the pump 83 and the sterilizing ability of the UV lamp 824. Therefore, the capacity of the second storage space formed for water storage in the sub-tank 82 may be smaller than the capacity of the first storage space formed for water storage in the water tank 70.

In addition, the sub-tank 82 maintains a constant water level for the initial maneuver of the pump 83, and for this purpose, when the water level of the water tank 70 becomes a low water level, the driving of the pump 83 is stopped, and thus it is possible to prevent the water inside the sub-tank 82 from being lowered than the set water level.

Looking at the structure of the sub-tank 82 in detail with reference to the drawings, the sub-tank 82 may include a sub body 821 and a sub cover 822. In addition, a UV lamp 824 for sterilizing water inside the sub-tank 82 by irradiating ultraviolet rays (UV) is provided in the sub cover 822 to sterilize the water contained in the sub-tank 82.

In detail, the sub body 821 may be formed in a rectangular tubular shape with an open top surface. In addition, a state where water to be supplied to the pump 83 is accumulated is maintained inside the sub body 821. A water storage space for accommodating water is formed inside the sub body 821 and can be referred to as a second water storage space to distinguish from the water storage space of the water tank 70.

In addition, a body water inlet 821*a* to be connected to the fitting portion 811 may be formed on the upper portion of the sub body 821. The body water inlet 821*a* may protrude forward and may be inserted into the fitting portion 811 to communicate with the water tank 70.

The water level inside the sub-body 821 may be maintained at or higher than the level of the body water inlet 821*a*. Therefore, a state of being filled with water without air is maintained between the body water inlet 821*a* and the tank water outlet 78, and when the pump 83 is driven, the water in the water tank 70 may be immediately introduced. That is, a vacuum state can be maintained so that external air does not flow into the flow path from the inside of the water tank 70 to the input side of the pump 84. In addition, the inside of the sub body 821 may be configured to maintain a full water level or a set water level. In addition, the sub body 821 may maintain a state where water is completely filled therein.

A body water outlet 821b may be formed at a lower end of one side of the sub body 821. The body water outlet 821b may be connected to the pump 83 and becomes a passage through which water inside the sub body 821 is introduced when the pump 83 is driven. The body water outlet 821b may be configured to correspond to the number of pumps 83.

For example, the body water outlet 821b is composed of two components, that is, an upper outlet and a lower water outlet, and may be connected to the upper pump 83a and the lower pump 83b by pipes, respectively. With this structure, independent driving of the upper pump 83a and the lower pump 83b can be ensured, and by operating time control of the upper pump 83a and the lower pump 83b, an accurate amount of water can be supplied to the upper cultivation shelf 30a and the lower cultivation shelf 30b.

A body coupling portion 821d protruding outward may be formed at an upper end of the sub body 821. The body coupling portion 821d may be coupled to the cover coupling portion 822b formed on the sub cover 822. A sealing structure may be provided between the sub body 821 and the sub cover 822, and thus the inside of the sub body 821 may be coupled in a sealed state.

The sub cover 822 may be formed in a shape corresponding to the open top surface of the sub body 821 and may be combined with the sub body 821 to shield the open top surface of the sub body 821.

Further, a UV lamp 824 capable of sterilizing water inside the sub body 821 by irradiating ultraviolet rays into the sub body 821 may be provided in the sub cover 822. The UV lamp 824 may include a UV LED 824b for irradiating ultraviolet rays and a UV PCB 824a equipped with the UV LED 824b and controlling driving of the UV LED 824b.

In detail, a cover recessed portion 822a recessed downward may be formed on an top surface of the sub cover 822. In addition, a recessed portion opening 822c may be formed inside the cover recessed portion 822a. In addition, a PCB cover 823 may be mounted inside the cover recessed portion 822a. The PCB cover 823 allows the UV lamp 824 to be fixedly mounted and may be exposed upward while being mounted on the sub cover 822.

The PCB cover 823 may be formed in a shape corresponding to the cover recessed portion 822a, and a screw penetrating the PCB cover 823 is fastened to the cover recessed portion 822a so that the PCB cover 823 may be fixedly mounted on the sub cover 822.

In addition, a lamp mounting portion 823a to which the UV lamp 824 is fixedly mounted may be formed on the PCB cover 823. The lamp mounting portion 823a may extend upward along the circumference of the UV lamp 824 to fix the UV lamp 824 therein.

The UV PCB 824a may be fixedly mounted on the lamp mounting portion 823a, and at least a portion of the lamp mounting portion 823a may be exposed to the top surface of the PCB cover 823, that is, the top surface of the sub cover 822. In addition, an externally exposed portion of the UV PCB 824a may be connected to a electric wire and a connector.

A cover opening 823b corresponding to the recessed portion opening 822c may be formed in the PCB cover 823. The cover opening 823b may communicate with the recessed portion opening 822c. In addition, when the UV lamp 824 is mounted, the UV LED 824b constituting the UV lamp 824 may be positioned inside the cover opening 823b.

A lamp cover 825 may be provided on a lower surface of the recessed portion opening 822c to shield the opened lower surface of the recessed portion opening 822c. The lamp cover 825 may be formed of a transparent glass or plastic material so that ultraviolet rays irradiated from the UV LED 824b may pass therethrough. Accordingly, the lamp cover 825 may be referred to as a transparent window. In addition, water inside the sub-tank 82 may be protected from being directed to the UV LED 824b.

Therefore, when the UV LED 824b is turned on, the light emitted from the UV LED 824b may be irradiated into the sub-tank 82 through the cover opening 823b, the recessed portion opening 822c, and the lamp cover 825.

Meanwhile, the UV lamp 824 may be turned on even while the pump 83 is driven and the water inside the sub-tank 82 flows. Accordingly, the water flowing through the sub-tank 82 can be sterilized by the ultraviolet rays irradiated from the UV lamp 824 while passing through the lamp cover 825.

Of course, other sterilization devices capable of sterilizing stored water may be provided in the sub-tank 82 as needed, in addition to the UV lamp 824.

Since a structure in which water containing nutrient solution is accommodated in the water tank 70 and circulated has, the UV lamp 824 may be installed in the water tank 70, but in a case where the user introduces and withdraws the water tank 70, there is a possibility of harm to the human body by exposure to ultraviolet rays emitted from the UV lamp 824, and it may be difficult to irradiate the entire inside of the water tank 70 having a relatively larger water storage area compared to the sub-tank 82 with ultraviolet rays for sterilization. Therefore, by disposing the UV lamp 824 in the sub-tank 82, which remains sealed compared to the water tank 70 and has a relatively small water storage area, potential harm to the user's body is completely prevented and efficient sterilization is achieved.

Hereinafter, the arrangement of the cultivation shelf 30 and the water supply module and the drain module will be described in more detail with reference to the drawings.

Figure 51:
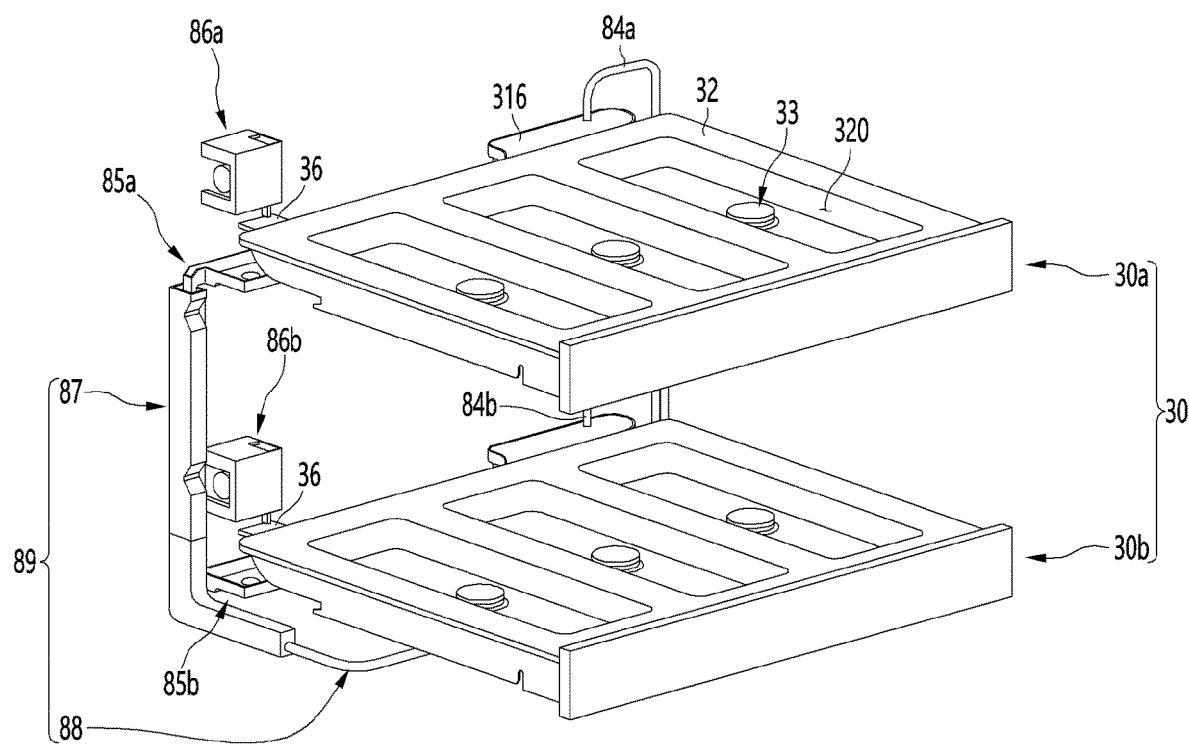
FIG. 51 is a perspective view of a cultivation shelf and a water supply and drain module, which are one component of the apparatus for cultivating plants.
Figure 52:
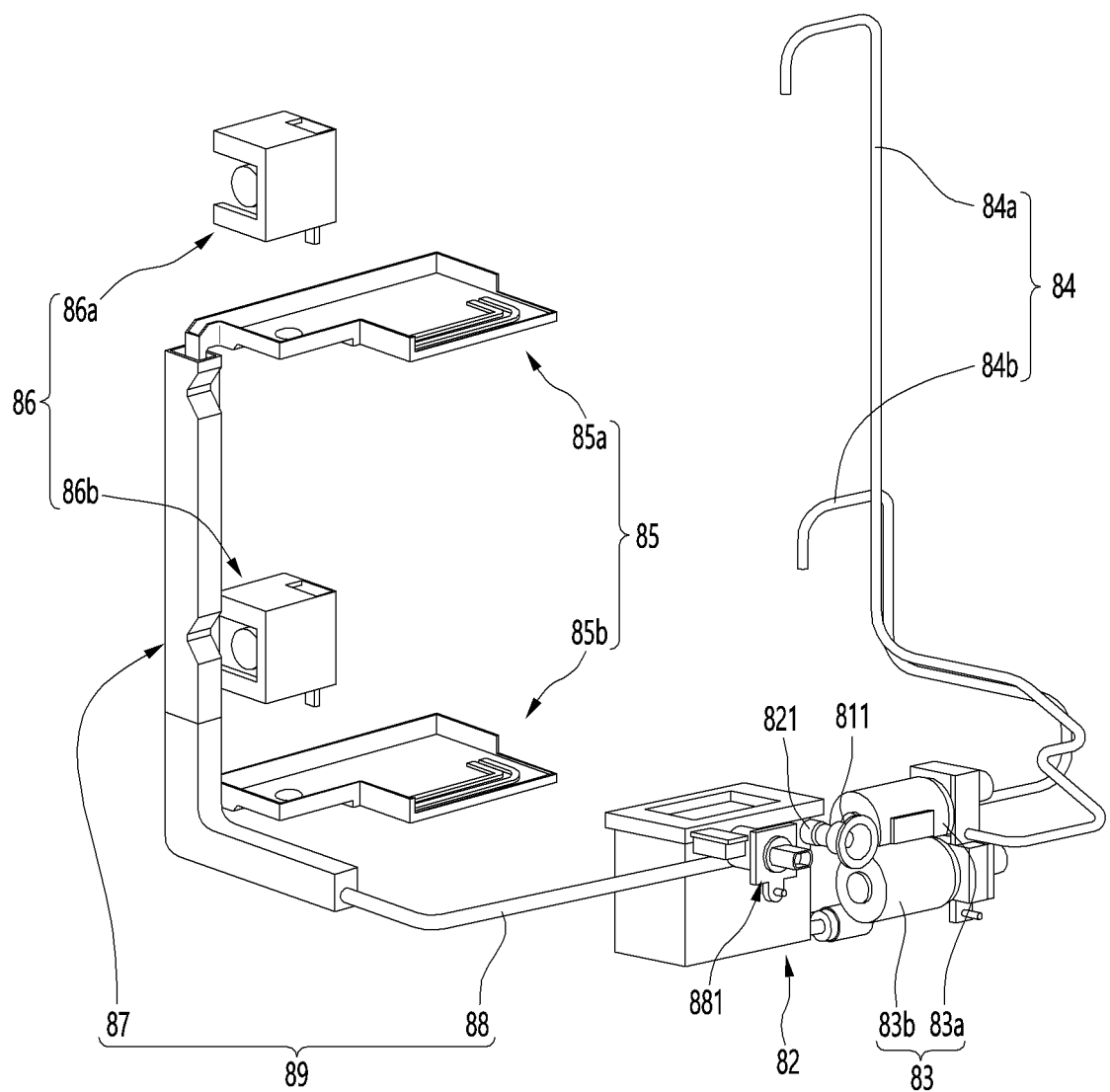
FIG. 52 is a perspective view of the water supply module and drain module.
Figure 53:
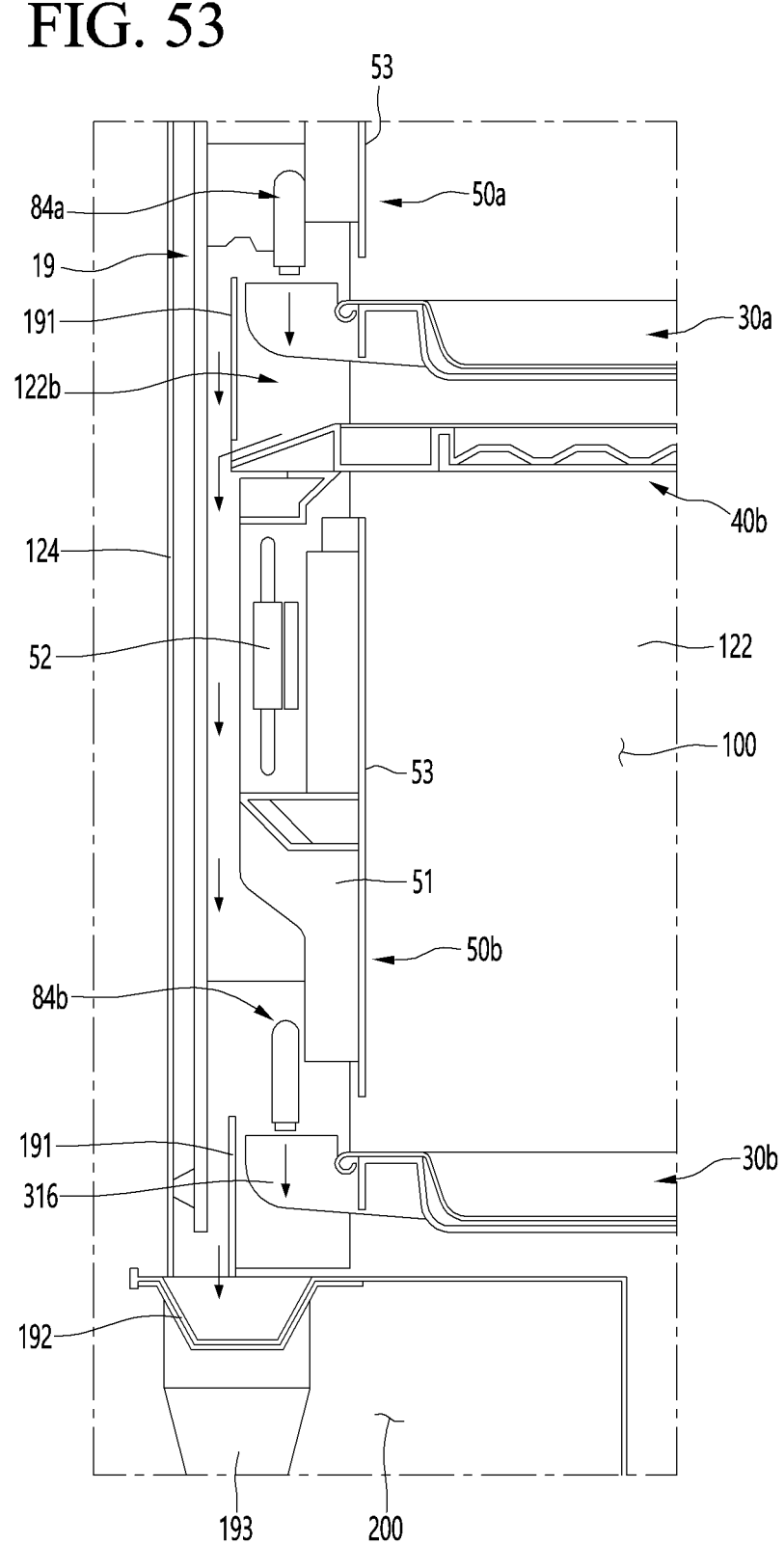
FIG. 53 is a side cross-sectional view illustrating the arrangement of the water supply pipe and the cultivation shelf.

FIG. 51 is a perspective view of a cultivation shelf and a water supply and drain module, which are one component of the apparatus for cultivating plants, FIG. 52 is a perspective view of the water supply module and drain module, and FIG. 53 is a side cross-sectional view illustrating the arrangement of the water supply pipe and the cultivation shelf.

As illustrated in the drawings, the plurality of cultivation shelves 30 may be arranged vertically. For example, the cultivation shelf 30 may include an upper cultivation shelf 30a disposed at an upper side and a lower cultivation shelf 30b disposed at a lower side. The upper cultivation shelf 30a may be referred to as a first cultivation shelf, and the lower cultivation shelf 30b may be referred to as a second cultivation shelf.

The upper cultivation shelf 30a and the lower cultivation shelf 30b may be spaced a set interval from each other, and a space above the upper cultivation shelf 30a and a space above the lower cultivation shelf 30b may be spaced apart from each other to secure a sufficient height at which so that plants are capable of being grown.

Also, the water supply module and the drain module, which are respectively disposed on both left and right sides of the cultivation shelf 30, may be connected to the water tank 70. Thus, as water is circulated between the water tank 70 and the cultivation shelf 30, the seed package 90 may be supplied with an appropriate amount of water and nutrients in time.

The water supply module may be disposed at the right side of the cultivation shelf 30 on which the water supply portion 316 is disposed. Also, the water supply module may include the pump 83 and the water supply pipe 84. The pump 83 and the water supply pipe 84 may be configured to provide independent water supply to the upper cultivation shelf 30a and the lower cultivation shelf 30b. For example, the pump 83 may include an upper pump 83a and a lower pump 83b, and the water supply pipe 84 may include an upper water supply pipe 84a and a lower water supply pipe 84b.

The pump 83 may adjust an amount of water supplied to the cultivation shelf 30 through control, and thus, a quantity of water may be supplied. For example, the pump 83 may operate 8 times per day, that is, at a time period of about 3 hours. Thus, when water is supplied once, about 1 liter of water may be supplied. Here, an amount of water supplied may be controlled through a driving time of the pump 83. If necessary, the water supply module may include a flow sensor, and as a flow rate is sensed through the flow sensor, the pump 83 may be driven to be controlled to provide a quantitative water supply.

At least a portion of the water supply pipe 84 may be provided as a metal pipe. Particularly, an end of the outlet-side water supply pipe 84 adjacent to the cultivation space 100 may be bent to be maintained in its position and shape. Thus, when water is supplied to the cultivation shelf 30, an accurate water supply position may be maintained to prevent the water from leaking or splashing outside the cultivation shelf 30.

As illustrated in FIG. 53, an end of the water supply pipe 84 may extend toward the water supply portion 316 disposed at the rear end of the cultivation shelf 30. The water supply portion 316 may protrude backward from the rear end of the cultivation shelf 30 and have an opened top surface. Also, the end of the water supply pipe 84 may be disposed above the opened top surface of the water supply portion 316 and be bent to face the opened top surface of the water supply portion 316.

When the cultivation shelf 30 is completely introduced, the water supply portion 316 at the rear end of the cultivation shelf 30 may be inserted into a space below the blower 50. Therefore, when the cultivation shelf 30 is completely introduced, the water supply portion is covered by the blower 50 so that the water supply portion 316 is not exposed to the outside.

In addition, in a state where the cultivation shelf 30 is retracted, the water supply portion 316 may be vertically aligned with the outlet of the water supply pipe 84. The water supply portion 316 is formed at the right end of the rear end of the cultivation shelf 30 and may be adjacent to the right side of the cultivation space 100. In addition, the water supply pipe 84 protrudes from the right side of the cultivation space 100 and can be easily accessed to the water supply portion 316. That is, the end of the water supply pipe 84 can be aligned with the water supply portion 316 without excessively protruding from the side plate 122, and the water supply to the water supply portion 316 may be guaranteed by maintaining an accurate arrangement position.

The drain pan 192 may be provided vertically below the water supply portion 316. The drain pan 192 is recessed at the rear end of the bottom surface of the cultivation space 100, and water falling from the water supply portion 316 can be guided. In addition, a drain hose 193 for discharging water to the condensate receiver 255 disposed inside the machine room 200 may be provided in the drain pan 192.

Therefore, even if water splashes out of the water supply portion 316 while supplying water through the water supply pipe 84, the falling water may be collected in the drain pan 192, and may be discharged into the condensate receiver 255 through the drain hose 193.

In addition, the drain surface 418 at the rear end of the lighting device 40 may be positioned below the rear end corresponding to the rear end of the cultivation shelf 30. Therefore, even if water splashes toward the rear end of the lighting device 40 during water supply or drainage, the water can be guided to the rear through the drainage surface 418, and may be drained into the drain pan 192 located at the vertical downward position of the rear end of the drainage surface 418. Therefore, it is possible to prevent water from flowing into the lighting device 40.

In addition, the evaporator 19 may also be located in a area vertically above the drain pan 192, and therefore, all condensation generated in the evaporator 19 or in the blower 50 can be also discharged through the drain pan 192. Accordingly, it is possible to prevent water leakage into the cultivation space 100.

The water supply module may include the sub-tank 82. The sub-tank 82 may be disposed at a side of the pump 83 and be disposed behind the water tank 70. The sub-tank 82 may be connected to the water tank 70 and the pump 83 so that the water in the water tank 70 is supplied to the pump 83.

Also, the sub-tank 82 may be configured to be always maintained at a set water level. Thus, when the pump 83 is stopped and restarted, air may be prevented from being introduced, and water may be always filled in the inlet side of the pump 83. Thus, the pump 83 may ensure that an accurate amount of water is supplied through the time control. Also, even if the small pump 83 is used repeatedly for a long time, a reliable operation may be secured.

The drain module may be disposed at the left side of the cultivation shelf 30 on which the opening/closing member 36 is provided. The drain module may include a drain tray 85 and a drain pipe 89. The drain tray 85 may be disposed below the opening/closing member 36 that opens and closes a drain hole 319a of the cultivation shelf 30 to receive water from the cultivation shelf 30, which is drained from the drain hole 319a.

The opening/closing member 36 may be configured to open and close the drain hole 319a by rotation thereof and may operate by a driving device 86 provided above the opening/closing member 36. The driving device 86 may include an upper driving device 86a for opening the opening/closing member 36 of the upper cultivation shelf 30a and a lower driving device 86b for opening the opening/closing member 36 of the lower cultivation shelf 30b.

For example, the driving device 86 may have a structure in which a rod moves vertically by driving a motor, and when moving downward, the drain hole 319a may be opened by pressing the opening/closing member 36 to rotate. Also, when the rod moves upward, the opening/closing member 36 may be returned to its original position to close the drain hole 319a again.

That is, water of the cultivation shelf 30 may be drained by the operation of the driving device 86. The driving device 86 may operate after a set time elapses after water is supplied to the cultivation shelf 30. The set time may be set to a time at which water supplied to the cultivation shelf 30 and supplied to the seed package 90 is sufficiently supplied as the seeds. The seeds or plants inside the seed package 90 may absorb a sufficient amount of water within the set time after water is supplied into the seed package 90.

For example, the set time may be set to about 1 hour to about 1 hour 30 minutes. Therefore, the cultivation shelf 30 may be maintained in water supply state for at least the set time, and after the set time elapses, all the water inside the cultivation shelf 30 may be drained by driving the driving device 86. Thus, the inside of the cultivation shelf 30 and the seed package 90 may be maintained in empty state of water until resupplying of water starts, and mold or green algae may be prevented from occurring in the cultivation space 100.

Particularly, the blower 50 may be driven inside the cultivation space 100, and the water inside the cultivation shelf 30 may be more effectively removed due to the air circulation by the blower 50. Thus, the contaminated environment of the cultivation space 100 may be eliminated during a time period until the resupplying of water starts after the drain is completed.

The set time may be adjusted according to the type of crops. When the amount of water suitable for cultivated plants is large, the set time may be adjusted so that the water supply time increases, or water is more frequently supplied.

When a water level inside the cultivation shelf 30 exceeds an appropriate water level, the driving device 86 may be driven to forcibly drain the water from the cultivation shelf 30 regardless of the set time to prevent the water within the cultivation shelf 30 from overflowing.

The drain tray 85 may be connected to the drain pipe 89. The drain tray 85 may serve as a buffer for primarily accommodating water discharged from the cultivation shelf 30. Also, the drain tray 85 may have a predetermined area to prevent the falling water from being splashing or overflowing while the water is drained. Also, the water discharged from the cultivation shelf 30 may be guided toward the drain pipe 89 without overflowing.

The drain tray 85 may include an upper drain tray 85*a* provided below the upper cultivation shelf 30*a* and a lower drain tray 85*b* provided below the lower cultivation shelf 30*b*. Also, the upper drain tray 85*a* and the lower drain tray 85*b* may be connected to the drain pipe 89.

The drain pipe 89 may be configured to guide water from the drain tray 85 to the water tank 70 and may include a drain guide pipe 87 connected to the drain tray 85 and a drain tube 88 connecting the drain guide pipe 87 to the water tank 70.

The drain guide pipe 87 may be connected to both the upper drain tray 85*a* and the lower drain tray 85*b* and may extend in the vertical direction. The drain guide pipe 87 may have a sufficient inner space so as not to overflow or backflow even when a large amount of water is supplied from the drain tray 85 and may have a cross-sectional area greater than that of the drain tube 88.

An upper end of the drain guide pipe 87 may be connected to the upper drain tray 85*a* and may extend further downward than the lower drain tray 85*b*. Also, a lower end of the drain guide pipe 87 may be bent forward and may extend forward.

The drain guide pipe 87 may be disposed inside the side surface of the cultivation space 100. That is, the drain guide pipe 87 may be accommodated in a portion recessed in the side plate 122 so that the drain guide pipe 87 protrudes to the inside of the cultivation space 100 or is not exposed when viewed from the front side.

The drain tube 88 may be connected to a lower end of the drain guide pipe 87. The drain tube 88 may be provided in a tube shape having a diameter less than the cross-sectional area of the drain guide pipe 87 and may be made of a flexible material. Thus, the drain tube 88 may extend from an end of the drain guide pipe 87 to the water tank 70 and may be disposed inside the pump cover 81.

A drain valve 881 may be provided at the extending end of the drain tube 88. The drain valve 881 may be exposed to the outside of the pump cover 81 and may be connected to the valve insertion port 744*a* of the water tank 70 when the water tank 70 is mounted.

In detail, the drain valve 881 has a structure similar to a check valve, and can be opened while being inserted into the valve insertion port 744*a* when the water tank 70 is installed. Due to the opening of the drain valve 881, the drain pipe 89 and the water tank 70 may communicate with each other, and water drained from the cultivation shelf 30 may be introduced into the water tank 70.

Also, when the water tank 70 is withdrawn, the drain valve 881 may be closed by releasing contact with the water tank 70 to prevent the water in the drain pipe 89 from being drained. Thus, the inside of the cultivation space 100 may be prevented from being contaminated by the drained water while the water tank 70 is withdrawn.

As described above, the water tank 70 may be connected to the water supply module and the drain module. Thus, the water of the water tank 70 may be supplied to the upper cultivation shelf 30*a* and the lower cultivation shelf 30*b* by the water supply module, and the water from the upper cultivation shelf 30*a* and the lower cultivation shelf 30*b* may be collected to the water tank 70 by the drain module. That is, it may have a structure in which water can be circulated between the water tank 70 and the cultivation shelf 30.

Hereinafter, the structure of the drain tray 85 will be described in more detail with reference to the drawings. The drain tray 85 may include an upper drain tray 85*a* and a lower drain tray 85*b*, respectively, and the upper drain tray 85*a* and the lower drain tray 85*b* may have exactly the same shape. Therefore, hereinafter, the upper drain tray 85*a* and the lower drain tray 85*b* will be described without being distinguished.

Figure 54:
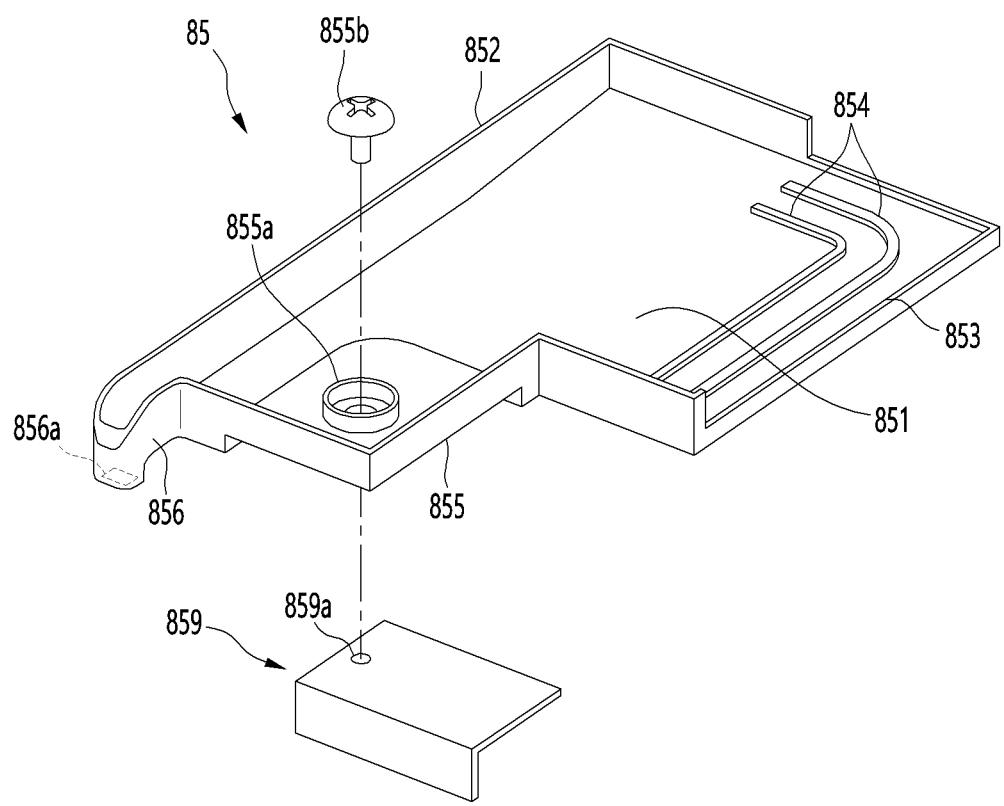
FIG. 54 is a perspective view of a drain tray according to an embodiment of the present disclosure.

FIG. 54 is a perspective view of a drain tray according to an embodiment of the present disclosure.

As illustrated in the drawing, the drain tray 85 may include a plate-shaped tray bottom surface 851 and a tray circumferential portion 852 extending upward along the circumference of the tray bottom surface 851.

The bottom surface 851 of the tray may be configured to form an area in which at least the drain portion 318 of the cultivation shelf 30, the drain hole 319*a*, and the drain guide pipe 87 may be included. That is, water drained from the drain portion 318 and the drain hole 319*a* of the cultivation shelf 30 may be formed to have a predetermined area so as to face the drain guide pipe 87. In addition, the tray bottom surface 851 is formed to be inclined so that the water discharged from the cultivation shelf 30 can more smoothly flow toward the drain guide pipe 87. In addition, water flowing along the drain tray 85 may be prevented from overflowing by the tray circumferential portion 852.

In addition, a portion of the front half portion of the tray circumference 852 adjacent to the rear end of the cultivation shelf 30 may be formed with a tray cutout 853 cut downward. The tray cutout 853 may be formed lower than the height of the tray circumference 852 and extend upward, and may be formed over the front end of the drain tray 85 and a portion of the right end in contact with the front end. Therefore, it is possible to prevent interference between the lower surface of the cultivation shelf 30 and the drain tray 85 in the process of introducing and withdrawing the cultivation shelf 30.

Meanwhile, an overflow prevention portion 854 may be formed on the tray bottom surface 851 corresponding to the tray cutout 853. The overflow prevention portion 854 protrudes from the tray bottom surface 851 and is formed along the front and side ends of the drain tray 85 but may be formed at a position slightly spaced from the outer end of the drain tray 85. The overflow prevention portion 854 may be formed in multiple numbers and may be spaced apart from each other in the front and rear direction. Therefore, even if the apparatus for cultivating plants 1 is shaken by vibration, it can be prevented that water drained along the drain tray 85 flows forward and overflows through the tray cutout 853.

In addition, the bottom surface 851 of the tray may be formed to be higher at a portion where the overflow prevention portion 854 is disposed and gradually lower toward a portion where the tray drain portion 856 is formed. Therefore, it is possible to prevent water from overflowing in the drain tray 85 and to ensure smooth drainage in the drain tray 85.

Meanwhile, a tray mounting portion 855 may be formed on a lower surface of the left end of the tray bottom surface 851, and a screw hole 855*a* may be formed on an top surface of the tray mounting portion 855. The screw 855*b* may pass through the screw hole 855*a* and may be fastened with the tray bracket 859 mounted on the tray mounting portion 855. Further, a screw hole 859*a* into which the screw 855*b* is fastened may be further formed in the tray bracket 859. The tray mounting portion 855 may be coupled to components below the drain tray 85, such as the lighting device 40, instead of the tray bracket 859, if necessary.

Tray drain portions 856 protruding outward may be formed at the corners of the left end and the rear end of the drain tray 85. The tray drain portion 856 may protrude outward from the drain tray 85 and be inserted into the drain guide pipe 87. In addition, the tray circumferential portion 852 may extend along the circumference of the tray drain portion 856, so that the water guided to the tray drain portion 856 does not overflow and the drain guide pipe 87 can turn inwards.

In addition, the tray drain portion 856 extends downward so that the water flowing into the tray drain portion 856 flows into the drain guide pipe 87 without leaking or splashing to the outside. In addition, the tray drain hole 856*a* may be opened at the lower end of the tray drain portion 856.

Hereinafter, the drain pipe 89 will be described in more detail with reference to the drawings.

Figure 55:
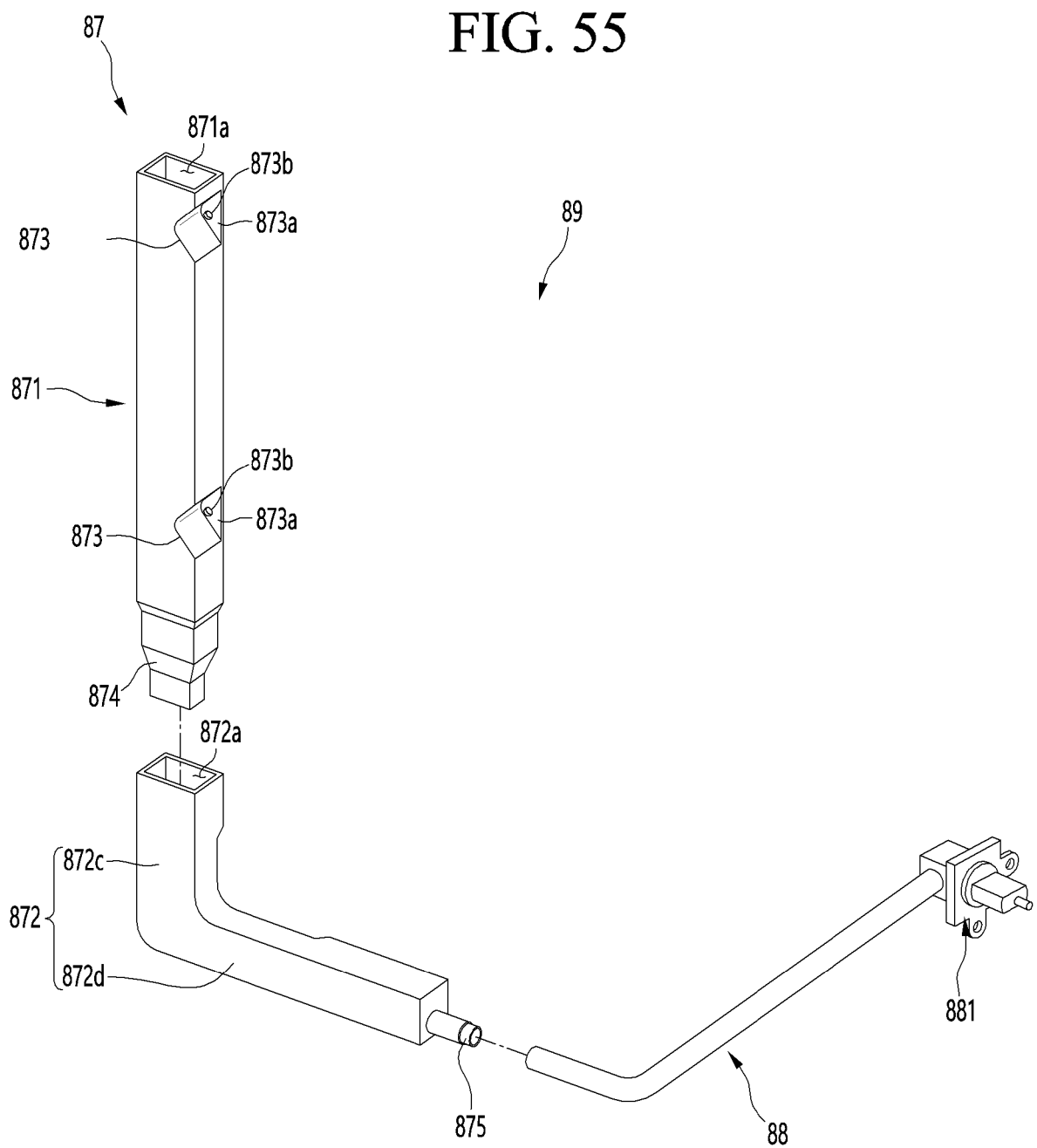
FIG. 55 is an exploded perspective view of a drain pipe according to an embodiment of the present disclosure.
Figure 56:
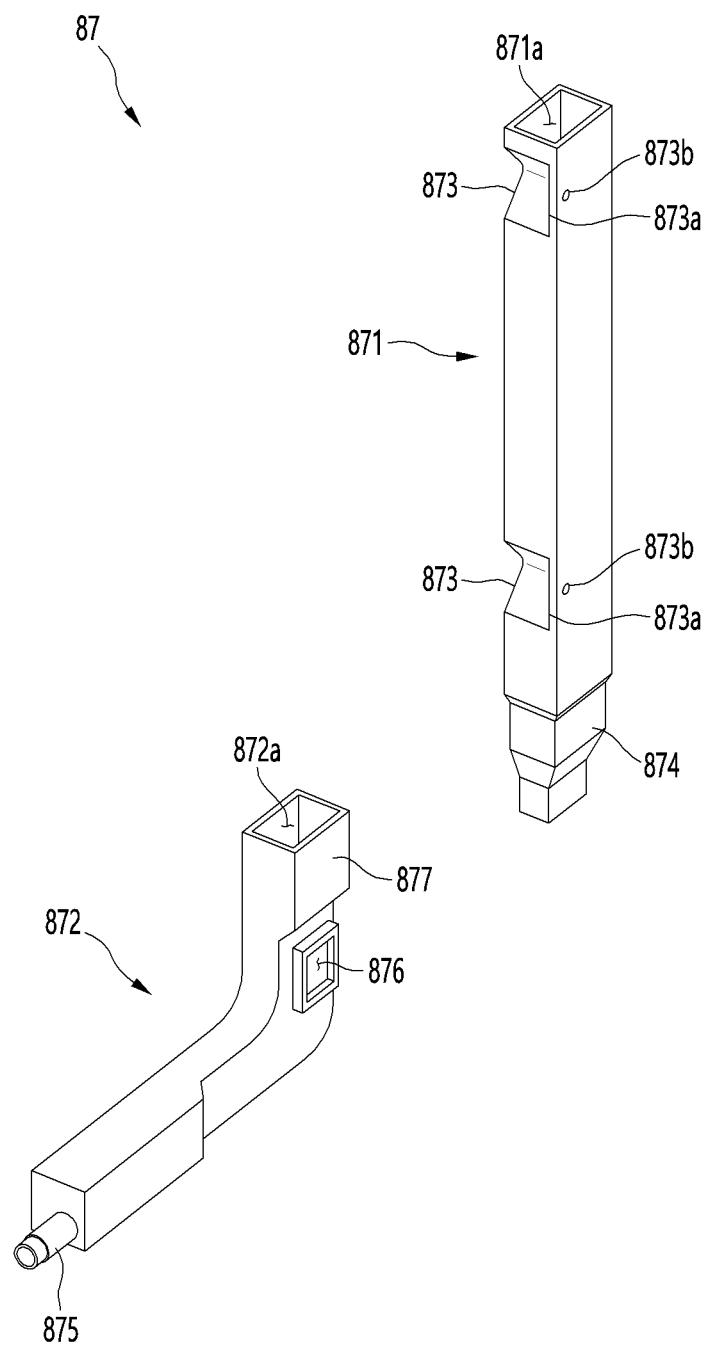
FIG. 56 is an exploded perspective view of the drain guide pipe constituting the drain pipe.

FIG. 55 is an exploded perspective view of a drain pipe according to an embodiment of the present disclosure, and FIG. 56 is an exploded perspective view of the drain guide pipe constituting the drain pipe.

As illustrated in the drawing, the drain pipe 89 may include a drain guide pipe 87 connected to the drain tray 85 as a whole and a drain tube 88 connecting the water tank 70 to the drain guide pipe 87.

In detail, the drain guide pipe 87 guides the water supplied from the drain tray 85 downward and may be formed in a tubular shape having a predetermined cross-sectional area so that a large amount of water flowing from the drain tray 85 can be guided downward without overflowing.

At this time, the drain pipe guide portion 122*c* to which the drain guide pipe 87 is mounted may be formed by bending the side plate 122 and may have a rectangular cross section. Accordingly, it is preferable that the drain guide pipe 87 has a rectangular cross section insertable inside the drain pipe guide portion 122*c*.

In addition, the drain guide pipe 87 may have a structure connected to a plurality of drain trays 85 for guiding water drained from the plurality of cultivation shelves 30 when a plurality of cultivation shelves 30 are arranged vertically. Therefore, the upper end of the drain guide pipe 87 may extend to at least a position corresponding to the position of the cultivation shelf 30 located at the top, and the lower end of the drain guide pipe 87 may be located below the cultivation shelf 30 located at the lowest position.

For example, the cultivation shelf 30 may be composed of two components, that is, an upper cultivation shelf 30*a* and a lower cultivation shelf 30*b*, and the drain tray 85 also includes an upper drain tray 85*a* and a lower drain tray 85*b*, respectively. In addition, the drain guide pipe 87 may include an upper drain guide pipe 871 connected to the upper drain tray 85*a* and a lower drain guide pipe 872 connected to the lower drain tray 85*b*.

The upper drain guide pipe 871 may extend in a vertical direction, and may extend in a straight line from the upper cultivation shelf 30*a* to the lower cultivation shelf 30*b*. In addition, an upper opening 871*a* may be formed on an top surface of the upper drain guide pipe 871. The upper opening 871*a* is opened so that the tray drain 856 of the upper cultivation shelf 30*a* is inserted, and therefore may be referred to as an upper inlet. The area of the upper opening 871*a* may correspond to the cross-sectional area of the drain guide pipe 87, and a large amount of water may be introduced at once.

Meanwhile, a guide pipe protrusion 873 protruding to the inside of the upper drain guide pipe 871 may be formed in the upper drain guide pipe 871. The guide pipe protrusion 873 is to allow water drained along the upper drain guide pipe 871 to fall and collide with each other, and at least one of them may be formed along the vertical extension direction of the upper drain guide pipe 871.

The water drained along the upper drain guide pipe 871 can be hit by the guide pipe protrusion 873, and the speed of the water drained downward can be adjusted and the falling distance of the water can be divided into multiple times. Accordingly, noise generated when water falling through the drain guide pipe 87 falls from the upper end to the lower end of the drain guide pipe 87 at once can be prevented. In addition, the flow rate of water flowing downward along the inner wall surface of the upper drain guide pipe 871 can be adjusted by the guide pipe protrusion 873, thereby minimizing the sound of flowing water.

A plurality of guide pipe protrusions 873 may be formed along the length of the upper drain guide pipe 871, and one guide pipe protrusion may be formed on the upper portion and the lower portion of the upper drain guide pipe 871, respectively.

An inner surface of the upper drain guide pipe 871 corresponding to the guide pipe protrusion 873 may be recessed, and a guide tube mounting portion 873*a* may be formed on one side (right side in FIGS. 55 and 56) of the upper drain guide pipe 871 corresponding to the recessed outer surface of the guide pipe protrusion 873. The guide tube mounting portion 873*a* may be formed in the flat shape, and may come into close contact with the inner surface of the drain pipe guide portion 122*c*. In addition, a screw hole 873*b* may be formed in the guide pipe mounting portion 873*a*, and a screw passing through the screw hole 873*b* is fastened to a side wall surface of the drain pipe guide portion 122*c* to maintain a state where the drain guide pipe 87 is fixedly mounted inside the drain pipe guide portion 122*c*.

A guide pipe insertion portion 874 may be formed at a lower end of the upper drain guide pipe 871. The lower end of the guide pipe insertion portion 874 is opened so that water flowing along the upper drain guide pipe 871 can be discharged downward. In addition, the guide pipe insertion portion 874 may be formed such that its cross-sectional area decreases as it goes downward. That is, the outer surface of the guide pipe insertion portion 874 may be inclined or stepped and may be inserted into the lower opening 872a of the lower drain guide pipe 872.

Meanwhile, the lower drain guide pipe 872 may be formed in a shape bent to correspond to the lower shape of the drain pipe guide portion 122c. In detail, the lower drain guide pipe 872 may include guide pipe vertical portion 872c which is connected to the upper drain guide pipe 871 and a guide pipe horizontal portion 872d which extends forward from the lower end of the guide pipe vertical portion 872c.

The top surface of the lower drain guide pipe 872 is open and may form the lower opening 872a. In addition, a guide pipe accommodation portion 877 into which the guide pipe insertion portion 874 is inserted may be formed at an upper end of the lower drain guide pipe 872 in which the lower opening 872a is formed. The guide pipe accommodation portion 877 may have a cross-sectional area larger than that of the guide pipe insertion portion 874 and may have a size corresponding to that of the upper opening 871a. Accordingly, in a state where the upper drain guide pipe 871 and the lower drain guide pipe 872 are coupled to each other, they may be formed to have a sense of unity.

A side opening 876 may be formed below the guide pipe accommodation portion 877, that is, in the guide pipe vertical portion 872c. The side opening 876 is opened so that the tray drain portion 856 of the lower drain tray 85b is inserted, and therefore may be referred to as a lower inlet. In addition, the side opening 876 is located at a position away from the lower end of the guide pipe vertical portion 872c upward, so that the water introduced through the tray drain portion 856 of the lower drain tray 85b can be easily guided forward.

Meanwhile, the guide pipe horizontal portion 872d extends forward and may extend to the front end of the drain pipe guide portion 122c. In addition, a tube connection portion 875 may protrude from the front end of the guide tube horizontal portion 872d, and the drain tube 88 may be connected to the tube connection portion 875. At this time, the position of the tube connection portion 875 may be located inside the space shielded by the pump cover 81. Accordingly, the drain tube 88 may be connected to the drain guide pipe 87 inside the pump cover 81 and extend up to the valve insertion port 744a of the water tank 70.

The drain tube 88 may be composed of a flexible tube, and therefore, it is easy to bend into the inner (rear) space of the pump cover 81 and may be effectively disposed inside the pump cover 81 with a complicated interior.

In addition, a drain valve 881 may be provided at an end of the drain tube 88. The drain valve 881 may be located at a position facing the valve insertion port 744a, may be fixed to the front surface of the pump cover 81, and may also protrude toward the water tank 70.

Hereinafter, with reference to the drawings, the connection structure and water supply state of the drain tray 85 and the drain guide pipe 87 will be described in more detail with reference to the drawings.

Figure 57:
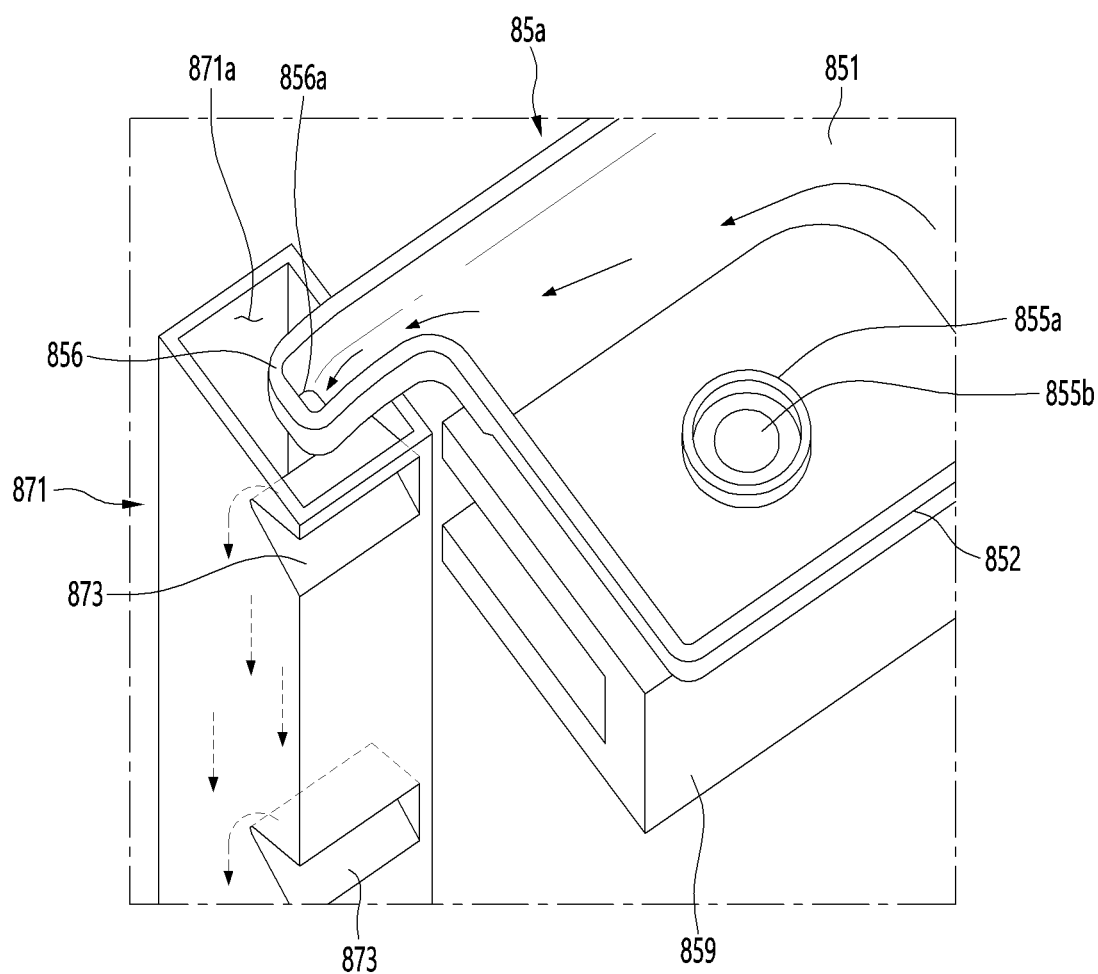
FIG. 57 is a partial perspective view illustrating a water supply state from the upper drain tray to the drain guide pipe according to an embodiment of the present disclosure.

FIG. 57 is a partial perspective view illustrating a water supply state from the upper drain tray to the drain guide pipe according to an embodiment of the present disclosure.

As illustrated, when the opening/closing member 36 of the cultivation shelf 30 is opened, or through the drain portion 318 of the cultivation shelf 30, the water of the cultivation shelf 30 can fall into the drain tray 85. At this time, the drain tray 85 may be disposed vertically below the drain hole 319a and the drain portion 318 and may be positioned adjacent thereto to stably receive the water discharged from the cultivation shelf 30.

Then, the water introduced into the drain tray 85 may flow toward the tray drain portion 856 along the inclination of the bottom surface 851 of the tray, and may be flow inside the drain guide pipe 87 through the tray drain hole 856a.

At this time, as illustrated in FIG. 17, the tray drain portion 856 of the upper drain tray 85a may be inserted into the top surface opening 871a formed at the upper end of the upper drain guide pipe 871. That is, the tray drain portion 856 of the upper drain tray 85a protrudes laterally from the upper side of the upper drain guide pipe 871, and the extended lower end can be inserted into the inside of an top surface opening 871a of the upper drain guide pipe 871.

Accordingly, water discharged through the tray drain hole 856a of the upper drain tray 85a may flow into the upper drain guide pipe 871. Meanwhile, the top surface opening 871a of the upper drain guide pipe 871 is formed to a size capable of accommodating the upper drain tray 85a, and may be formed significantly larger than the size of the tray drain hole 856a. Therefore, even when a large amount of water flows in through the upper drain tray 85a, the water does not flow back through the top surface opening 871a and is smoothly discharged downward through the upper drain guide pipe 871.

Water introduced into the upper drain guide pipe 871 falls downward, and some of the water falling may collide with the guide pipe protrusion 873. At this time, the guide pipe protrusion 873 formed at the top of the guide pipe protrusions 873 may be disposed adjacent to the tray drain portion 856 and face the tray drain hole 856a.

Accordingly, water falling from the tray drain hole 856a may collide with the guide pipe protrusion 873 and then fall downward. When water falls while colliding with the plurality of guide pipe protrusions 873, noise generated when water droplets directly fall from the upper end of the drain guide pipe 87 to the lower end of the drain guide pipe 87 can be prevented, and the sound of water flowing along the wall of the drain guide pipe 87 can also be prevented.

As such, the water flowing into the upper drain guide pipe 871 through the upper drain tray 85a flows downward and can be introduced into the water tank 70 through the lower drain guide pipe 872 and the drain tube 88.

Figure 58:
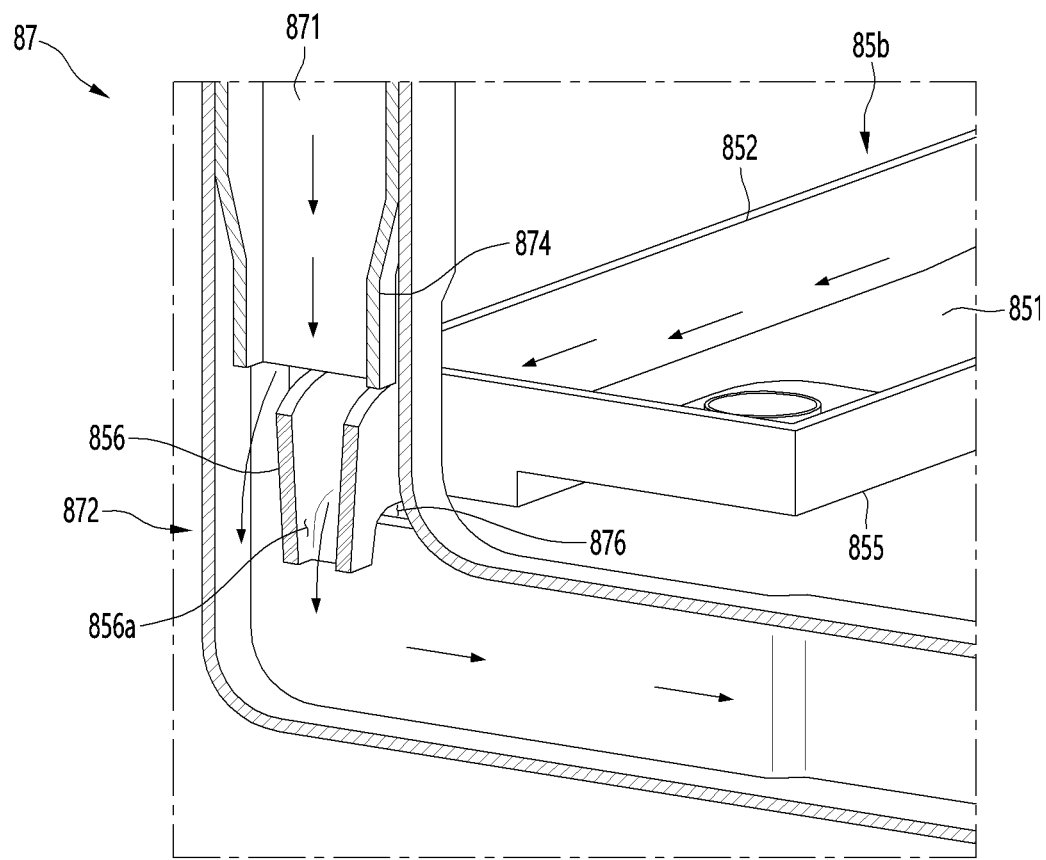
FIG. 58 is a cutaway perspective view illustrating a water supply state from the lower drain tray to the drain guide pipe according to an embodiment of the present disclosure.

FIG. 58 is a cutaway perspective view illustrating a water supply state from the lower drain tray to the drain guide pipe according to an embodiment of the present disclosure.

As illustrated, the guide tube insert 874 formed at the lower end of the upper drain guide pipe 871 is inserted through the open top surface of the lower drain guide pipe 872, and the upper drain guide pipe 871 And the lower drain guide pipe 872 may communicate with each other. Therefore, the water drained along the upper drain guide pipe 871 flows into the lower drain guide pipe 872, is joined with the water flowing through the lower drain tray 85b, and thus is directed to the drain tube 88.

Therefore, the drain guide pipe 87 can provide a flow path having a cross-sectional area of sufficient size so that water simultaneously discharged through at least the upper drain tray 85a and the lower drain tray 85b can be effectively discharged without flowing backward.

Meanwhile, the water drained from the lower cultivation shelf 30b may be collected in the lower drain tray 85b, and the water of the lower drain tray 85b flows from the tray bottom surface 851 to the tray drain portion 856, and may flow into the lower drain guide pipe 872 through the tray drain hole 856a.

At this time, the tray drain portion 856 of the lower drain tray 85b may protrude laterally and be inserted into the side opening 876 opened on the side of the lower drain guide pipe 872. Therefore, the tray drain portion 856 is inserted into the lower drain guide pipe 872 through the side opening 876, and the extended lower end of the tray drain portion 856 is interlocked with the side opening 876 so that the lower drain tray 85b and the lower drain guide pipe 872 maintain a coupled relationship with each other. In addition, the tray drain hole 856a is opened downward from the inside of the lower drain guide pipe 872 so that all of the water drained from the lower drain tray 85b flows into the lower drain guide pipe 872.

In addition, the water discharged through the tray drain hole 856a of the lower drain tray 85b is diverted together with the water flowing through the upper drain guide pipe 871 to flow to the front along the guide pipe horizontal portion 872d, and may be introduced into the drain tube 88 connected to the lower drain guide pipe 872.

The drain tube 88 may extend to the inside of the cultivation space 100 from the side wall of the cultivation space 100, more specifically, the rear space of the pump z-cover 81 in which the pump 83 and the sub-tank 82 are disposed. In addition, the drain valve 881 disposed at the end of the drain tube 88 is connected to the water tank 70 so that the water discharged through the drain pipe 89 is directed to the water tank 70.

Hereinafter, a connection relationship between the water supply module and drain module and the water tank 70 will be described in more detail with reference to drawings.

Figure 59:
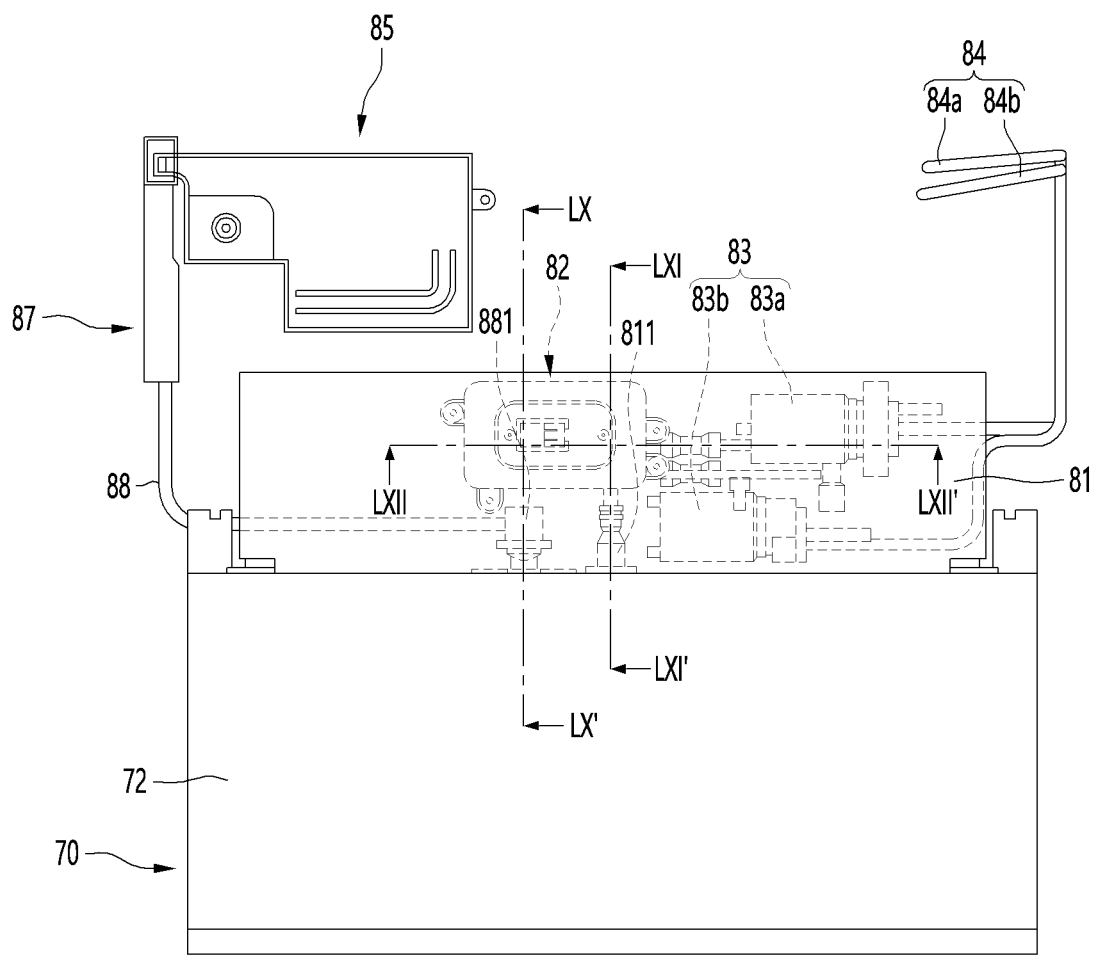
FIG. 59 is a plan view illustrating the connection relationship between the water supply module, the drain module, the water tank, the sub-tank, and the pump.
Figure 60:
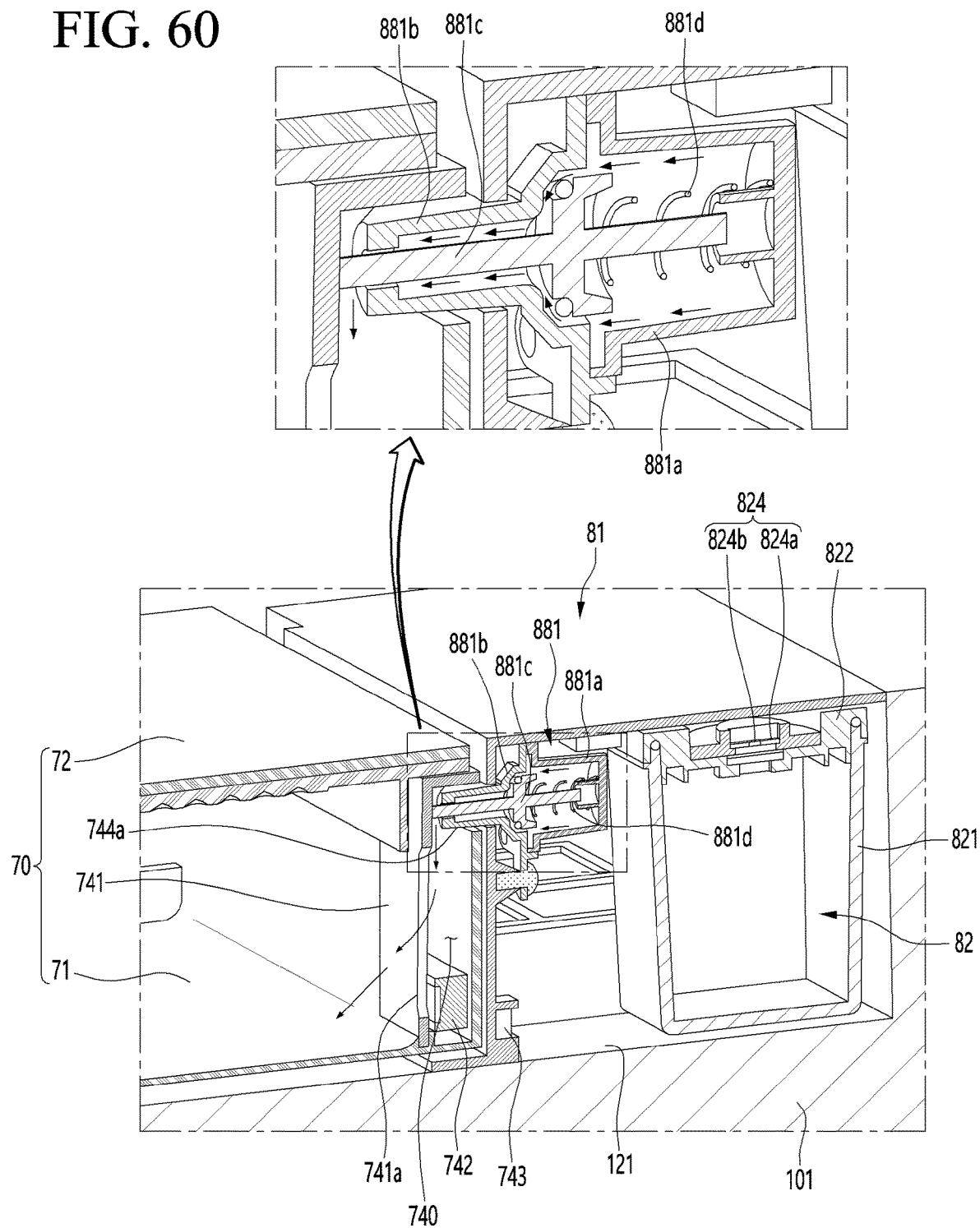
FIG. 60 is a cross-sectional view taken along line LX-LX' of FIG. 59.

FIG. 59 is a plan view illustrating the connection relationship between the water supply module, the drain module, the water tank, the sub-tank, and the pump, and FIG. 60 is a cross-sectional view taken along line LX-LX' of FIG. 59.

As illustrated, the water tank 70 may be disposed on the bottom surface of the cultivation space 100 and may be disposed in front of the pump cover 81. The water tank 70 may have a height corresponding to the height of the top surface of the pump cover 81 when the tank cover 72 is closed. In addition, the lower cultivation shelf 30b may be disposed adjacent to and above the water tank 70 and the pump cover 81.

In addition, when the water tank 70 is completely introduced and becomes adjacent to the front surface of the pump cover 81, it is possible to supply water to the cultivation shelf 30 and recover water discharged from the cultivation shelf 30.

A drain valve 881 connected to an end of the drain tube 88 may be mounted on the front of the pump cover 81. An end of the drain valve 881 may protrude forward through the front surface of the pump cover 81 and may be inserted into the inside through the rear surface of the water tank 70 in a state where the water tank 70 is completely introduced.

In detail, the drain valve 881 may be formed by a rear case 881a connected to the drain tube 88 and a front case 881b coupled to the open front surface of the rear case 881a. The front case 881b may protrude forward through the pump cover 81, and the protruding end may be inserted into the valve insertion port 744a on the rear side of the water tank 70.

In addition, the valve opening/closing member 881c may be supported by an elastic member 881d inside the combined interior of the rear case 881a and the front case 881b. The valve opening/closing member 881c may be formed in a shape like a poppet, and a rod may be formed in the front and rear direction, and a shade may be formed around the rod to contact the inner surface of the front case 881b to open and close the flow path. Accordingly, the valve opening/closing member 881c may open and close the drain valve 881 while moving forward and backward inside the drain valve 881.

The valve opening/closing member 881c is supported from the rear by the elastic member 881d to maintain the drain valve 881 in a closed state. In addition, in a state where the valve opening/closing member 881c is closed, the front end of the valve opening/closing member 881c may protrude through the front case 881b. In this case, the outer diameter of the front end of the valve opening/closing member 881c may have a smaller diameter than the opening of the front end of the front case 881b. In addition, the valve opening/closing member 881c may protrude more than the front end of the front case 881b protruding forward of the pump cover 81 in a state where the drain valve 881 is closed.

Meanwhile, a valve insertion port 744a may be formed at a rear surface 744 of the water tank 70 corresponding to the drain valve 881. The valve insertion port 744a may be formed at a corresponding position so that the front case 881b of the drain valve 881 can be inserted when the water tank 70 is inserted.

A display portion cover 741 may be formed at a portion where the front end of the drain valve 881 is inserted. The display portion cover 741 indicates the water level of the water tank 70 and may be formed inside the water tank 70 spaced apart from the rear surface 744 of the tank body 71. The display portion cover 741 may extend from a bottom surface of the tank body 71 to an upper end of the tank body 71. In addition, a display portion opening 741c cut in a vertical direction may be formed in the display portion cover 741. Water inside the tank body 71 may flow into a space spaced apart between the display portion cover 741 and the tank body 71 through the display portion opening 741c.

In addition, a tank floater 742 may be formed in the spaced apart space between the display portion cover 741 and the tank body 71. The tank floater 742 may be formed of the foam material that floats on water and may be formed to have an identifiable color. Therefore, the tank floater 742 can move up and down according to the water level of the tank body 71, and the water level of the tank body 71 can be intuitively displayed through the display portion opening 741c.

In addition, the tank floater 742 may include a magnet, and a tank level detection device 743 may be provided on a front surface of the pump cover 81 corresponding to the display portion cover 741. The tank level detection device 743 may be configured to include a hall sensor for detecting the magnet of the tank floater 742 and may detect the water level of the water tank 70 by detecting a change in the magnetic field of the magnet. For example, the tank level detection device 743 may be disposed at the lower end of the pump cover 81, and thus, when the magnet is located at a position corresponding to the tank level detection device 743, the water tank 70 can detect that the water level is low. When it is detected that the water level of the water tank 70 is low, the control portion 27 of the apparatus for cultivating plants 1 may inform the user of water replenishment through the display device 14 or the user device 3, and, if necessary, the water supply to the cultivation shelf 30 may be stopped.

Meanwhile, when the water tank 70 is completely inserted, the front case 881b is inserted into the valve insertion port 744a, and the front end of the opening/closing member 36 comes into contact with the rear surface of the display portion cover 741 and thus is pressed. At this time, the opening/closing member 881c is moved backward to open the drain valve 881, and, through the drain valve 881, water may flow into the inside of the space 740 spaced apart between the display portion cover 741 and the tank body 71. In addition, the water flowing into the space 740 spaced apart between the display portion cover 741 and the tank body 71 may flow into the internal space of the tank body 71 through the display portion opening 741*c*.

The drain valve 881 is inserted into the tank body 71 to open and close, but the drain valve 881 may be covered by the display portion cover 741, and thus the exposure of the drain valve 881 and the exposure of a portion where water flows into the water tank 70 can be prevented.

In this way, when the water tank 70 is fully introduced and mounted, the front end of the valve opening/closing member 881*c* is pressed inside the water tank 70, and thus the drain valve 881 is opened and thus water from the cultivation shelf 30 discharged through the drain pipe 89 may be recovered into the water tank 70. When the water tank 70 is closed, the front end of the valve opening/closing member 881*c* is continuously pressed by the water tank 70, and thus the drain valve 881 remains closed.

In addition, when the water tank 70 is withdrawn for water replenishment or nutrient solution input, the front end of the valve opening/closing member 881*c* and the water tank 70 are spaced apart from each other, and by the elastic force of the elastic member 881*d*, the valve opening/closing member 881*c* shields the flow path inside the drain valve 881, and the drain valve 881 may be closed. When the drain valve 881 is closed, drain through the drain pipe 89 is not performed. Accordingly, leakage of water drained from the drain pipe 89 into the cultivation space 100 is prevented.

In addition, although not illustrated in detail, the water tank 70 may be introduced and withdrawn of the water tank 70 by the tank detection device 812 that detects the introduction and withdrawn of the water tank 70. In addition, in the state where the water tank 70 is withdrawn, the control portion 27 that controls the operation of the apparatus for cultivating plants 1 limits the operation of the drive device 86 so that the drainage of the water in the cultivation shelf 30 may be prevented, and the operation of the pump 83 may be stopped to prevent the cultivation shelf 30 from being supplied with water.

Hereinafter, a path through which the water in the water tank 70 is supplied to the cultivation shelf 30 via the sub-tank 82 will be described in detail with reference to drawings.

Figure 61:
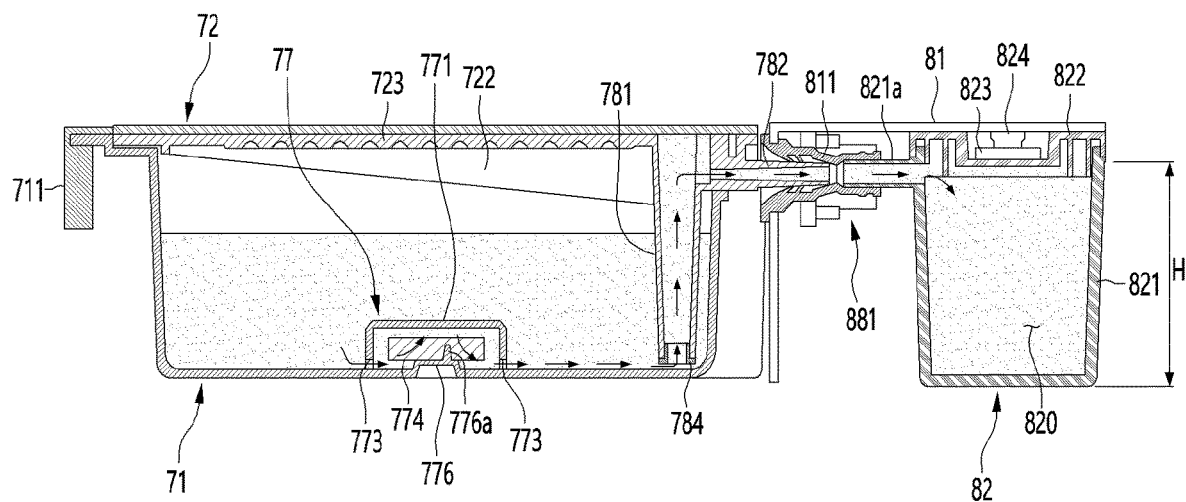
FIG. 61 is a cross-sectional view taken along line LXI-LXI' of FIG. 59.
Figure 62:
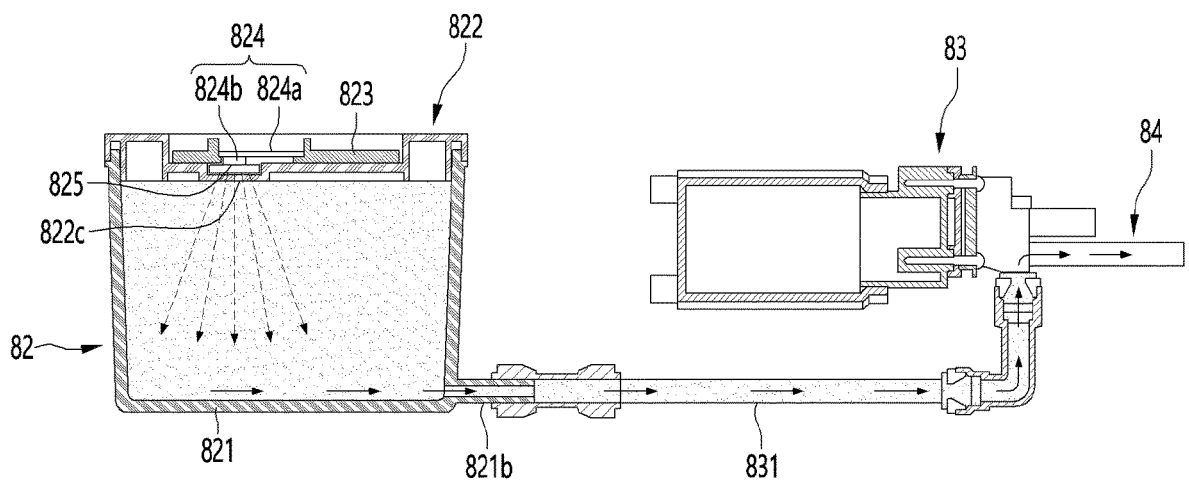
FIG. 62 is a cross-sectional view taken along line LXII-LXII' of FIG. 59.

FIG. 61 is a cross-sectional view taken along line LXI-LXI' of FIG. 59, and FIG. 62 is a cross-sectional view taken along line LXII-LXII' of FIG. 59.

As illustrated in the drawing, when the water tank 70 is introduced, the tank outlet 78 of the water tank 70 is inserted into the fitting portion 811, and the body acquisition part 821*a* of the sub-tank 82 may also be connected to the fitting portion 811.

Therefore, the tank outlet 78 and the body inlet 821*a* are connected through the fitting portion 811, and the water tank 70 and the sub-tank 82 can be in communication with each other. In addition, the inside of the sub-tank 82 may be filled with water as much as the set water level H.

In this state, when the pump 83 is operated, the water in the sub-tank 82 can be supplied to the pump 83, and the pump 83 is driven for a set time to supply a set amount of water to the cultivation shelf 30.

As the water in the sub-tank 82 is suctioned in by the driving of the pump 83, negative pressure is generated in the body inlet 821*a* and the tank outlet 78 to suction the water in the water tank 70.

The water tank outlet 78 suctions water from the bottom of the water tank 70 through the first water outlet 781, and until the water inside the water tank 70 is completely exhausted, water in the water tank 70 may be supplied to the sub-tank 82. In addition, when the water level of the water tank 70 is the set level or less, the tank level detection device 743 stops the pump 83. Accordingly, it is possible to maintain a state where the sub-tank 82 is filled with water equal to or higher than a set water level, and it is possible to prevent air from being mixed into the pump 83.

By allowing the water inside the water tank 70 to be suctioned in from the bottom, the water inside the water tank 70 can flow from the bottom of the water tank 70 and be purified while passing through the purifying member 740.

Meanwhile, water contained in the sub-tank 82 may be sterilized by the UV lamp 824. The inside of the sub-tank 82 is always filled with water, and the water remains inside the sub-tank 82 until the pump 83 is driven.

Therefore, when the UV lamp 824 is turned on, it is possible to sterilize the water inside the sub-tank 82, thereby preventing mold or green algae from occurring in the water supplied to the cultivation shelf 30 and also preventing the occurrence of bad odors. In particular, since the capacity of the sub-tank 82 is set to an effective capacity for sterilization through the UV lamp 824, this sterilization action may be more efficient. The UV lamp 824 may be turned on at set distances, or may be configured to be operated for a set time after the operation of the pump 83 is completed.

As the pump 83 is driven, the water in the sub-tank 82 is discharged through the body water outlet 821*b* and may flow into the input side of the pump 83 by the pipe 831 connecting the body water outlet 821*b* and the pump 83. In addition, the water discharged to the discharge side of the pump 83 may be supplied to the cultivation shelf 30 through the water supply pipe 84 connected to the pump 83.

Figure 63:
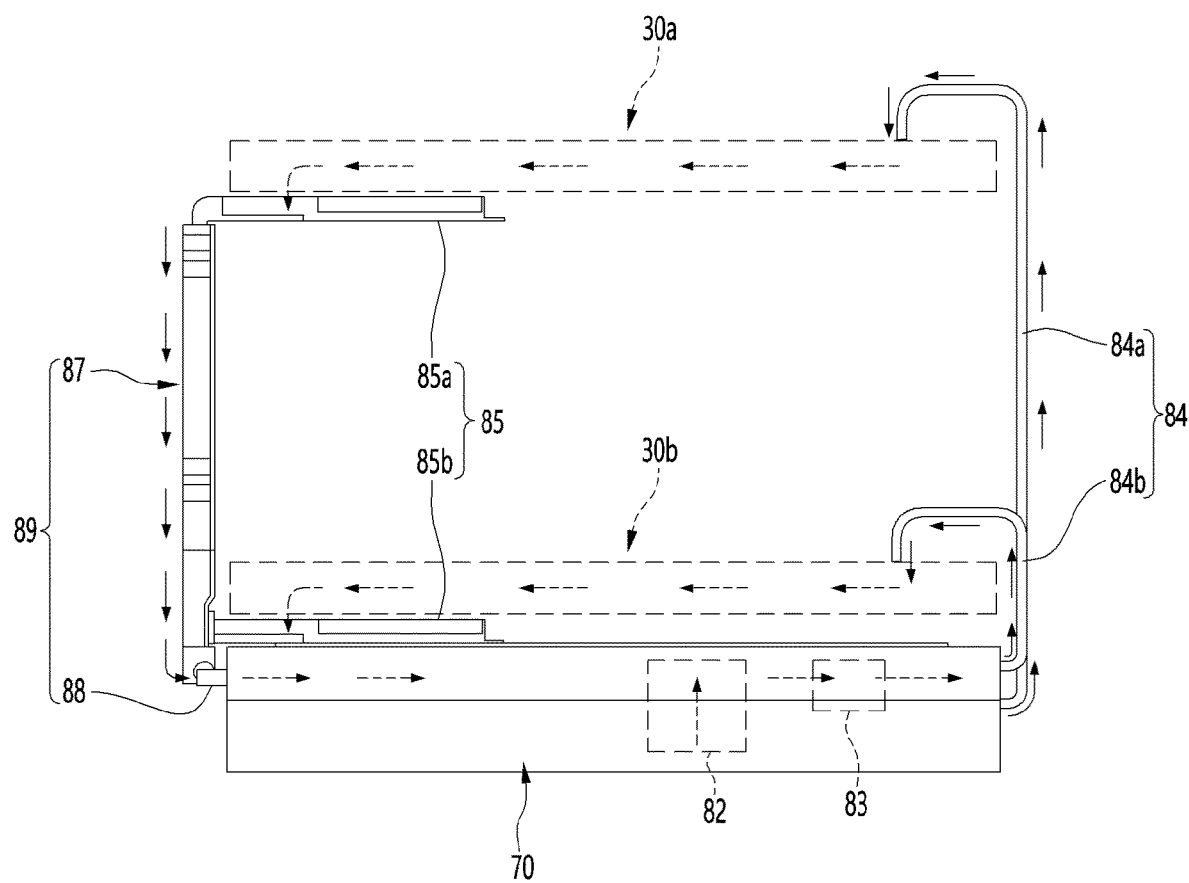
FIG. 63 is a view illustrating a water circulation state between the cultivation shelf and the water tank.

FIG. 63 is a view illustrating a water circulation state between the cultivation shelf and the water tank.

As illustrated in the figure, water stored in the water tank 70 may flow into the sub-tank 82 by driving the pump 83. In addition, the water stored in the sub-tank 82 can be sterilized by a UV lamp 824 provided in the sub-tank 82.

Water sterilized in the sub-tank 82 may be supplied to the cultivation shelf 30 along the water supply pipe 84 by driving the pump 83. At this time, the upper pump 83*a* and the lower pump 83*b* may be driven independently, and water may be independently supplied to the upper cultivation shelf 30*a* and the lower cultivation shelf 30*b*.

By driving the pump 83, the water in the water tank 70 flows into the sub-tank 82, and the water accommodated in the sub-tank 82 can always maintain a water level above a set water level. At this time, the pump 83 may be repeatedly operated based on a set time and may be turned on every 3 hours, for example.

The pump 83 is driven for a set time to supply a set amount of water to the cultivation shelf 30. At this time, the water supplied to the cultivation shelf 30 may be supplied above a set water level so that the seed package 90 can be sufficiently absorbed. The seed package 90 seated on the cultivation shelf 30 absorbs a sufficient amount of supplied water. At this time, the supplied water is in the state of a culture medium including nutrients added through the water tank 70, and both water and nutrients may be supplied.

When the time for the seed package 90 to sufficiently absorb water has elapsed, the opening/closing member 36 is opened, and the water in the cultivation shelf 30 can be drained through the drain hole 319*a*. For example, the opening/closing member 36 may be controlled to be opened when 1 hour and 30 minutes have elapsed after water supply is completed, since the plants grown on the cultivation shelf 30 can sufficiently absorb water for 1 hour to 1 hour 30 minutes.

Therefore, the cultivation shelf 30 can maintain a waterless state for about 1 hour and 30 minutes when it is re-watered, and thus, it is possible to prevent the growth of mold, green algae, or the like in the cultivation space 100, thereby preventing contamination, and be capable pf preventing odors from occurring. That is, it is possible to supply a sufficient amount of water to the seed package 90 in a state where water is supplied while minimizing the time during which water is exposed to the environment of the cultivation shelf 30 with high temperature and high humidity.

When the opening/closing member 36 is opened, the water of the cultivation shelf 30 and the lower cultivation shelf 30*b* drained through the drain hole 319*a* flows into the drain pipe 89 through the upper drain tray 85*a* and the lower drain tray 85*b* and can be returned to the water tank 70 along the drain pipe 89.

Water recovered into the water tank 70 may be stored in the water tank 70 and may be purified by the purifying member 744 while being stored. Then, when the pump 83 is driven again, water can be supplied to the cultivation shelf 30 again.

In this way, the water in the water tank 70 is supplied to the cultivation shelf 30 through the water supply pipe 84, and the water remaining after being absorbed by the seed package 90 may be cycled while repeating the process of recovering to the water tank 70 through the drain pipe 89.

Hereinafter, the structure of the cultivation shelf 30 will be described in more detail with reference to the drawings. Since the cultivation shelf 30 has the same structure regardless of the vertical position, only one cultivation shelf 30 will be described below, and the upper cultivation shelf 30*a* and the lower cultivation shelf 30*b* may have exactly the same structure.

Figure 64:
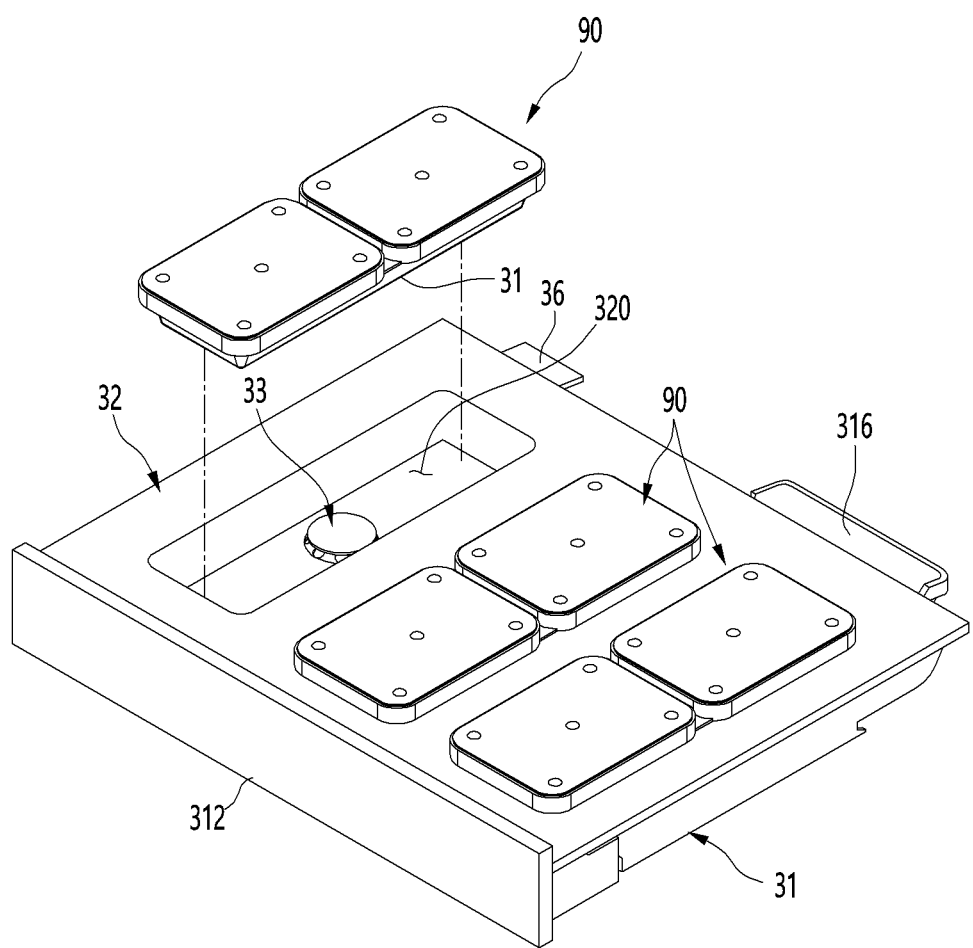
FIG. 64 is a view illustrating a state where a seed package is seated on the cultivation shelf.
Figure 65:
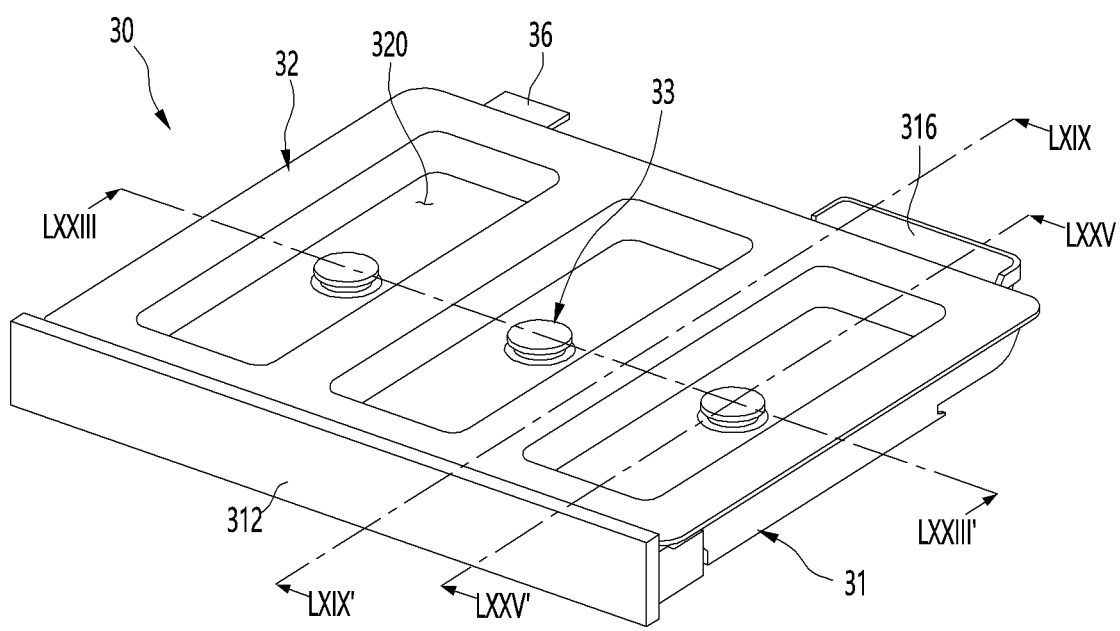
FIG. 65 is a perspective view of the cultivation shelf.
Figure 66:
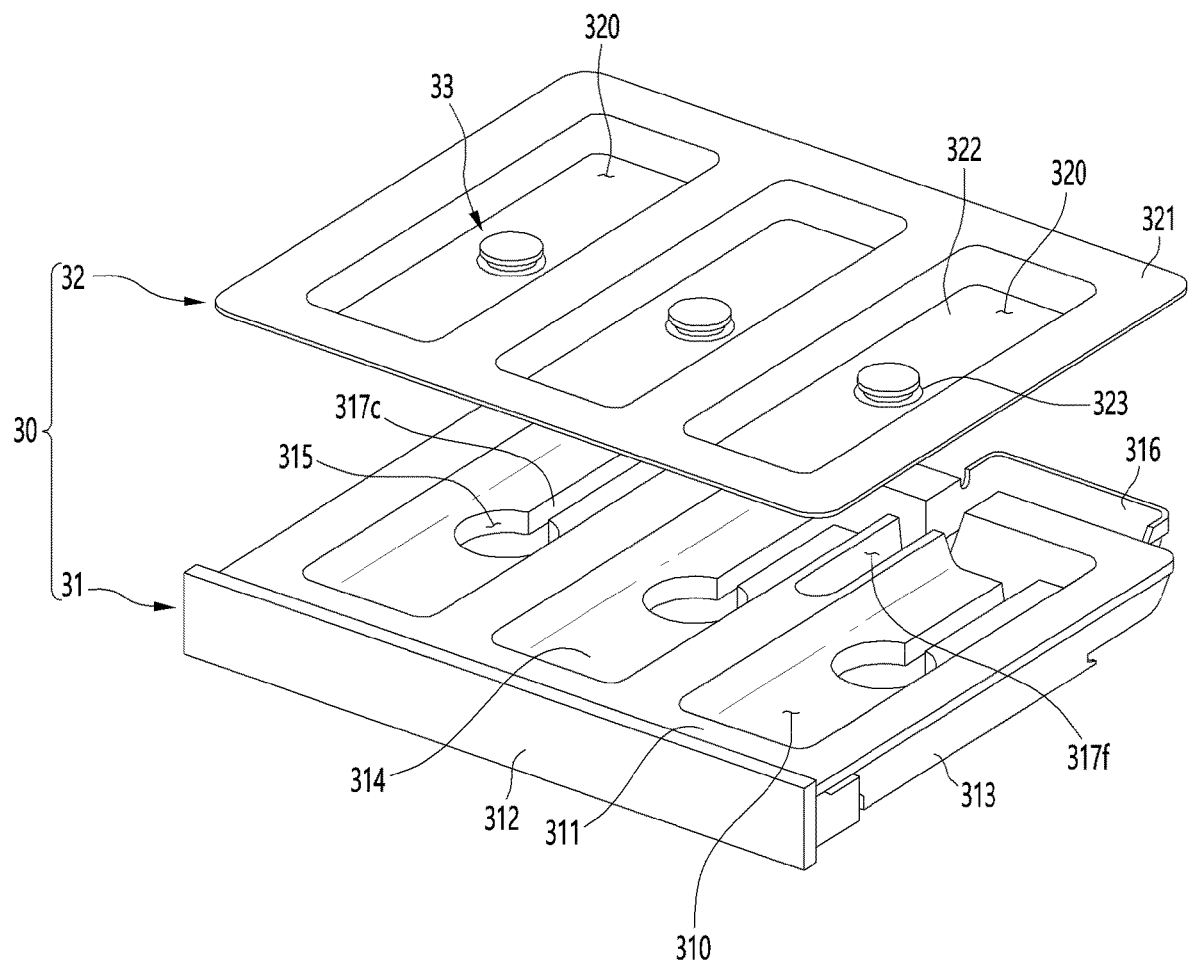
FIG. 66 is an exploded perspective view of the cultivation shelf.

FIG. 64 is a view illustrating a state where a seed package is seated on the cultivation shelf, FIG. 65 is a perspective view of the cultivation shelf, and FIG. 66 is an exploded perspective view of the cultivation shelf.

As illustrated in the drawings, the cultivation shelf 30 may be configured so that the plurality of the seed packages 90 are seated, and the water supplied from the water tank 70 may be supplied to the seed packages 90.

In detail, the cultivation shelf 30 may include a shelf tray 32 on which the seed package 90 is mounted, and a shelf base 31 accommodating water supplied to the seed package 90. Also, the shelf tray 32 may be seated on the shelf base 31 to define an outer appearance of the top surface of the cultivation shelf 30.

The shelf tray 32 may be made of a metal material to have an excellent and clean outer appearance. For example, the shelf tray 32 may be made of a stainless material to be resistant to contamination and to facilitate cleaning and management.

The shelf tray 32 may be mounted in a state of overlapping a top surface of the shelf base 31 and may be provided in a shape corresponding to the top surface shape of the shelf base 31. Also, when the shelf tray 32 is mounted, a front surface and left and right surfaces of the shelf base 31 may be exposed, and the water supply portion 316 and the opening/closing member 36, which are disposed on a rear surface of the shelf base 31, may also protrude to a rear side of the shelf tray 32.

The shelf tray 32 may be provided in a rectangular shape when viewed from above. Also, the shelf tray 32 may include a tray top surface 321 that defines an outer appearance of the top surface as a whole and a seat 320 recessed from the tray top surface 321. The seat 320 may be referred to as a tray seat to be distinguished from a base seat 310 of the shelf base 31.

The top surface of the tray 321 may define an outer appearance of the top surface of the shelf base 31 except for the seat 320 and may be provided in a planar shape. Also, a tray edge 321*a* bent or curved in a round shape may be disposed around the top surface of the tray 321. For example, the edge of the tray 321*a* may be curled so that the circumference of the shelf tray 32 is smoothly rounded.

The seat 320 may be recessed in a shape corresponding to the seed package 90 so that the seed package 90 is seated. A plurality of seats 320 may be provided so that the plurality of the seed packages 90 are seated in separate spaces, respectively. For example, three seats 320 may be arranged side by side in the left and right direction.

The seat 320 may accommodate the entire bottom surface of the seed package 90 and may be recessed to accommodate at least a portion of upper and lower heights. Here, the seat bottom surface 321 may have a size and shape corresponding to those of the container bottom surface 911 of the seed package 90. Thus, when the seed package 90 is seated on the seat 320, the container bottom surface 911 may be in surface contact with the seat bottom surface 321. In this state, even if water is supplied by opening the shutter 33, the water may not be permeated between the bottom surface 911 of the container and the bottom surface 322 of the seat.

Also, the shutter 33 may be provided at a center of the bottom surface 322 of the seat. One shutter 33 may be provided for each of the plurality of seats 320. Also, the shutter 33 may be mounted on a communication member mounting hole 323 passing through the bottom surface 322 of the seat. The shutter 33 may move vertically to allow the water accommodated in the shelf base 31 to be selectively introduced. The shutter 33 may be referred to as a water supply member, an opening/closing member, or a shielding member, because of enabling the selective water supply to the seat 320.

The shutter 33 may be disposed at the center of each of the plurality of seats 320, and the plurality of shutters 33 may all be disposed in the same extension line. For example, the shutters 33 may be disposed in the same extension line in the horizontal direction (left and right direction in FIG. 65). Therefore, when water is supplied, the water may be supplied at the same position in each of the seats 320, and also, the water may be accurately supplied regardless of the mounted positions of the seed package 90 on the plurality of seats 320.

The shutter 33 may operate according to the mounting of the seed package 90. That is, the shutter 33 may be maintained in closed state inside the seat 320, on which the seed package 90 is not mounted, among the plurality of seats 320 and may be maintained in opened state at the seat 320, on which the seed package 90 is mounted, so that the water is introduced to be supplied to the seed package 90.

That is, the shutter 33 may be configured to selectively supply the water to the seat 320, on which the seed package 90 is mounted, among the plurality of seats 320 according to whether the seed package 90 is mounted.

The shutter 33 may be disposed at a position facing the water inlet 912 of the seed package 90, and when the seed package 90 is seated on the seat 320, a portion of the shutter 33 may be accommodated inside the water inlet 912, and a bottom surface of the water inlet 912 may press a top surface of the shutter 33 so that the shutter 33 operates. The structure of the shutter 33 and the interaction between the shutter 33 and the water inlet 912 will be described in more detail below.

The shelf base 31 may be provided below the shelf tray 32. The shelf base 31 may be configured to allow water supplied from the water tank 70 to flow and be stored and may have a top surface shape corresponding to a bottom surface shape of the shelf tray 32 so that the shelf tray 32 is seated.

The shelf base 31 may be made of a plastic material and may be provided in a square shape corresponding to the shelf tray 32 when viewed from above. Also, the shelf base 31 may include a base top surface 311 on which the shelf tray 32 is mounted and a base seat 310. Also, a handle 312 for the withdrawal of the cultivation shelf 30 may be provided on a front surface of the shelf base 31, and a base side surface 313 coupled to the shelf rail for the withdrawal of the cultivation shelf 30 may be provided at each of both left and right sides of the shelf base 31.

Also, a shutter accommodation portion 315 in which the shutter 33 is accommodated and a base passage 317 connecting the shutter accommodation portion 315 to the water supply portion 316 and the drain hole 319a may be provided inside the shelf base 31. Also, the shelf base 31 may be provided with an opening/closing member 36 that opens and closes the drain hole 319a and a water level detection member 34 sensing a water level of the shelf base 31.

Hereinafter, the structure of the shelf base 31 will be described in more detail with reference to the drawings.

Figure 67:
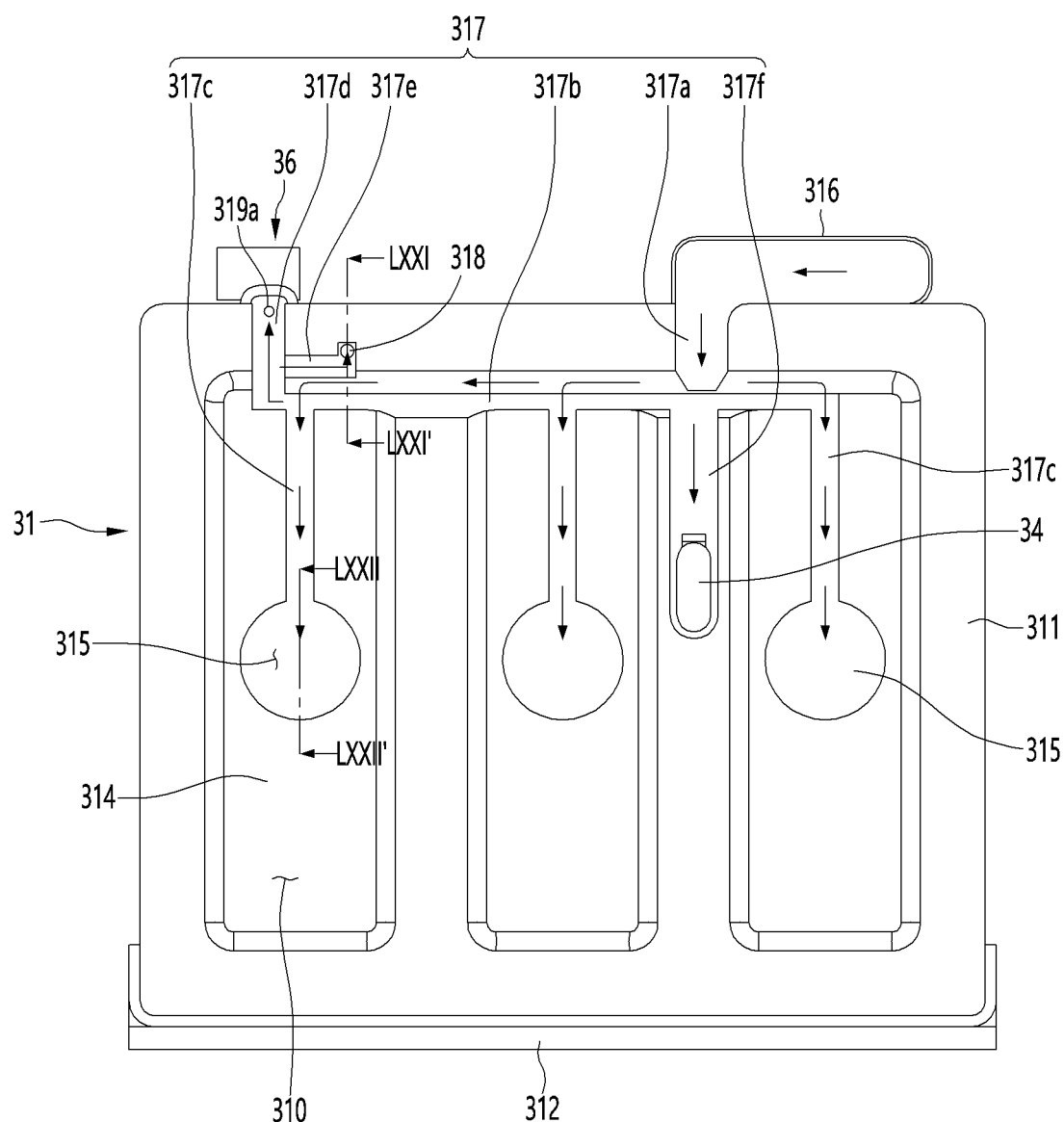
FIG. 67 is a plan view of a shelf base, which is one component of the cultivation shelf.
Figure 68:
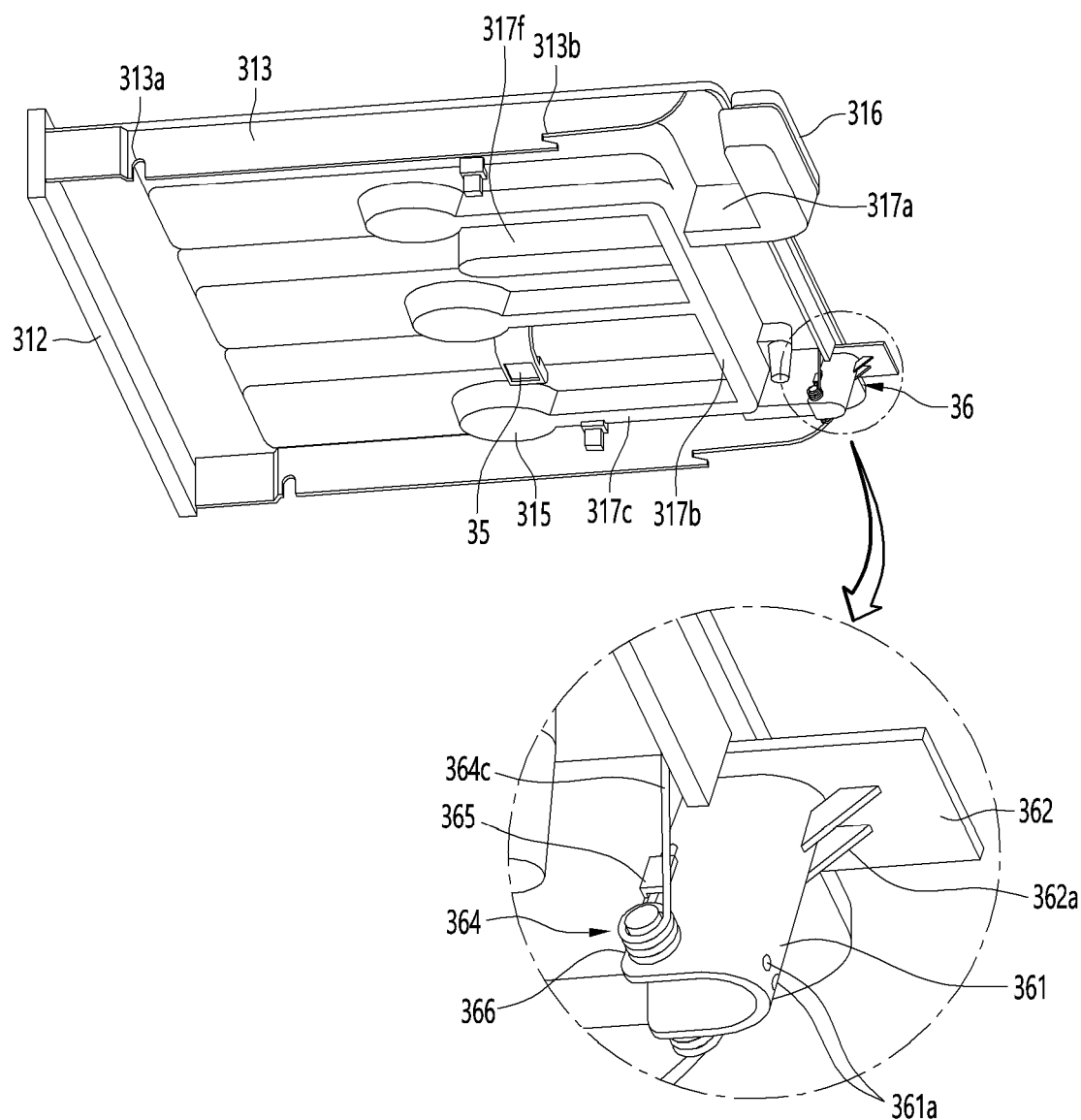
FIG. 68 is a perspective view of the shelf base as viewed from below.

FIG. 67 is a plan view of a shelf base, which is one component of the cultivation shelf, and FIG. 68 is a perspective view of the shelf base as viewed from below.

As illustrated in the drawings, the shelf base 31 may have an outer appearance of a top surface appearance, which is defined by the base top surface 311. Also, the base top surface 311 may support the tray top surface 321 of the shelf tray 32.

Also, the handle 312 may be disposed on a front surface of the shelf base 31. The handle 312 may define the front surface of the shelf base 31 and may extend from a left front end to a right end of the shelf base 31 and also may extend downward from the base top surface 311.

The handle 312 may protrude downward so that the user pulls the handle by putting his or her hand into a lower front of the shelf base 31. The user may hold the handle 312 to manipulate the withdrawal of the cultivation shelf 30.

Also, the base side surfaces 313 may be defined on both left and right sides of the shelf base 31, respectively. The base side surface 313 may extend downward from each of both left and right ends of the top surface 311 of the base 311.

A front coupling portion 313a and a rear coupling portion 313b coupled to the shelf rail 16 may be disposed on the base side surfaces 313. The front coupling portion 313a may be provided in the first half of the base side surface 313 and may be provided in a groove shape with a lower end recessed. Also, the rear coupling portion 313b may be provided at a rear end of the base side surface 313 and may be provided in a groove shape that is recessed forward.

Thus, to mount the cultivation shelf 30, that is, the shelf base 31 on the shelf rail 16, the shelf base 31 may first move backward to restrict the rear end of the shelf base 31 so that one side of the shelf rail 16 is inserted into the rear coupling portion 313b. Then, a front end of the shelf base 31 may move downward so that the other side of the shelf base 31 is inserted into the front coupling portion 313a to restrict the front end of the cultivation shelf 30 to the shelf rail 16, thereby coupling the shelf base 31 to the shelf rail 16.

A shelf detection member 35 may be provided at one side of the bottom surface of the shelf base 31. The shelf detection member 35 may be configured to detect that the cultivation shelf 30 is completely inserted and may be provided at a position corresponding to the shelf detection device 49 disposed below the cultivation shelf 30. For example, the shelf detection member 35 may be made of a magnetic material and may be exposed downward from the cultivation shelf 30.

In this embodiment, the lower lighting device 40b may be provided below the upper cultivation shelf 30a, and the shelf detection device 48 may be disposed on the lower lighting device 40b. Also, the water tank 70 and the pump cover 81 may be provided below the lower cultivation shelf 30b, and the shelf detection member 35 may be disposed on a top surface of the pump cover 81, which is a position corresponding to the shelf detection member 35. That is, the shelf detection device 48 may be disposed at a position corresponding to the position of the shelf detection member 35 among the constituents disposed below the cultivation shelf 30.

The shelf detection device 48 may be configured as a hall sensor that detects a magnet and be configured to detect the shelf detection member 35 when the cultivation shelf 30 is completely inserted. The cultivation shelf 30 has to be disposed in a state of being inserted to an accurate position. Due to the characteristics of the cultivation shelf 30 having the structure in which the cultivation shelf 30 is inserted and withdrawn, if the cultivation shelf 30 is not disposed at the correct position, the water supply pipe 84 and the water supply portion 316 may not be aligned with each other, and thus, water may leak or overflow during the water supply process. Also, during the draining process, water may leak out of the drain tray 85.

Thus, in this embodiment, the shelf detection device 48 may detect whether the cultivation shelf 30 has reached the correct position, and when the cultivation shelf 30 is not disposed at the correct position, the information, in which the cultivation is not disposed at the correct position, may be informed to the outside so that the user manipulates the cultivation shelf 30 to be disposed at the correct position.

The base seat 310 may be disposed inside the base top surface 311. The base seat 310 may have a shape corresponding to that of the seat 320, and a bottom surface of the base seat 310, that is, the base bottom surface 314 may be in surface contact with the seat bottom surface 322. Thus, the base seat 310 and the seat 320 may be in a state where the bottom surfaces are in close contact with each other to be maintained in stably mounted state, and thus, the water may be effectively supplied to the seed package 90.

Also, a shutter accommodation portion 315 may be provided at an inner center of the base seat 310. The shutter accommodation portion 315 may be disposed at a position corresponding to the shutter 33 in a state of being mounted on the shelf tray 32, and the shutter accommodation portion 315 may be provided for each of the plurality of base seats 310.

Also, the shutter accommodation portion 315 may have a size capable of accommodating the shutter 33 therein. The shutter accommodation portion 315 may be provided in a circular shape to accommodate a lower portion of the shutter 33. Also, the shutter accommodation portion 315 may define a recessed space having a set height H1 (in FIG. 57) so as to ensure vertical movement of the shutter 33 without interfering with the shutter 33 when the shutter 33 moves vertically. The shutter accommodation portion 315 may be recessed to a height at which the shutter accommodation portion is in contact with the lower end of the shutter 33 when the shutter 33 moves to the lowermost position. For example, the set height H1 may be approximately 14 mm.

The water supply portion 316 may be disposed at one side (right side in FIG. 67) of the left and right sides of the rear end of the shelf base 31. The water supply portion 316 may protrude backward and be recessed to receive water supplied through the water supply pipe 84.

Also, the drain hole 319*a* and the opening/closing member 36 that opens and closes the drain hole 319*a* may be provided on the other side (left side in FIG. 15) of the left and right sides of the rear end of the shelf base 31. The opening/closing member 36 may have a shape capable of surrounding and shielding the drain hole 319*a* and an area adjacent to the drain hole 319*a* and may protrude backward to rotate according to the operation of the driving device 86, thereby opening and closing the drain hole 319*a*.

The shelf base 31 may be provided with a base passage 317, through which water flows, on the shelf base 31. The base passage 317 may be provided to connect all of the water supply portion 316, the shutter accommodation portion 315, the water level detection portion 317*f*, the drain hole 319*a*, and the drain portion 318 to each other. In addition, the base passage 317 may guide the water supplied to the shelf base 31 so as to be effectively supplied to the seed package 90 and drained after the water supply is completed.

The base passage 317 may include a water supply guide portion 317*a*, a branch portion 317*b*, a connection portion 317*c*, and a drain guide portion 317*d*.

In detail, the water supply guide portion 317*a* may be configured to connect the water supply portion 316 to the branch portion 317*b* and may extend from one end of the water supply portion 316 to the branch portion 317*b*. Here, each of the water supply portion 316 and the water supply guide portion 317*a* may be disposed at a position higher than the branch portion 317*b*. Also, a bottom surface of the water supply guide portion 317*a* may have an inclination that gradually decreases toward the branch portion 317*b*. Thus, the water supplied to the water supply portion 316 may flow toward the branch portion 317*b*.

In addition, the branch portion 317*b* may be disposed along the rear ends of the seats 320 disposed on the shelf base 31. The branch portion 317*b* may pass through all of the plurality of seats 320 disposed on the shelf base 31, and one end of the branch portion 317*b* may be connected to the drain guide portion 317*b* connected to the drain hole 319*a*.

Also, the drain guide portion 317*d* may be connected from one end of the branch portion 317*b* to the drain hole 319*a*. The drain hole 319*a* may be defined in an end of the drain guide portion 317*d*, and the drain hole 319*a* may be defined at the lowest position of the bottom surface of the drain guide portion 317*d*. Thus, water passing through the branch portion 317*b* may be naturally discharged to the drain hole 319*a* through the drain guide portion 317*d*.

A plurality of connection portions 317*c* may be disposed on the branch portion 317*b*. The plurality of connection portions 317*c* may be provided for each of the base seats 310 and may be connected to the shutter accommodation portion 315 of the base seat 310. Thus, the water supplied to the water supply portion 316 may flow in order to the water supply guide portion 317*a* and the branch portion 317*b* and then may be supplied into all the shutter accommodation portions 315 on the shelf base 31 through the plurality of connection parts 317*c* connected to the branch portion 317*b*.

While water is supplied to the water supply portion 316 and until the set time elapses before the start of the drainage, the opening/closing member 36 may be closed, and the drain hole 319*a* may be maintained in the closed state. Thus, a state where the base passage 317 including the shutter accommodation portion 315 is filled with water may be maintained.

The base passage 317 may further include a water level detection portion 317*f*. The water level detection portion 317*f* may be configured to prevent water supply above a full water level H2 into the shelf base from occurring and may be configured so that the water level detection member 34 is disposed in the water level detection portion 317*f*.

Hereinafter, the arrangement of the water level detection member 34 will be described in more detail with reference to drawings.

Figure 69:
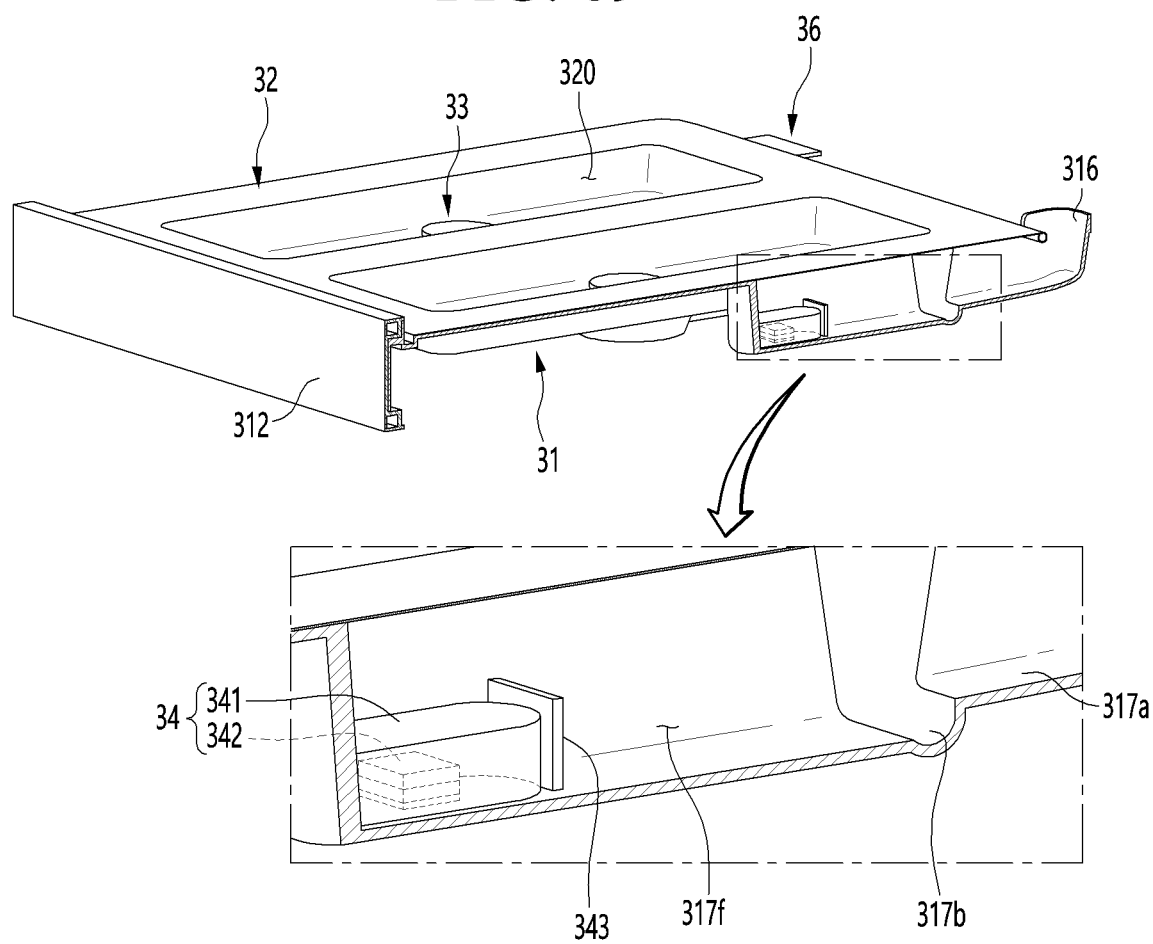
FIG. 69 is a cutaway perspective view taken along line LXIX-LXIX' of FIG. 65.
Figure 70:
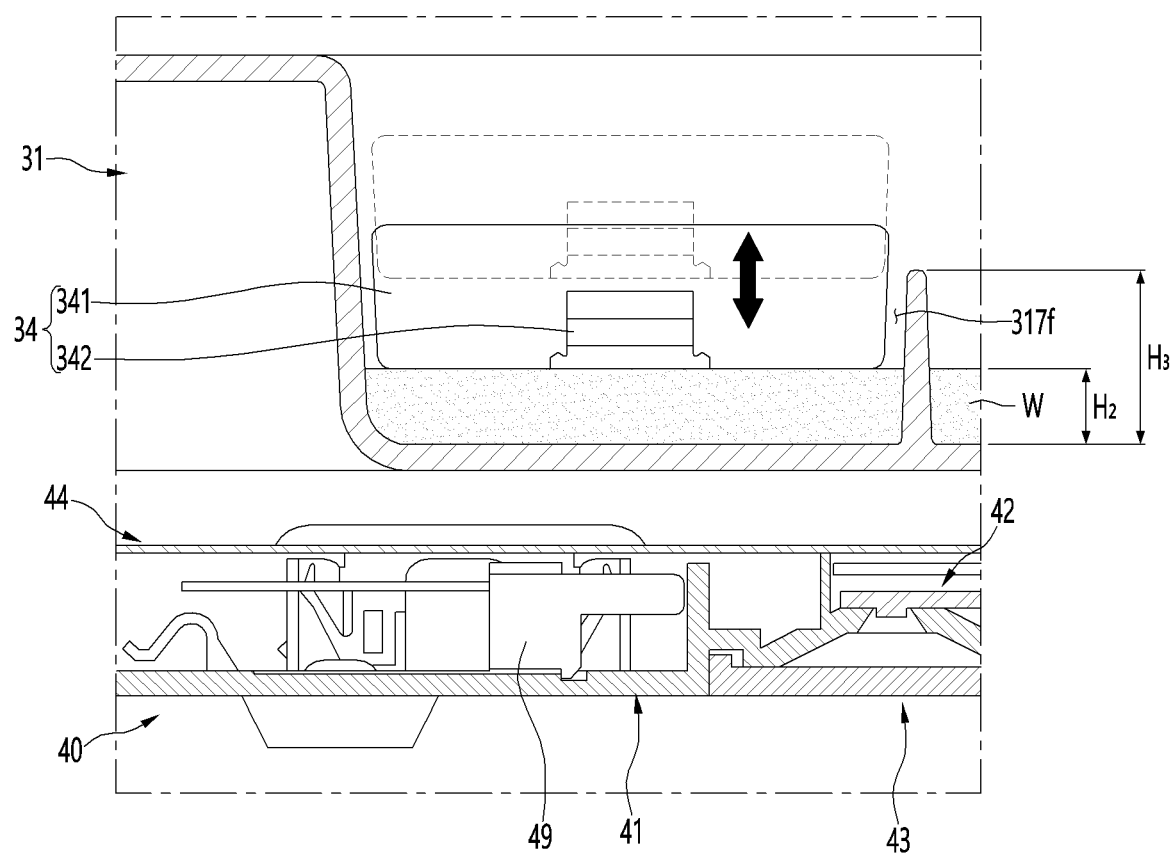
FIG. 70 is a view illustrating a state where the water level of the shelf is detected by the water level detection member of the cultivation shelf.

FIG. 69 is a cutaway perspective view taken along line LXIX-LXIX' of FIG. 65, and FIG. 70 is a view illustrating a state where the water level of the shelf is detected by the water level detection member of the cultivation shelf.

As illustrated in the drawings, the water level detection portion 317*f* may extend from one side of the branch portion 317*b*. Also, the branch portion 317*b* may be disposed at a position facing the extending end of the water supply guide portion 317*a*.

Thus, when water is first supplied from the water supply portion 316, the water supplied to the branch portion 317*b* may be directed to the water level detection portion 317*f* at the same time. Thus, when an excessive amount of water is supplied to increase in water level of the cultivation shelf 30, the excessive water supply may be detected first.

In detail, when the shelf tray 32 is mounted, the water level detection portion 317*f* may be disposed at a position that does not interfere with the seat 320. Therefore, the water level detection portion 317*f* has to be disposed at one side of the top surface 311 of the base and also has to be close to the water supply portion 316 to immediately detect that water is supplied above the full water level. Thus, the water level detection portion 317*f* may be disposed at a position that is close to the water supply portion 316 in a space between the base mounting portions 310.

If the water level detection portion 317*f* is disposed at the leftmost base seat 310, when the water level detection portion 317*f* detects a water level above the full water level, the rightmost base seat 310 may be already reached the full water level, and thus, the water may overflow to the outside of the cultivation shelf 30 as it goes over. Thus, the water level detection portion 317*f* may be disposed at a position facing the water supply guide portion 317*a* to enable more accurate detection of the water level, thereby preventing water from overflowing from the cultivation shelf 30.

Also, the water level detection portion 317*f* may extend forward and also may extend to a position at which the water level detection device 48 disposed on the lighting device 40 under the cultivation shelf 30 is disposed. Thus, when the water level detection member 34 is disposed at an end of the water level detection portion 317*f*, the water level detection member 34 may be disposed at a position facing the water level detection device 48 to accurately determine the water level of the cultivation shelf 30.

In addition, a detection member guide 343 that guides the position of the water level detection member 34 may protrude from the water level detection portion 317*f*. The detection member guide 343 may be disposed at a position spaced apart from an end of the water level detection portion by a length of the water level detection member 34 and may extend upward from a bottom surface of the water level detection portion 317*f*. Also, both sides of the detection member guide 343 may be spaced apart from an inner wall surface of the water level detection portion 317*f*, and thus, water may be introduced up to the end of the water level detection portion 317*f* at which the water level detection member 34 is disposed.

The water level detection member 34 may include a detection member case 341 and a magnet 342. The detection member case 341 may define an outer shape of the water level detection member 34 and may be made of a material having buoyancy capable of floating in water. Accordingly, the water level detection member 34 may be referred to as a floating member or a plotter. In detail, the water level detection member 34 is formed of a sponge or foam material to float on water, and a magnet 342 may be accommodated therein. Also, the magnet 342 may be disposed on an inner bottom surface of the detection member case 341. Thus, when the water level detection portion 317*f* is filled with water, the water level detection member 34 may rise as the water level increases due to the buoyancy.

A water level detection device 49 may be disposed below the cultivation shelf 30. In this embodiment, the lower lighting device 40*b* may be provided below the upper cultivation shelf 30*a*, and the water level detection device 49 may be disposed on the lower lighting device 40*b*. Also, the water tank 70 and the pump cover 81 may be provided below the lower cultivation shelf 30*b*, and the water level detection device 49 may be disposed on a top surface of the pump cover 81, which is a position corresponding to the water level detection member 34. That is, the water level detection device 49 may be disposed at a position corresponding to the position of the water level detection member 34 among the constituents disposed below the cultivation shelf 30.

Figure 73:
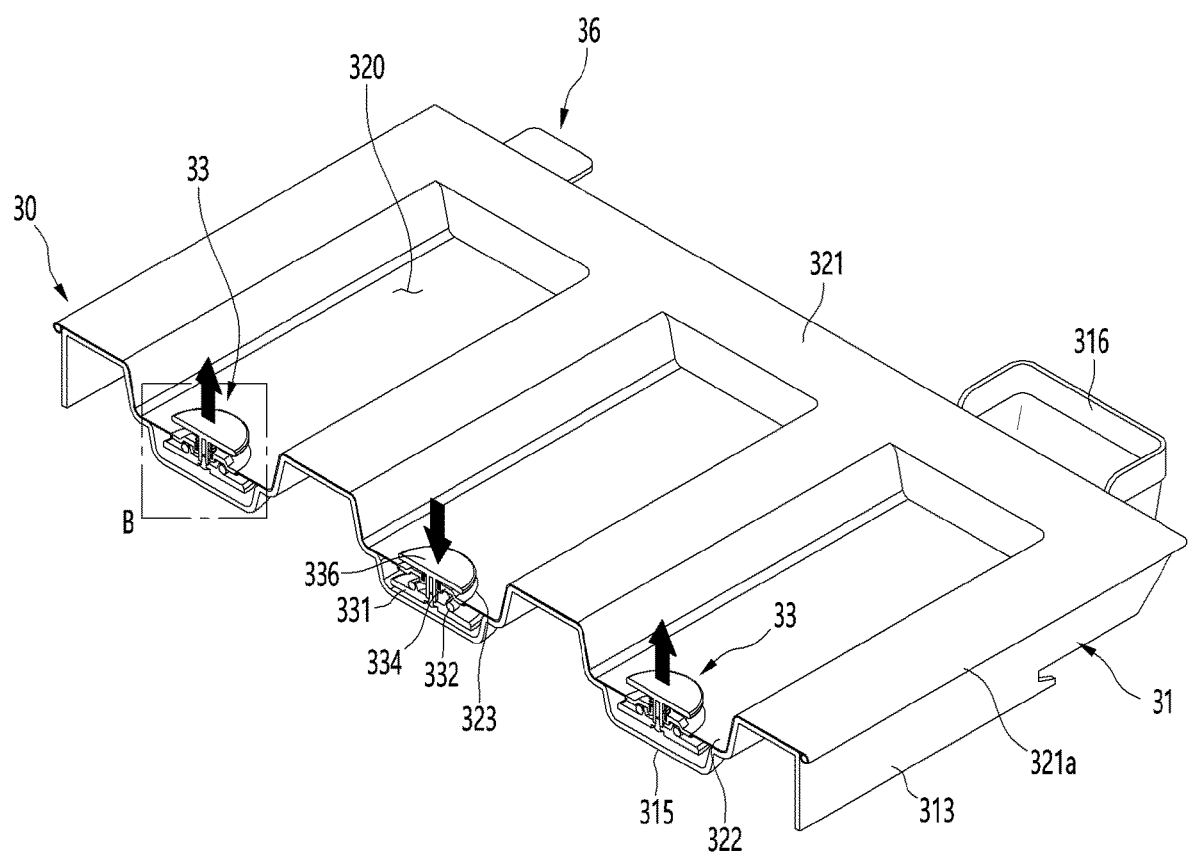
FIG. 73 is a cutaway perspective view taken along line LXXVI-LXXIVI' of FIG. 65.

FIG. 73 will be described based on the arrangement of the water level detection device 49 in the lighting device 40. As illustrated in the drawing, when the cultivation shelf 30 is completely inserted, the water level detection device 49 may be disposed below the water level detection member 34.

Meanwhile, the water level detection device 49 may be provided inside the light case 41. In addition, the water level detection device 49 may be positioned vertically below the water level detection member 34 in a state where the cultivation shelf 30 is introduced. In addition, the water level detection device 49 may be disposed close to the case cover 44 as much as possible, and may be configured to effectively detect the water level detection member 34.

The water level detection device 49 may be configured to detect a change in magnetic field and may be configured to determine a vertical height of the water level detection member 34. That is, the water level detection device 49 may detect a change in magnetic field by the magnet of the water level detection member 34 to detect a distance to the water level detection member 34, thereby determining a water level of the cultivation shelf 30. In addition, the water level detection device 49 may have a structure such as a hall sensor.

For example, when water is not supplied to the cultivation shelf 30, the water level detection member 34 may be disposed on a bottom surface of the water level detection portion 317*f*. Here, the position of the water level detection member 34 may be disposed at the closest position to the water level detection device 49, and in the water level detection device 49, the water level of the water level detection portion 317*f* may be determined to be lowest through strength of the strongest magnetic field. In this state, when the set time condition is satisfied, water may be supplied to the cultivation shelf 30.

Also, when water is supplied to the cultivation shelf 30, the water level detection member 34 may move upward according to the water level of the cultivation shelf 30 and then gradually move away from the bottom surface of the water level detection portion 317*f*. Also, the water level detection device 49 may detect that the strength of the magnetic field gradually decreases as the water level detection member 34 moves away.

At this time, when the amount of water reaching the full water level H2 or exceeding the full water level H2 is supplied to the cultivation shelf 30, the water level detection device 49 may detect this. The amount of water supplied to the cultivation shelf 30 may be controlled by the driving time of the pump 83, but the water level of the cultivation shelf 30 may be above the full water level due to other factors such as abnormality of the pump 83 or poor drainage.

When the water level detection device 49 detects that the water level of the cultivation shelf 30 is above the abnormal water level H3 that is equal to or higher than the full water level H2, the water to the cultivation shelf 30 may be stopped. That is, when the water level of the cultivation shelf 30 rises more than necessary, since the water overflows to the outside of the cultivation shelf 30, or the drainage and water supply are not smoothly performed, the driving of the pump 83 may be stopped, or the driving device 86 may be driven to forcibly drain the water of the cultivation shelf 30.

The abnormal water level H3 detected by the water level detection device 49 may be set somewhat higher than the full water level H2. The set abnormal water level H2 may be set to a specific height between the full water level H2 and a limit water level H4 in consideration of residual water remaining on the cultivation shelf 30 or an error in amount of water, which occurs during the water supply process. For example, the abnormal water level H3 may be set between about 20 mm and about 28 mm.

Also, the base passage 317 may further include a drain guide portion 317*e*. The drain guide portion 317*e* may be disposed at one side of the shelf base 31 and be configured to prevent the water level of the shelf base 31 from exceeding the limit water level H4.

Hereinafter, the drain guide portion 317*e* will be described in more detail with reference to the drawings.

Figure 71:
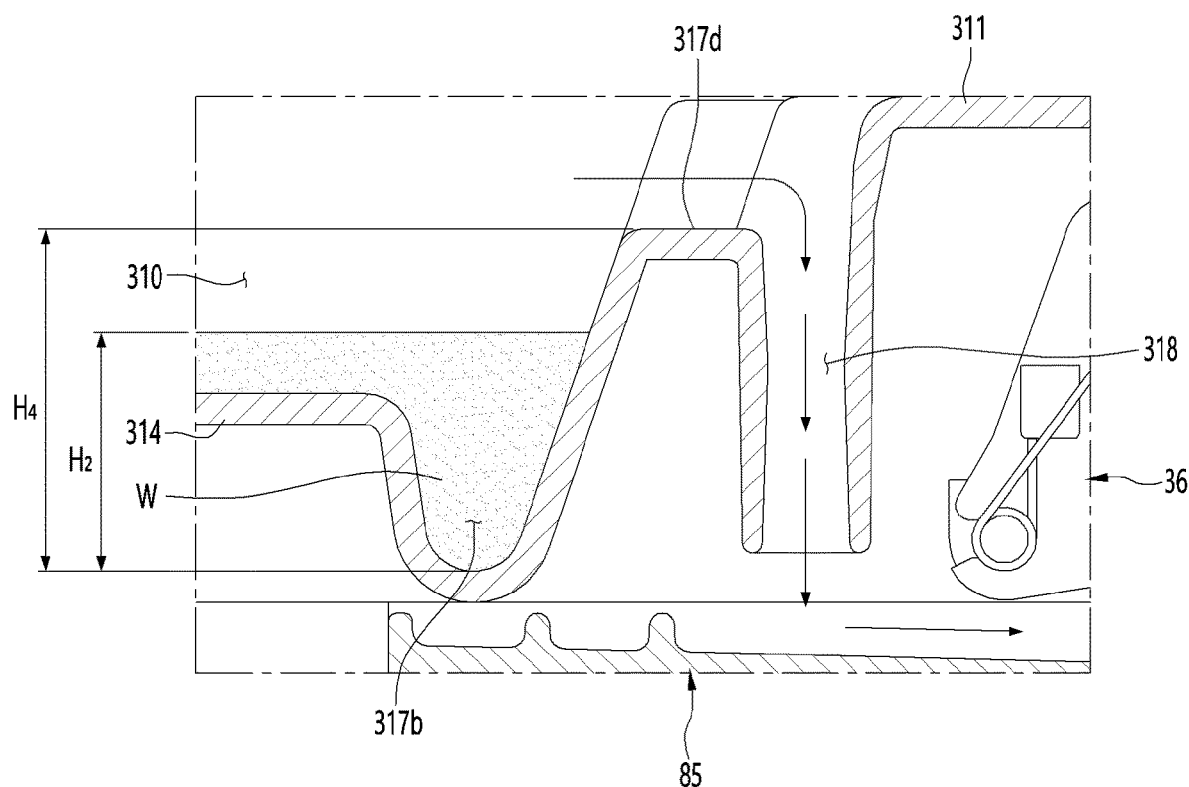
FIG. 71 is a view illustrating a water overflow state in the LXXI-LXXI' section of FIG. 67.
Figure 72:
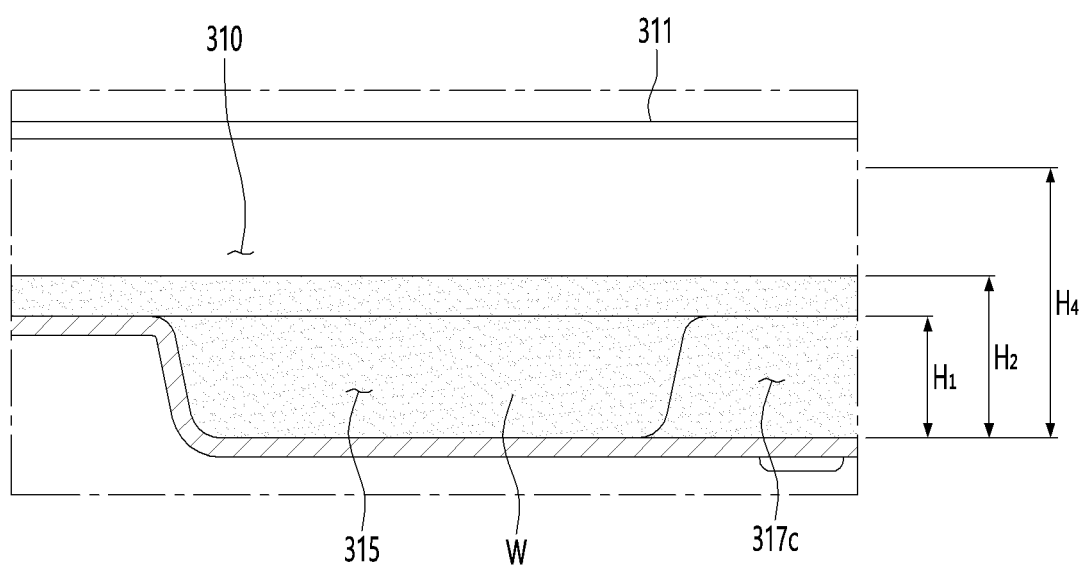
FIG. 72 is a view illustrating the water level state of the LXXII-LXXII' section of FIG. 67.

FIG. 71 is a view illustrating a water overflow state in the LXXI-LXXI' section of FIG. 67, and FIG. 72 is a view illustrating the water level state of the LXXII-LXXII' section of FIG. 67.

As illustrated in the drawings, the base passage 317 may include the drain guide portion 317*e*. The drain guide portion 317*e* may connect the branch portion 317*b* to the drain portion 318.

The drain guide portion 317*e* may be provided at the same height as the limit water level H4. The limit water level H4 may be higher than the abnormal water level H3 detected by the water level detection member 34 and lower than the height of the top surface 311 of the base of the shelf base 31. For example, the limit water level H4 may be set to about 38 mm.

The drain guide portion 317*e* may be disposed at a position above the bottom surface of the branch portion 317*b* by the limit water level H4. Also, the drain guide portion 317*e* may extend backward, and the drain portion 318 may be disposed on a rear end of the drain guide portion 317*e*.

The drain portion 318 may extend downward from the rear end of the drain guide portion 317*e* and may be provided in a tubular shape with opened top and bottom surfaces. The drain portion 318 may extend downward and may extend toward the drain tray 85. Here, the lower end of the drain portion 318 may be disposed higher than the bottom surface of the shelf base 31 so that when the cultivation shelf 30 is withdrawn, the lower end of the drain portion 318 does not interfere with the drain tray 85.

Thus, even if the water level detection device 49 fails to detect the abnormal water level H3 due to a failure or the like, the pump 83 may abnormally operate, or water of the inside of the cultivation shelf 30 may not be smoothly drained, and thus, the resupply of water may be performed. Here, when the water level inside the shelf base 31 reaches the limit water level H4, the water may be discharged through the drain portion 318 naturally.

The water level of the cultivation shelf 30 may not rise above the limit water level H4 in any case, and the phenomenon in which the water supplied to the cultivation shelf 30 overflows to flow down or contaminates the cultivation space 100 may be prevented fundamentally.

As described above, even if an abnormal water supply situation occurs in the cultivation shelf 30, but a normal water supply state, an occurrence of the water overflow situation in the cultivation shelf 30 may be prevented from occurring by the water level detection device 49 and the drain portion 318.

As illustrated in FIG. 72, in the normal water supply situation, when the pump 83 is driven for a set time or longer, the water supplied to the cultivation shelf 30 may be fully filled into the shutter accommodation portion 315 having the set height H1 and also be supplied until the full water level H2 is reached. Here, the water supplied to the cultivation shelf 30 may be approximately 1 L.

When water is supplied to the full water level H2, the water level may be higher than the bottom surface 322 of the seat, and when the seed package 90 is mounted in this state, the shutter 33 of the seat 320 may be opened so that water is supplied into the seed package 90. Also, among the plurality of seats 320, the seat 320 to which the seed package 90 is not mounted may be blocked by the shutter 33 so that water is not supplied to the seat 320.

Also, even if an excessive water supply situation occurs due to an abnormal operation of the pump 83 or erroneous detection of the water level detection device 49 during the water supply process, the water may be forcibly drained through the drain portion 318 to prevent the water level of the cultivation shelf 30 from exceeding the limit water level H4.

Hereinafter, the shutter 33 will be described in more detail with reference to the drawings.

Figure 74:
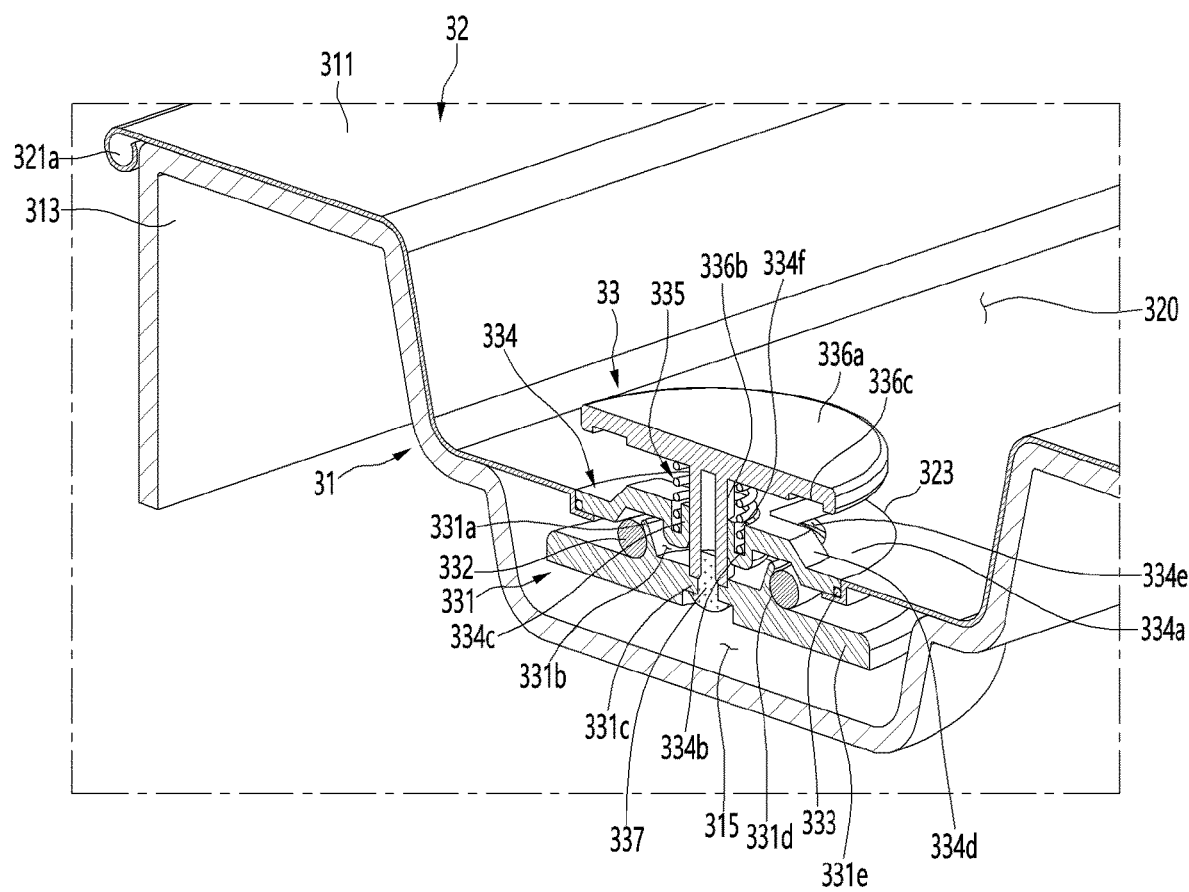
FIG. 74 is an enlarged view of section B of FIG. 73.
Figure 75:
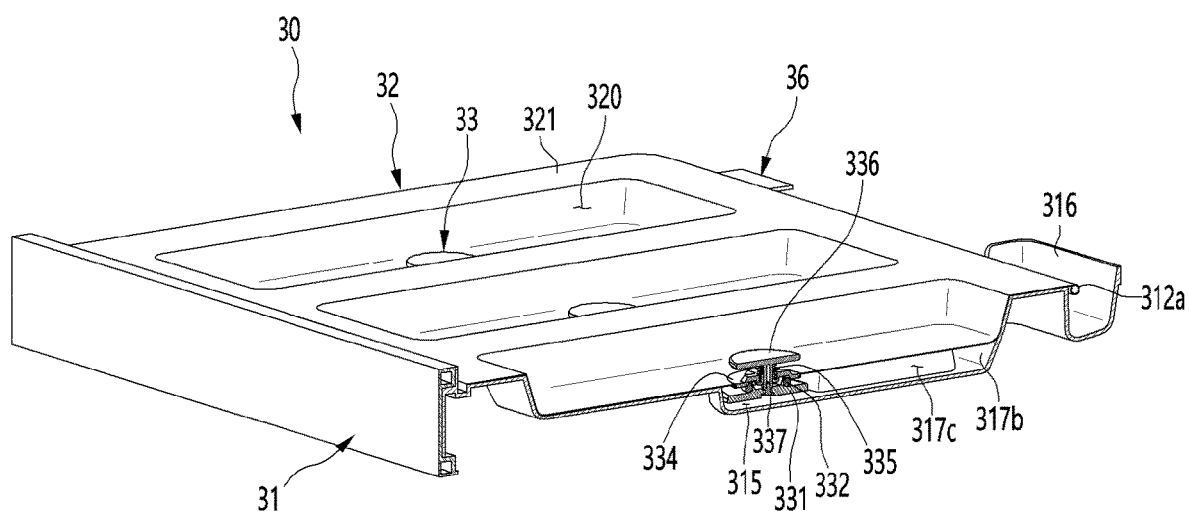
FIG. 75 is a cutaway perspective view taken along line LXXV-LXXV' of FIG. 65.
Figure 76:
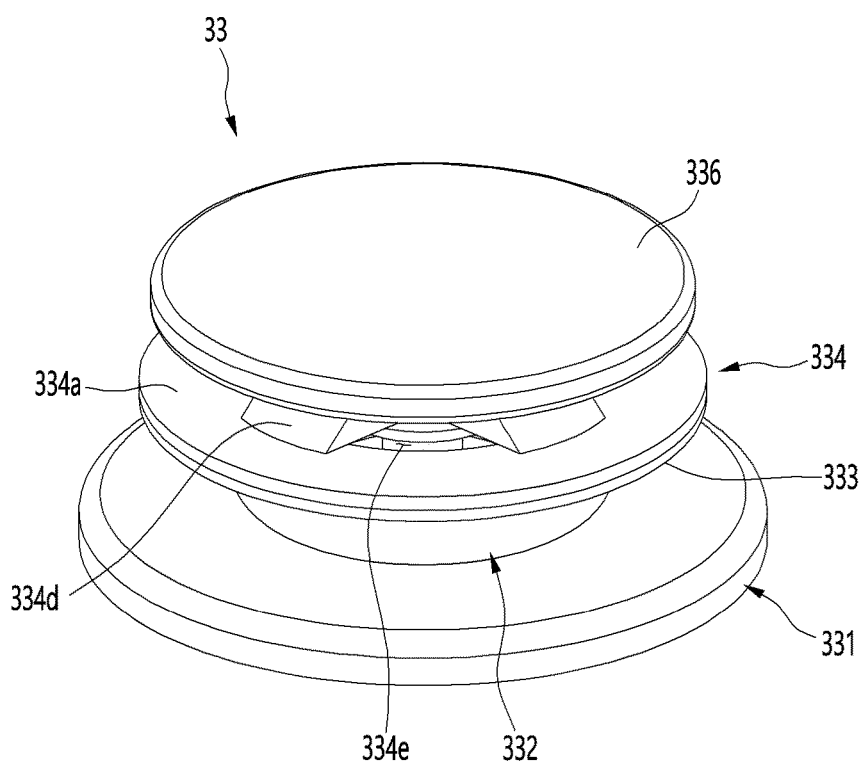
FIG. 76 is a perspective view of a shutter, which is one component of the cultivation shelf.
Figure 77:
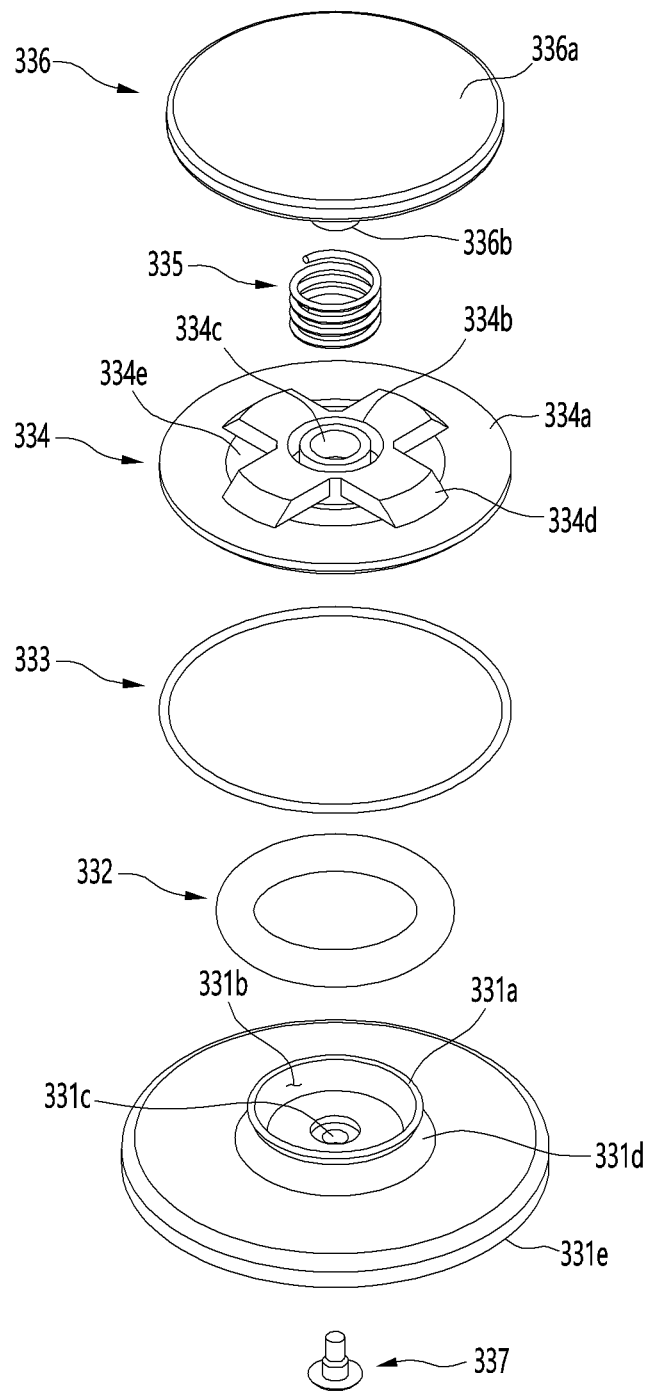
FIG. 77 is an exploded perspective view illustrating a state where the shutter is disassembled as viewed from above.
Figure 78:
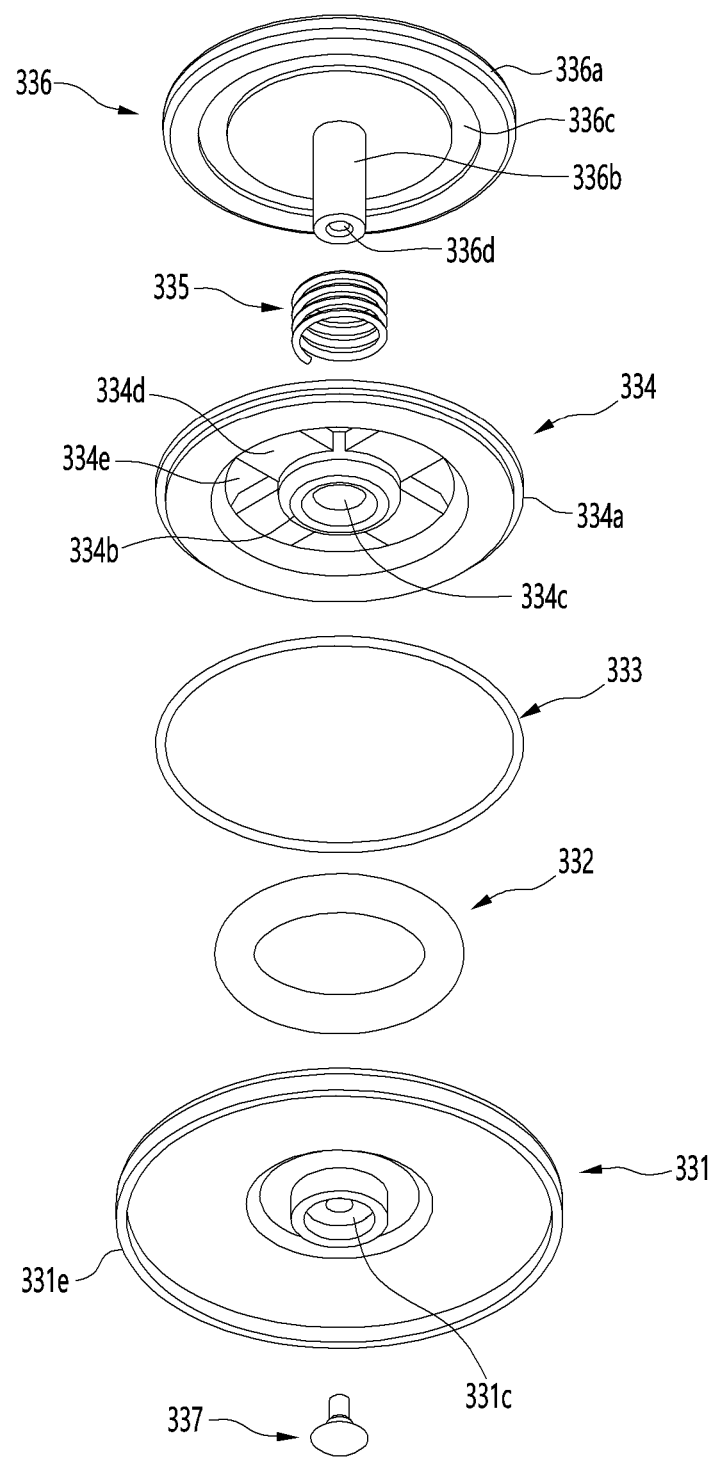
FIG. 78 is an exploded perspective view illustrating a state where the shutter is disassembled as viewed from below.

FIG. 73 is a cutaway perspective view taken along line LXXVI-LXXIVI' of FIG. 65, FIG. 74 is an enlarged view of section B of FIG. 73, FIG. 75 is a cutaway perspective view taken along line LXXV-LXXV' of FIG. 65, FIG. 76 is a perspective view of a shutter, which is one component of the cultivation shelf, FIG. 77 is an exploded perspective view illustrating a state where the shutter is disassembled as viewed from above, and FIG. 78 is an exploded perspective view illustrating a state where the shutter is disassembled as viewed from below.

As illustrated in the drawings, water supplied to the water supply portion 316 may flow through the base passage 317 and then be supplied into the shutter accommodation portion 315 via the water supply guide portion 317a, the branch portion 317b, and the connection portion 317c.

Here, the bottom surfaces of the branch portion 317b, the connection portion 317c, and the shutter accommodation portion 315 may be the same height, and the supplied water may be filled at the same time into the branch portion 317b, the connection portion 317c, and the shutter accommodation portion 315. Also, the plurality of connection portions 317c and the shutter accommodation portions 315 connected to the branch portion 317b may also be filled with water at the same time. Also, to realize the vertical movement of the shutter 33, the shutter accommodation portion 315 may be recessed by a distance at which the lower end of the shutter 33 is movable downward.

Also, the shutter 33 may be provided inside the seat 320 that is recessed in the shelf tray 32. Also, the shutter 33 may be disposed at a position corresponding to the shutter accommodation portion 315 disposed on the shelf base 31.

Thus, the constituents of the shutter 33, which are disposed at the lower side with respect to the seat bottom surface 322, may be disposed inside the shutter accommodation portion 315, and the constituents of the shutter 33, which are disposed at the upper side with respect to the seat bottom surface 322, may protrude to operate due to the contact with the seed package 90 seated on the seat 320.

The shutter 33 may be maintained in a state mounted on the seat 320 and may operate according to the mounting of the seed package 90 so that water supplied to the shelf base 31 is selectively supplied to the seat 320 and the seed package 90. Since the shutter 33 determines water supply into the seat, the shutter 33 may be referred to as a water supply device or an opening/closing device.

That is, according to the operation of the shutter 33, the communication hole 334e defined in the bottom surface 322 of the seat may be opened and closed. That is, when the communication hole 334e is closed, the water supply to the seat 320 may be blocked, and when the communication hole 334e is opened, the water supply to the seat 320 and the seed package 90 may be enabled. Here, the operation of the shutter 33 may be configured to be opened while being pressed by the seed package 90 when the seed package 90 is mounted. Thus, the cultivation shelf 30 may be configured to provide the selective water supply by the operation of the mechanically configured shutter 33 without an electrical device requiring a separate power supply.

In the detailed structure of the shutter 33, the shutter 33 may include a shutter member 331 that moves vertically inside the shutter accommodation portion 315, a communication member 334 in which an opening opened and closed by the shutter member 331 is defined, and a pressing member 336 protruding from the seat bottom surface 322 and elevated by the contact with the seed package 90.

In detail, the shutter member 331 may have a size that is capable of being accommodated inside the shutter accommodation portion 315 to cover a plurality of communication holes 334e defined in the communication member 334 from below.

The shutter member 331 may be provided in a disk shape when viewed from below, and a screw hole 331c may be defined in a center of the shutter member 331. A screw 337 may be coupled to the screw hole 331c, and the screw 337 may pass through the shutter member 331 and be coupled to the boss portion 336b of the pressing member 336. Thus, the shutter member 331 and the pressing member 336 may be integrally coupled to each other and may move vertically together.

The shutter member 331 may have a flat bottom surface. Therefore, when the water is filled in the shutter accommodation portion 315, the shutter member contacts the water surface, and the upward buoyancy can be effectively applied. Particularly, the shutter member 331 may be made of a material having buoyancy by which the shutter member 331 is capable of being floated in water, and when the shutter accommodation portion 315 is filled with water, the shutter member 331 may move upward according to the water level. For example, the shutter member 331 may be made of a foam material such as Styrofoam.

Further, a shutter member protrusion 331a protruding upward may be disposed on an upper side of the shutter member 331. The shutter member protrusion 331a may protrude upward from a position that is separated a predetermined distance from the center of the shutter member 331.

Also, a sealing member mounting portion 331d on which the O-ring 332 is mounted may be recessed in an outer surface of a shutter member protrusion portion 331a. The O-ring 332 may be provided in a shape such as an O-ring and may be made of a material having elasticity. Also, the O-ring 332 may be provided to be in contact with the bottom surface of the communication member 334 when the shutter member 331 moves upward.

Here, all of the communication holes 334e defined in the communication member 334 may be defined in an inner region of the O-ring 332. That is, the O-ring 332 may be provided in an O-ring shape, and a diameter of the O-ring 332 may be greater than a distance between the communication holes 334e. Thus, when the shutter member 331 moves upward so that the O-ring 332 is in contact with the communication member 334, water supplied to the shelf base 31 may not be supplied to the seat 320.

Also, a shutter member recess portion 331b on which the communication member guide portion 334b of the communication member 334 protruding downward is seated may be disposed on an inner surface of the shutter member protrusion portion 331a. Thus, when the shutter member 331 moves upward, a top surface of the shutter member 331 and a bottom surface of the communication member 334 may be maintained to be in close contact with each other.

That is, when the shutter accommodation portion 315 is filled with water, the shutter member 331 may move upward so that the O-ring 332 is in close contact with the communication member 334, and the communication member guide portion 334b and the shutter member recess portion 331b are in close contact with each other to maintain the closed state of the shutter member 331. In this state, the communication hole 334e may be covered by the shutter member 331 to prevent the water supplied to the shelf base 31 from flowing toward the seat 320.

The communication member 334 may be disposed at the center of the seat 320. The communication member 334 may be mounted on a communication member mounting hole 323 defined to pass through the seat 320. Here, a circumference of the communication member mounting hole 323 may be provided to be stepped and may be configured to support the circumference of the communication member 334. Also, a O-ring 332 may be further provided between the circumference of the communication member mounting hole 323 and the circumference of the communication member 334. Thus, in the state where the communication member 334 is mounted, leaking of water between the circumference of the communication member mounting hole 323 and the circumference of the communication member 334 may be prevented.

The communication member 334 may be injection-molded using a plastic material. Accordingly, the communication member 334 may form a relatively complex and three-dimensional structure to provide a structure capable of adhering to the O-ring 332 and the shutter member recessed portion 331b. Further, the communication member 334 may include a communication member guide portion 334b, a communication member circumferential portion 334a spaced apart from the communication member guide portion 334b and connected to the communication member mounting hole 323, and a plurality of open communication holes 334e formed between the communication member circumferential portion 334a and the communication member guide portion 334b.

Of course, the communication member 334 may be omitted and a communication hole 334e may be directly formed through the seat 320 of the shelf tray 32, and it will also be possible for the communication hole 334e to be opened and closed by the operation of the shutter 33.

The communication member guide portion 334b may be defined at a central portion of the communication member 334. Also, a bottom surface of the communication member guide portion 334b may protrude downward and may be provided in a corresponding shape to be seated in the shutter member recess portion 331b.

Also, a top surface of the communication member guide portion 334b may include a spring groove 334f recessed downward. The spring groove 334f may be a portion into which a lower end of the spring 335 penetrated by a boss portion 336b is accommodated and may support the spring 335 from below. Also, an upper end of the spring 335 may be supported on a bottom surface of the pressing member 336.

Therefore, the spring 335 may maintain the closed state of the shutter 33 even when water is not accommodated inside the shutter accommodation portion 315, and when the pressing member 336 moves downward, the spring 335 may be compressed. That is, when the seed package 90 is removed from the seat 320 in the state where the seed package 90 is seated, the pressing member 336 may move upward due to restoring force of the spring 335, and the shutter 33 may be maintained in the closed state.

If it is not necessary to maintain the closed state of the shutter 33 in a state where the seed package 90 is not mounted, the spring may be omitted. If water is accommodated in the shutter accommodating portion 315, the communication hole 334e can be maintained in a closed state even without the spring 335 due to the buoyancy of the shutter member 331. In addition, if water is not accommodated in the shutter accommodating portion 315, the communication hole 334e may remain open due to the weight of the shutter member 331 and the pressing member 336.

Also, a through-hole 334c through which the boss portion 336b of the pressing member 336 passes may be defined in the communication member guide portion 334b. The communication member guide portion 334b in which the through-hole 334c is defined may be bent in a shape such as a boss. Thus, the pressing member 336 may move vertically while passing through the through-hole 334c, and the shutter member 331 may also move vertically together with the pressing member 336.

The communication member circumferential portion 334a may be connected to the communication member mounting hole 323, and the O-ring 332 may be disposed along an outer end of the communication member circumferential portion 334a. An inner diameter of the communication member circumferential portion 334a may be larger than an outer diameter of the communication member guide portion 334b, and the communication member circumferential portion 334a and the communication member guide portion 334b may be spaced apart from each other. Also, the communication member 334 may further include a communication member connection portion 317c that connects the communication member circumferential portion 334a to the communication member guide portion 334b, which are spaced apart from each other.

A plurality of communication member connection portions 317c may be arranged at regular intervals along the communication member guide portion 334b and the communication member circumferential portion 334a. Thus, a space between the communication member connection portions 317c may be defined as the communication hole 334e.

The communication member connection portion 317c may connect the whole portion between the communication member guide portion 334b and the communication member circumference portion 334a. In this case, the communication holes 334e may be defined at regular intervals along the communication member connection portion 317c.

Therefore, when the shutter 33 is opened, the water of the shelf base 31 may be transferred inside the seat 320 through the communication hole 334e defined between the communication member guide portion 334b and the communication member circumferential portion 334a.

The communication member guide portion 334b may protrude further upward than the communication member circumferential portion 334a, and thus, the communication member connection portion 317c may be formed to be inclined or rounded. The communication hole 334e disposed on the communication member connection portion 317c may also open outwardly and upwardly, and water discharged when the shutter 33 is opened may flow sideways and upwards. so that the water can be more smoothly supplied to the seed package 90.

Thus, even in the state where the pressing member 336 is pressed by the seed package 90 to move downward, the communication hole 334e may not be blocked or covered, and thus, the water introduced or discharged through the communication hole 334e may smoothly flow radially with respect to the center of the communication member 334.

Also, when the shutter 33 is closed, the shutter member protrusion 331a may be accommodated in a space below the communication member connection portion 317c.

The pressing member 336 may include a contact portion 336a that protrudes from the inside of the seat 320 and is in contact with the seed package 90 and a boss portion 336b extending downward from a center of the contact portion 336a.

The contact portion 336a may be provided in a disk shape and may have a size corresponding to a top surface of the water inlet 912 of the seed package 90. Thus, when the seed package 90 is mounted, the contact portion 336a may be pressed by the top surface of the water inlet 912 from the inside of the water inlet 912.

A size of the contact portion 336a may correspond to that of the communication member 334, and thus the communication member 334 may be configured to be covered by the contact portion 336a when viewed from above.

Also, a contact portion groove 336c may be defined in a bottom surface of the contact portion 336a. The contact portion groove 336c may be defined along a circumference of a bottom surface of the contact portion 336a and may be recessed at a position facing the communication hole 334e of the communication member 334. Thus, when water is supplied through the communication hole 334e, a space may be secured between the communication hole 334e and the bottom surface of the contact portion 336a to facilitate the flow of the supplied water.

Also, the boss portion 336b may extend downward from the center of the contact portion 336a and may extend downward to pass through the through-hole 334c. Also, a screw hole 336d may be defined on a bottom surface of the boss portion 336b so that the screw 337 passing through the shutter member 331 is coupled to the bottom surface of the boss portion 336b. Thus, the shutter member 331 and the pressing member 336 may be integrally coupled to each other by the screw 337.

As described above, the pressing member 336 and the shutter member 331 may open and close the communication hole 334e while moving in the vertical direction based on the communication member 334 in a fixed state and also may selectively supply water to the seed package 90.

Also, although this embodiment discloses the structure in which the communication member 334 is mounted on the communication member mounting hole 323 opened in the seat 320, the separate communication member 334 may not be mounted, and when the seat bottom surface 322 is molded, a structure corresponding to the communication member 334 may be molded together.

Hereinafter, the operation of the shutter 33 for selectively supplying water and a water supply/drain structure will be described in more detail with reference to the drawings.

Figure 79:
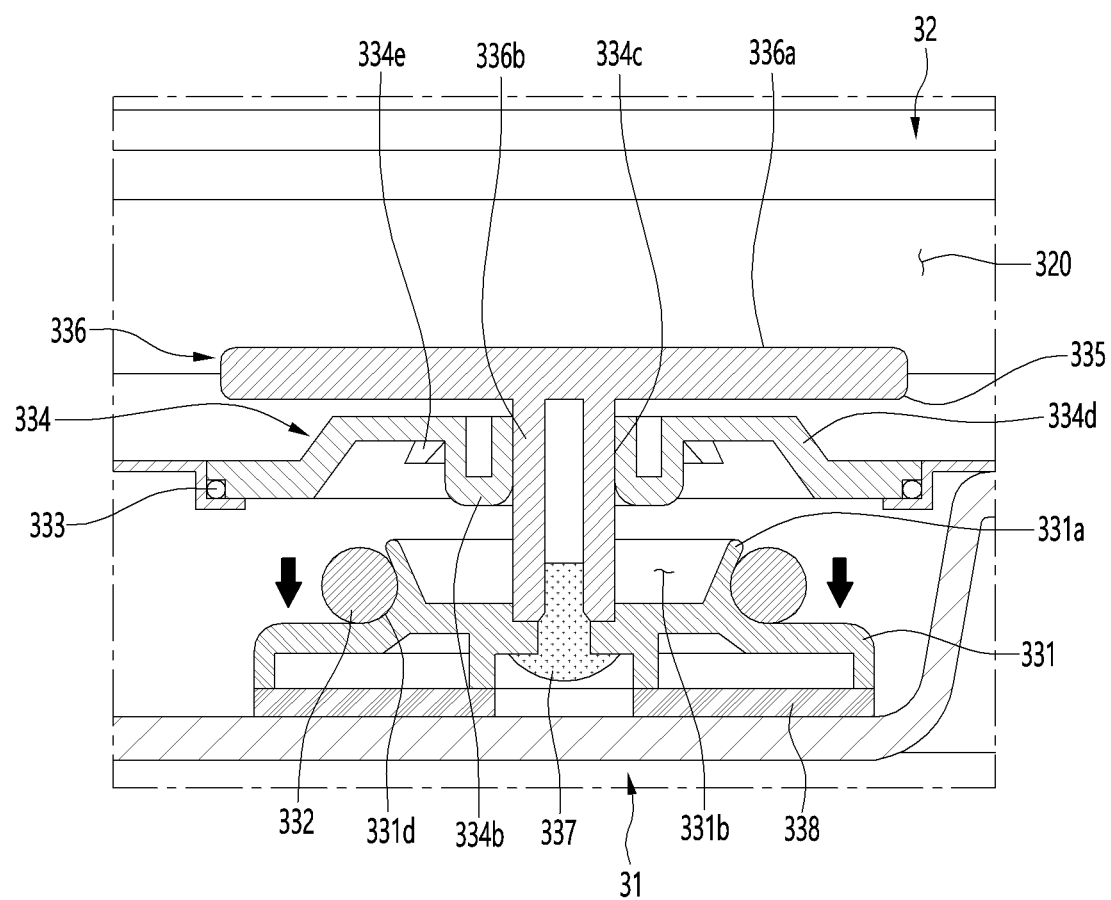
FIG. 79 is a view illustrating the shutter state when water is not supplied to the cultivation shelf.

FIG. 79 is a view illustrating the shutter state when water is not supplied to the cultivation shelf.

As illustrated in the drawings, when water is not supplied to the cultivation shelf 30, or when the water in the cultivation shelf 30 is fully drained, there is no water in the shutter accommodation portion 315.

When there is no water inside the shutter accommodation portion 315, the buoyancy for moving the shutter 33 upward is not applied. Also, the shutter 33 may move downward by its own weight, and the bottom surface of the shutter member 331 may be supported on the bottom surface of the shutter accommodation portion 315.

Also, in this state, the shutter 33 may be in an opened state where the shutter moves downward. Also, since the shutter 33 moves downward, the contact portion 336a of the pressing member 336 may shield a portion in which the communication hole 334e is defined, and when viewed from the outside, an area of the contact portion 336a, which corresponds to the communication member 334 may be covered.

In this state, by driving the pump 83, the water in the water tank 70 can be supplied to the cultivation shelf 30 through the water supply pipe 84.

Figure 80:
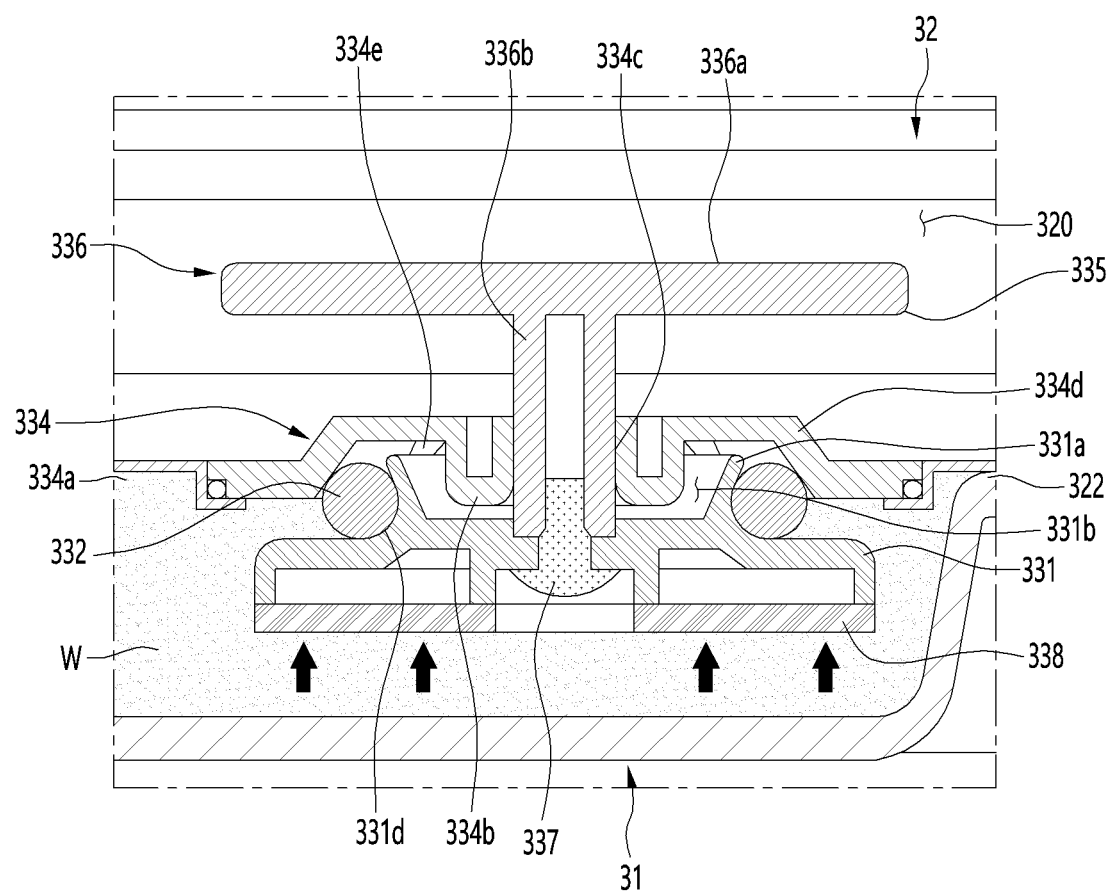
FIG. 80 is a view illustrating the shutter state when water is supplied to the cultivation shelf.

FIG. 80 is a view illustrating the shutter state when water is supplied to the cultivation shelf.

As illustrated in the drawing, when water is supplied to the water supply portion 316 of the cultivation shelf 30, the water may be supplied along the base passage 317 of the shelf base 31. In this case, water may be supplied to all the shutter accommodation portions 315 provided in the cultivation shelf 30. That is, regardless of whether the seed package 90 is mounted, water may be supplied to all the shutter accommodation portions 315 of the cultivation shelf 30.

Water W supplied to the shutter accommodation portion 315 may be supplied to a set amount according to the operation time of the pump 83, and the amount of water W capable of reaching the full water level H2 may be supplied. Alternatively, the water supply may be stopped by the water level detection member 34 during this process.

All of the plurality of shutter accommodation portions 315 may be filled by driving the pump 83, and the shutter 33 may move upward by the water W filled in the shutter accommodation portions 315. In detail, the shutter member 331 may generate buoyancy due to the water W filled in the shutter accommodation portion 315, and thus, the shutter 33 may move upward.

In this case, the shutter member 331 may have the buoyancy by which the shutter member 331 is capable of being floated in the water W and thus may move upward as the shutter accommodation portion 315 is filled with the water W. Meanwhile, the entirety of the shutter member 331 may not be formed of a material having buoyancy. For example, as illustrated in FIGS. 79 and 80, a separate buoyancy member 338 formed of a material having buoyancy may be further coupled to the bottom surface of the shutter member 331. That is, the shutter member 331 is formed of a plastic material, and the buoyancy member is formed of a material having buoyancy that can float on water, and then mounted on the lower surface of the shutter member 331 to fill the shutter accommodating portion 315 may move upwards in the water. Due to this structure, the durability of the shutter member 331 can be increased, while buoyancy for the operation of the shutter member 331 can be provided.

Meanwhile, when water is completely filled in the shutter accommodation portion 315, the shutter member 331 can be raised to the maximum height, and as illustrated in FIG. 80, the O-ring 332 is in contact with the circumference of the communication hole 334e and thus the shutter 33 may be in a closed state. When the shutter 33 is closed, the circumferences of the communication holes 334e are hermetically sealed by the O-ring 332, and thus water cannot be supplied into the seat 320.

Also, when the shutter 33 is closed, the pressing member 336 may protrude to the maximum height to protrude from the bottom surface 322 of the seat. In the state where the seed package 90 is not mounted on the cultivation shelf 30, the shutter 33 may be maintained in the closed state, and water may not be supplied to the inside of the seat 320.

The seed package 90 may be mounted on the cultivation shelf 30 for cultivation of the plants. Also, water may be supplied into the seat 320 and the seed package 90 when water is supplied to the seat 320, on which the seed package 90 is seated, among the plurality of seats 320.

Figure 81:
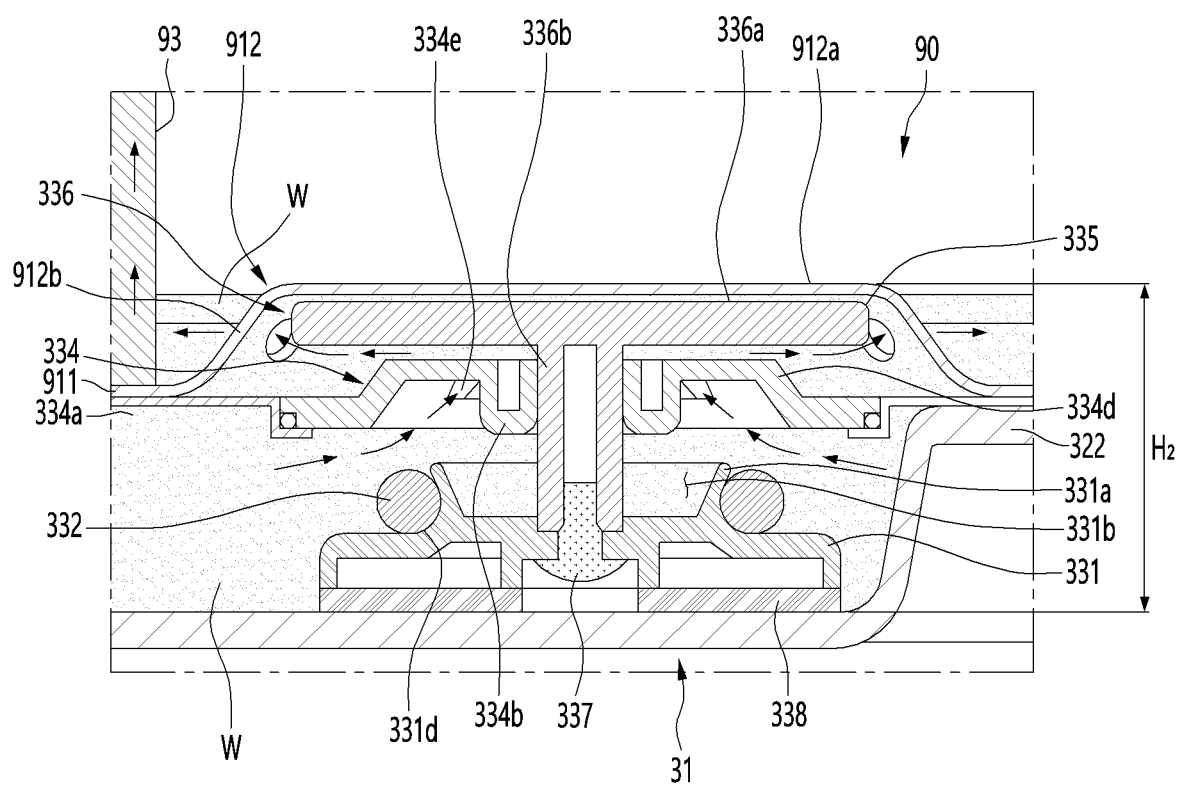
FIG. 81 is a view illustrating the shutter state and water supply state in a state where the seed package is seated on the cultivation shelf.

FIG. 81 is a view illustrating the shutter state and water supply state in a state where the seed package is seated on the cultivation shelf.

As illustrated in the drawings, the seed package 90 may be seated on the cultivation shelf 30. When the seed package 90 is seated on the seat 320, the pressing member 336 of the shutter 33 may be disposed inside the water inlet 912 of the seed package 90, and the pressing member 336 may be pressed by a top surface of the water inlet 912.

The pressing member 336 may be pressed by a weight of the seed package 90 to move downward. As the pressing member 336 moves, the shutter member 331 connected to the pressing member 336 may also move downward, and the shutter 33 may be opened. That is, the shutter member 331 may move to a bottom surface of the shutter accommodation portion 315, and the O-ring 332 may be spaced apart from the communication member 334 so that the water supplied to the cultivation shelf 30 is introduced into the seat 320 through the communication hole 334e.

In detail, the water supplied to the cultivation shelf 30 may be guided to the shutter accommodation portion 315 along the base passage 317. At this time, if the seed package 90 is mounted, the shutter 33 may be opened and water may flow into the seat 320.

Here, the communication hole 334e may be provided in a shape of which side and top surfaces are opened, and thus, even when the pressing member 336 move downward, the water may be effectively discharged. Water passing through the communication hole 334e defined in the seat bottom surface 322 may be radially discharged from the center of the shutter 33. Also, the container bottom surface 911 of the seed package 90 may be in contact with the seat bottom surface 322. Thus, water discharged through the communication hole 334e may be supplied into the seed package 90 through the container opening 912c defined along the circumference of the water inlet 912.

The container opening 912c may be disposed at a side that is spaced apart from the communication hole 334e and may be defined along the circumference of the communication hole 334e. Thus, the water discharged radially through the communication hole 334e may be supplied into the container 91 through the container opening 912c.

The water supplied to the cultivation shelf 30 may be supplied to the full water level H2 when a set amount of water is supplied. The full water level H2 may be set at least higher than the container opening 912c. Thus, when the water supply to the cultivation shelf 30 is completed, the water may be filled up to a top surface of the water inlet 912 inside the seed package 90.

The water introduced into the seed package 90 may be supplied to the seed accommodation member 93 disposed to be in contact with the container bottom surface 911 of the seed package 90, and the seed accommodation member 93 may absorb the supplied water to supply the water to seeds or plants inside the seed accommodation member 93. Here, the water supplied to the seeds or plants may contain nutrients input from the water tank 70, and thus, even in the state without providing a separate medium or soil inside the seed package 90, the nutrients required for the growth of the seed or plant may be supplied.

In the state where the water is supplied to the cultivation shelf 30, the opening/closing member 36 may be maintained in the closed state for a set time. Also, after the time for which a sufficient amount of water is absorbed into the seeds or plants elapses, the driving device 86 may operate to open the opening/closing member 36, and the water of the cultivation shelf 30 may be discharged through the drain hole 319a.

Figure 82:
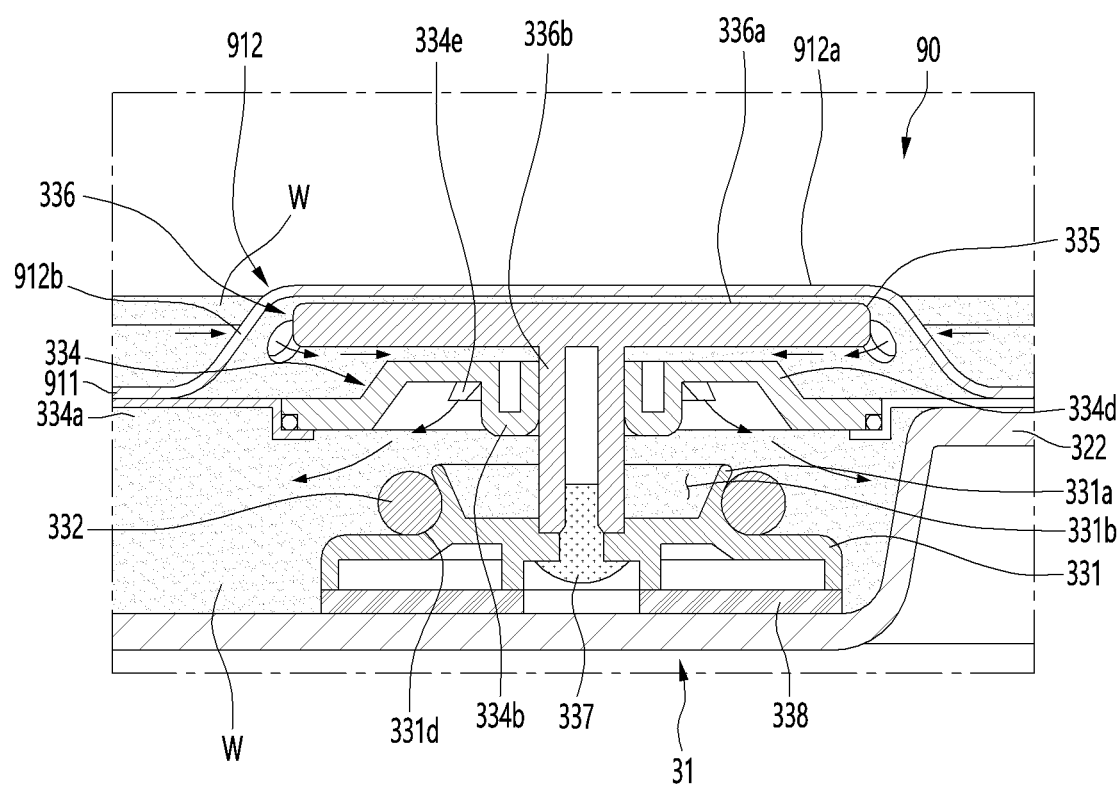
FIG. 82 is a view illustrating the shutter state and drainage state in a state where the seed package is seated on the cultivation shelf.

FIG. 82 is a view illustrating the shutter state and drainage state in a state where the seed package is seated on the cultivation shelf.

As illustrated in the drawing, when a set time elapses after the water supply in the state where the seed package 90 is mounted on the seat 320, the water inside the cultivation shelf 30 may be drained. The opening/closing member 36 may open the drain hole 319a by the driving of the driving device 86, and the water inside the cultivation shelf 30 may be discharged through the drain hole 319a.

In detail, the water inside the cultivation shelf 30 may be drained by the opening of the drain hole 319a. Here, the water inside the shutter accommodation portion 315 may flow toward the drain hole 319a along the base passage 317.

Here, since the seed package 90 is mounted, the shutter 33 may be maintained in the opened state as ever. Thus, the water inside the seed package 90 may be drained through the container opening 912c of the water inlet 912 to flow into the shutter accommodation portion 315 through the communication hole 334e of the seat 320.

As a result, the water inside the cultivation shelf 30 as well as the water inside the seed package 90 may be discharged through the base passage 317 to the drain hole 319a. Also, the water discharged through the drain hole 319a may be collected to the water tank 70 through the drain tray 85 and the drain pipe 89.

Also, when the drainage inside the cultivation shelf 30 is completed, the opening/closing member 36 may be returned to its initial position by the operation of the driving device 86 to close the drain hole 319a.

When the water of the cultivation shelf 30 is fully drained, no water exists inside the cultivation shelf 30, and the water inside the seed package 90 as well as the cultivation shelf 30 may be fully drained.

Alternatively, most of the water may be drained even if water does not exist completely inside the cultivation shelf 30 and the seed package 90, and the remaining water may also be removed by the operation of the blower 50.

As described above, the inside of the seed package 90 as well as the cultivation shelf 30 may be maintained without water except for a certain time period after the water supply. Thus, the mold or green algae may be prevented from being generated on the cultivation shelf 30, and thus, the clean state may be maintained.

Particularly, the water supplied to the seat 320, on which the seed package 90 is mounted, as well as the seat 320, on which the seed package 90 is not mounted, may not be exposed. That is, when the seed package 90 is mounted, the inside of the seat 320 may be filled by the seed package 90, and water passing through the shutter 33 may be supplied to the seed package 90m, and thus, the water supplied to the outside may not be exposed.

In addition, when the seed package 90 is not mounted, the shutter 33 may be maintained in the closed state so that the water in the shelf base 31 is not exposed to the seat 320. Therefore, since the cultivation shelf 30 is not expose the supplied water to the outside in any case regardless of whether the seed package 90 is mounted, the contamination due to the water exposed to the outside may be fundamentally prevented to allow the inside of the cultivation space 100 to be maintained in the clean state.

Hereinafter, the opening/closing member 36 will be described in more detail with reference to the drawings.

Figure 83:
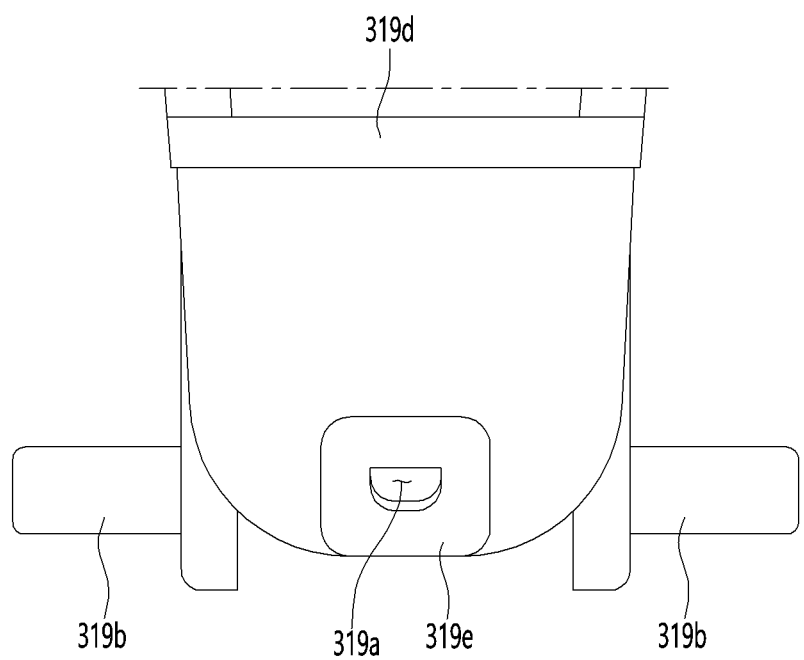
FIG. 83 is a view of the shelf drain portion of the shelf base as viewed from rear.
Figure 84:
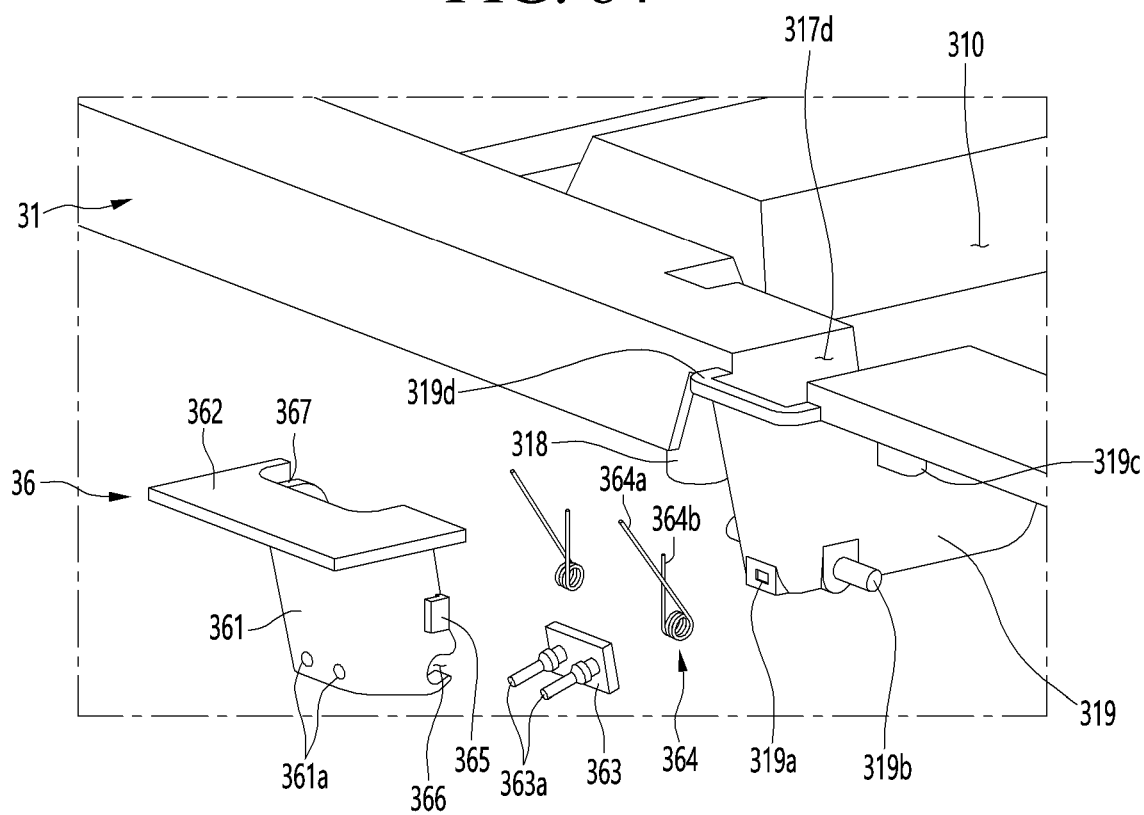
FIG. 84 is an exploded perspective view illustrating a coupling structure of an opening/closing member according to an embodiment of the present disclosure.
Figure 85:
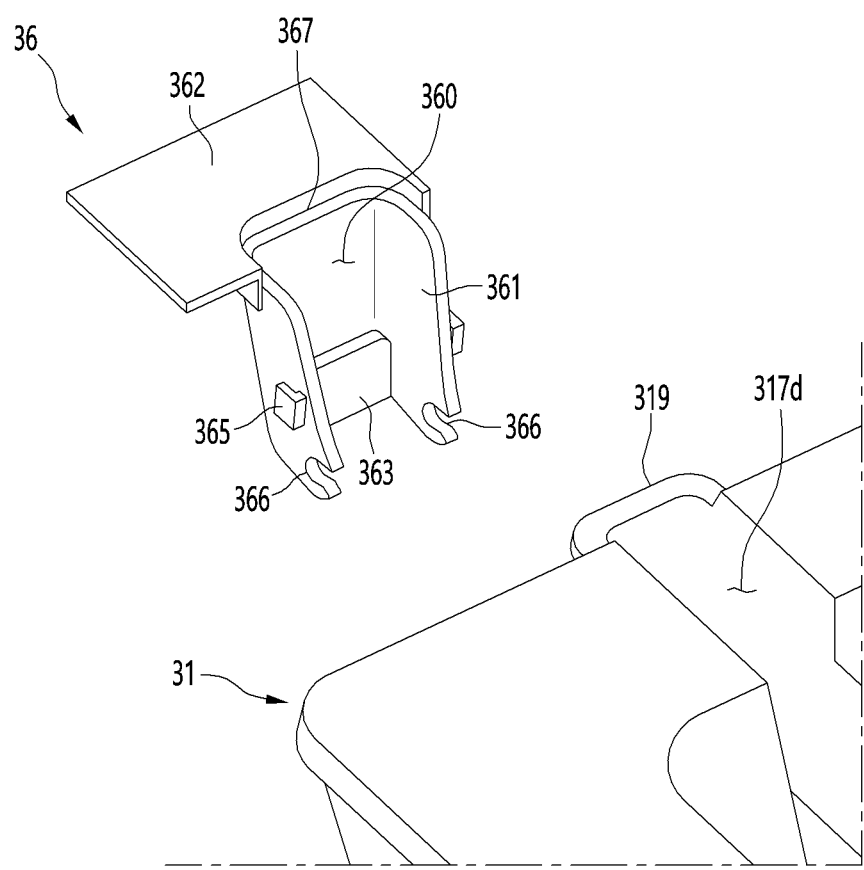
FIG. 85 is an exploded perspective view illustrating the state where the opening/closing member is separated from the shelf base.

FIG. 83 is a view of the shelf drain portion of the shelf base as viewed from rear, FIG. 84 is an exploded perspective view illustrating a coupling structure of an opening/closing member according to an embodiment of the present disclosure, and FIG. 85 is an exploded perspective view illustrating the state where the opening/closing member is separated from the shelf base.

As illustrated, a shelf drain portion 319 protruding backward and downward may be formed at the rear end of the shelf base 31. The shelf drain portion 319 may form at least a portion of the recessed drain guide portion 317d.

The shelf drain portion 319 may protrude toward the drain tray 85, and at least the bottom of the rear surface of the shelf drain portion 319 where the drain hole 319a may be formed to be positioned above the drain tray 85. Therefore, the opening/closing member 36 does not interfere with the drain tray 85 even when the cultivation shelf 30 is introduced and withdrawn, and at the same time, when the opening/closing member 36 is opened, the water of the cultivation shelf 30 may be drained while falling into the drain tray 85.

The shelf drain portion 319 may protrude in a shape in which the width decreases as it goes downward as a whole, and the rear surface thereof is formed in a rounded shape so that the inner surface of the opening/closing member 36 may be formed to be in close contact with the form of wrapping the rear surface of the shelf drain portion 319.

In addition, the drain hole 319a may be formed at the lower end of the rear surface of the shelf drain portion 319. The drain hole 319a may be formed at the center of a sealing portion 319e protruding from the bottom of the rear surface of the shelf drain portion 319. The sealing portion 319e may be formed in a flat shape and may slightly protrude from an outer surface of the curved shelf drain portion 319. Therefore, when the opening/closing member 36 is closed, the entire sealing portion 319e including the drain hole 319a is brought into close contact with the inner surface of the opening/closing member 36, so that the drain hole 319a can be closed.

Opening/closing member rotation shafts 319b protruding outward may be formed on both left and right sides of the shelf drain portion 319. The opening/closing member rotation shaft 319b may be coupled to the shaft coupling portion 366 of the opening/closing member 36, and the opening/closing member 36 is rotated based on the opening/closing member rotation shaft 319b to open and close the drain hole 319a. The position of the opening/closing member rotation shaft 319b may be located in front of the drain hole 319a and may be arranged on the same extension line as the drain hole 319a, so that the drain hole 319a can be effectively airtight in a state where the opening/closing member 36 is not rotated.

In addition, the opening/closing member rotation shaft 319b may protrude further through the shaft coupling portion 366 and may extend so that an elastic member 364 providing elastic force to the opening/closing member 36 is mounted. In addition, a first fixing portion 319c supported by one end of the elastic member 364 may be formed on upper portions of both side surfaces of the shelf drain portion 319.

In addition, a drain portion edge 319d may be formed along an upper end of the rear surface of the shelf drain portion 319. The drain portion edge 319d may be seated on a stepped portion 367 formed on the opening/closing member 36, and the drain portion edge 319d and the stepped portion 367 may be coupled to each other in a state where the opening/closing member 36 is closed so that the opening/closing member 36 is engaged with the shelf drain portion 319 to maintain a closed state.

The opening/closing member 36 may be provided at a rear surface of the shelf drain portion 319. The opening/closing member 36 may be formed to surround the shelf drain portion 319 from the rear and may be formed to open and close the drain hole 319a by rotation.

In detail, the opening/closing member 36 may include an opening/closing body 361 that surrounds the shelf drain portion 319 from the rear and a rotation manipulation portion 362 pressed by the driving device 86.

The opening/closing body 361 may be formed to correspond to the shape of the rear surface of the shelf drain portion 319. The opening and closing body 361 may extend from the lower end to the upper end of the shelf drain portion 319. The opening/closing body 361 may form a recessed space 360 to accommodate portions of the rear surface and both side surfaces of the shelf drain portion 319 and can be formed to enclose an adjacent area to the drain hole 319a including the drain hole 319a.

In addition, the front surface thereof may be opened to form a recessed space in the rear of the opening and closing body 361, and the shelf drain portion 319 may be inserted through the open front surface of the opening and closing body 361. Meanwhile, a sealing member 363 may be provided on an inner surface of the opening and closing body 361.

The sealing member 363 may be provided on an inner surface of the opening and closing body 361 facing the drain hole 319a. In addition, the sealing member 363 may be formed to be larger than the drain hole 319a, and in a state where the opening/closing member 36 is in close contact with the shelf drain portion 319, the drain hole 319a may be shielded by being in contact with the circumference of the drain hole 319a, including the opened rear surface of the drain hole 319a.

The sealing member 363 may be formed of a material having elasticity such as rubber or urethane and may completely air-tighten the distance between the opening/closing member 36 and the shelf drain portion 319, and in a state where the opening/closing member 36 is closed, water may not be drained through the drain hole 319a.

Meanwhile, the sealing member 363 may include a sealing portion 319e for shielding the drain hole 319a and a fixing portion 363a extending from the sealing portion 319e and fixed to the opening/closing body 361. The sealing portion 319e may be formed in a plate shape, and is formed to shield the drain hole 319a and the sealing portion 319e. The sealing portion 319e may be formed of a material having elasticity, may be effectively in close contact with the circumference of the curved shelf drain portion 319 and may prevent a gap from occurring between the drain hole 319a and the sealing portion.

The fixing portion 363a protrudes rearward from the rear surface of the sealing member 363 and may be formed to pass through a fixture 361a formed in the opening/closing body 361. In addition, the fixing portion 363a may be press-fitted into the fixture 361a, and at least a portion thereof may be formed larger than the diameter of the fixing portion 363a so that the sealing member 363 may be fixedly mounted thereto. In addition, a portion protruding to the outside may be removed after the sealing member 363 is mounted on the opening/closing body 361. Of course, the sealing member 363 may be fixed by being attached or inserted into the inner surface of the opening and closing body 361 without the fixing portion 363a.

In addition, shaft coupling portions 366 to which the opening/closing member rotating shafts 319b are coupled may be formed on both sides of the opening and closing body 361. The shaft coupling portion 366 may be recessed at the open front end of the opening/closing body 361 and may be formed such that the opening/closing member rotation shaft 319b is press-fitted. At this time, the position of the shaft coupling portion 366 may be formed at the same position as the height of the sealing member 363 and the drain hole 319a.

The opening/closing member 36 may be rotatably mounted on the shelf base 31 by inserting the rotating shaft 319b into the shaft coupling portion 366. In addition, the opening/closing member rotation shaft 319b may pass through the shaft coupling portion 366 and protrude further. The elastic member 364 may be mounted on the opening/closing member rotation shaft 319b protruding outward from the shaft coupling portion 366. For example, the elastic member 364 may have a structure such as a torsion spring. In addition, the elastic member 364 may be provided on a pair of opening/closing member rotation shafts 319b disposed on both sides of the opening/closing member 36.

The elastic member 364 may include a winding portion 364a through which the opening/closing member rotation shaft 319b passes, and a first extension portion 364b and a second extension portion 364c extending from both ends of the winding portion 364a. In this case, the first extension portion 364b may be hooked and fixed to the first fixing portions 319c provided on both sides of the shelf drain portion 319.

In addition, the second extension portion 364c may be fixed to the second fixing portion 365 formed on both side surfaces of the opening and closing body 361. The second fixing portion 365 may be formed at the front end of both side surfaces of the opening and closing body 361 and may be formed above the shaft coupling portion 366.

Accordingly, the elastic member 364 may be elastically deformed when the opening/closing member 36 rotates, and provide an elastic force to restore the initial state where the elastic member 364 shields the drain hole 319a. In addition, the elastic member 364 presses the opening/closing member 36 in the closing direction so that the opening/closing member 36 shields the drain hole 319a in a state where no external force is applied to the elastic member and thus may be in close contact with the shelf drain hole 319a.

Meanwhile, the rotation manipulation portion 362 may be extended rearward from an upper end of the opening/closing body 361. The rotation manipulation portion 362 forms an top surface of the opening/closing member 36 and may be formed in a plate shape extending rearward from an upper end of the opening and closing body 361. The rotation manipulation portion 362 may have a wider area on the side where the driving device 86 is disposed based on the center of the opening and closing body 361, and more effective linkage action can be made during operation of the driving device 86.

The rotation manipulation portion 362 may extend rearward so that the rod 862 of the driving device 86 can come into contact therewith. The rotation manipulation portion 362 is located at an upper and rearward distance from the opening/closing member rotation shaft 319b and may be formed on the uppermost and rearmost sides of the opening/closing member 36. Therefore, even if the driving device 86 is pressed with a small force during operation, the opening/closing member 36 can rotate about the opening/closing member rotating shaft 319b of. In addition, the rotation manipulation portion 362 may be formed to have a sufficiently large area to ensure contact with the rod 862.

In addition, a plurality of reinforcing ribs 362a connecting the rear surface of the opening and closing body 361 and the lower surface of the rotation manipulation portion 362 may be formed on the lower surface of the rotation manipulation portion 362. Therefore, even if the driving device 86 repeatedly presses the rotary manipulation portion 362 downward, it is possible to prevent the rotation manipulation portion 362 from being damaged or deformed.

A front end of the rotation manipulation portion 362 may be connected to an upper end of the opening/closing body 361, and a stepped portion 367 recessed along the upper end of the opening/closing body 361 may be formed. In a state where the driving device 86 is not operated, the opening/closing member 36 blocks the drain hole 319a, and the drain portion edge 319d of the shelf drain portion 319 may be seated to the stepped portion 367.

Meanwhile, a driving device 86 for selective rotation of the opening/closing member 36 may be provided inside the cultivation space 100.

Hereinafter, the structure of the driving device 86 will be described in more detail with reference to the drawings.

Figure 86:
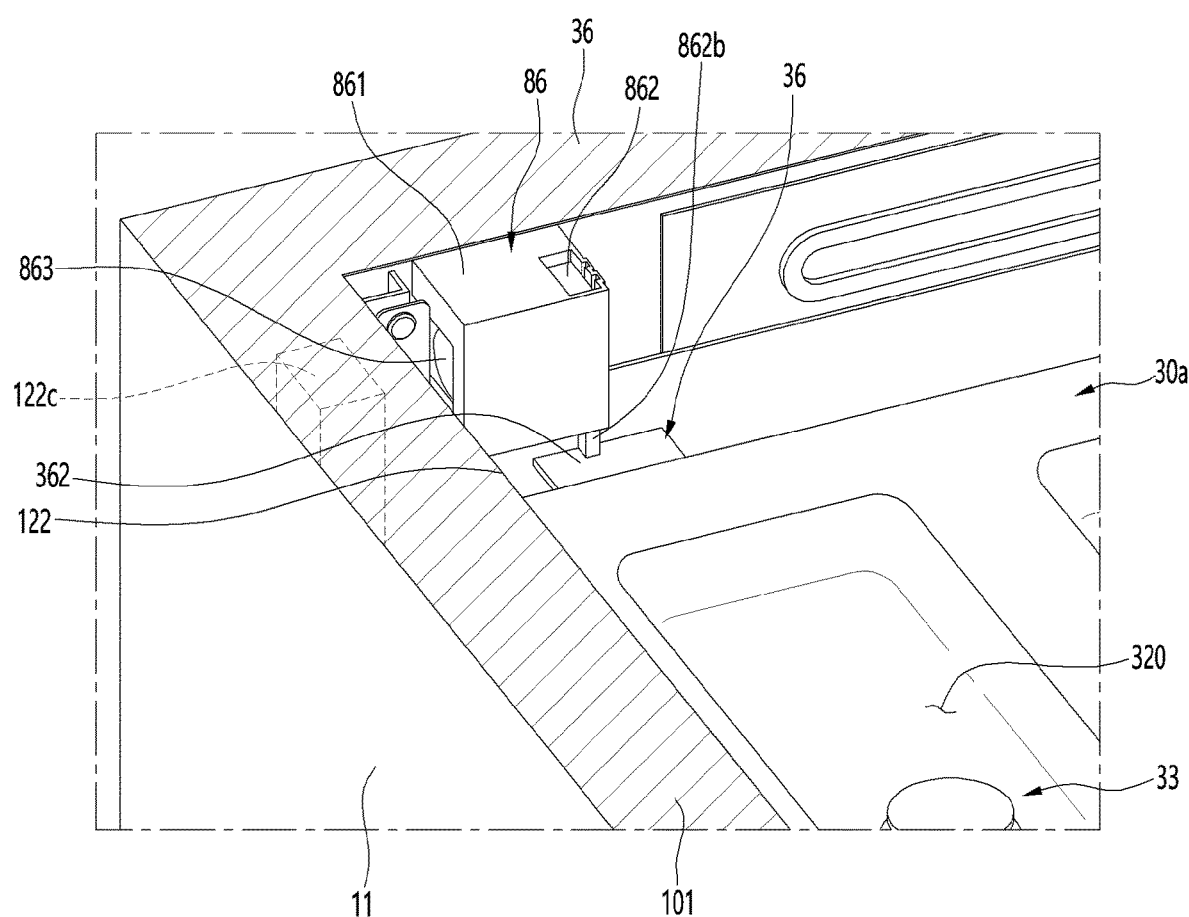
FIG. 86 is a cutaway perspective view illustrating the disposition of the driving device, the opening/closing member, and the cultivation shelf according to an embodiment of the present disclosure.
Figure 87:
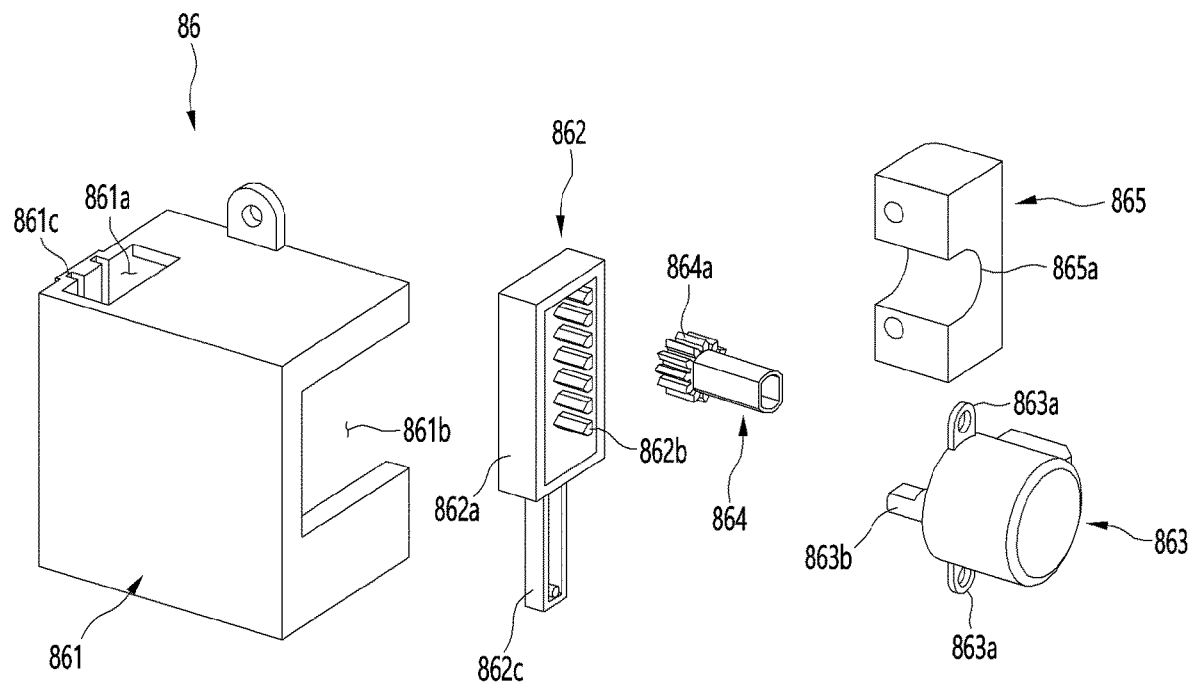
FIG. 87 is an exploded perspective view of the driving device.

FIG. 86 is a cutaway perspective view illustrating the disposition of the driving device, the opening/closing member, and the cultivation shelf according to an embodiment of the present disclosure, and FIG. 87 is an exploded perspective view of the driving device.

As illustrated in the figure, the driving device 86 is for determining the number of times of the cultivation shelf 30, and may be configured to rotate the opening/closing member 36. The driving device 86 may be disposed at the corners of the side and rear surfaces of the cultivation space 100, and may be covered so as not to be exposed to the front of the cultivation space 100 when the blower 50 is mounted.

The driving device 86 may be located above each of the cultivation shelves 30 arranged vertically and may be located vertically above the opening/closing member 36. In addition, the driving device 86 may be configured to rotate the opening/closing member 36 by pressing the rotation manipulation portion 362 of the opening/closing member 36.

The driving device 86 may include a driving device case 861 forming an outer appearance, a driving motor 863 provided in the driving device case 861, a pinion 864 on which a rotation shaft 863*b* of the driving motor 863 is mounted, and a rod 862 that moves up and down inside the driving device case 861 to selectively press the rotation manipulation portion 362.

In detail, the driving device case 861 may be formed in a box shape with an open rear surface, and an accommodation space 861*b* in which the driving motor 863, the pinion 864, and the rod 862 may be accommodated may be formed therein. In addition, at least a portion of a side surface of the driving device case 861 on which the driving motor 863 is mounted and a bottom surface through which the rod 862 is in and out may be opened.

The driving motor 863 may be disposed inside the driving device case 861, and a portion of the driving motor 863 may be configured to be exposed through an open surface of the driving device case 861. In addition, a motor fastening portion 863*a* for fixing the driving motor 863 to the inside of the driving device case 861 may be formed in the driving motor 863. Accordingly, the drive motor 863 may be fixedly mounted inside the drive device case 861 by fastening a screw penetrating the motor fastening portion 863*a*.

The driving motor 863 is disposed so that the rotating shaft 363*b* faces inward, and the pinion 864 may be coupled to the rotating shaft 863*b*. A pinion gear 864*a* coupled to the rack gear 862*b* of the rod 862 may be formed at an end of the pinion 864.

In addition, a pinion supporter 865 for supporting the pinion 864 may be provided in the driving device case 861. One surface of the pinion supporter 865 is coupled to the driving device case 861, and a through groove 865*b* through which the pinion 864 passes may be recessed on a surface to which the driving device case 861 is coupled. Accordingly, the pinion 864 passes through the pinion supporter 865 to pass through the through groove 865*b*, and the pinion supporter 865 guides the pinion 864 to maintain an accurate mounting position.

The rod 862 may be mounted to be movable inside the driving device case 861 in the vertical direction. In addition, an opening 861*c* corresponding to the top surface of the rod 862 may be formed on the top surface of the driving device case 861. In addition, an opening corresponding to the lower surface of the rod 862 may be further formed on the lower surface of the driving device case 861. In addition, a guide groove 861*c* is formed inside the driving device case 861, and one surface of the rod 862 is formed in a corresponding shape to be inserted into the guide groove 861*c*, so that the movement of the rod 862 in the vertical direction can be guided.

The rod 862 may extend long in the vertical direction and may include a rod upper portion 865*a* disposed inside the driving device case 861 and a rod lower portion 865*c* extending downward from the lower end of the upper rod portion 865*a* and in contact with the opening/closing member 36.

The rod upper portion 865*a* may be formed to have a cross-sectional area corresponding to the opening 861*c* on the top surface of the driving device case 861 and may be guided by the guide groove 861*c* to move in the driving device case 861 in the vertical direction.

In addition, a rack gear 862*b* may be formed on one surface of the rod upper portion 865*a*. The rack gear 862*b* may be formed along one side of the rod upper portion 865*a* facing the pinion gear 864*a* and, in a state where the rod 862 is mounted on the driving device case 861, may be formed to mesh with the pinion gear 864*a*. Accordingly, the rod 862 may be moved in a vertical direction by the pinion 864 rotated when the driving motor 863 is driven.

In addition, the lower rod portion 865*c* may protrude downward and may have a smaller cross-sectional area than that of the rod upper portion 865*a*. The rod lower portion 865*c* may be formed to press the rotation manipulation portion 362 of the opening/closing member 36 from above when the rod 862 moves downward. The length of the rod lower portion 865*c* and the downward moving stroke of the rod 862 may be set to such an extent that the drain hole 319*a* can be sufficiently opened by rotating the opening/closing member 36.

For example, the rod 862 may be moved downward by a set distance when the driving device 86 is operated to drain the cultivation shelf 30, and press the rotation manipulation portion 362 to rotate the opening/closing member 36. In addition, the drain hole 319*a* is opened by rotation of the opening/closing member 36 to drain water from the cultivation shelf 30.

In addition, when drainage of the cultivation shelf 30 is not performed, the driving device 86 is not operated, and at this time, the rod 862 is located inside the driving device case 861 or the lower end of the lower rod 862 is positioned at the lower end of the driving device case 861. Therefore, it is possible to prevent the rod 862 from being exposed to the outside and from interfering with components inside the cultivation space 100.

Hereinafter, the operation state of the driving device 86 and the opening/closing member 36 will be described in more detail with reference to the drawings.

Figure 88:
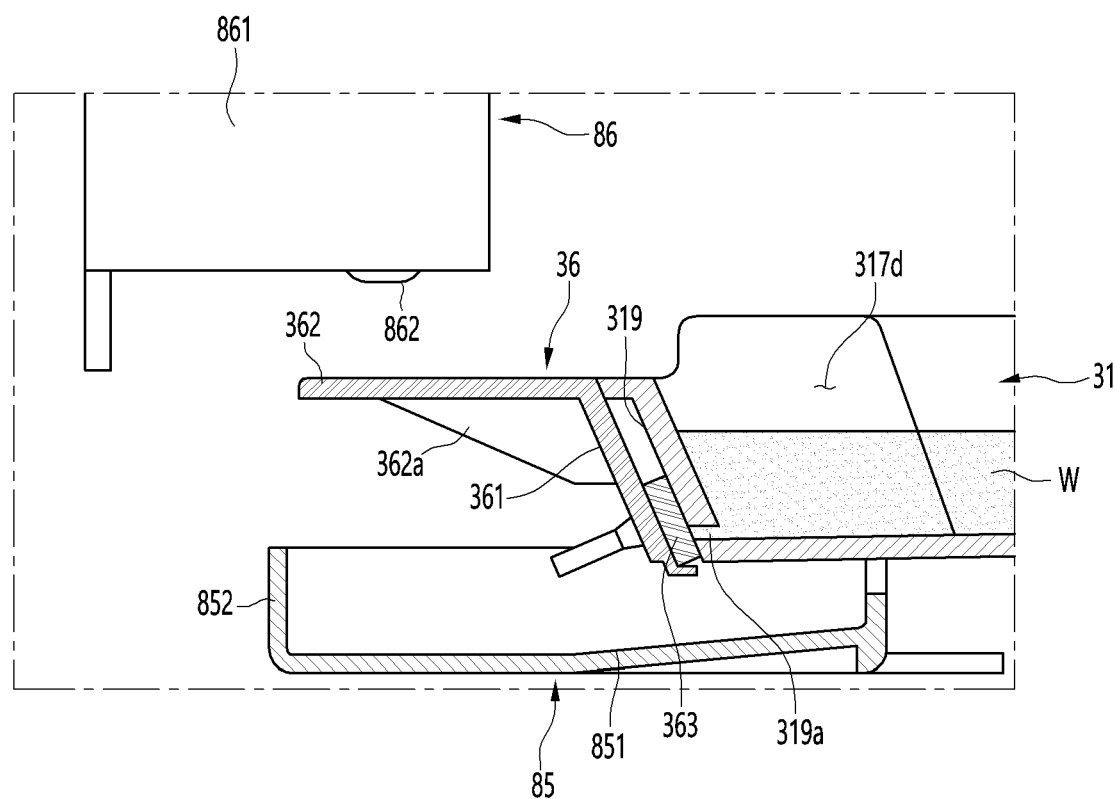
FIG. 88 is a view illustrating a state where the opening/closing member is closed before operation of the driving device.

FIG. 88 is a view illustrating a state where the opening/closing member is closed before operation of the driving device.

As illustrated in the figure, in the cultivation shelf 30 for plant cultivation, a set amount of water inside the water tank 70 may be supplied to the cultivation shelf 30 through the water supply pipe 84 by driving the pump 83. In addition, the cultivation shelf 30 may be filled with water of a set water level.

While water is being supplied to the cultivation shelf 30 and until drainage is started after water supply is completed, the driving device 86 is not operated, and the opening/closing member 36 also maintains a state where the drain hole 319*a* is shielded. Therefore, the cultivation shelf 30 can maintain a state filled with water, and a required amount of water can be absorbed into the seed package 90. At this time, the water of the cultivation shelf 30 is supplied from the water tank 70 and may be a culture medium containing nutrients necessary for plant growth. Of course, when the seed package 90 itself contains nutrients, only pure water may be supplied from the water tank 70.

In an initial state where the driving device 86 is not operated, most of the rod 862 may be located inside the driving device case 861. Accordingly, when viewed from the front, the driving device 86 and the rod 862 may be substantially not exposed as they are covered by the blower 50. In addition, it would be desirable that the lower end of the rod 862 may protrude downward from the lower surface of the driving device case 861, but remain separated from the opening/closing member 36, and protrude only enough to be covered by the blower 50.

In a state where no external force is applied to the opening/closing member 36 by the driving device 86, the opening/closing member 36 may maintain a closed state. In a state where the opening/closing member 36 is closed, an inner surface of the opening/closing member 36 may be in a state where the shelf drain portion 319 is wrapped around and accommodated.

At this time, the sealing member 363 may come into close contact with the shelf drain portion 319 to shield it. In addition, the opening/closing member 36 can be pressed and maintained in a closed state by the elastic force provided by the elastic member 364, and the sealing member 363 may be pressed to and be in close contact with the outer surface of the shelf drain portion 319 to shield the drain hole 319a.

Therefore, the water supplied to the inside of the cultivation shelf 30 is not drained to the drain tray 85 in a normal water supply situation, but maintains a set water level or maintains a state where water can be supplied to the seed package 90. In addition, the drain tray 85 may remain empty.

Figure 89:
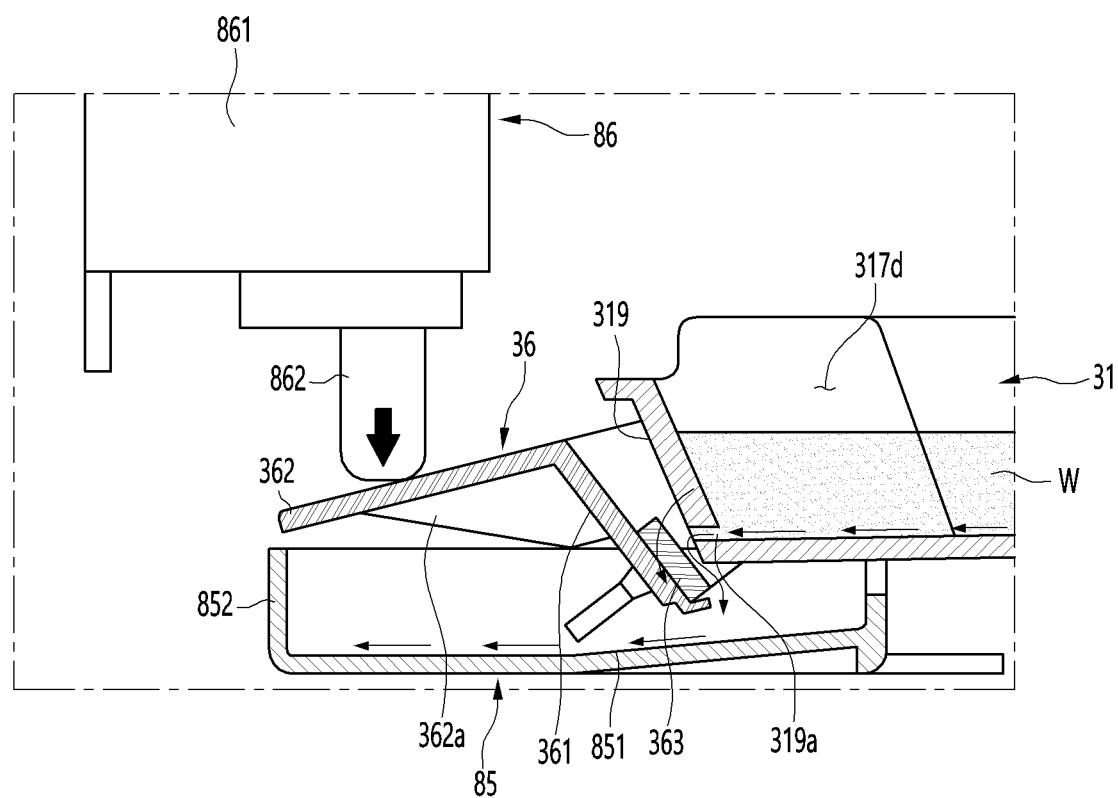
FIG. 89 is a view illustrating a state where the opening/closing member is opened by the operation of the driving device.

FIG. 89 is a view illustrating a state where the opening/closing member is opened by the operation of the driving device.

As illustrated, when water is supplied to the seed package 90 sufficiently after a set time in a state where water is supplied to the cultivation shelf 30, the water inside the cultivation shelf 30 may be drained.

In order to drain water from the cultivation shelf 30, the driving device 86 is operated first. In detail, the pinion 864 is rotated by the forward rotation of the driving motor 863, and the rod 862 coupled with the pinion 864 may move downward.

At this time, the rod 862 is positioned vertically above the rotation manipulation portion 362 of the opening/closing member 36, and when the rod 862 continuously moves downward, the rotation manipulation portion 362 is pressed to rotate the opening/closing member 36. The rod 862 is moved to a height lower than the initial height of at least the rotation manipulation portion 362, and the opening/closing member 36 is rotated so that the drain hole 319a is lowered to a height at which it can be rotated to sufficiently open. When the rod 862 descends to a set height, the driving motor 863 stops rotating.

When the rotation manipulation portion 362 is pressed due to the lowering of the rod 862, the opening/closing member 36 rotates based on the opening/closing member rotation shaft 319b. The opening/closing member 36 is rotated in a counterclockwise direction (as seen in FIG. 31), and when the opening/closing member 36 is rotated beyond a set angle, the sealing member 363 opens the drain hole 319a.

In addition, while the opening/closing member 36 rotates counterclockwise for opening, the elastic member 364 may be elastically deformed, and the opening/closing member 36 may be in a state of having elasticity for returning to the initial position as illustrated in FIG. 30.

When the drain hole 319a is opened by the rotation of the opening/closing member 36, water inside the cultivation shelf 30 may be drained through the drain hole 319a, and fall to the inside of the drain tray 85.

In addition, the water falling into the drain tray 85 may flow along the tray bottom surface 851, go to the tray drain portion 856, and flow into the drain pipe 89. Water introduced into the drain pipe 89 may be recovered to the water tank 70 and stored to be capable of being re-supplied to the cultivation shelf 30.

Meanwhile, when all the water contained in the cultivation shelf 30 is discharged, the drive motor 863 may reversely rotate, and the rod 862 moves upward to return to an initial state.

At the same time, the opening/closing member 36 is rotated clockwise by the elastic force provided by the elastic member 364, and the opening/closing member 36 may be closed again. When the opening/closing member 36 is closed, the sealing member 363 may be in the state of FIG. 30 in which the drain hole 319a is shielded again, and the state where water can be supplied to the cultivation shelf 30 is maintained.

This process of water supply and drainage can be repeated at set time intervals, and an appropriate amount of water can be supplied to the plants cultivated on the cultivation shelf 30 in a timely manner. In addition, although not described in detail, light is supplied by the lighting device 40 during the process of repeating water supply and drainage, and operation for controlling the temperature of the cultivation space and forming an air flow can be performed by the temperature controller and the blower 50.

Meanwhile, when the apparatus for cultivating plants 1 continues to operate while the seed package 90 is placed in the apparatus for cultivating plants 1, seeds inside the seed package 90 germinate and the plants can grow at seed package 90.

Figure 90:
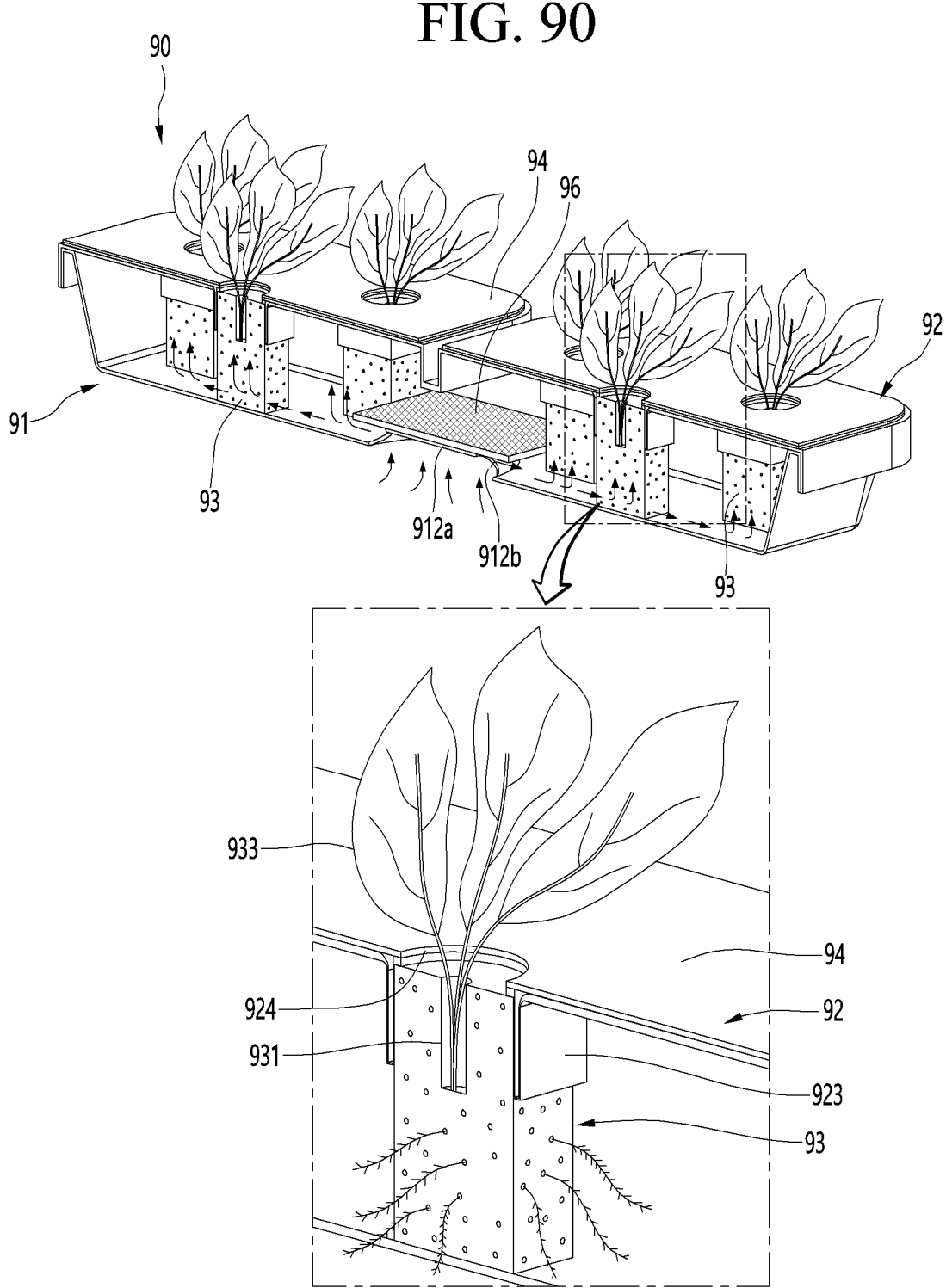
FIG. 90 is a cutaway perspective view illustrating a state where plants are grown in the seed package.

FIG. 90 is a cutaway perspective view illustrating a state where plants are grown in the seed package.

As illustrated in the drawing, in a state where the seed package 90 is disposed inside the plant cultivation device 1, through the operation of the plant cultivation device 1, by the water supply module and the drain module, proper water supply to the cultivation shelf 30 and the seed package 90 is made, light is irradiated through the lighting device 40, and by driving the temperature control device and the blower 50, temperature control and air flow of the cultivation space 100 are provided so that plants grow.

To this end, the seed accommodation member 93 continuously supplies water flowing into the container 91 to the seed 932, and after germination of the seed 932, water is supplied to the root of the plant 933. In addition, sufficient water required for the plant can be supplied through repetitive water supply and drainage at set time intervals on the cultivation shelf 30, as well as oxygen supply should also be made smoothly by exposing the roots of the plant 933 to the air.

Meanwhile, the root of the plant 933 growing inside the seed accommodation member 93 may pass through the seed accommodation member 93 and grow into the container 91. In addition, the stem of the plant 933 growing inside the seed accommodation member 93 passes through the cover hole 924 inside the seed accommodation groove 931 of the seed accommodation member 93 and may be exposed upward of the seed package 90.

Plants inside the seed accommodation member 93 continuously grow, and the seed accommodation member 93 expands due to the roots and stems of the plant 933. That is, the seed accommodation member 93 expands while being pressed outward by the root of the plant 933 growing through the seed accommodation member 93 and the stem of the plant 933 growing outside the container cover 92. Therefore, the seed accommodation member 93 can be more firmly fixed in a state of being inserted into the accommodation member mounting portion 923.

While the seed accommodation member 93 remains attached to the accommodation member mounting portion 923, the water inside the container 91 is effectively absorbed so that it can be evenly supplied to the entire root of the plant 933. In addition, as the plant 933 grows, the seed accommodation member 93 maintains its initial mounting position, and the seed accommodation member 93 is prevented from being removed from the accommodation member mounting portion 923 so that the plant 933 will provide a more stable environment for growth.

Hereinafter, the overall operation of the apparatus for cultivating plants 1 having the above structure will be briefly reviewed.

Figure 91:
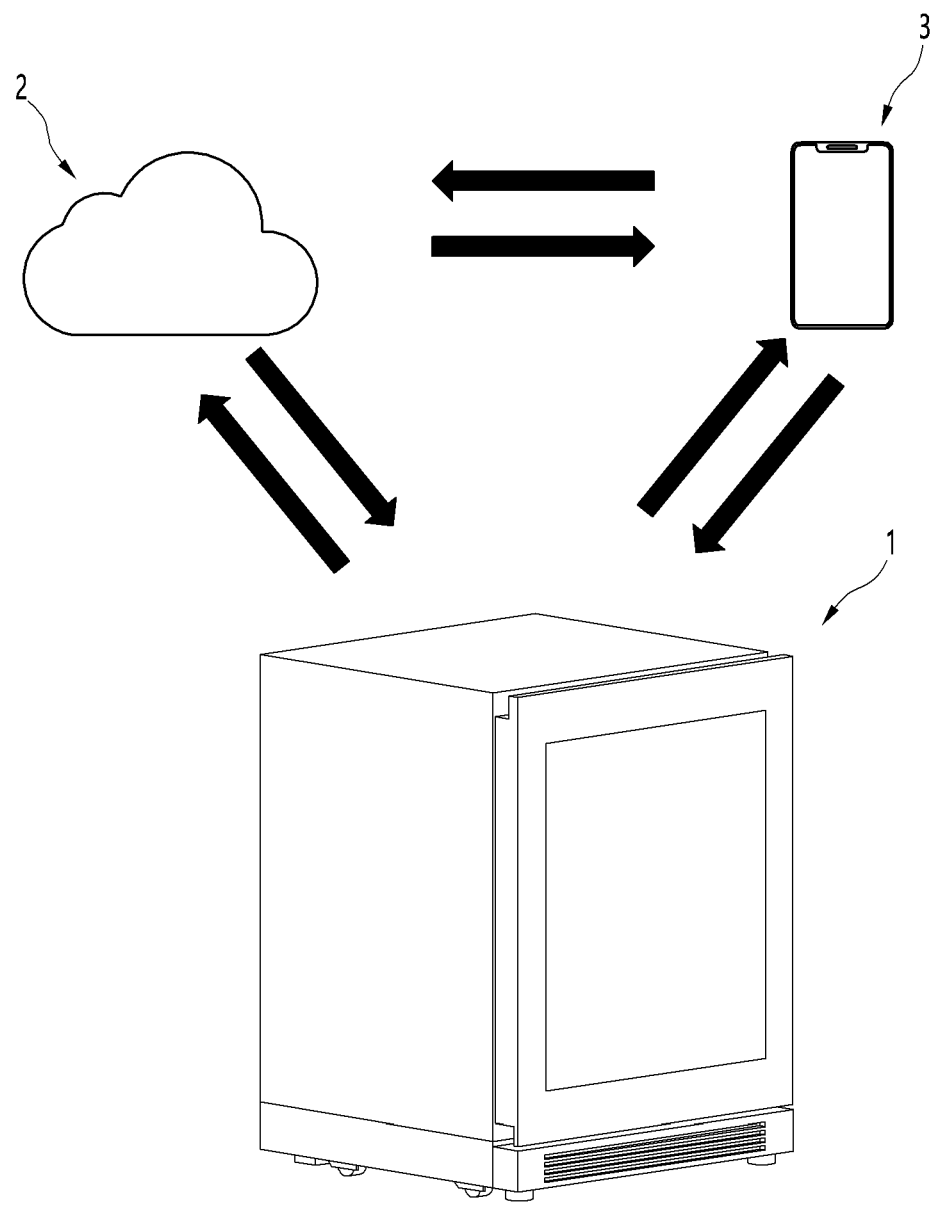
FIG. 91 is a view illustrating a connection state between the apparatus for cultivating plants, a server, and a user device.
Figure 92:
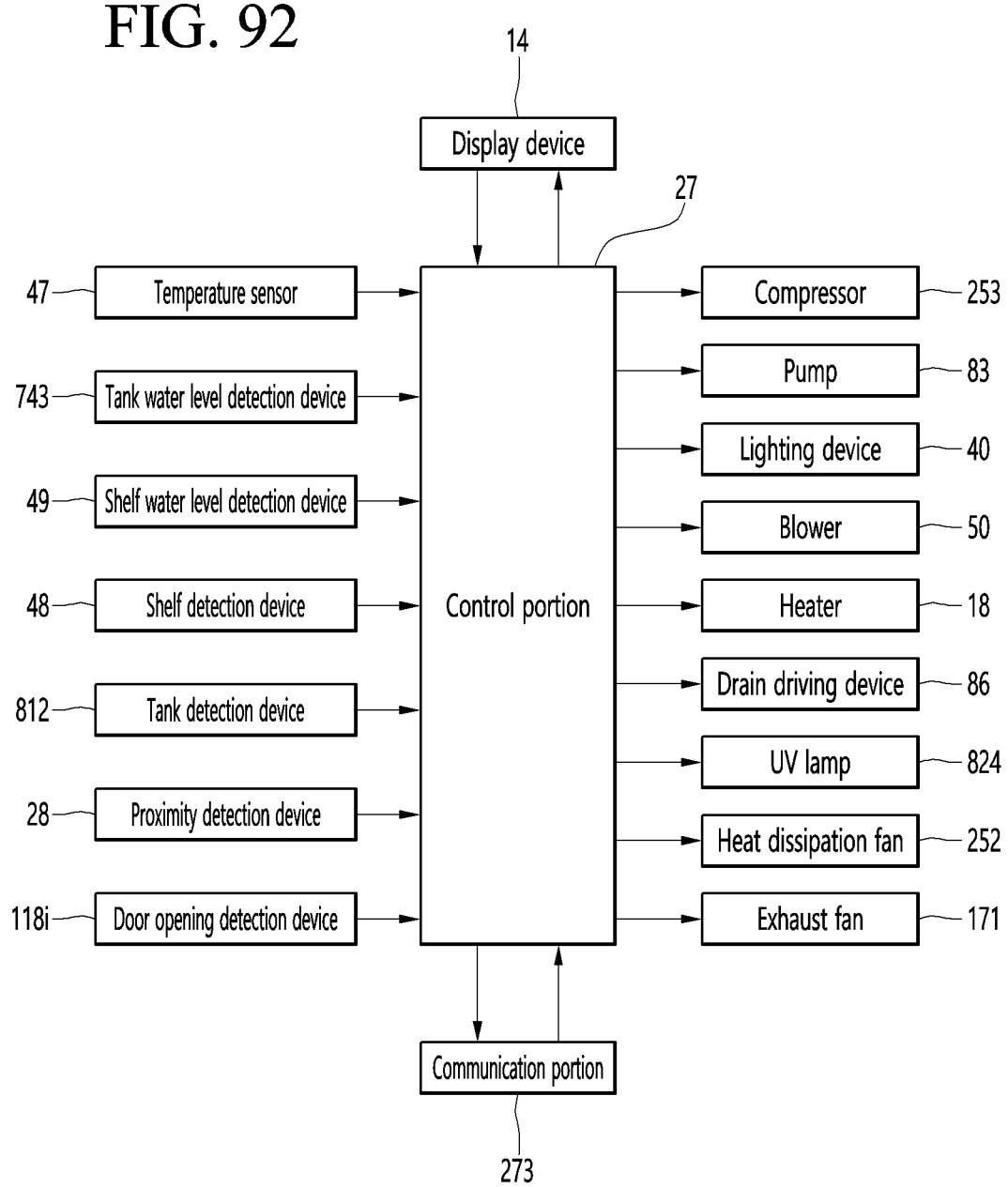
FIG. 92 is a block diagram illustrating the flow of control signals of the apparatus for cultivating plants.
Figure 93:
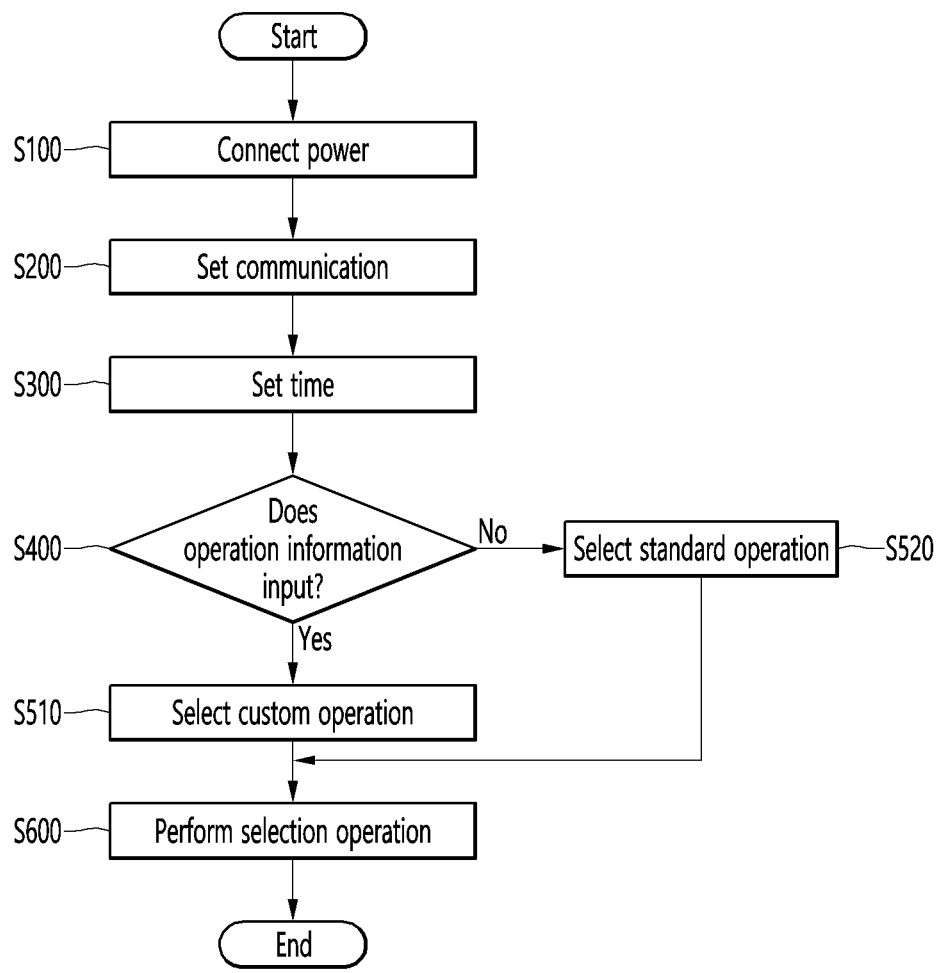
FIG. 93 is a flowchart illustrating the initial installation and operation process of the apparatus for cultivating plants.

FIG. 91 is a view illustrating a connection state between the apparatus for cultivating plants, a server, and a user device, FIG. 92 is a block diagram illustrating the flow of control signals of the apparatus for cultivating plants, and FIG. 93 is a flowchart illustrating the initial installation and operation process of the apparatus for cultivating plants.

As illustrated in the figure, the apparatus for cultivating plants 1 requires performing an initial setting step for smooth use. The initial setting step may be performed when starting up in a state for installation or in a state where the power is completely turned off. The initial setting step may be performed in a state where basic setting is required prior to operation of the plant growing apparatus 1.

The apparatus for cultivating plants 1 may set, change, and control operating conditions of the apparatus for cultivating plants 1 through communication with a user device 3 carried by a user or a cloud server 2 in a remote location. In addition, the apparatus for cultivating plants 1 may transmit and receive information on plants cultivated in the apparatus for cultivating plants 1 or driving information between the user device 3 and the cloud server 2. The user device 3 may be, for example, a mobile phone or a tablet PC capable of outputting a screen and allowing a user to manipulate an input.

In detail, after the apparatus for cultivating plants 1 is placed in a position for use, a power cord is connected so that power for operation is applied to the apparatus for cultivating plants 1. In addition, the user can connect power to start the operation of the apparatus for cultivating plants 1 by manipulating the power manipulation portion 147a of the display device 14 [S100].

When power is applied to the apparatus for cultivating plants 1, the apparatus for cultivating plants 1 can be in a network connection state with the cloud server 2 and the user device 3 away from the apparatus for cultivating plants 1. At this time, the user can operate the network connection of the apparatus for cultivating plants 1 by manipulating the communication connection manipulation portion 147i of the display device 70.

When the network connection work of the apparatus for cultivating plants 1 is performed, the user can make detailed settings for operation of the apparatus for cultivating plants 1 including the network connection setting using the user device 3.

Of course, the apparatus for cultivating plants 1 may perform basic operations even when not connected to a network, and the apparatus for cultivating plants 1 may be operated through manipulation of the manipulation portion 147 [S200].

In a state where power is connected to the apparatus for cultivating plants 1, a time setting operation is performed to set the operation of the apparatus for cultivating plants 1. If the apparatus for cultivating plants 1 is in a network-connected state, it is automatically synchronized and can be set to the current time without a separate setting.

However, in a state where the apparatus for cultivating plants 1 is not connected to a network, it may be possible for the user to directly set the current time or an arbitrary time by directly manipulating the time manipulation portion 147f.

Of course, if the apparatus for cultivating plants 1 is network-connected to the user device, various time setting operations including current time input and arbitrary time input may be performed using the user device 3.

Through such a time setting operation, a criterion for an on/off operation of the lighting device 40 may be provided. In addition, it may be a standard for driving the pump 83 and the driving device 86 for water supply and drainage and may be a standard for operating the apparatus for cultivating plants 1 as a whole [S300].

Meanwhile, in a state where power is connected to the apparatus for cultivating plants 1, the apparatus for cultivating plants 1 may receive input of information required for operation for plant cultivation. Input of information for operating the apparatus for cultivating plants 1 may include standard operation input through the input of the manipulation portion 147 and customized operation input cultivated plants provided from the cloud server 2 or user device 3 connected to the network.

When the apparatus for cultivating plants 1 is not connected to a network or the user directly presses the standard operation manipulation portion 147b or 147d of the manipulation portion 147, the apparatus for cultivating plants may input standard operation. Of course, the user may additionally input operation information of the apparatus for cultivating plants 1 through the manipulation portion 147 at this time. That is, the user manipulates the time manipulation portion 147f or the up and down control portions 147g and 147h of the manipulation portion 147 to set additional operation settings such as the temperature of the cultivation space 100 and the on/off time of the lighting device 40.

In addition, when the apparatus for cultivating plants 1 is connected to the network, the user can input the download operation by pressing the download operation manipulation portions 147c and 147e of the manipulation portion 147. When a download operation is input, information for operating the apparatus for cultivating plants 1 may be transmitted and downloaded from the cloud server 2 or the user device 3 away from the apparatus for cultivating plants 1 [S400].

In detail, when the user selects the download operation by pressing the download operation manipulation portions 147c and 147e of the manipulation portion 147, the apparatus for cultivating plants 1 selects and downloads the optimal operation suitable for the plant being cultivated by communicating the cloud server 2 at a remote location or the user device 3 through the communication portion 273. Accordingly, the download operation may be referred to as a customized operation.

In a state where the customized operation is input, the user may transmit information on plants under cultivation to the cloud server 2 through the user device 3. At this time, the packaging of the seed package 90, barcode, QR code, or the like is photographed using a camera or reader of the user device 3, or information is simply transmitted to the cloud server 2 by using an NFC tag input, or the like or it may be possible to directly input the name of a plant or the information of the commercially available seed package 90.

In the cloud server 2, information on various types of plants that can be cultivated in the apparatus for cultivating plants 1 and information on the seed package 90 may be stored, and through the periodical update and management, no matter what kind of seed package 90 is put into the apparatus for cultivating plants 1, the most optimized operation for cultivation can be derived based on the stored information.

For example, if the seed package 90 is a seed package 90 for cultivating basil, unlike the fixed standard operation logic, temperature, illumination, amount of sunlight, amount of water supply, or the like suitable for the growth of basil are calculated and thus the optimized operation logic may be set and transmitted to the control portion 27.

Meanwhile, if a plurality of seed packages 90 are provided in the cultivation space 100, and the plurality of seed packages 90 include plants of different species, in the cloud server 2, temperature, illumination, amount of sunlight, amount of water supply, or the like calculates as an average value and thus the operation logic can be set [S510].

Meanwhile, when the user selects the standard operation by pressing the standard operation manipulation portion 147b, 147d of the manipulation portion 147, the apparatus for cultivating plants 1 can be operated according to the basic operation logic already set in the control portion 27.

That is, operations suitable for general sprout vegetables or types of plants that can be cultivated by germinating seeds are basically stored on the control portion 27, and the control portion 27 allows the apparatus for cultivating plants 1 to be operated according to the stored standard operation upon input of manipulation of the standard operation manipulation portions 147b and 147d.

For example, in the standard operation, the temperature of the cultivation space 100 can be maintained at 25° C. during the day and 18° C. at night by the temperature control device based on the input current time. In addition, water supply to the cultivation shelf 30 may be performed every 3 hours, and when 1 hour and 30 minutes have elapsed after water supply, the water of the cultivation shelf 30 is drained so that the water of the cultivation shelf 30 may be drained so that the cultivation shelf 30 remains empty of water for about 1 hour and 30 minutes. In addition, the lighting device 40 may maintain an on state for 14 hours and an off state for 10 hours during a daytime period.

Meanwhile, even if the user does not separately input the standard operation manipulation portions 147b and 147d, the apparatus for cultivating plants 1 can be operated using standard operation. That is, when power is applied to the apparatus for cultivating plants 1, only power is applied by pressing the power manipulation portion 147a without setting any communication and time settings. The plant growing apparatus 1 can be made to enter into standard operation after the set time has elapsed. For example, the set time may be 5 minutes, and water supply may be started and the lighting device 40 may be turned on after 5 minutes have elapsed.

Of course, in this state, the user can manipulate the manipulation portion 147 to additionally set and change operation conditions or change to downloaded custom operation [S520].

In addition, the user opens the door 13 in a state where power is connected to the apparatus for cultivating plants 1 for plant cultivation, and the seed package 90 from which the cover sheet 95 is removed is seated on the cultivation shelf 30.

After seating the seed package 90, the user closes the door 13 and allows the apparatus for cultivating plants 1 to operate according to the set operation to cultivate plants, the cultivated plants at a desired time can be harvested.

At this time, the control portion 27 receives information on the customized operation [S510] or standard operation [S520] selected according to the user's operation through the communication portion 273, and operates the apparatus for cultivating plants according to the selected operation logic [S600].

Meanwhile, the communication setting step [S200] and the time setting step [S300] performed after the power input step [S100] after installation of the apparatus for cultivating plants 1 may be independently performed or may be omitted. Hereinafter, the communication setting step [S200] of the overall operation setting of the apparatus for cultivating plants 1 will be described in more detail.

Figure 94:
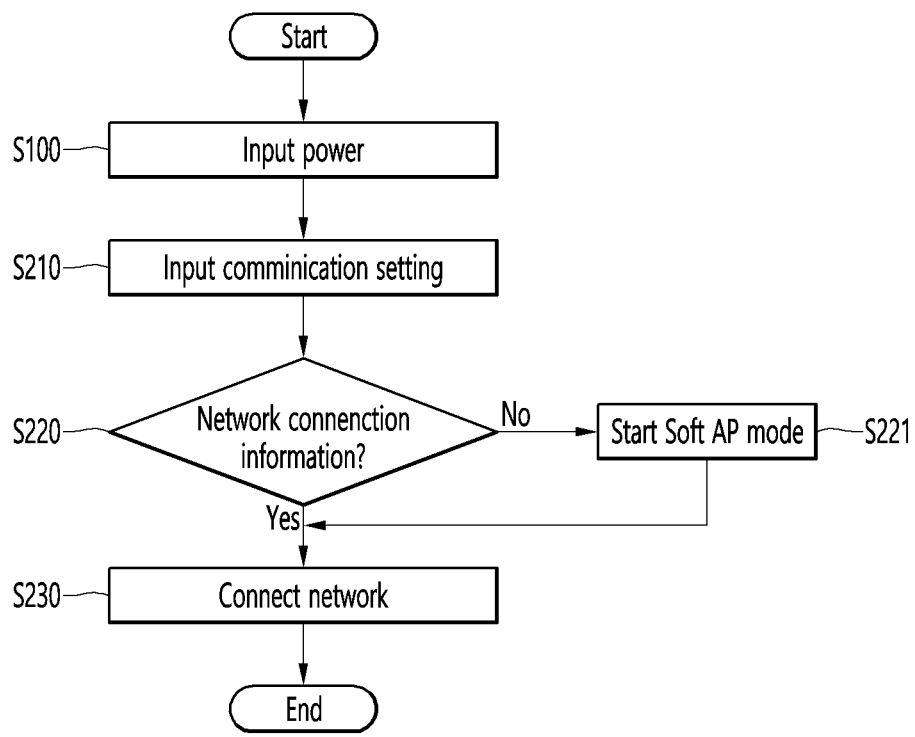
FIG. 94 is a flowchart illustrating a communication setting process of the apparatus for cultivating plants.

FIG. 94 is a flowchart illustrating a communication setting process of the apparatus for cultivating plants.

As illustrated in the drawing, after installation of the apparatus for cultivating plants 1, power may be connected, and power may be input to the apparatus for cultivating plants 1 by manipulating the power manipulation portion 147a [S100].

When power is applied to the apparatus for cultivating plants 1, the apparatus for cultivating plants 1 can be in a network connection state with the cloud server 2 and the user device 3 away from the apparatus for cultivating plants 1. At this time, the user can operate the network connection of the apparatus for cultivating plants 1 by manipulating the communication connection manipulation portion 147i of the display device 70 [S210].

Of course, the apparatus for cultivating plants 1 may automatically perform an operation for network connection when power is applied without a separate manipulation. In addition, the network connection state can be displayed through the communication connection manipulation portion 147i.

For example, in a state where the apparatus for cultivating plants 1 is connected to a network, at a position corresponding to the communication connection manipulation portion 147i, the apparatus for cultivating plants 1 is turned on or off, and in a state where the apparatus for cultivating plants 1 is not connected to a network, at the position corresponding to communication connection manipulation portion 147i, the apparatus for cultivating plants 1 is turned off. In addition, in a state where the communication connection manipulation portion 147i is turned off, the user can perform a network connection operation by manipulating the communication connection manipulation portion 147i.

The apparatus for cultivating plants 1 may determine the network connection according to previously set information when there is previously set network information. In addition, when a network connection input is instructed by the communication connection manipulation portion 147i, the control portion 18 checks the network connection state of the apparatus for cultivating plants 1 to determine whether network connection information is input [S220].

When the apparatus for cultivating plants 1 is installed for the first time and there is no preset network connection information, the apparatus for cultivating plants 1 starts a soft AP mode, and the network connection may be set through the user device 3 [S221].

On the other hand, if there is already set network connection information, the apparatus for cultivating plants 1 may be connected to a set network [S230].

Through this network setting, the apparatus for cultivating plants 1 can be connected to the user device 3 and the cloud server 2 in a remote location. Accordingly, the apparatus for cultivating plants 1, the user device 3, and the cloud server 2 may be directly or indirectly connected to each other to be able to transmit information. The apparatus for cultivating plants 1, the server 2, and the user device 3 may be network-connected through various electric wireless communications. For example, the electric wireless communication may be any one of various methods such as Wi-Fi, ZigBee, NFC, and Bluetooth.

In particular, this embodiment enables manipulation and operation information of various cultivation environments of the apparatus for cultivating plants 1 to be displayed or inputted through the user device 3 or the server 2. Therefore, in the apparatus for cultivating plants 1, a configuration for manipulating an operation or displaying information may be minimized so that the configuration is more concise and the outer appearance is kept clean.

Hereinafter, the time setting step [S300] of the overall operation setting of the apparatus for cultivating plants 1 will be described in more detail.

Figure 95:
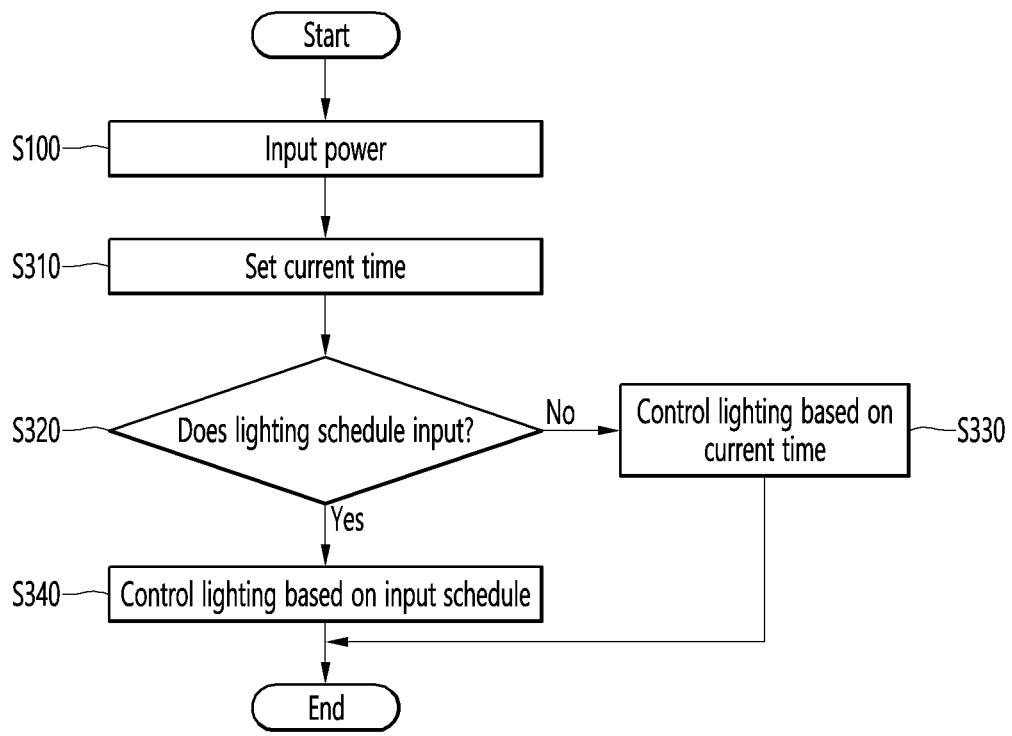
FIG. 95 is a flowchart illustrating a setting process of the lighting device of the apparatus for cultivating plants.
Figure 96:
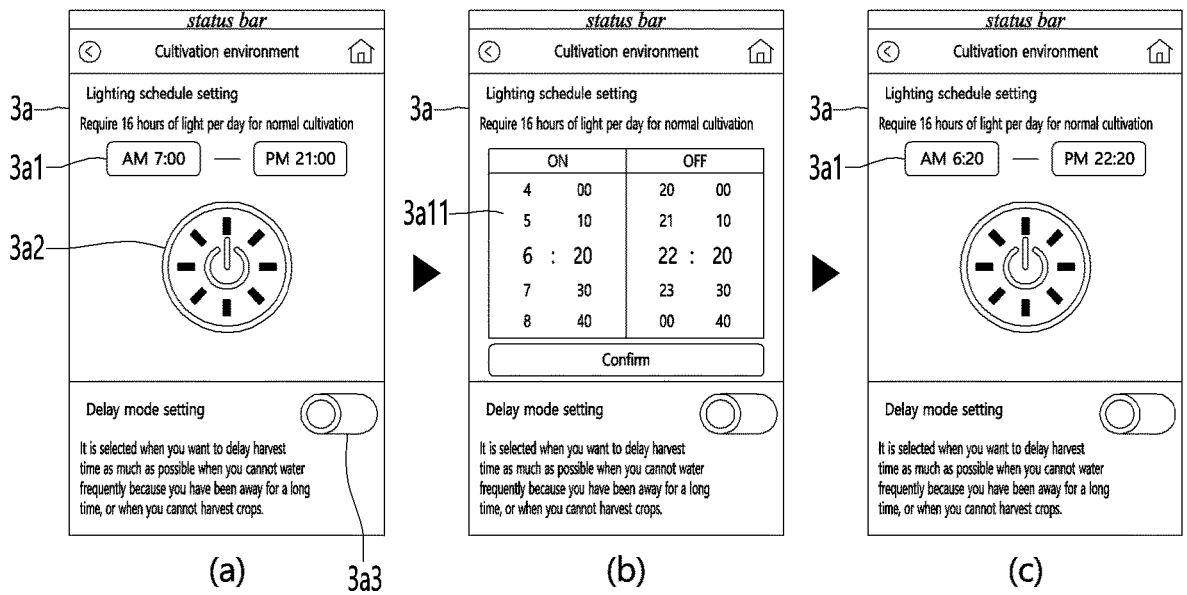
FIG. 96 is a diagram sequentially illustrating manipulation states of a user device for setting the operating time of the lighting device.

FIG. 95 is a flowchart illustrating a setting process of the lighting device of the apparatus for cultivating plants, and FIG. 96 is a diagram sequentially illustrating manipulation states of a user device for setting the operating time of the lighting device.

As illustrated in the figure, in order to set the operation of the lighting device 40 of the apparatus for cultivating plants 1, power is input to the apparatus for cultivating plants 1 and the operation is ready [S100].

At this time, the apparatus for cultivating plants 1 may be network-connected to the user device or server 2. In addition, the user can set the time for the operation of the apparatus for cultivating plants 1. Through the time setting of the apparatus for cultivating plants 1, it is possible to set a time that is a standard for the operation of the lighting device 40 and the temperature control device.

In detail, the apparatus for cultivating plants 1 may be able to set the time using the user device 3. For the operation of the apparatus for cultivating plants 1, the apparatus for cultivating plants 1 may be set according to the current time. That is, the apparatus for cultivating plants 1 can set a reference time for operation of the apparatus for cultivating plants 1 through the same setting as the current time and may be operated according to the user's life pattern.

At this time, the current time setting of the apparatus for cultivating plants 1 may be possible through an input through the time input manipulation portion 147f of the manipulation portion 147. In addition, the current time setting of the apparatus for cultivating plants 1 may be automatically input by synchronization when connected to a network. In addition, the current time setting of the apparatus for cultivating plants 1 may be input through manipulation of the user device 3 in a network-connected state [S310].

After the current time setting of the apparatus for cultivating plants 1 is completed, the user can set the operating time of the lighting device 40 through the user device 3. In general, plants need about 14 hours of sunlight per day for effective growth. Accordingly, the lighting device 40 may also remain turned on for about 14 hours unless a separate setting is made. Of course, the time during which the lighting device 40 remains turned on is not fixed to 14 hours and can be adjusted as needed. In addition, when the user opens the door 13 in an on state, the lighting device 40 may relatively darken the brightness to prevent glare of the user. In addition, when the door 13 is closed, the lighting device 40 can emit light with the original brightness.

The lighting device 40 may be controlled based on the set current time. That is, the lighting device 40 may be controlled to be turned on and off according to the actual sunrise and sunset times based on the current time. Therefore, plants requiring changes in seasons and hours of sunlight can be cultivated while being provided with the same amount of sunlight as the external environment.

Of course, the lighting device 40 does not correspond to the actual sunrise and sunset times, but operates to be turned on at a random time during the week based on the current time input through the time input manipulation portion 147f and turned off when the set time elapses.

When the on-time of the lighting device 40 corresponds to the current time, the lighting device 40 remains on at a time when the surrounding environment is bright, so that the user's life pattern is not disturbed, and the user's life pattern may achieve natural harmony with the surrounding environment. That is, the lighting device 40 may maintain an on state for 14 hours at a time corresponding to an actual daytime time. In this way, the control portion 27 can determine daytime and nighttime based on the input current time, the lighting device 40 is turned on for a set time during the daytime period, and the lighting device 40 is turned on during the set time period during the nighttime period. It can be turned off for a period of time [S330].

Meanwhile, the on/off time of the lighting device 40 may be set according to the user's life pattern or preference. At this time, when the lighting device 40 is turned on, the lighting device 40 continuously maintains an on state, and 14 hours after the lighting device 40 is turned on may be set as the time to be turned off. It can be.

The user may use the user device 3 to set the time when the lighting device 40 is turned on and off, so that the apparatus for cultivating plants 1 is operated according to the time the user is mainly active. For example, in the case of a user who is mainly active after the evening time, the lighting device 40 may be kept turned on at a time including the evening time. That is, although the actual time is the time after sunset, the lighting device 40 can be kept turned on so that the inside of the apparatus for cultivating plants 1 can be easily checked and the plant being cultivated can be easily managed.

In this case, the actual on/off time of the lighting device 40 may be input through manipulation of the time input manipulation portion 147f and up and down input manipulation units 147g and 147h of the manipulation portion 147. In addition, the actual on/off time of the lighting device 40 may be input through manipulation of the user device 3 [S340].

Figure 97:
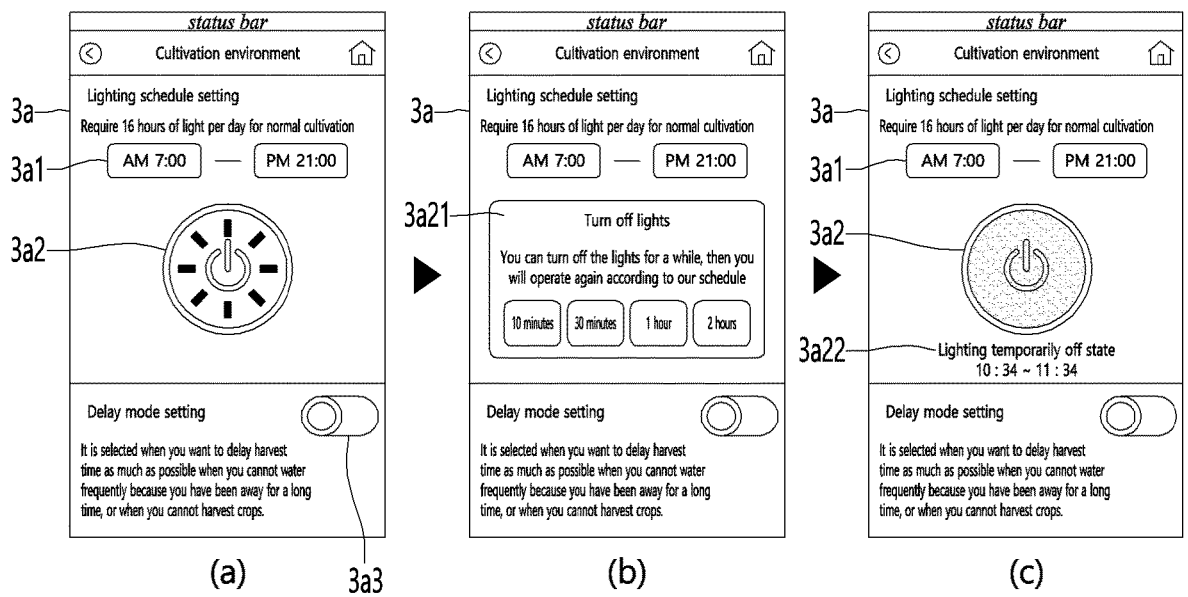
FIG. 97 is a diagram sequentially illustrating manipulation states of the user device for setting the off state of the lighting device.
Figure 98:
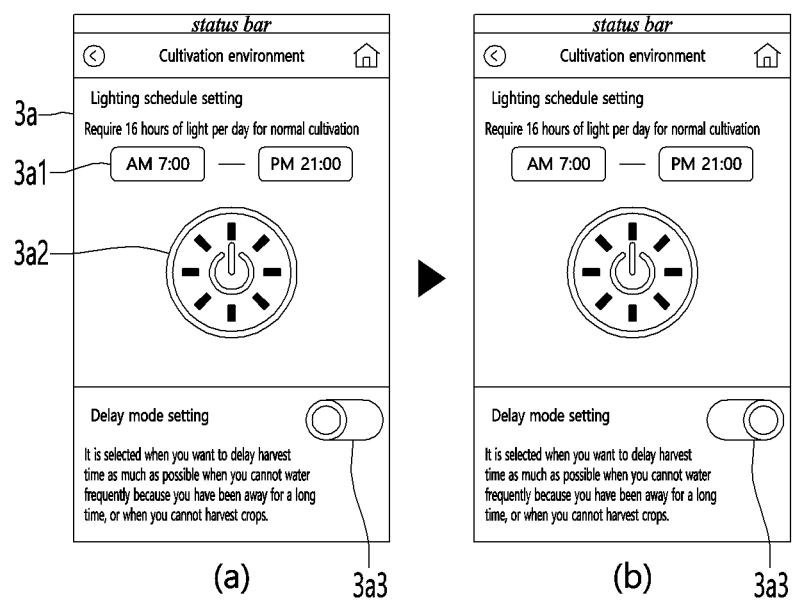
FIG. 98 is a diagram sequentially illustrating manipulation states of the user device for setting the delay mode of the lighting device.

Referring to FIGS. 96 to 98, a process of setting the operation of the lighting device using the user device 3 will be described in more detail.

To set the operation of the lighting device 40 of the user device 3, the user outputs the light setting screen 3a as illustrated in FIG. 96(a). A time input portion 3a1, an on/off input portion 3a2, and a operation mode input portion 3a3 may be output on the light setting screen 3a.

In order to set the operating time of the lighting device 40, the time input portion 3a1 is manipulated. The currently set on-time and off-time of the lighting device 40 are displayed in the time input portion 3a1.

When the user manipulates the time input portion 3a1, the light setting screen 3a is switched and outputted from the time input portion 3a1 to the time selection portion 3a11 as illustrated in FIG. 76(b). The time selection portion 3a11 sequentially displays a plurality of on-times and off-times, and allows one of them to be selected. The time output from the time selection portion 3a11 may be, for example, the time set for the previous five times, and five times may be displayed at regular distances based on the current time. Of course, in the time selection portion 3a11, it will be possible for the user to directly input the time.

When the user selects a specific time in the time selection portion 3a11, the light setting screen 3a, as illustrated in FIG. 96(c), may be output after the time selection portion 3a11 is switched back to the time input portion 3a1. At this time, the time selected by the time selection portion 3a11 may be output to the time input portion 3a1.

In addition, the user may forcibly turn on/off the lighting device 40 using the user device 3.

FIG. 97 is a diagram sequentially illustrating manipulation states of the user device for setting the off state of the lighting device.

As illustrated in the drawing, an on/off input portion 3a2 may be displayed on the light setting screen 3a of the user device 3. The lighting device 40 is displayed in different states depending on the on/off state, so that the user may check the operation state of the lighting device 40 even from a remote location, and may operate the lighting device 40 more easily.

As illustrated in (a) of FIG. 97, when the user wants to forcibly turn off the lighting device 40 while the lighting device 40 is turned on, the user manipulates the on/off input portion 3a2.

When the on/off input portion 3a2 is manipulated, the on/off input portion 3a2 can be converted into an off time setting portion 3a21 as illustrated in FIG. 97(b). A plurality of off times during which the lighting device 40 is maintained in an off state may be displayed in the off time setting portion 3a21. The user can select any one of a plurality of displayed times.

When the off time setting portion 3a21 is manipulated, the on/off input portion 3a2 may be turned off and output as illustrated in FIG. 97(c). In addition, the light setting screen 3a may display the time during which the lighting device 40 maintains an off state.

In order to turn on the lighting device 40 again, the lighting device 40 can be manipulated, and if there is no separate manipulation, the lighting device 40 turns on again after the selected off time elapses. In addition, when the lighting device 40 is turned on, the light setting screen 3a becomes as illustrated in FIG. 24(a) again.

Meanwhile, the user may change the operation mode of the lighting device 40 by manipulating the user device 3.

FIG. 98 is a diagram sequentially illustrating manipulation states of the user device for setting the delay mode of the lighting device.

As illustrated, a operation mode input portion 3a3 may be output on the time setting screen of the user device 3.

The apparatus for cultivating plants 1 may control the harvesting time of the cultivated plants through setting of the operation mode. For example, the operation mode of the apparatus for cultivating plants 1 may include a normal mode in which a specific plant is harvested at a normal harvesting time and a delay mode in which a specific plant is harvested later than a general harvesting time.

If the user goes out for a long period of time during use of the apparatus for cultivating plants 1, or if the harvest of plants of the apparatus for cultivating plants 1 is not desired for a certain period of time, a more delayed harvest time than the harvest time of the general plant is required, and the apparatus for cultivating plants 1 can be set to operate in the delay mode by manipulating the operation mode input portion 3a3.

In the delay mode, the temperature inside the apparatus for cultivating plants 1 may be adjusted, the number and amount of water supplied may be adjusted, and the operation time of the lighting device 40 may be adjusted to slow down the growth of the plant and thus the operation state of the apparatus for cultivating plants 1 is changed.

For example, in the delay mode, the on time of the lighting device 40 may be adjusted to delay the harvesting time of plants. When the normal mode is selected, the lighting device 40 is turned on for 14 hours and then turned off, however, when the delay mode is selected, the lighting device 40 may be turned on for 10 hours and then turned off. Of course, the on-time of the lighting device 40 in the delay mode may be adjusted.

The mode input 3a3 may be displayed in different states according to user settings. For example, in a state where the apparatus for cultivating plants 1 is not set to the delay mode, it may be displayed as illustrated in FIG. 98(a).

In this state, when the user wants to set the operation mode of the apparatus for cultivating plants 1 to the delay mode, the user manipulates the operation mode input portion 3a3. When the operation mode input portion 3a3 is manipulated, the actual operation mode of the apparatus for cultivating plants 1 is changed to the delay mode, and in the light setting screen 3a of the user device 3, as illustrated in FIG. 98(b), the shape of the operation mode input portion 3a3 is changed so that operation mode change information can be delivered to the user.

Meanwhile, in the step in which the apparatus for cultivating plants 1 performs a selective operation [S600] according to the selected operation, a water supply and drainage process will be described in detail.

Figure 99:
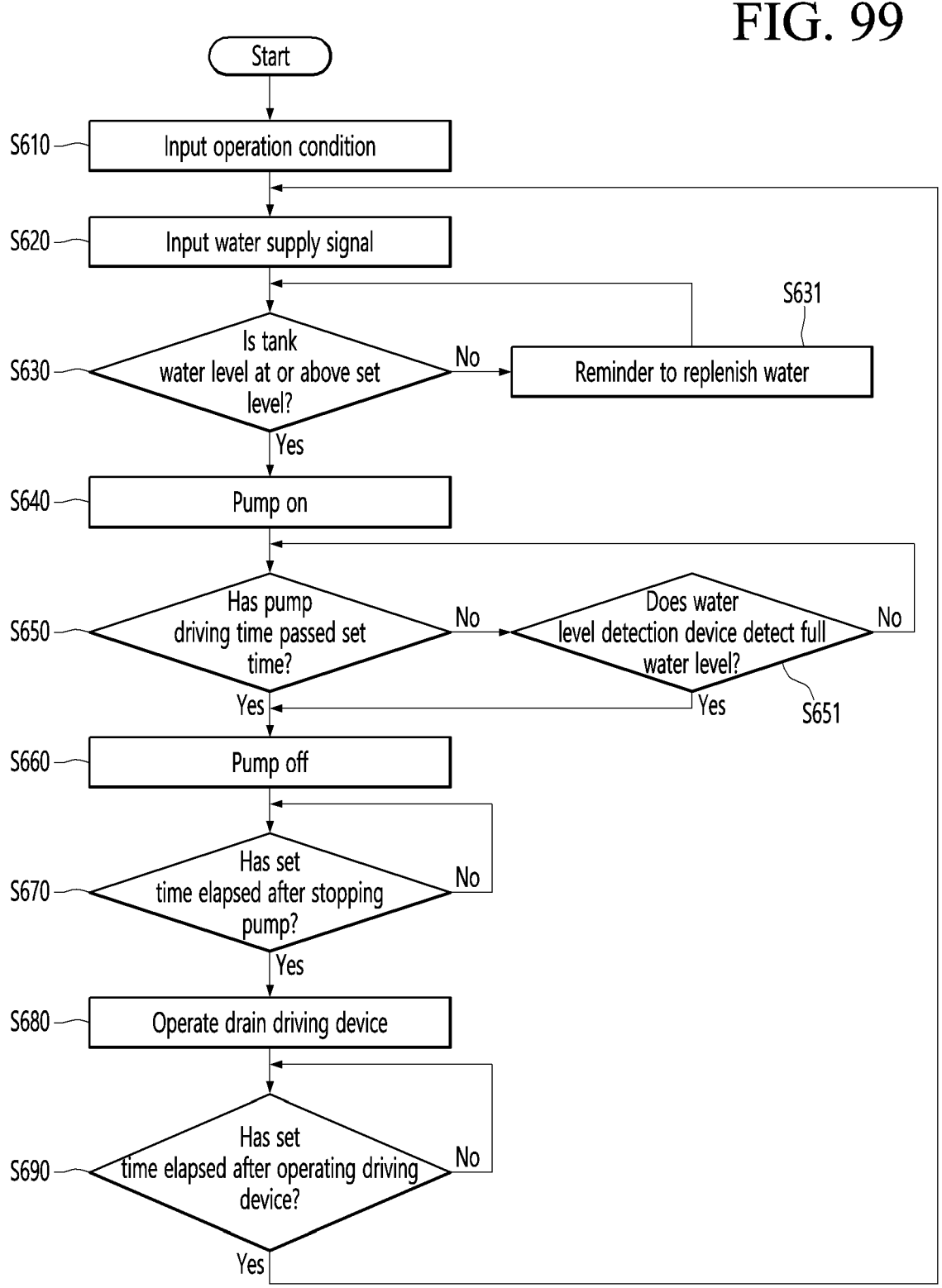
FIG. 99 is a flow chart illustrating a water supply operation process of the apparatus for cultivating plants.

FIG. 99 is a flow chart illustrating a water supply operation process of the apparatus for cultivating plants.

As illustrated in the figure, the control portion 27 receives operation conditions through previously stored operation information or operation information transmitted from the cloud server 2 and the user device 3 [S610].

In addition, the control portion 27 may input a water supply signal for starting water supply based on the operating conditions [S620].

When a water supply signal is input from the control portion 27, the control portion 27 determines the water level of the water tank 70 through the tank level detection device 743. That is, the control portion 27 checks whether the water level of the water tank 70 is equal to or higher than the set water level at which normal water supply can be performed. At this time, the set water level may be a water level at which water supply to the cultivation shelf 30 can be completed once. For example, since approximately 1 L of water is supplied to the cultivation shelf 30 once, the set water level may be a height when 1 L of water remains in the water tank 70 [S630].

If the water level detected by the tank level detection device 743 is lower than the set water level, water supply cannot be performed smoothly, and damage to cultivated plants due to poor water supply may be concerned, and air entrainment may cause failure or damage to the pump 83.

Accordingly, when an amount of water lower than the set water level is stored in the water tank 70, water shortage may be notified through the water supply display portion 148b of the display device 14. At this time, the user may be immediately notified of water shortage by simultaneously providing guidance through the user device 3.

In addition, the pump 83 may remain stopped until water is replenished in the water tank 70 [S631].

Meanwhile, when the water level of the water tank 70 is detected by the tank level detection device 743 as being equal to or higher than the set water level, water supply to the cultivation shelf 30 can be smoothly performed, so the controller 27 may turn on the pump 83 and start supplying water [S640].

By driving the pump 83, the water in the water tank 70 may pass through the sub-tank 82 and the pump 83 and be supplied to the cultivation shelf 30 through the water supply pipe 84. The water supplied to the cultivation shelf 30 is selectively supplied only to the position where the seed package 90 is seated among the seats 320 of the cultivation shelf 30, and thus the contamination of the cultivation space 100 and the cultivation shelf 30 may be prevented.

Water supplied to the cultivation shelf 30 can be accurately supplied in a set amount. For example, the set amount may be 1 L. The amount of water supplied to the cultivation shelf 30 may be determined by the driving time of the pump 83.

Therefore, the pump 83 can be operated for a time during which a set amount of water can be supplied and then stopped, and the control portion 27 determines whether the driving time of the pump 83 has passed the set time [S650].

Meanwhile, even though the set time has not elapsed, water exceeding the set amount may be supplied due to an abnormal water supply situation or a situation in which the pump 83 malfunctions. In this case, the shelf level detection device 49 detects that the water level of the cultivation shelf 30 is the set water level or more.

If the water level of the cultivation shelf 30 is detected above the set water level, the pump 83 is turned off, and when the water level of the cultivation shelf 30 is below the set water level, the pump 83 may remain turned on [S651].

Meanwhile, in step [S650], when the pump 83 is turned on and the set time elapses, it is determined that a fixed amount of water is supplied to the cultivation shelf 30, and the pump 83 may be turned off and water supply may be terminated [S660].

After the pump 83 is turned off, the cultivation shelf 30 may be maintained for a set time while being filled with a set amount of water. For example, the set time is 1 hour and 30 minutes, and the cultivation shelf 30 may be filled with water for 1 hour and 30 minutes after water supply is completed. If the cultivation shelf 30 is filled with a set amount of water for 1 hour and 30 minutes, a sufficient amount of water can be supplied to the inside of the seed package 90, and the plants inside the seed package 90 may absorb enough water for the required amount of water regardless of the type.

The control portion 27 determines whether a set time has elapsed after the pump 83 is turned off, and if the set time has elapsed, the water supply state is maintained, and when it is determined that the set time has passed, drainage is started [S670].

That is, when it is determined that the set time has elapsed after the pump 83 is turned off by the control portion 27, the driving device 86 is operated to start drainage. By the operation of the driving device 86, the opening/closing member 36 is rotated so that the drain hole 319a can be opened, and the water of the cultivation shelf 30 may be drained to the water tank 70 through the drain tray 85 and the drain pipe 89.

The driving device 86 maintains an operated state while the water of the cultivation shelf 30 is completely drained, and returns to the original position when the draining is completed, so that the opening/closing member 36 is in a state of shielding the drain port 319a [S680].

When the drainage is completed in the [S680] step, the cultivation shelf 30 becomes empty, and the inside of the cultivation space 100 including the cultivation shelf 30 by the continuous operation of the blower 50 is not exposed to water and can be dried by continuous air circulation. In addition, oxygen supply is promoted to the roots of plants inside the seed package 90, so that effective growth is possible.

After the step [S680] ends, the control portion 27 determines whether the set time has elapsed. That is, the control portion 27 determines whether the set time has elapsed and the time required for re-supply has arrived. At this time, the setting time may be 1 hour and 30 minutes. Accordingly, the control portion 27 generates a water supply signal every 3 hours to repeat water supply and drainage at regular time intervals [S690].

Meanwhile, in the apparatus for cultivating plants 1, the user may open the door 13 while driving, introduce and withdraw the cultivation shelf 30 to harvest or manage cultivated plants, or introduce and withdraw the water tank 70 for replenishing water or nutrients.

If water is supplied or drained at the moment when the user introduces and withdraws the cultivation shelf 30 or manipulates the water tank 70, water leakage may occur inside the cultivation space, and therefore, the control portion 27 detects the user to control the operation of the water supply module and the drain module by detection.

Hereinafter, the operation of the apparatus for cultivating plants 1 according to user detection will be described in more detail with reference to the drawings.

Figure 100:
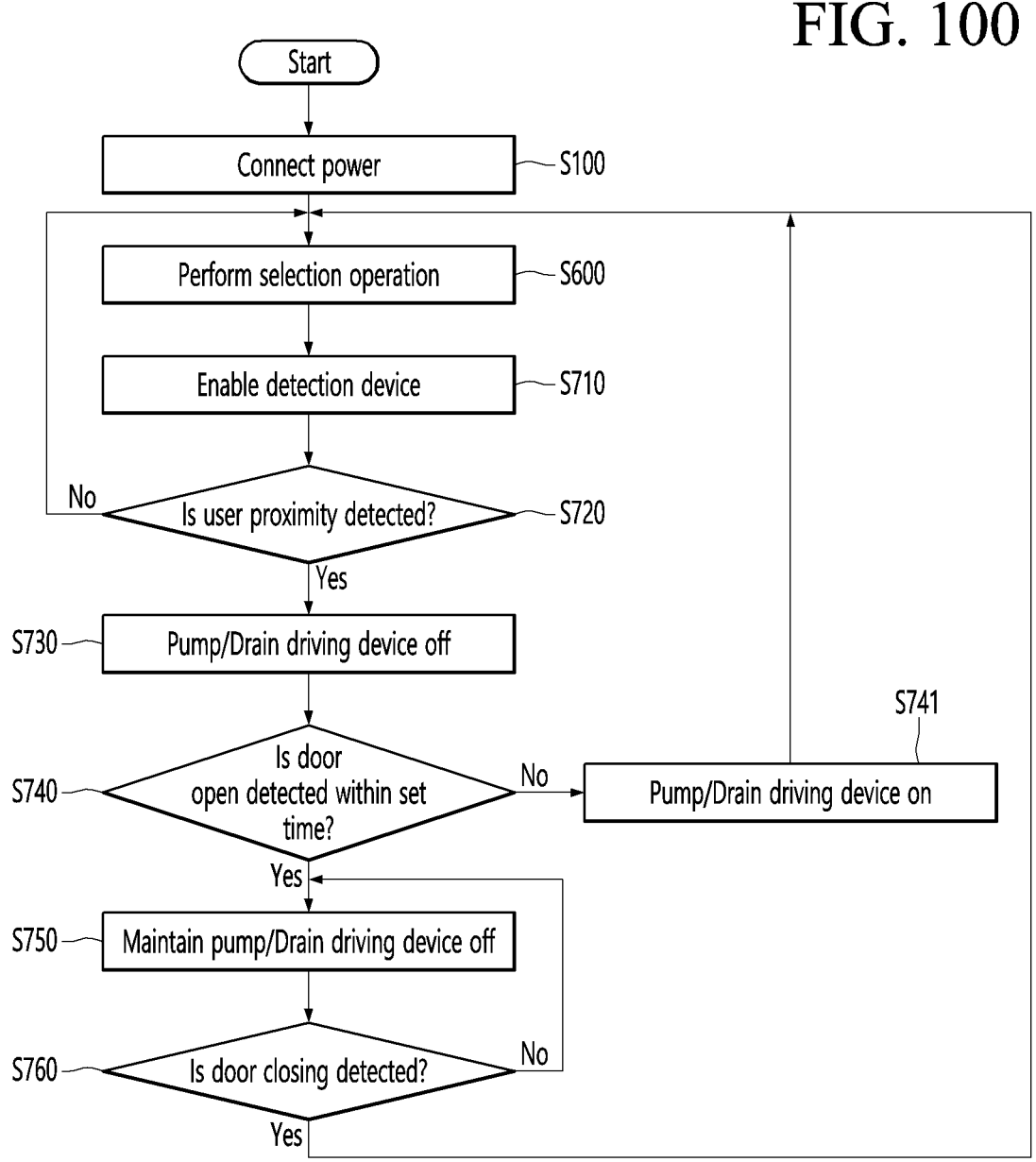
FIG. 100 is a flowchart illustrating an operation process according to the user detection sensor.

FIG. 100 is a flowchart illustrating an operation process according to the user detection sensor.

As illustrated in the figure, in order to set the operation of the lighting device 40 of the apparatus for cultivating plants 1, power is input to the apparatus for cultivating plants 1 and the operation is ready [S100].

In addition, the control portion 27 operates the apparatus for cultivating plants 1 as described above according to the selected operation logic [S600].

When the operation of the apparatus for cultivating plants 1 starts, the proximity detection device 28 is activated to detect whether a user has approached the apparatus for cultivating plants 1.

In detail, the proximity detection device 28 is preferably a distance detection sensor or a human body detection sensor rather than a sensor directly pressed or touched by a user. That is, the proximity detection device 28 may be mounted on the front surface of the apparatus for cultivating plants 1, and through this, it is possible to detect that the user has approached the apparatus for cultivating plants.

Since the proximity detection device 28 is not a method that the user touches, there is an advantage in that the user does not need to perform a special operation and if the user simply approaches the apparatus for cultivating plants 1, the proximity detection device can detect it.

The proximity detection device 28 may be provided to detect whether the user is within the detection distance and outside the detection distance while the apparatus for cultivating plants 1 is in operation, the former may be referred to as detection on and the latter may be referred to as detection off [S710].

The control portion 27 determines whether the user has approached within the detection distance through the proximity detection device 28. If the proximity detection device 28 does not detect the user's proximity, the control portion 27 maintains the normal selection operation execution step [S600]. Conversely, when the control portion 2 determines that the proximity detection device 28 is in an on state, the water supply and drainage are immediately stopped [S720].

When the proximity detection device 28 is turned on, the control portion 27 stops driving the pump 83 and returns the driving device 86 to a state prior to drainage. That is, even if the cultivation shelf 30 or the water tank 70 is withdrawn out by stopping water supply and drainage, the water supply and drainage operations are immediately stopped to prevent leakage [S730].

Meanwhile, the detection on state of the proximity detection device 28 may be a state where the user stays within a detection distance for a certain period of time. That is, there may be cases where the user simply passes by the apparatus for cultivating plants 1 within a detection distance. For example, when it is determined that the user is within a detection distance for a predetermined time in order to determine whether the user is in close proximity to the apparatus for cultivating plants 1 for a predetermined purpose, the detection on state may be established.

As such, in one embodiment of the present disclosure, determining whether the user's proximity to the apparatus for cultivating plants 1 is detected at a detection distance or a certain time within the detection distance has been described as an example, but the present disclosure is not limited thereto.

The control portion 2 may recognize whether the user opens the door 13 through the door opening detection device 118i. The control portion 2 may be connected to the door open detection device 118i, and thus may determine whether the door 13 is opened within a set time in a detection on state of the proximity detection device 28 [S740].

In detail, the user may not intend to approach the apparatus for cultivating plants 1 to open the door 13 but just pass by. In this case, it is preferable to turn on the operation of the water supply module 80 and the drain module 60 again.

In detail, if the user does not open the door 13 even after a set time elapses while the proximity detection device 28 is on, that is, if the door opening detection device 118i is in an off state, the control portion 2 can turn on the Pump 83 again. That is, if the door open signal, that is, the on state is not input from the door open detection device 118i in the detection on state, the control portion 2 operates the pump 83 to resume the stopped water supply. In addition, the set time may be, for example, between 1 and 15 seconds, but is not limited thereto.

In addition, if the user does not open the door 13 and the door opening detection device 118i is in an off state even if the proximity detection device 28 is turned on and the set time is exceeded, the control portion 2 sends an operation signal to the driving device 86, and the driving device 86 receiving the signal may rotate the opening/closing member 36 to open the drain hole 319a. That is, when the user's proximity is detected and the door open signal is not input by the door open detection device 118i, the control portion 2 operates the driving device 86 and thus interrupted drainage can be resumed [S741].

Meanwhile, when the proximity detection device 28 is turned on, the control portion 2 detects the user's proximity, and when the door opening detection device 118i is turned on and the opening of the door 13 is recognized, the state of the pump 83 and the driving device 86 which stop operation thereof is maintained. That is, when the door opening is recognized by the door opening detection device 118i, the control portion 2 can control the pump 83 and the driving device 86 to maintain an off state.

Accordingly, water supply and drainage may already be stopped before the user opens the door 13 and withdraws the cultivation shelf 30. That is, the control portion 2 can detect the user's proximity and stop the water supply or drainage process in advance before the user opens the door 13.

In detail, during the time when the user opens the door 13 and withdraws the cultivation shelf 30, the control portion 2 can already stop the water supply or drainage process, and can completely drain the remaining water in the water supply pipe or the cultivation shelf 30.

Therefore, even if the user withdraws the cultivation shelf 30 or the water tank 70 after opening of the door 13, water during water supply or drainage is prevented from flowing into a space other than the cultivation shelf 30 [S750].

Meanwhile, the opening of the door 13 is detected through the door opening detection device 118i, and the control portion 27 determines whether the door 13 is closed while the step [S750] is maintained.

That is, the control portion 27 maintains the step [S750] until closing of the door is detected through the door open detection device 118i, and when closing of the door is detected through the door open detection device 118i, the control portion 27 returns to the step [S600] of performing the selection operation.

Meanwhile, according to an embodiment of the present disclosure, when the proximity detection device 28 detects a detection on state, the lighting device 40 may be operated to provide light to the inside of the cabinet 10. That is, when it is detected by the proximity detection device 28 that a user is in front of the apparatus for cultivating plants 1, the control portion 2 sends a signal to the lighting device 40, so that the lighting device 40 can be turned on by operation.

Through this, the user can check the inside of the cabinet 10 through the see-through window 132a of the door even without opening the door. In addition, the user can determine whether the door 13 is opened or closed after checking the state of the cultivated plant.

In addition, when it is recognized that the door 13 is opened by the door open detection device 118i, the operation of the blower 50 may be stopped, and when it is recognized that the door 13 is closed by the door open detection device 118i, the operation of the blower 50 may be started.

INDUSTRIAL APPLICABILITY

Apparatus for cultivating plants according to an embodiment of the present disclosure has high industrial applicability because the usability is improved.

The invention claimed is:

1. An apparatus for cultivating plants, the apparatus comprising:
a cabinet having a cultivation space;
a door configured to open and close the cultivation space;
a cultivation shelf disposed in the cultivation space, and configured to seat a plurality of seed packages;
a lighting device configured to provide light to the cultivation shelf;
a water tank disposed in the cultivation space, and configured to store water; and
a water supply pipe configured to provide water from the water tank to the cultivation shelf,
wherein the lighting device includes:
 a light source module having a plurality of light sources; and
 a light case configured to mount the light source module,
 wherein a total number of the light sources disposed in a front half of the lighting device is greater than a total number of the light sources disposed in a rear half of the lighting device, and wherein a distance between adjacent light sources is narrower on both sides of the lighting device than a distance between adjacent light sources at a center of the lighting device.

2. The apparatus according to claim 1, wherein the cultivation shelf includes:
a shelf tray having a plurality of recessed seats to seat the seed packages; and
a shelf base disposed under the shelf tray, and configured to accommodate the water from the water supply pipe.

3. The apparatus according to claim 2,
wherein the cultivation shelf includes a shutter configured to open and close relative to the seats, and
wherein the shutter is configured such that when the shutter is opened, the water in the shelf base is to pass through the shutter and is to be introduced into the seats.

4. The apparatus according to claim 3,
wherein the shutter is movably mounted on the shelf tray relative to a vertical direction to be opened and closed, and
wherein the shutter is configured such that the see shutter is to be opened when the seed package is mounted on the seat, and the shutter is to maintain a closed state when the seed package is not mounted on the seat.

5. The apparatus according to claim 1, comprising:
shelf rails mounted on both sides of the cultivation space, and the cultivation shelf is to couple to the shelf rails such that the cultivation shelf is configured to be inserted and withdrawn relative to the cultivation space;
a plate-shaped evaporator on a wall at a rear of the cultivation space, and configured to adjust temperature of the cultivation space; and
a blower disposed in front of the plate-shaped evaporator.

6. The apparatus according to claim 5, wherein the cabinet includes:
an inner case configured to form the cultivation space;
an outer case configured to form an outer appearance; and
an insulator disposed in a space between the inner case and the outer case, and configured to insulate the cultivation space,
wherein a blower fan cover is disposed in front of the blower, and
wherein the inner case and the blower fan cover are configured to reflect light from the lighting device.

7. The apparatus according to claim 5, comprising:
a heater configured to heat the cultivation space;
a temperature sensor configured to sense a temperature of the cultivation space;
a machine room disposed below the cabinet, and a compressor is to be disposed in the machine room; and
a controller configured to control operation of the heater and the compressor.

8. The apparatus according to claim 5,
wherein a plurality of cultivation shelves are provided in a vertical direction to partition the cultivation space into a plurality of spaces,
wherein the lighting device is provided at an upper side of each of the spaces,
wherein the blower is disposed at a rear of each of the spaces,
wherein an outlet of the blower is disposed at a height corresponding to a lower surface of the lighting device, and
wherein an inlet of the blower is disposed at a height corresponding to a top surface of the cultivation shelf.

9. The apparatus according to claim 1, comprising:
a tank rail on an inner surface of the cultivation space, the water tank is to couple to the tank rail, and the tank rail is configured to allow the water tank to horizontally move relative to the cultivation space;
wherein the water tank includes:
a tank body to couple to the tank rail, and configured to store the water; and
a tank cover configured to open and close relative to a top of the tank body, and
wherein the tank rail is configured to withdrawal outwardly from the cultivation space such that the tank cover is rotatable.

10. The apparatus according to claim 1, comprising:
a tank rail on an inner surface of the cultivation space, the water tank is to couple to the tank rail, and the tank rail is configured to allow the water tank to move outward from the cultivation space;
wherein the water tank includes:
a tank body to couple to the tank rail, and configured to store the water;
a tank cover configured to rotate so as to open and close relative to the tank body;
a first water outlet to extend from a lower surface of the tank cover, and configured to provide a first flow path for the water stored in the tank body;
a second water outlet to extend in an introduction direction of the tank body, and configured to provide a second flow path for communicating with the first flow path; and
a fitting portion to be selectively coupled to the second water outlet when the tank body is introduced;
wherein a pump is configured to provide water from inside the tank body to the cultivation shelf via the first flow path, and the second flow path is connected to the fitting portion.

11. The apparatus according to claim 1, comprising:
a pump to connect to the water supply pipe; and
a sub-tank disposed between an outlet of the water tank and an inlet of the pump, and the sub-tank having a storage space smaller than a storage space of the water tank;
wherein the sub-tank includes:
a transparent window for the sub-tank; and
an ultraviolet (UV) lamp configured to irradiate ultraviolet rays through the transparent window and to the storage space of the sub-tank.

12. The apparatus according to claim 1, comprising:
a pump configured to provide the water to the water supply pipe;
drain holes disposed in the cultivation shelf;
an opening/closing member configured to open and close each of the drain holes;
a driving device configured to drive the opening/closing member;
a drain pipe configured to guide water from the cultivation shelf based on the opening of the opening/closing member; and
a controller configured to control operation of the driving device and the pump.

13. The apparatus according to claim 1, comprising:
a display device having an input device configured to input at least a time and a display configured to display time, and
wherein the display device is disposed at a position facing the door, and the display is visible through the door when the door is closed.

14. The apparatus according to claim 1, wherein the seed package includes:
- a seed accommodation member configured to absorb moisture while accommodating cultivated seeds therein;
- a container configured to accommodate the seed accommodation member; and
- a cover configured to shield top of the container, and
- wherein the seed accommodation member is to provide a seed accommodation groove to extend from the cover and a plurality of cell structures are configured for growth of roots of seeds.

15. The apparatus according to claim 1, wherein the light case includes:
- a separation portion in a center of a bottom surface of the light source where the light source module is not arranged;
- a front module mounting portion provided in front of the separation portion; and
- a rear module mounting portion provided in rear of the separation portion.

16. The apparatus according to claim 15, wherein the light sources mounted on the front module mounting portion are spaced apart such that spacing between the light sources disposed at a center of the front module mounting portion is wider than spacing between the light sources disposed on either side of the front module mounting portion.

17. The apparatus according to claim 15, wherein a number of the light sources disposed on a first half of the front module mounting portion is greater than a number of the light sources disposed on a second half of the front module mounting portion.

18. The apparatus according to claim 15, wherein the light sources mounted on the rear module mounting portion become narrower as they are positioned from a center of the rear module mounting portion to both sides of the rear module mounting portion.

19. The apparatus according to claim 15, wherein a number of the light sources mounted on a front part of the rear module mounting portion is greater than a number of the light sources mounted on a rear part of the rear module mounting portion.

* * * * *